US012784493B1

(12) United States Patent
Wang et al.

(10) Patent No.: US 12,784,493 B1
(45) Date of Patent: Nov. 3, 2026

(54) NEURAL-NETWORK BASED OBJECT GENERATION

(71) Applicant: Nvidia Corporation, Santa Clara, CA (US)

(72) Inventors: Ting-Chun Wang, Santa Clara, CA (US); Arun Mallya, Mountain View, CA (US); Ming-Yu Liu, San Jose, CA (US); Abhijit Patait, Pune (IN); Aurobinda Maharana, Pune (IN); Vignesh Ungrapalli, Udupi (IN); Yogender Kumar Gupta, Bengaluru (IN); Vipul Parashar, Bulandshahr (IN); Vishesh Lokras, Pune (IN)

(73) Assignee: NVIDIA Corporation, Santa Clara, CA (US)

( * ) Notice: Subject to any disclaimer, the term of this patent is extended or adjusted under 35 U.S.C. 154(b) by 469 days.

(21) Appl. No.: 17/713,009

(22) Filed: Apr. 4, 2022

(51) Int. Cl.

| | |
|---|---|
| ***G06V 40/16*** | (2022.01) |
| ***G06T 7/70*** | (2017.01) |
| ***G06V 10/22*** | (2022.01) |
| ***H04L 65/403*** | (2022.01) |

(52) U.S. Cl.
CPC .............. *G06V 40/161* (2022.01); *G06T 7/70* (2017.01); *G06V 10/22* (2022.01); *G06V 40/168* (2022.01); *G06T 2207/30201* (2013.01); *H04L 65/403* (2013.01)

(58) Field of Classification Search
None
See application file for complete search history.

(56) References Cited

U.S. PATENT DOCUMENTS 8,265,392 B2 * 9/2012 Wang .................. H04N 19/503 382/173
11,277,562 B2 3/2022 Kang et al.
11,335,077 B1 * 5/2022 Salmani Rahimi ...... G06N 3/02
11,363,199 B2 6/2022 Lee et al.
11,368,652 B1 * 6/2022 Johnson ............... G06V 40/171
11,425,412 B1 8/2022 Gigliotti et al.
11,558,553 B2 1/2023 Song et al.
11,599,376 B1 * 3/2023 Viswanathan ........ G06F 9/3877
11,856,203 B1 12/2023 Tschannen et al.
11,889,230 B2 * 1/2024 Astarabadi ............... H04N 7/15
12,126,902 B2 10/2024 Kim et al.
2008/0037838 A1 * 2/2008 Ianculescu .......... G06F 18/2148 382/118
2009/0303342 A1 * 12/2009 Corcoran ................ G06T 7/248 348/222.1
2010/0208206 A1 8/2010 Connell, II
2011/0064276 A1 3/2011 Tanaka et al.

(Continued)

OTHER PUBLICATIONS

IEEE "IEEE Standard for Floating-Point Arithmetric", Microprocessor Standards Committee of the IEEE Computer Society, IEEE Std 754-2008, dated Jun. 12, 2008.

(Continued)

*Primary Examiner* — Michelle M Entezari Hausmann
(74) *Attorney, Agent, or Firm* — Robert C. Kowert; Kowert, Hood, Munyon, Rankin & Goetzel, P.C.

(57) ABSTRACT

Apparatuses, systems, and techniques are presented to generate image data. In at least one embodiment, one or more objects are generated within one or more second images based, at least in part, on one or more features of the one or more objects within one or more first images.

30 Claims, 63 Drawing Sheets

(56) References Cited

U.S. PATENT DOCUMENTS

| | | | | |
|---|---|---|---|---|
| 2011/0274315 | A1* | 11/2011 | Fan | G06T 7/277 382/103 |
| 2012/0189168 | A1* | 7/2012 | El-Maleh | G06T 7/174 382/107 |
| 2013/0136171 | A1 | 5/2013 | Lee et al. | |
| 2013/0322537 | A1 | 12/2013 | Rossato et al. | |
| 2014/0267808 | A1 | 9/2014 | Kuwata | |
| 2014/0286593 | A1 | 9/2014 | Numata | |
| 2016/0004904 | A1* | 1/2016 | Senechal | G16H 20/30 382/118 |
| 2016/0191995 | A1* | 6/2016 | el Kaliouby | H04N 21/812 725/12 |
| 2016/0224852 | A1* | 8/2016 | Vicente | B60Q 9/00 |
| 2018/0260614 | A1* | 9/2018 | Wang | G06F 17/11 |
| 2018/0293755 | A1 | 10/2018 | Ahuja et al. | |
| 2018/0300885 | A1 | 10/2018 | On | |
| 2019/0051057 | A1 | 2/2019 | Sommerlade et al. | |
| 2019/0065853 | A1 | 2/2019 | Sohn et al. | |
| 2019/0080474 | A1 | 3/2019 | Lagun et al. | |
| 2019/0110003 | A1 | 4/2019 | Lai et al. | |
| 2019/0230269 | A1* | 7/2019 | Saito | G08B 13/19617 |
| 2020/0049946 | A1 | 2/2020 | Peuhkurinen et al. | |
| 2020/0077023 | A1 | 3/2020 | Kang et al. | |
| 2020/0202604 | A1* | 6/2020 | Otani | G06T 13/40 |
| 2020/0234034 | A1* | 7/2020 | Savchenkov | G06V 10/82 |
| 2020/0372614 | A1 | 11/2020 | Tran et al. | |
| 2021/0012549 | A1 | 1/2021 | Comer et al. | |
| 2021/0034836 | A1 | 2/2021 | Haimovitch-Yogev et al. | |
| 2021/0042520 | A1 | 2/2021 | Molin et al. | |
| 2021/0049468 | A1 | 2/2021 | Karras et al. | |
| 2021/0181351 | A1* | 6/2021 | Ge | B60W 10/20 |
| 2021/0209734 | A1* | 7/2021 | Simhadri | G06N 20/20 |
| 2021/0237764 | A1 | 8/2021 | Tang et al. | |
| 2021/0318850 | A1 | 10/2021 | Thomas | |
| 2021/0329306 | A1 | 10/2021 | Liu et al. | |
| 2021/0339759 | A1* | 11/2021 | Fouad | A61B 5/0077 |
| 2021/0365707 | A1* | 11/2021 | Mao | G06F 18/2413 |
| 2021/0385383 | A1 | 12/2021 | Kim et al. | |
| 2021/0407103 | A1* | 12/2021 | Tang | G06V 40/25 |
| 2022/0005160 | A1 | 1/2022 | Anisimovskiy et al. | |
| 2022/0058407 | A1 | 2/2022 | Yang et al. | |
| 2022/0141422 | A1 | 5/2022 | Bathiche et al. | |
| 2022/0148332 | A1 | 5/2022 | Nor et al. | |
| 2022/0198959 | A1 | 6/2022 | Sheynikhovich et al. | |
| 2022/0206571 | A1 | 6/2022 | Drozdov et al. | |
| 2022/0398692 | A1* | 12/2022 | Jiang | H04N 19/20 |
| 2023/0022444 | A1 | 1/2023 | Lee et al. | |
| 2023/0050618 | A1 | 2/2023 | Kim et al. | |
| 2023/0072627 | A1 | 3/2023 | Jiang et al. | |
| 2023/0222676 | A1 | 7/2023 | Jafari-Khouzani et al. | |
| 2023/0290142 | A1* | 9/2023 | Yoon | G06V 20/41 |
| 2023/0306789 | A1 | 9/2023 | Vemulapalli | |
| 2023/0351662 | A1 | 11/2023 | Sinha et al. | |
| 2023/0401682 | A1* | 12/2023 | Hu | G06V 10/774 |
| 2024/0029410 | A1 | 1/2024 | Chen et al. | |
| 2024/0144008 | A1 | 5/2024 | Tanji | |
| 2024/0353739 | A1 | 10/2024 | Sato et al. | |

OTHER PUBLICATIONS

Society of Automotive Engineers On-Road Automated Vehicle Standards Committee "Taxonomy and Definitions for Terms Related to Driving Automation Systems for On-Road Motor Vehicles", Standard No. J3016-201806, dated Jun. 15, 2018.

Society of Automotive Engineers On-Road Automated Vehicle Standards Committee, "Taxonomy and Definitions for Terms Related to Driving Automation Systems for On-Road Motor Vehicles," Standard No. J3016-201609, issued Jan. 2014, revised Sep. 2016, 30 pages.

U.S. Appl. No. 19/771,578, filed Aug. 10, 2026, Ting-Chun Wang.

* cited by examiner

NEURAL-NETWORK BASED OBJECT GENERATION

TECHNICAL FIELD

At least one embodiment pertains to processing resources used to perform compression of video data, such as during video conferencing, using neural networks. For example, at least one embodiment pertains to processors or computing systems used to communicate, from a sender to a receiver, a key frame and one or more keypoints identified by a first neural network, and reconstruct, by a receiver, one or more video frames based on said key frame and one or more keypoints using a second neural network, according to various novel techniques described herein.

BACKGROUND

Streaming media, such as video content, is increasingly popular due to widespread availability of video conferencing technologies. Recent demand for remote working has further increased demand for streaming video content to facilitate everyday workplace interaction. However, streaming video content places high demands for bandwidth on network infrastructure. This is further exacerbated by inconsistent or poor connection quality often available to remote working environments. Traditionally, streaming video services employ video compression solutions to improve connection quality between video conferencing parties and reduce bandwidth requirements. While such solutions often provide savings in bandwidth, the savings are often marginal and sometimes at the expense of video quality.

DETAILED DESCRIPTION

Figure 1:
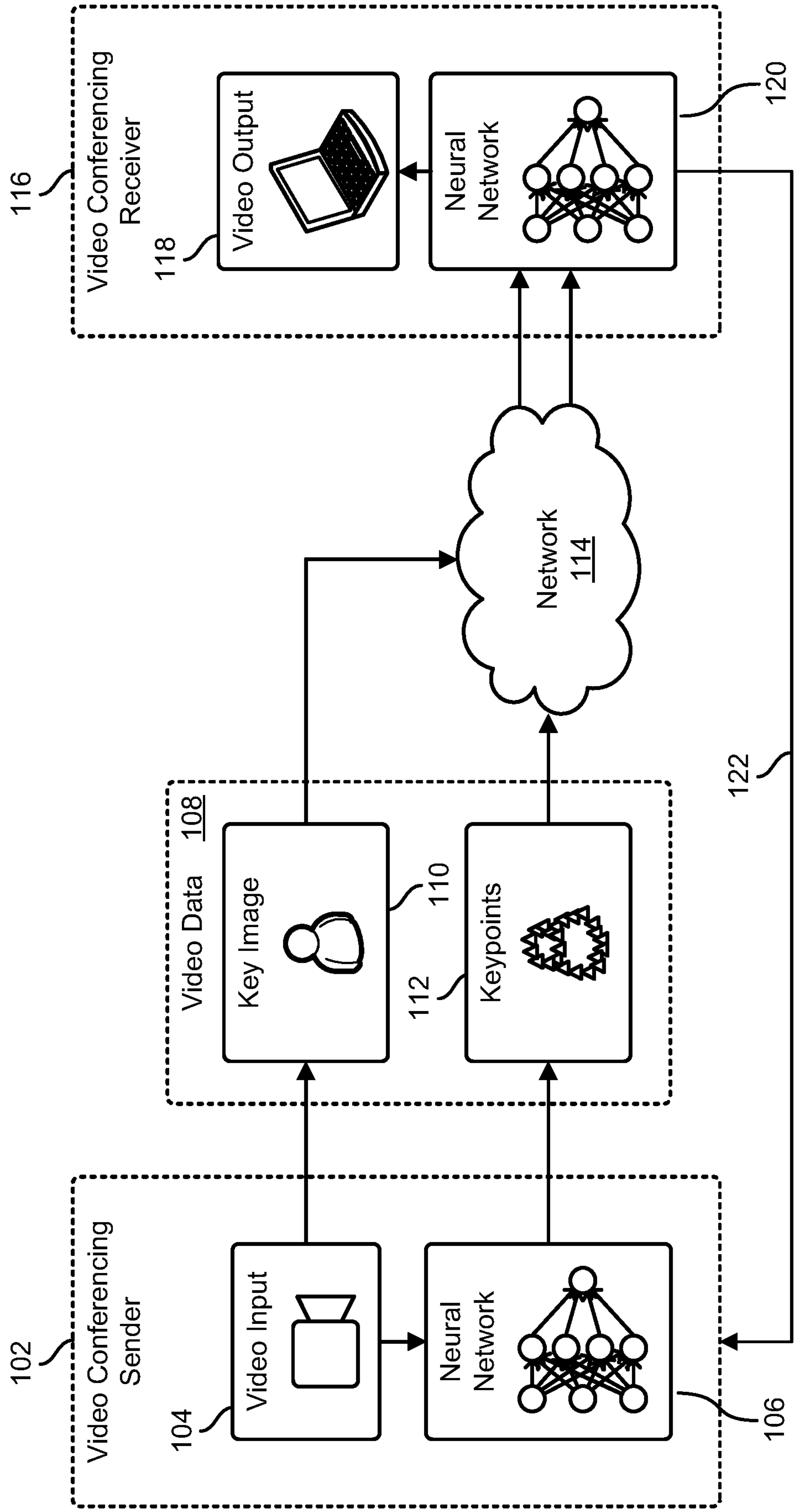
FIG. 1 is a block diagram illustrating an architecture for video streaming, such as video conferencing, between a sender and a receiver using neural networks, according to at least one embodiment.

FIG. 1 is a block diagram illustrating an architecture for video streaming, such as video conferencing, between a sender 102 and a receiver 118 using neural networks 108, 124, according to at least one embodiment. In at least one embodiment, video streaming comprises video conferencing or teleconferencing. Video streaming comprises, in an embodiment, video game streaming and video game streaming services. In at least one embodiment, video streaming comprises digital satellite video streaming, such as digital satellite television streaming. In at least one embodiment, video streaming comprises broadcast video streaming. Video streaming, in an embodiment, comprises internet video streaming. In at least one embodiment, video streaming comprises digital video broadcasting. Video streaming, in an embodiment, comprises any Advanced Televisions Systems Committee (ATSC) approved television or other video broadcast technique, such as cable or broadcast television. In at least one embodiment, video streaming comprises any ATSC mobile/handheld (ATSC-M/H) video broadcast method. In at least one embodiment, video streaming comprises closed circuit television streaming and other closed circuit digital video capture or broadcast. In at least one embodiment, video streaming comprises video capture and encoding performed by personal digital cameras, such as DSLR cameras, to store, encode, and transmit digital video data. In at least one embodiment, an architecture illustrated in FIG. 1 is usable for any video streaming and/or video capture application described above or further described herein.

In at least one embodiment, a sender 102 is a computing system or any other computing device comprising one or more video input 104 devices and one or more neural networks 106. In at least one embodiment, a sender 102 generates or captures video data 108 using one or more video input 104 devices in conjunction with one or more neural networks 106. In at least one embodiment, a sender 102 generates video data 108 using video capture or video streaming software, such as video game streaming software or video conferencing software. In at least one embodiment, video data 108 is data comprising information usable to reconstruct or regenerate one or more images or video frames, where said information is generated, in part, by one or more video input 104 devices and one or more neural networks 106.

In at least one embodiment, a video input 104 device is a hardware device comprising one or more hardware components to capture image and video information. In at least one embodiment, a video input 104 device is a software video capture program, such as a screen capture program or video conferencing program. In at least one embodiment, a video input 104 is a video game streaming software program. In at least one embodiment, a video input 104 is any other software or hardware component to capture, generate, or receive video data. In at least one embodiment, a video input 104 device is a camera. In at least one embodiment, a video input 104 device is any other type of device further described herein to capture image and video information. In at least one embodiment, a sender 102 comprises a single video input 104 device. A sender 102, in an embodiment, comprises a plurality of video input 104 devices to facilitate capture of image and video information. In at least one embodiment, one or more video input 104 devices capture or otherwise generate two-dimensional (2D) images, video frames, or other information about one or more objects. In at least one embodiment, one or more video input 104 devices capture or otherwise generate three-dimensional (3D) images, video frames, or other information about one or more objects. In at least one embodiment, one or more video input 104 devices capture or otherwise generate images, video frames, or other information about one or more objects usable as a key image (e.g., a frame) 110.

In at least one embodiment, a key image (e.g., a video frame) 110 is data comprising information about a single image or frame of video captured or otherwise generated by one or more video input 104 devices. In at least one embodiment, a key image 110, such as a video frame, is a first image in a sequence of images, such as a first frame in a sequence of video frames. In at least one embodiment, a key image (e.g., a frame) 110 is a component of video data 108 usable for reconstruction or regeneration of one or more video frames by one or more neural networks 120. In at least one embodiment, a key image 110, such as a frame, is generated by one or more video input 104 devices prior to generation of additional video data 108 by one or more neural networks 106. In at least one embodiment, a key image (e.g., a frame) 110 is generated by one or more video input 104 devices as a result of a request 122 to generate a new key image 110, such as a new key frame, by a receiver 116. In at least one embodiment, a key image (e.g., a frame) 110 generated by one or more video input 104 devices as a result of a request 122 to generate a new key image 110 is a second image, or different image from a sequence of images, such as a different frame in a sequence of video frames. In at least one embodiment, a sender 102 selects a key image 110 for transmission to a receiver 116. In at least one embodiment, a key image 110 is determined by one or more video inputs 104 and/or one or more sender neural networks 106. In at least one embodiment, a key image 110 is otherwise determined or selected by a sender 102 or one or more components, such as one or more video input 104 devices or one or more sender neural networks 106, utilized by a sender 102. In at least one embodiment, in conjunction with a key image 110, one or more video input 104 devices capture or otherwise generate images, video, or other information about one or more objects to be converted into video data 108 by one or more neural networks 106.

In at least one embodiment, a sender 102 comprises one or more sender neural networks 106. In at least one embodiment, a sender neural network 106 is data values and software instructions that, when executed, generate video data 108 comprising information about an object or objects captured by one or more video input 104 devices. In at least one embodiment, one or more neural networks 106 are usable, by a sender, to determine one or more key images 110. In at least one embodiment, one or more neural networks 106 utilized by a sender 102 generate or otherwise infer features or keypoints 112 for one or more images or video frames captured or otherwise generated by one or more video input 104 devices. In at least one embodiment, one or more neural networks 106 utilized by a sender 102 generate or otherwise infer an appearance vector comprising one or more data values indicating features or keypoints 112 for one or more images. In at least one embodiment, an appearance vector comprising information about features or keypoints 112 is an abstract latent code.

In at least one embodiment, a sender neural network 106 is trained using a training framework implementing a generative adversarial network (GAN), as described below in conjunction with FIG. 6. In at least one embodiment, a sender neural network 106 is trained using a training framework implementing a StyleGAN. In at least one embodiment, a sender neural network 106 is trained using a training framework to infer or otherwise generate features or keypoints 112 for a specific object, subject, user, or person. In at least one embodiment, a sender neural network 106 is trained using a training framework to infer or otherwise generate features or keypoints 112 generally for any object or objects in one or more images or video frames captured by one or more video input 104 devices. In at least one embodiment, a sender neural network 106 is trained by a training framework implementing a GAN prior to deployment. In at least one embodiment, a sender neural network 106 continues training after deployment.

In at least one embodiment, features or keypoints 112 are one or more sets of data, where each data item in each set of data comprises information about points of interest, or features, in an object captured by one or more video input 104 devices. Points of interest, in an embodiment, comprise locations or other data points in each video frame captured by one or more video input 104 devices, where each location or other data point corresponds to a feature or features, identified by one or more neural networks 106, of an object or objects in each video frame. In at least one embodiment, points of interest comprise information about features such as eye, nose, jaw, mouth, or other facial features. In at least one embodiment, points of interest comprise information about hands, arms, or other object features that indicate object position. In at least one embodiment, points of interest comprise information about any other object feature usable to facilitate reconstruction of video frames.

In at least one embodiment, keypoints 112 generated or otherwise inferred by one or more sender neural networks 106 comprise individual sets of data for each video frame captured or otherwise generated by one or more video input 104 devices. In at least one embodiment, keypoints 112 comprise individual data sets for a subset of video frames captured or otherwise generated by one or more video input 104 devices. Individual data sets corresponding to a video frame, in an embodiment, comprise one or more points or locations in a video frame captured by one or more video input 104 devices corresponding to points of interest in said video frame, as described above. In at least one embodiment, individual data sets corresponding to a video frame, in an embodiment, comprise data about compact features associated with said video frame.

In at least one embodiment, individual data sets corresponding to a video frame, in an embodiment, comprise data about one or more points or locations in said video frame. In at least one embodiment, data about one or more points or locations in a video frame captured by one or more video input 104 devices comprises coordinate information associated with an individual point of interest in said video frame. Data about one or more points or locations in a video frame, in an embodiment, comprises movement information about said points or locations in said video frame. In at least one embodiment, data about one or more points or locations in a video frame comprises any other information capable of being identified by one or more neural networks 106 to facilitate generation of video data 108 usable by a receiver 116 to reconstruct or otherwise estimate video frames captured by one or more video input 104 devices, as described below.

In at least one embodiment, one or more neural networks 106 utilized by a sender 102 are convolutional neural networks. In at least one embodiment, one or more neural networks 106 utilized by a sender 102 are, individually, any type of neural network usable for keypoint identification in one or more video frames as further described herein. One or more sender neural networks 106, in an embodiment, are any type of neural network usable to perform neural network operations further described herein. In at least one embodiment, one or more sender neural networks 106 are trained by a sender 102 or any other entity, such as a streaming video or video conferencing provider, using a training framework such as a generative adversarial network (GAN), as described below in conjunction with FIG. 6. A sender 102 or any other entity, such as a streaming video or video conferencing provider, trains one or more neural networks 106 using any type of training framework usable to train one or more neural networks 106 to generate video data 108 such as keypoints 112.

In at least one embodiment, video data 108 comprises a key image 110 combined with one or more keypoints 112 generated by one or more neural networks 106. Video data 108, in an embodiment, comprises a key image 110 in conjunction with any other type of information generated by one or more neural networks 106 to facilitate reconstruction of one or more video frames by a receiver 116. In at least one embodiment, a key image 110 is transmitted or otherwise communicated by a sender 102 separately from one or more keypoints 112. In at least one embodiment, one or more keypoints 112 are transmitted or otherwise communicated by a sender 102 separately from a key image 110. A sender 102 transmits or otherwise communicates video data 108 comprising a key image 110 and one or more keypoints 112, in an embodiment, over a network 114.

In at least one embodiment, a sender 102 transmits or otherwise communicates video data 108 over a network 114 to one or more receivers 116. In at least one embodiment, a network 114 is a communication medium between two or more computing systems to facilitate exchange of data or other information between said two or more computing systems. In at least one embodiment, a network 114 comprises a local area network (LAN). In at least one embodiment, a network 114 comprises hardware and/or software to facilitate peer-to-peer data exchange over a wireless communication protocol such as Bluetooth™ or any near-field communication (NFC) protocol further described herein. In at least one embodiment, a network 114 comprises hardware and/or software to facilitate Internet communication. In at least one embodiment, a network 114 comprises any other hardware and/or software to facilitate exchange of data or other information between one or more senders 102 and one or more receivers 116.

In at least one embodiment, a receiver 128 receives video data 110 transmitted over a network 116 and reconstructs, using a receiver neural network 124, video content for a video output 122 from said video data 110. For example, a receiver 128 receives video data 110 comprising one or more keypoints 112 to be used, by a receiver neural network 124 in conjunction with a previously received key image 110, as video data 110 over a network 116. In at least one embodiment, a receiver 116 is a computing system or computing device such as a laptop or desktop computer, a tablet, or any other stationary or mobile personal or cloud-based computing device comprising one or more video outputs 118. In at least one embodiment, a receiver 116 comprises one or more human or other users. In at least one embodiment, a receiver 116 comprises no human users. In at least one embodiment, a receiver 116 is a computing resource services provider, as described below in conjunction with FIG. 2.

In at least one embodiment, a receiver 116 comprises one or more video output 118 devices. In at least one embodiment, a video output 118 device is one or more graphics processors or graphics rendering devices capable of rendering video for display on one or more video displays, as further described herein. In at least one embodiment, one or more video output 118 devices or components receive video frames or other video data to be output for display on one or more video displays from one or more neural networks 120.

In at least one embodiment, a receiver 116 neural network 120 is data values and software instructions that, when executed, reconstruct or otherwise infer one or more video frames to be displayed by one or more video output devices 118 based on a key image 110 and one or more keypoints 112, as described above. In at least one embodiment, one or more receiver neural networks 120 infer one or more video frames using a key image 110 as a base image in conjunction with information from one or more keypoints 112 to indicate updates to said key image 110, as described below in conjunction with FIGS. 104 and 5. In at least one embodiment, one or more receiver 116 neural networks 120 infer one or more video frames using a key image 110 comprising image data received from a sender 102. In at least one embodiment, one or more receiver 116 neural networks 120 infer one or more video frames using a key image 110 comprising image data previously stored by a receiver 116.

In at least one embodiment, if one or more receiver 116 neural networks 120 infer or otherwise determine that one or more features, such as keypoints 112, received from a sender 102, indicate a new key image 110 is required, said one or more receiver 116 neural networks 120 request 122 a new key image 110 from said sender 102. If one or more receiver 116 neural networks 120, in an embodiment, infer or otherwise determine that a key image 110 has corrupted data, poor or reduced data quality, or is otherwise unusable for inference or reconstruction of one or more video frames by said receiver 116, said one or more receiver 116 neural networks 120 request 122 a new key image 110 from a sender 102. In at least one embodiment, if a receiver 116 otherwise determines that a new key image 110 is required, said receiver 116 requests 122 a new key image 110 from a sender 102. In at least one embodiment, a request 122 for a new key image 110 is one or more packets, messages, or other network 114 communication techniques to signal or indicate to a sender 102 that said new key image 110 is requested by said receiver 116.

In at least one embodiment, one or more receiver 116 neural networks 120 infer, generate, or otherwise reconstruct 2D video frames from 2D video data 108. One or more receiver 116 neural networks 120 infer, generate, or otherwise reconstruct 3D video frames from 3D video data 108. In at least one embodiment, one or more receiver 116 neural networks 120 rotate one or more 3D characteristics of a sender 102, such as a face, based on input or feedback from one or more users of a receiver 116 computing system or device. In at least one embodiment, input or feedback from one or more users of a receiver 116 computing system or device is received, by said receiver 116 computing system or device, from a user input device such as a computer mouse or touchscreen.

In at least one embodiment, one or more receiver 116 neural networks 120 apply one or more structural adjustments or modifications to one or more video frames generated, inferred, or otherwise reconstructed by said one or more receiver 116 neural networks 120. In at least one embodiment, temporal upsampling is usable to generate additional images or video frames by one or more receiver 116 neural networks by interpolating between different received sets of features or landmarks. In at least one embodiment, one or more receiver 116 neural networks 120 apply style mixing to sharpen motion blurred portions of one or more images or video frames generated or otherwise inferred by said one or more receiver 116 neural networks 120.

In at least one embodiment, one or more receiver 116 neural networks 120 apply one or more visual adjustments or modifications to one or more video frames generated, inferred, or otherwise reconstructed by said one or more receiver 116 neural networks 120. In at least one embodiment, one or more receiver 116 neural networks 120 generate one or more modified video frames indicated by one or more users of a receiver 116. In at least one embodiment, one or more modified video frames generated, inferred, or otherwise created by one or more receiver 116 neural networks 120 comprise deep fakes, wherein said one or more receiver 116 neural networks 120 utilize one or more key images 110 indicating one or more alternative objects. In at least one embodiment, one or more alternative objects are objects, such as one or more users, that are not captured or otherwise observed by one or more video input 104 devices in a sender 102 computing system. For example, in an embodiment, one or more alternate objects are cartoon or video game representations comprising features, such as keypoints.

In at least one embodiment, one or more modified video frames generated, inferred, or otherwise created by one or more receiver 116 neural networks 120 comprise background changes, wherein said one or more receiver 116 neural networks 120 change a background identified by said one or more receiver 116 neural networks 120 in one or more key images 110. In at least one embodiment, one or more receiver 116 neural networks segment one or more key images 110 into foreground and background objects, and modify or change one or more background objects. In at least one embodiment, one or more receiver 116 neural networks 120 replace one or more background objects with a predetermined location or scene. In at least one embodiment, one or more receiver 116 neural networks 120 replace one or more background objects with a scene to indicate that one or more users of a sender 102 computing system are located at an alternative geographic location. In at least one embodiment, one or more receiver 116 neural networks 120 replace one or more background objects with one or more images or video frames provided by a sender 102. In at least one embodiment, one or more receiver 116 neural networks 120 replace one or more background objects with one or more images or video frames provided by a third party that is not a sender 102 or said receiver 116. In at least one embodiment, one or more receiver 116 neural networks 120 replace one or more background objects with one or more images or video frames to match or otherwise facilitate overlays applied to one or more foreground objects, such as a user, identified by said one or more receiver 116 neural networks 120.

In at least one embodiment, one or more modified video frames generated, inferred, or otherwise created by one or more receiver 116 neural networks 120 comprise overlays, wherein said one or more receiver 116 neural networks 120 add or remove one or more objects to one or more video frames. For example, in an embodiment, one or more receiver 116 neural networks 120 add a clothing item, such as a hat, to one or more users in one or more video frames generated, inferred, or otherwise reconstructed by said one or more receiver 116 neural networks 120. In at least one embodiment, one or more receiver 116 neural networks 120 remove one or more objects, such as glasses, from one or more users in one or more video frames generated, inferred, or otherwise reconstructed by said one or more receiver 116 neural networks 120.

In at least one embodiment, one or more modified video frames generated, inferred, or otherwise created by one or more receiver 116 neural networks 120 comprise feature adjustments, wherein said one or more receiver 116 neural networks 120 change one or more aspects of one or more users of a sender 102 computing system. In at least one embodiment, features comprise eye, skin, or hair color. In at least one embodiment, features comprise makeup applied to one or more users of a sender 102 computing system. In at least one embodiment, features comprise facial hair or clothing accessories, such as a hat, glasses, earrings, or any other clothing item commonly worn by users of a computing system.

In at least one embodiment, one or more modified video frames generated, inferred, or otherwise created by one or more receiver 116 neural networks 120 comprise pose adjustments, wherein said one or more receiver 116 neural networks 120 change a pose or viewpoint corresponding to one or more users of a sender 102 computing system. For example, in an embodiment, one or more receiver 116 neural networks 120 adjust a user facing away such that they appear to be facing toward or looking at a sender 102 video capture device. In at least one embodiment, one or more receiver 116 neural networks 120 adjust any point of view associated with one or more video frames.

Figure 2:
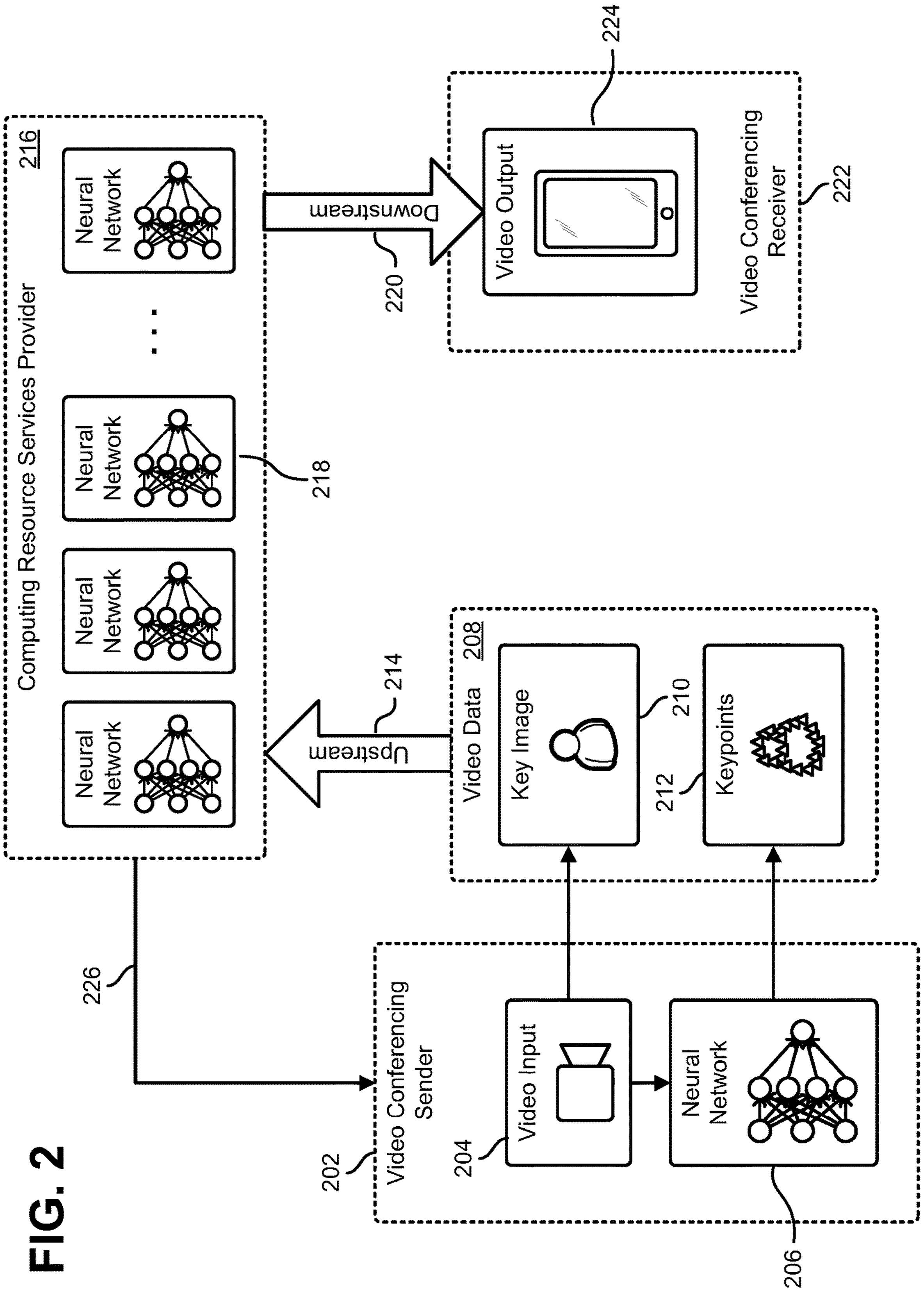
FIG. 2 is a block diagram illustrating an architecture for video streaming, such as video conferencing, by a sender and a receiver using a computing resource services provider comprising neural networks, according to at least one embodiment.

FIG. 2 is a block diagram illustrating an architecture for video streaming, such as video conferencing, by a sender 202 and a receiver 222 using a computing resource services provider 216 comprising neural networks 218, according to at least one embodiment. In at least one embodiment, a sender 202 is a computing system or computing device having one or more users and comprising one or more video input 204 devices and one or more sender 202 neural networks 206, as described above in conjunction with FIG. 1. In at least one embodiment, a sender 202 generates, infers, or otherwise creates video data 208 comprising one or more key images (e.g., video frames) 210 and one or more keypoints 212, as described above in conjunction with FIG. 1.

In at least one embodiment, a sender 202 transfers or otherwise communicates video data 208 to a computing resource services provider 216 using an upstream 214 communication channel. In at least one embodiment, an upstream 214 communication channel is network infrastructure, further described herein, to facilitate transfer of data from a sender 202 to one or more network servers in a computing resource services provider 216. In at least one embodiment, an upstream 214 communication channel facilitates uploading of data between a sender 202 and a computing resource services provider 216. In at least one embodiment, an upstream 214 communication channel has reduced or limited bandwidth capabilities when compared to a downstream 220 communication channel, as described below. In at least one embodiment, an upstream 214 communication channel has equivalent bandwidth capabilities when compared to a downstream 220 communication channel.

In at least one embodiment, an upstream 214 communication channel is a wired network connection. In at least one embodiment, an upstream 214 communication channel is a wireless network communication channel as further described herein. In at least one embodiment, a sender 202 transfers data to a computing resource services provider 216 over an upstream 214 communication channel comprising a single communication channel between a client and server on a network. In at least one embodiment, a sender 202 transfers data to a computing resource services provider 216 over an upstream 214 communication channel comprising multiple communication channels between multiple clients and servers on a network. In at least one embodiment, a sender 202 transfers data to a computing resource services provider 216 over an upstream 214 communication channel comprising any network topography to facilitate client-server or peer-to-peer communication on a network.

In at least one embodiment, a sender 202 transfers data to a computing resource services provider 216 to facilitate transfer of video data between a sender 202 and a receiver 222. In at least one embodiment, a computing resource services provider 216 is one or more computing systems to provide computing services over a network. In at least one embodiment, a computing resource services provider 216 provides any computing service further described herein. In at least one embodiment, a computing resource services provider 216 comprises one or more neural networks 218 to facilitate inferencing, reconstruction, or any other generation of video frames from video data 208, as described above in conjunction with FIG. 1.

In at least one embodiment, a computing resource services provider 216 converts video data 208 to video frames or other data using one or more neural networks 218, as described above in conjunction with FIG. 1. In at least one embodiment, a computing resource services provider 216 comprises one or more parallel processing units (PPUs), such as graphics processing units (GPUs). In at least one embodiment, a computing resource services provider 216 accelerates or otherwise improves inferencing performance of one or more neural networks 218 using one or more PPUs, such as GPUs. In at least one embodiment, a computing resource services provider 216 utilizes one or more PPUs, such as GPUs, for any other purpose related to services provided to one or more clients by said computing resource services provider 216.

In at least one embodiment, a computing resource services provider 216 transfers or otherwise communicates video data generated or otherwise inferred by one or more neural networks 218 to a receiver 222 using a downstream 220 communication channel.

In at least one embodiment, a downstream 220 communication channel is network infrastructure, further described herein, to facilitate transfer of data from a one or more network servers in a computing resource services provider 216 to a receiver 222, as described above in conjunction with FIG. 1. In at least one embodiment, a downstream 220 communication channel facilitates downloading or other transfer of data between a computing resource services provider 216 and one or more receivers 222. In at least one embodiment, a downstream 220 communication channel has greater bandwidth capabilities when compared to an upstream 214 communication channel. In at least one embodiment, a downstream 220 communication channel has equivalent bandwidth capabilities when compared to an upstream 214 communication channel.

In at least one embodiment, a downstream 220 communication channel is a wired network connection. In at least one embodiment, a downstream 220 communication channel is a wireless network communication channel, as further described herein. In at least one embodiment, a computing resource services provider 216 transfers data to one or more receivers 222 over a downstream 220 communication channel comprising a single communication channel between a client and server on a network. In at least one embodiment, a computing resource services provider 216 transfers data to one or more receivers 222 over a downstream 220 communication channel comprising multiple communication channels between multiple clients and servers on a network. In at least one embodiment, a computing resource services provider 216 transfers or otherwise communicates data to one or more receivers 222 over a downstream 220 communication channel comprising any network topography to facilitate client-server or peer-to-peer communication on a network.

In at least one embodiment, one or more receivers 222 receive data comprising video frames or other data to represent video from a sender 202 from a computing resource services provider 216. In at least one embodiment, a receiver 222 is a computing system or computing device comprising one or more video output 224 devices, as described above in conjunction with FIG. 1. In at least one embodiment, one or more receivers 222 are desktop or laptop computing devices. In at least one embodiment, one or more receivers 222 are mobile devices, such as tablets or mobile phones. In at least one embodiment, one or more receivers 222 are any type of computing system further described herein. In at least one embodiment, one or more receivers 222 are any other type of computing system comprising one or more video outputs 224 capable of receiving data comprising video from a computing resource services provider 216.

Figure 3:
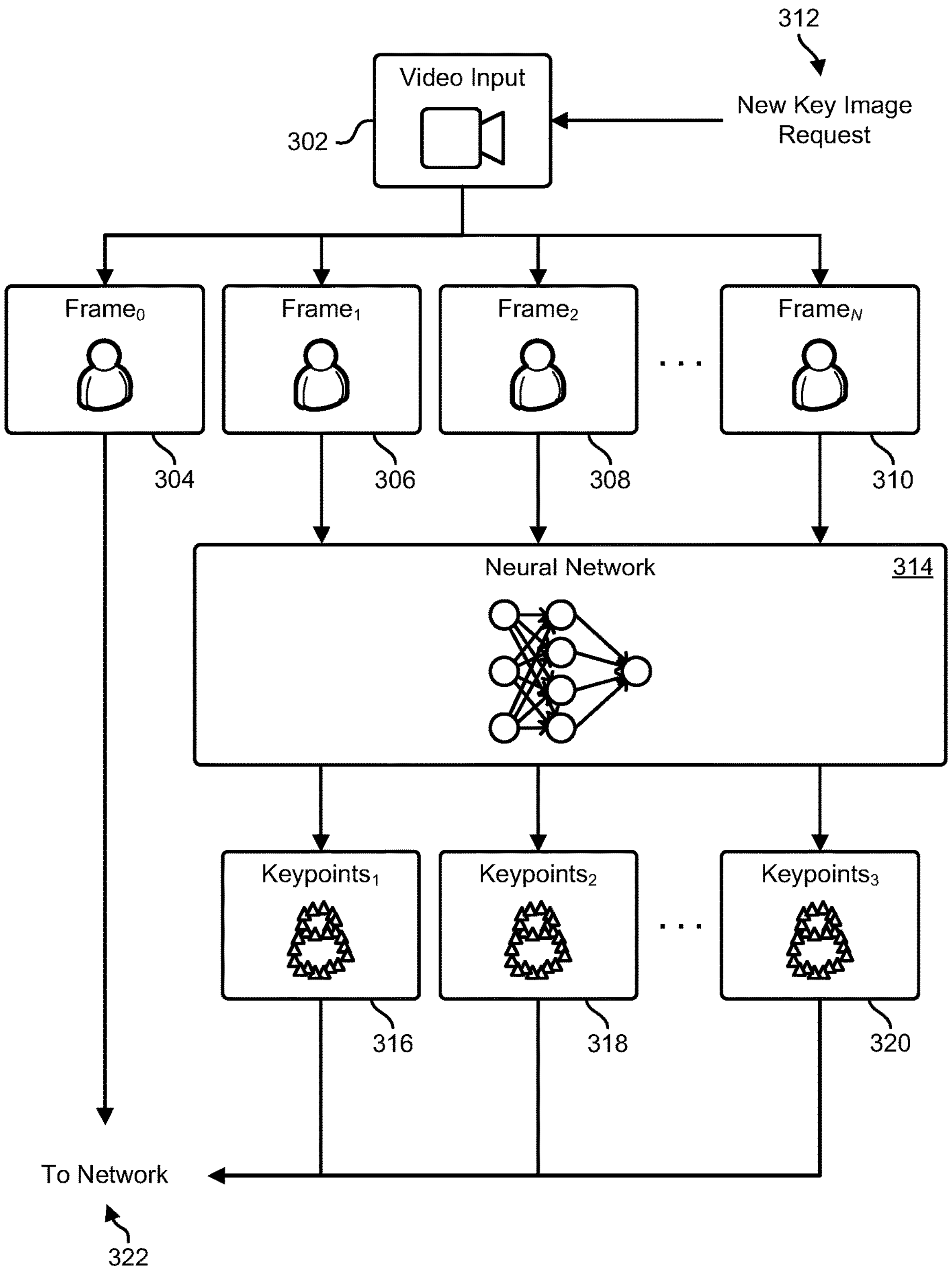
FIG. 3 is a block diagram illustrating a sender architecture for generation of compressed video data to facilitate video streaming, such as video conferencing, using one or more neural networks, according to at least one embodiment.

FIG. 3 is a block diagram illustrating a sender architecture for generation of compressed video data usable for video streaming, such as during video conferencing, using one or more neural networks, according to at least one embodiment. In at least one embodiment, compressed video data is one or more keypoints 316, 318, 320 associated with one or more keyframes or initial frames 304 from one or more video input 302 devices, as described above in conjunction with FIG. 1. In at least one embodiment, one or more video input 302 devices capture or otherwise generate one or more frames 304, 306, 308, 310 to be used for transferring, streaming, or otherwise communicating video data across a network 322, as described above in conjunction with FIGS. 1 and 2.

In at least one embodiment, one or more video input 302 devices generate one or more frames 304, 306, 308, 310. In at least one embodiment, a frame 304, 306, 308, 310 is data comprising two-dimensional (2D) or three-dimensional (3D) image or other information about one or more objects in a scene. In at least one embodiment, a frame 304, 306, 308, 310 is an initial frame 304. In at least one embodiment, an initial frame 304 is a first frame in a sequence of frames 304, 306, 308, 310 captured or otherwise generated by one or more video input 302 devices. In at least one embodiment, a sender uses an initial frame 304 as a key image (e.g., a frame), as described above in conjunction with FIGS. 1 and 2.

In at least one embodiment, a sender captures or otherwise generates an initial frame 304 using one or more video input 302 devices. In at least one embodiment, a sender generates an initial frame 304 upon initialization. In at least one embodiment, a sender generates an initial frame 304 at discrete intervals during capture of one or more frames 304, 306, 308, 310 by one or more video input 302 devices. A sender generates an initial frame 304, in an embodiment, on request from one or more users of said sender computing system or device.

In at least one embodiment, a sender generates an initial frame 304 when said sender infers or otherwise detects, using one or more neural networks 314, that one or more objects captured by one or more video input 302 devices have changed beyond a threshold amount. In at least one embodiment, a sender generates an initial image (e.g. a frame) 304 upon receipt of a new key image request 312 from a computing resource services provider, as described above in conjunction with FIG. 2 and below in conjunction with FIG. 5, or directly from a receiver, as described above in conjunction with FIG. 1 and below in conjunction with FIG. 4.

In at least one embodiment, a frame 304, 306, 308, 310 is an additional or subsequent frame 306, 308, 310. In at least one embodiment, an additional or subsequent frame 306, 308, 310 is any frame in a sequence of frames 304, 306, 308, 310, captured or otherwise generated by one or more video input 302 devices, after an initial frame 304. In at least one embodiment, an additional or subsequent frame 306, 308, 310 is captured at a discrete time interval by one or more video input 302 devices.

In at least one embodiment, a sender captures or otherwise generates one or more additional or subsequent frames 306, 308, 310 after an initial frame 304 at discrete time intervals. In at least one embodiment, a sender captures or otherwise generates one or more additional frames 306, 308, 310 after an initial frame 304 at time intervals specified in a capture rate or frame rate utilized by one or more video input 302 devices. A sender captures or otherwise generates one or more additional frames 306, 308, 310, in an embodiment, at time intervals specified by a video encoding codec or other video streaming technique. In at least one embodiment, a sender captures or otherwise generates one or more additional frames 306, 308, 310 after an initial frame 304 at any time interval to facilitate transfer of video data as described above in conjunction with FIGS. 1 and 2.

In at least one embodiment, one or more additional frames 306, 308, 310 captured by one or more video input 302 devices are usable, by a sender, to generate one or more sets of keypoints 316, 318, 320, as described above in conjunction with FIGS. 1 and 2. In at least one embodiment, a sender utilizes one or more neural networks 314 to infer or otherwise generate one or more sets of keypoints 316, 318, 320 from one or more additional frames 306, 308, 310.

In at least one embodiment, one or more sets of keypoints 316, 318, 320 are data comprising information about one or more additional or subsequent frames 306, 308, 310. In at least one embodiment, a keypoint is data comprising information about an object or portions of an object in a frame 304, 306, 308, 310. In at least one embodiment, a keypoint corresponds to a feature of an object, such as eyes, mouth, jawline, ears, or any other feature of a human face. In at least one embodiment, a keypoint corresponds to any identifiable feature of any object captured or otherwise generated by one or more video input 302 devices. In at least one embodiment, a keypoint comprises location information. In at least one embodiment, a keypoint comprises movement information, such as changes to an object between one or more frames 304, 306, 308, 310.

In at least one embodiment, one or more sets of keypoints 316, 318, 320 have data storage or transfer requirements smaller or less than data storage or transfer requirements of one or more frames 304, 306, 308, 310 used, by a sender neural network 314, to infer or otherwise generate said one or more sets of keypoints 316, 318, 320. In at least one embodiment, a sender transfers, uploads, or otherwise communicates one or more sets of keypoints 316, 318, 320 to a receiver or a computing resource service provider over a network 322, as described above in conjunction with FIGS. 1 and 2. In at least one embodiment, a sender transfers, uploads, or otherwise communicates one or more sets of keypoints 316, 318, 320 to a receiver or a computing resource service provider over a network 322 as each set of keypoints 316, 318, 320 is generated by one or more neural networks 314. In at least one embodiment, a sender transfers, uploads, or otherwise communicates one or more sets of keypoints 316, 318, 320 to a receiver or a computing resource service provider over a network 322 in blocks or groups after said one or more sets of keypoints 316, 318, 320 are generated by one or more neural networks 314.

Figure 4:
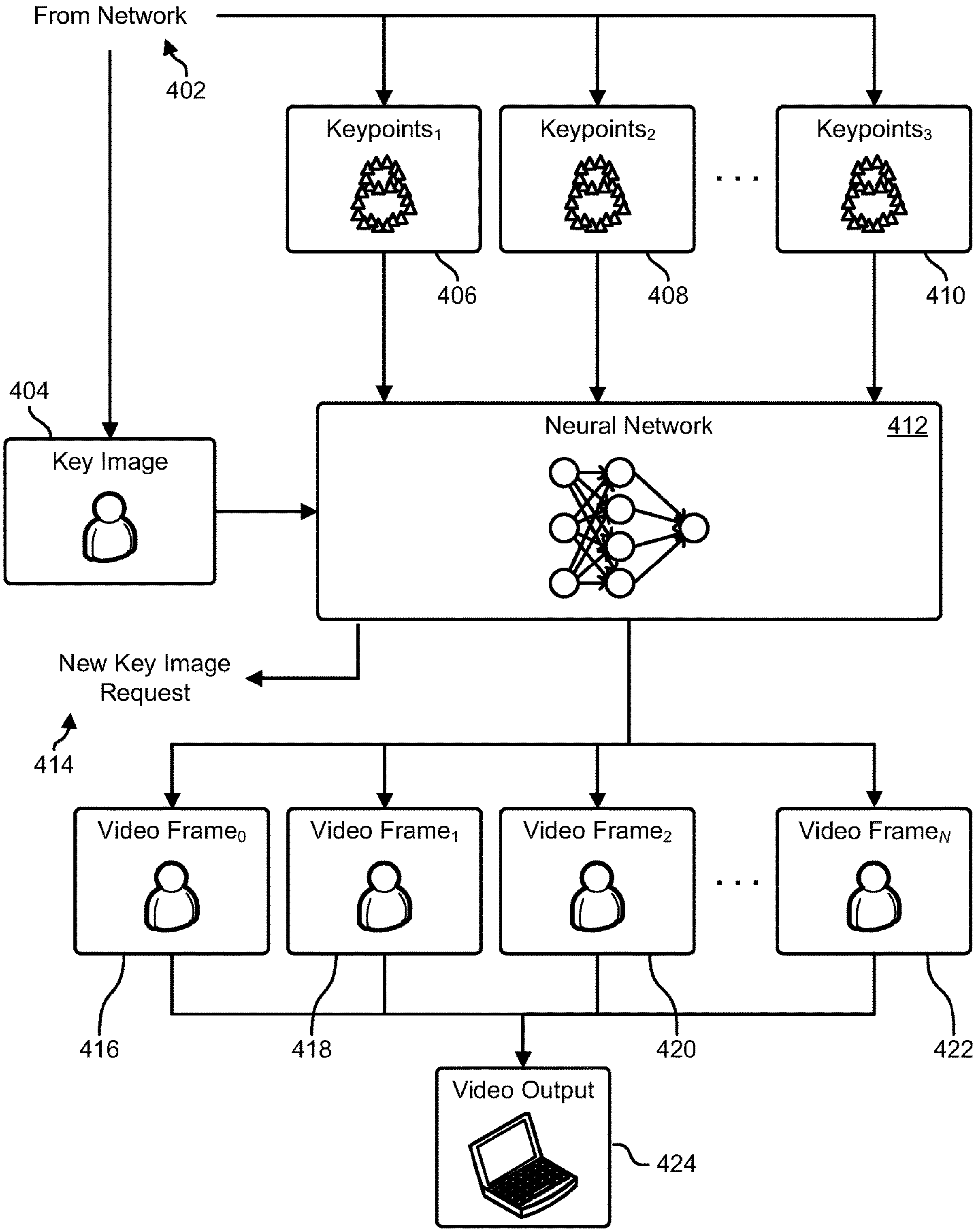
FIG. 4 is a block diagram illustrating a receiver architecture for reconstruction of video data during video streaming, such as video conferencing, using one or more neural networks, according to at least one embodiment.

FIG. 4 is a block diagram illustrating a receiver architecture for reconstruction of video data or video frames 416, 418, 420, 422 during video streaming, such as video conferencing, using one or more neural networks 412, according to at least one embodiment. In at least one embodiment, a receiver receives, over a network 402, a key image (e.g., a frame) 404 from a sender, as described above in conjunction with FIGS. 1-3. In at least one embodiment, a receiver receives, over a network 402, one or more sets of keypoints 406, 408, 410 from a sender, as described above in conjunction with FIGS. 1-3.

In at least one embodiment, a receiver comprises one or more neural networks 412, as described above in conjunction with FIG. 1. In at least one embodiment, one or more neural networks 412 infer or otherwise generate one or more video frames 416, 418, 420, 422 from a key image 404, such as a key frame or video frame, and one or more sets of keypoints 406, 408, 410 received, by a sender, over a network 402.

In at least one embodiment, a key image 404 is received, by a receiver, prior to one or more sets of keypoints 406, 408, 410. In at least one embodiment, a key image 404 is received, by a receiver, at intervals determined by a sender, as described above in conjunction with FIG. 3. In at least one embodiment, a receiver stores one or more key images 404 received from a sender. In at least one embodiment, one or more neural networks 412 of a receiver use one or more stored key images instead of a most recent received key image 404 from a sender. In at least one embodiment, one or more neural networks 412 of a sender use a previously stored key image previously stored having a different composition when compared to a most recent received key image 404. For example, in an embodiment, one or more neural networks 412 of a receiver use a stored key image having different clothing on a person or object than a most recently received key image 404.

In at least one embodiment, a receiver uses one or more neural networks 412, as described above in conjunction with FIG. 1, to reconstruct or otherwise infer one or more video frames 416, 418, 420, 422 from a key image 404, stored or recently received, and one or more sets of keypoints 406, 408, 410. In at least one embodiment, a key image 404 serves as a reference or base image for one or more neural networks 412. In at least one embodiment, one or more neural networks 412, using a key image 404, infer or otherwise reconstruct one or more video frames 416, 418, 420, 422 comprising changes or movements for one or more objects in said key image 404 using one or more sets of keypoints 406, 408, 410.

In at least one embodiment, if one or more neural networks 412 are unable to infer changes or movements for one or more objects in a key image 404, said one or more neural networks indicate to a sender to perform a new key image request 414. In at least one embodiment, a new key image request 414 is a packet, message, or other network-based indication to a sender that a new key image 404 is required. Using a new key image 404 received over a network 402, a sender uses one or more neural networks 412 to infer or otherwise generate one or more video frames 416, 418, 420, 422 comprising a scene and objects from said key image 404 as well as changes or movements for said scene and objects indicated by one or more keypoints 406, 408, 410.

In at least one embodiment, one or more neural networks 412 infer or otherwise generate one or more video frames 416, 418, 420, 422. In at least one embodiment, a video frame 416, 418, 420, 422 is data comprising two-dimensional (2D) or three-dimensional (3D) image or other information about one or more objects in a scene indicated by a key image 404, as described above in conjunction with FIG. 3. In at least one embodiment, one or more video frames 416, 418, 420, 422 are equivalent to frames captured or otherwise generated by a sender video input device. In at least one embodiment, one or more video frames 416, 418, 420, 422 comprise a stored video frame, as described above, in conjunction with object movements indicated by one or more received keypoints 406, 408, 410.

In at least one embodiment, one or more video frames 416, 418, 420, 422 are output, by a sender, to one or more video outputs 424. In at least one embodiment, a video output 424 is a graphics processor or other graphics rendering device further described herein. In at least one embodiment, a video output 424 is any device capable of displaying video data described herein. For example, in an embodiment, a video output 424 is one or more graphics processors to display one or more video frames 416, 418, 420, 422 to a desktop pc monitor. In at least one embodiment, a video output 424 is one or more graphics processors to display one or more video frames 416, 418, 420, 422 to a mobile device screen.

Figure 5:
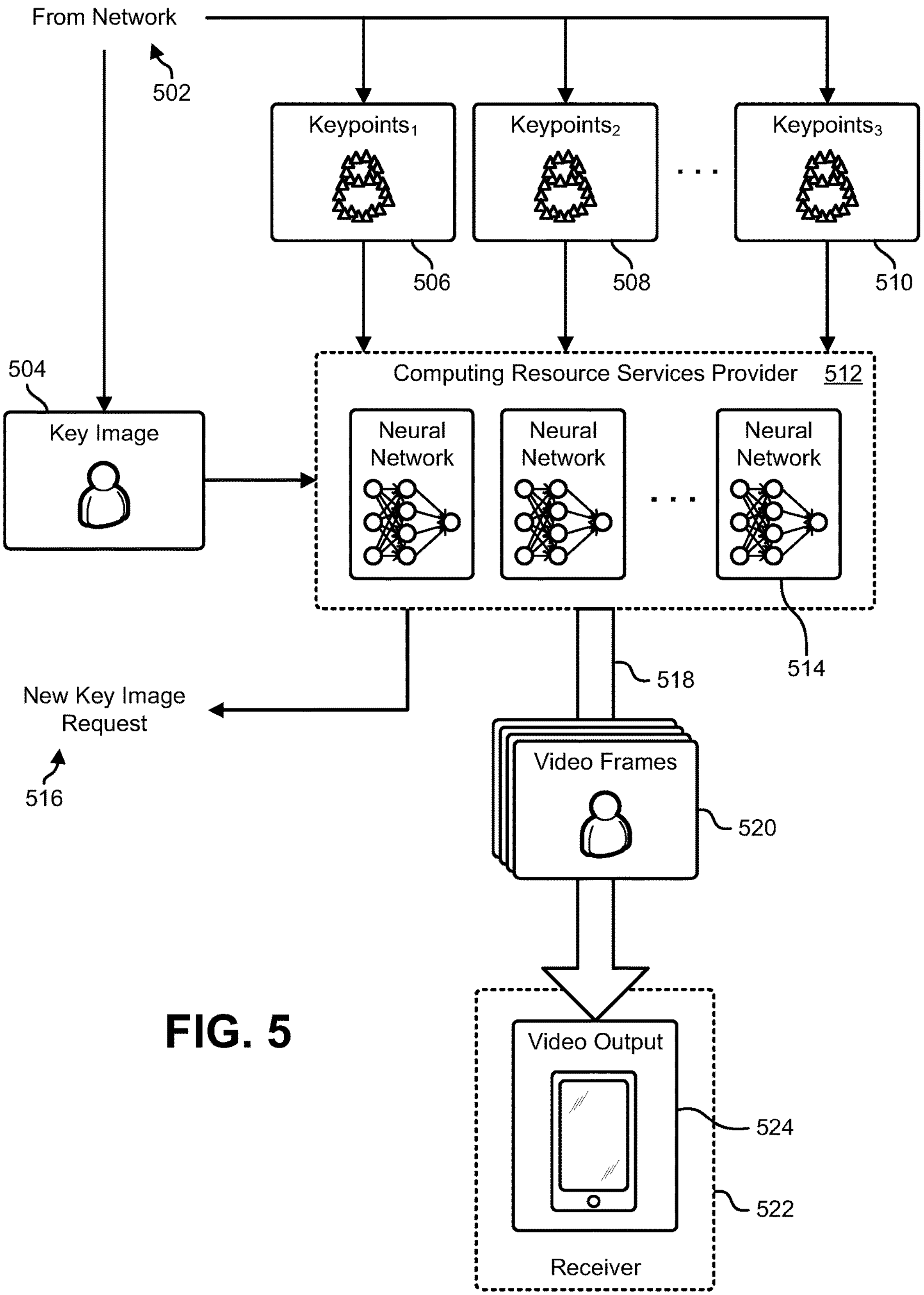
FIG. 5 is a block diagram illustrating an architecture for reconstruction of video data during video streaming, such as video conferencing, using a computing resource services provider comprising one or more neural networks, according to at least one embodiment.

FIG. 5 is a block diagram illustrating an architecture for reconstruction of video data during video streaming, such as video conferencing, using a computing resource services provider comprising one or more neural networks, according to at least one embodiment. In at least one embodiment, a computing resource services provider 512 receives, over a network 502, a key image (e.g., a frame) 504 from a sender, as described above in conjunction with FIGS. 1-3. In at least one embodiment, a computing resource services provider 512 receives, over a network 502, one or more sets of keypoints 506, 508, 510 from a sender, as described above in conjunction with FIGS. 1-3.

In at least one embodiment, a computing resource services provider 512 comprises one or more neural networks 514, as described above in conjunction with FIG. 2. In at least one embodiment, one or more neural networks 514 infer or otherwise generate one or more video frames 520 from a key image 504, such as a key frame, and one or more sets of keypoints 506, 508, 510 received, by a sender, over a network 502. One or more neural networks 514 of a computing resource services provider 512 infer or otherwise generate one or more video frames 520, in an embodiment, from a stored key image 504 previously received from a sender over a network 502.

In at least one embodiment, a computing resource services provider 512 receives a key image 504 from a receiver prior to one or more sets of keypoints 506, 508, 510. In at least one embodiment, a computing resource services provider 512 stores one or more key images 504 received from one or more senders. In at least one embodiment, one or more neural networks 514 utilized by a computing resource services provider 512 use one or more stored key images instead of a most recent received key image 504 from a sender. In at least one embodiment, one or more neural networks 514 utilized by a computing resource services provider 512 use a previously stored key image previously stored having a different composition when compared to a most recent received key image 504. For example, in an embodiment, one or more neural networks 514 utilized by a computing resource services provider 512 use a stored key image having different clothing on a person or object than a most recently received key image 504.

In at least one embodiment, a computing resource services provider 512 uses one or more neural networks 514, as described above in conjunction with FIG. 2, to reconstruct or otherwise infer one or more video frames 520 from a key image 504, stored or recently received, and one or more sets of keypoints 506, 508, 510. In at least one embodiment, a key image 504 serves as a reference or base image for one or more neural networks 514. In at least one embodiment, one or more neural networks 514, using a key image 514, infer or otherwise reconstruct video frames 520 comprising changes or movements for one or more objects in said key image 520 using one or more sets of keypoints 506, 508, 510.

In at least one embodiment, if one or more neural networks 514 for a computing resource services provider 512 are unable to infer changes or movements for one or more objects in a key image 504, said a computing resource services provider 512 performs a new key image request 516, as described above in conjunction with FIG. 2.

Using a new key image 504 received over a network 502, a computing resource services provider 512 uses one or more neural networks 514 to infer or otherwise generate one or more video frames 520 to be transferred, streamed, or otherwise communicated to a receiver 522 over a communication medium 518.

In at least one embodiment, a computing resource services provider 512 uses one or more neural networks 514 to infer or otherwise generate one or more video frames 520. In at least one embodiment, a video frame 520 is data comprising two-dimensional (2D) or three-dimensional (3D) image or other information usable to create video, as described above in conjunction with FIGS. 1-3. In at least one embodiment, one or more video frames 520 are equivalent to frames captured or otherwise generated by a sender video input device. In at least one embodiment, one or more video frames 520 are different than frames captured or otherwise generated by a sender video input device, and comprise a stored video frame, as described above, in conjunction with object movements indicated by one or more received keypoints 506, 508, 510.

In at least one embodiment, a computing resource services provider 512 transfers one or more video frames 520 or video data to one or more receiver 522 devices over a communication medium 518. In at least one embodiment, a communication medium 518 is a network. In at least one embodiment, a communication medium is a wireless network or wired wide area network, such as an Internet network as described above in conjunction with FIGS. 1 and 2.

In at least one embodiment, one or more receiver 522 devices are any computing devices, as described in FIGS. 1 and 2, usable for rendering or otherwise displaying video data such as one or more video frames 520 on one or more video outputs 524. In at least one embodiment, each receiver 522 device comprises one or more video outputs 524. In at least one embodiment, a video output 524 is any hardware component capable of displaying any video data described herein. For example, in an embodiment, a video output 524 is one or more graphics processors to display one or more video frames 520 or other video data to a desktop pc monitor. In at least one embodiment, a video output 524 is one or more graphics processors to display one or more video frames 520 or other video to a mobile device screen, such as a smartphone or tablet, as further described herein.

Figure 6:
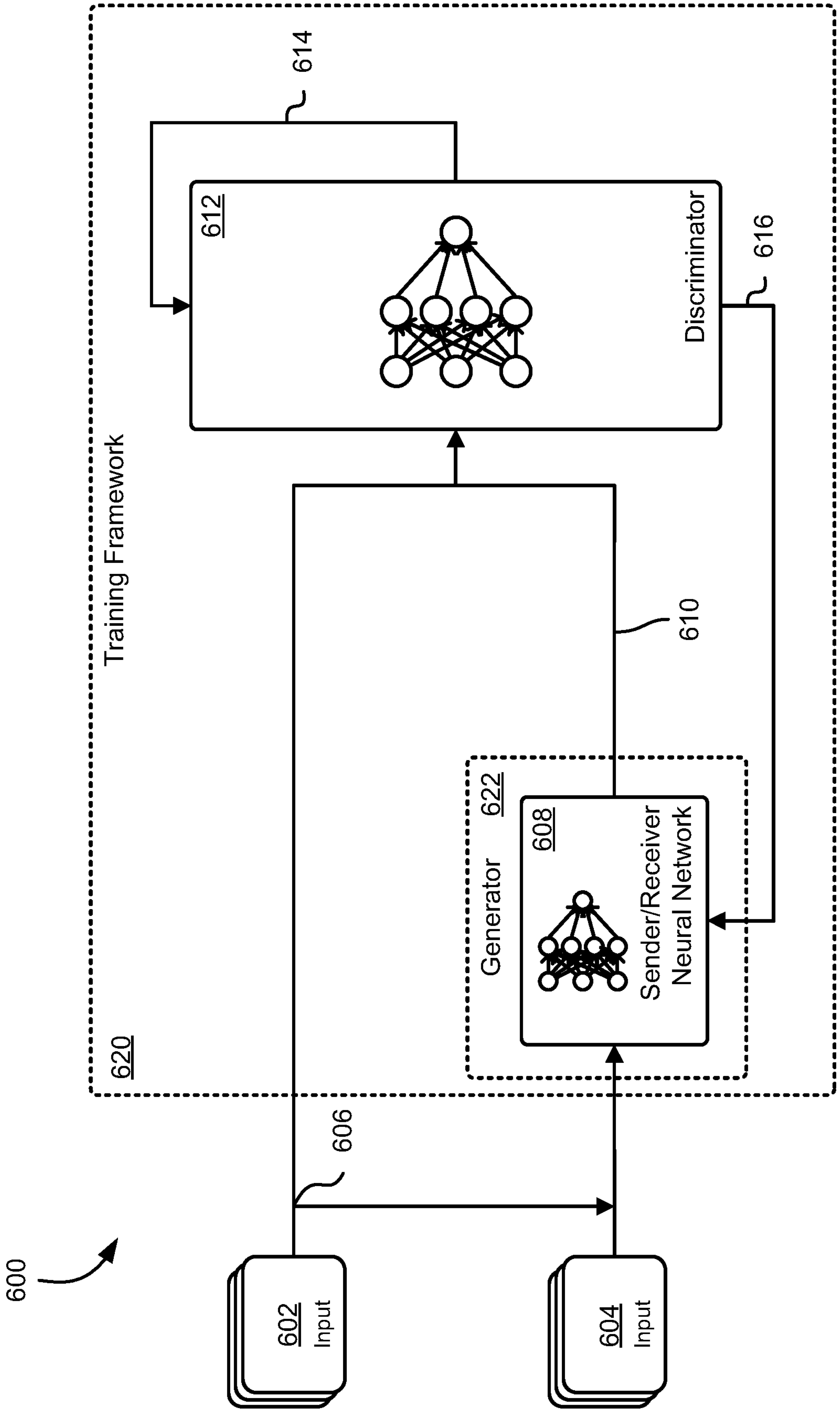
FIG. 6 is a block diagram illustrating an exemplary generative adversarial network for training one or more neural networks to perform video compression and decompression for video streaming, such as video conferencing, according to at least one embodiment.

FIG. 6 is a block diagram illustrating an exemplary generative adversarial network (GAN) 600 for training one or more neural networks 608 to perform video compression and decompression in order to facilitate video streaming, such as video conferencing, according to at least one embodiment. In at least one embodiment, one or more neural networks 608 usable for video streaming, such as video conferencing, as described above in conjunction with FIGS. 1-5, are trained by a training framework implementing a general GAN 600. In at least one embodiment, one or more neural networks 608 usable for video streaming, such as video conferencing, as described above in conjunction with FIGS. 1-5, are trained by a training framework implementing a specific GAN 600 architecture, such as StyleGAN. In at least one embodiment, one or more neural networks 608 usable for video streaming, such as video conferencing, as described above in conjunction with FIGS. 1-5, are trained by a training framework implementing any other architecture for training one or more neural networks 608.

In at least one embodiment, a GAN 600 comprises a generator 622 to train one or more sender and/or receiver neural networks 608, as described above in conjunction with FIGS. 1-5, to generate or otherwise infer keypoints from video frames or to reconstruct or otherwise infer video frames from keypoints and a key image, as further described herein. In at least one embodiment, a generator 622 is a sender or receiver neural network 608, as described above in conjunction with FIGS. 1-3.

In at least one embodiment, a GAN 600 comprises a discriminator 612. In at least one embodiment, a discriminator 612 is data values and software instructions that, when executed, determine if output from a generator 608 is correct (such as if generator 608 output is "real" or "fake"). In at least one embodiment, a discriminator 612 determines other properties of generator 622 output, such as type, value, or other determinations that improve generator 622 operation. In at least one embodiment, a discriminator 612 determines loss values comprising differences or numerical values representing differences between a generator 622 output 610 and baseline data input 602 to said discriminator 612.

In at least one embodiment, a GAN 600 receives, during training, input data 602, 604. In at least one embodiment, input data 602, 604 consists of two equivalent data sets. In at least one embodiment, two data sets are equivalent if they have identical member data items. In at least one embodiment, input data 602, 604 consists of two non-equivalent or different data sets. In at least one embodiment, an input data set 602 provides a baseline or reference of real values used for training a discriminator 612 and calculating loss values 614, 616. In at least one embodiment, input data 602, 604 consists of more than two different data sets. In at least one embodiment, an input data set 602, 604 comprises image information. In at least one embodiment, an input data set 602, 604 comprises video frame information, as described above in conjunction with FIGS. 3-5. In at least one embodiment, an input data set 602, 604 comprises images, image information, object information, video frames, video information, or other appropriate usable to train one or more sender neural networks 608 to infer or otherwise generate keypoints from images and/or video frames, as described above in conjunction with FIGS. 1-3. In at least one embodiment, an input data set 602, 604 comprises images, image information, object information, video frames, video information, or other appropriate usable to train one or more receiver neural networks 608 to infer or otherwise generate images and/or video frames or other video data from a key image and one or more sets of keypoints, as described above in conjunction with FIGS. 1, 4, and 5.

In at least one embodiment, one input data set 604 is equivalent or otherwise similar to a baseline data set 602. In at least one embodiment, an input data set 604 is used, by a training framework implementing a GAN 600, to train a generator 622. In at least one embodiment, a generator 622 in a GAN 600 provides as output a probabilistic distribution 610.

In at least one embodiment, a generator 608 in a GAN 200 operating on image content outputs a set of generated keypoints instead of or in addition to probabilistic values 610. A generator 608 in a GAN 200 operating on video frames or other video content, in an embodiment, outputs a set of generated keypoints instead of or in addition to probabilistic values 610. A generator 608 in a GAN 200 operating on a set of keypoints, in an embodiment, outputs an image instead of or in addition to probabilistic values 610. In at least one embodiment, a generator 608 in a GAN 200 operating on a set of keypoints outputs video frames and/or other video data instead of or in addition to probabilistic values 610.

In at least one embodiment, output from a generator 622 is provided, by a GAN, as input to a discriminator 612 for training purposes. In at least one embodiment, a discriminator 612 provides loss information 616 used by a training framework implementing a GAN 600 to train a generator 622 in order to update weights through backpropagation in a generator 622.

In at least one embodiment, an exemplary GAN 600, such as that illustrated in FIG. 6, generator 622 interaction with a discriminator 612. In at least one embodiment, an exemplary GAN 600, such as that illustrated in FIG. 6, demonstrates loss value 614, 616 backpropagation during training by a training framework using said GAN 600.

In at least one embodiment, a training framework implementing a GAN 600 backpropagates loss values 616 from a discriminator 612 to a generator 622. In at least one embodiment, a training framework implementing a GAN 600 backpropagates loss values 616 from a discriminator 612 to said discriminator 612.

In at least one embodiment, a generator 622 in a GAN 600 comprises one or more sender neural networks 608, as described above in conjunction with FIGS. 1-3. In at least one embodiment, a generator 622 in a GAN 600 comprises one or more receiver neural networks 608, as described above in conjunction with FIGS. 1, 4, and 5. In at least one embodiment, a discriminator 612 in a GAN 600 comprises one or more neural networks. A discriminator 612 neural network, in an embodiment, is any type of neural network described herein.

In at least one embodiment, a generator 622 creates, infers, or otherwise generates new data instances, such as "fake" sets of keypoint data. In at least one embodiment, a generator 622 creates, infers, or otherwise generates new data instances, such as "fake" images, video frames, or other video data. In at least one embodiment, a generator 622 generates probabilities related to input data, such as p(X) when input is arbitrary data type X, or p(X, Y) when input is arbitrary data type X and labels Y. In at least one embodiment, a generator 622 learns from input data 604 to generate plausible data, such as "fake" sets of keypoint data or "fake" images, video frames, or other video data comprising artificial features, styles, or objects, as described herein. In at least one embodiment, generated data instances 610 from a generator 622 become negative training examples for a discriminator 612.

In at least one embodiment, a discriminator 612 discriminates between different data instances, such as categorizing an input data item as true or false, real or "fake". In at least one embodiment, a discriminator 612 takes, as input, two different types of input data 602, 604 from two different sources. In at least one embodiment, a discriminator 612 takes, as input, real data instances. In at least one embodiment, real data instances are baseline sets of keypoint data and/or images, video frames, or other video data. In at least one embodiment, a discriminator 612 utilizes real data instances as positive training examples, or examples of "true" information. In at least one embodiment, real data instances provide a baseline for calculating loss information 614, 618. In at least one embodiment, loss information 614 calculated from real data instances is backpropagated by a training framework implementing or using a GAN 600 into a discriminator 612 neural network during pre-training, as described below.

In at least one embodiment, a discriminator 612 takes, as input, "fake" data instances, such as "fake" sets of keypoint data, or fake images, video frames, or other video data output from a generator 622. In at least one embodiment, "fake" data instances output by a generator 622 are any other type of data. In at least one embodiment, a generator 622 uses "fake" data instances as negative examples, or "false" examples, during training by a training framework implementing or otherwise using a GAN 600. In at least one embodiment, a discriminator 612 uses "fake" data instances during training by a training framework implementing or otherwise utilizing a GAN 600, and determines if said data instances are "real" or "fake." In at least one embodiment, a training framework implementing or otherwise using a GAN 600 utilizes output from a discriminator 612 to measure if said discriminator 612 correctly determined if a "fake" data instance was "real" or "fake." In at least one embodiment, a training framework implementing a GAN 600 calculates loss information 616 based on discriminator 612 determination of "fake" or "real" for input data 610, and utilizes said loss information 616 for backpropagation to a generator 622.

In at least one embodiment, a discriminator 612 outputs training loss 616. In at least one embodiment, training loss 616 is one or more numerical values used to update one or more neural networks in a generator 622 by a training framework implementing a GAN 600. In at least one embodiment, a training framework implementing or otherwise using a GAN 600 calculates loss values using a traditional GAN loss function. In at least one embodiment, a training framework implementing or otherwise using a GAN 600 calculates loss values using any other loss function usable to determine loss from one or more sender or receiver neural network types, as described above in conjunction with FIG. 1.

Figure 7:
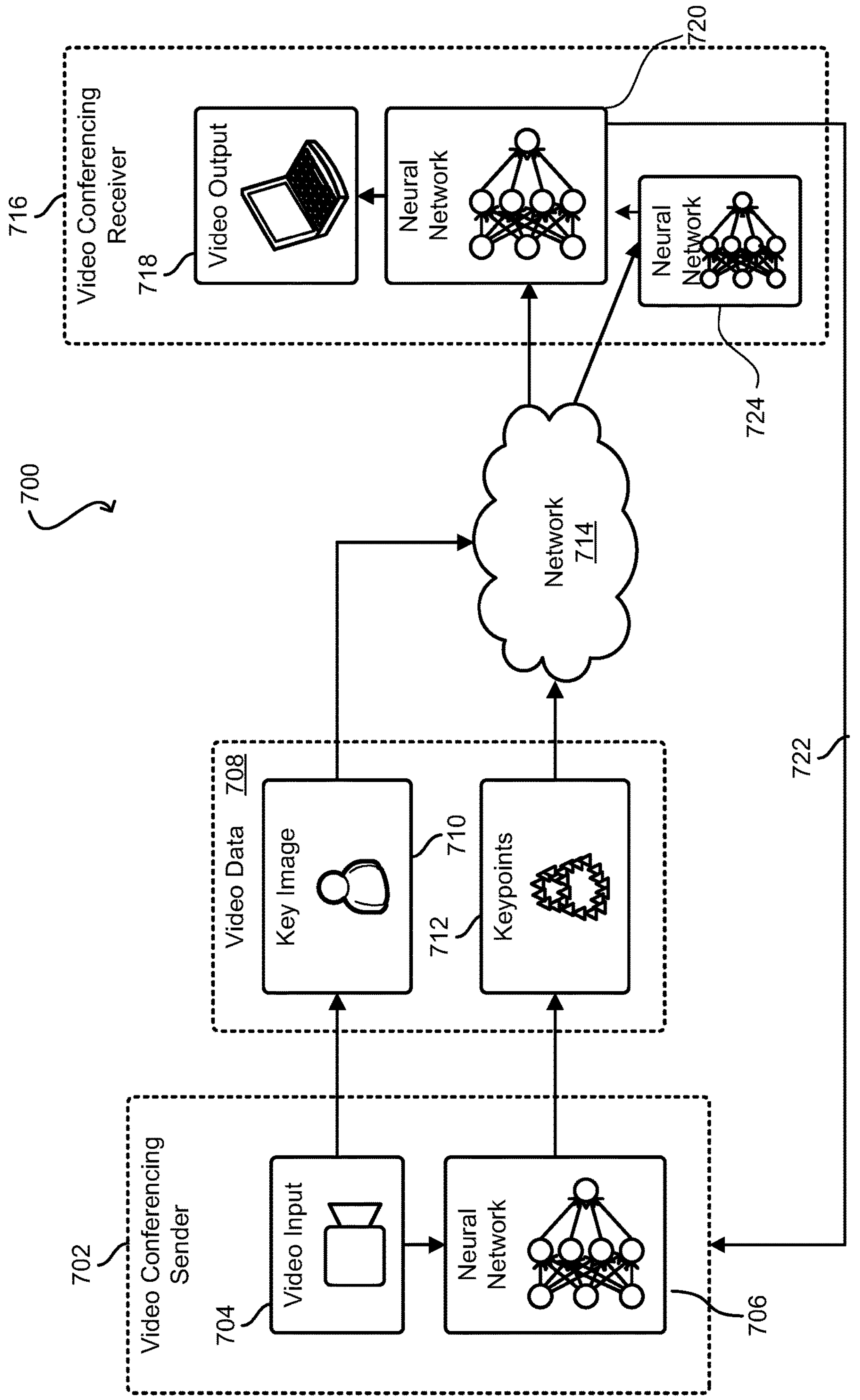
FIG. 7 is a block diagram illustrating a system for reconstructing one or more images, according to at least one embodiment.

FIG. 7 illustrates a process for video data compression and decompression to facilitate video streaming, such as video conferencing, according to at least one embodiment. In at least one embodiment, a process 700 for video data compression and decompression begins 702 by generating, by a sender, a key image (e.g., a frame) 704, as described above in conjunction with FIGS. 1-3. In at least one embodiment, a sender designates or otherwise specifies a stored key image instead of generating a new key image 704.

In at least one embodiment, after a key image, such as a frame, has been generated 704 or otherwise determined by a sender, said sender transmits said key image 706 to a receiver or computing resource services provider, as described above in conjunction with FIGS. 1 and 2. Using additional video frames captured or otherwise generated by one or more video capture devices, in an embodiment, a sender generates keypoints 708 for one or more of said additional video frames. In at least one embodiment, a sender transfers or otherwise communicates, over a network, keypoints generated 708 by said sender, as described above in conjunction with FIGS. 1-3.

In at least one embodiment, a receiver receives keypoints 712 transferred or otherwise communicated 710 over a network. In at least one embodiment, a receiver determines if keypoints generated 708 by a sender have changed 714 beyond a threshold value or are otherwise unusable for inference or other generation of video frames by said receiver. If keypoints generated 708 by a sender have changed 714 beyond a threshold value or are otherwise unusable for inference or other generation of video frames by a receiver, said receiver, in an embodiment, requests a new key image from a sender.

In at least one embodiment, if keypoints generated 708 by a sender have not changed 714 beyond a threshold value or are otherwise usable for inference or other generation of video frames by a receiver, said receiver proceeds to generate video frames 716 using either a recently transmitted key image 706 or a key image stored by said receiver. In at least one embodiment, if a sender has more keypoint data to transmit or otherwise communicate to a receiver over a network, a sender continues 718 by generating additional keypoints 708. Otherwise, in an embodiment, video streaming or transmission is complete and a process 700 for video data compression and decompression to perform video streaming, such as video conferencing, ends 720.

In at least one embodiment, a system such as that illustrated in FIGS. 1-5 can also provide for separate eye movement of a person, or other such organism or object, as well as other such independent (or partially independent) features, with respect to a face, head, or other portion of that person, organism, or object. In at least one embodiment, this can be accomplished using an additional neural network as illustrated for system 700 of FIG. 7. In at least one embodiment, keypoints 712 extracted from a video frame of video input 704 by a neural network 706 can be provided over at least one network 714, along with at least one key image, for use by a neural network 720 to synthesize an image for display on a video output 718, using a process such as those described with respect to systems of FIGS. 1-5. In at least one embodiment, an additional neural network 724 such as a small multilayer perceptron (MLP), can analyze at least keypoint data 712 relevant to one or more eyes, or an eye region, of a person represented in key image 710. In at least one embodiment, neural network 724 can use this data to predict new keypoints, for at least one or more eyes or an eye region, that would correspond to a target movement of one or more eyes of a person in an image to be generated, where motion or placement of those keypoints would enable a sequence of video frames, when displayed on video output 718, to represent a natural and realistic eye movement, including focus points and gaze directions, that can be at least partially separate from movement of a head of that person, as a head can turn in a left direction while eyes move in a right direction, although positions of these eyes may vary to at least some extent based upon motion of a corresponding head. In at least one embodiment, neural network 724 may predict keypoints corresponding to realistic pupil positions within one or more eye positions, where those eye positions may depend at least in part upon determined head positions.

In at least one embodiment, an approach to reconstructing gaze direction, or pupil position, of a person separate from a rest of a face of that person can involve training such a separate neural network 724 to reconstruct natural eye movement in order to cause one or more images, such as may comprise a reconstructed video steam, to appear more realistic upon presentation. In at least one embodiment, system 700 can then have at least some control over gaze direction in addition to face redirection when synthesizing images based, at least in part, upon a set of keypoints 712. In at least one embodiment, direction can be used for specific purposes, such as to increase an amount of eye contact during a presentation of video, such as during a video conference, regardless of whether a person's head remains stationary or moves in any given direction, as long as that head remains in frame with these eyes sufficiently visible or represented in that image data. In at least one embodiment, gaze redirection can be performed on a receiver side using transmitted keypoints as illustrated in FIG. 7, but keypoint prediction for gaze redirection could occur on a sender side as well, with reconstruction then being performed using these transmitted new keypoints on a receiver side. In at least one embodiment, keypoints 712 are learned unsupervised, such that a gaze keypoints mapping can be determined after gaze redirection.

In at least one embodiment, a source image and a target image can be provided, which may correspond to different frames of video content. In at least one embodiment, during training this source image can be provided as input to a reconstruction network that is to be trained to reconstruct this target image. In at least one embodiment, a network can first attempt to predict keypoints 712 for this source image, as well as this target image. In at least one embodiment, using these keypoints a flow map can be estimated to attempt to warp this source image to this target image. In at least one embodiment, these keypoints can be learned using unsupervised learning, such that they may be different from well-understood facial landmarks, and may correspond to features that are useful specifically for tasks such as reconstruction. In at least one embodiment, since these keypoints are learned using unsupervised learning, a mapping can be determined both before and after gaze manipulation. In at least one embodiment, an attempt can be made to artificially move pupil positions during training. In at least one embodiment, this can involve detecting a pupil position and then adding a random (or non-random) factor or vector to move this pupil position. In at least one embodiment, a keypoint detection process can then be performed again for this manipulated image in order to obtain new keypoints representative of this movement. In at least one embodiment, these keypoints from before and after this pupil position manipulation can be used to train a lightweight neural network, such as a small MLP, to predict a change in pupil position, and output predicted keypoints corresponding to this predicted change. In at least one embodiment, these new keypoints can be compared against corresponding keypoints from this manipulation, which serves as a source of ground truth data, in order to adjust appropriate network parameters to minimize a loss and increase an accuracy of this gaze prediction network. In at least one embodiment, at inference time, this trained MLP can take as input a set of keypoints 712 and a specified or predicted movement of these pupils, and can predict a new set of keypoints for these pupils. In at least one embodiment, a neural network 720 can then use these predicted pupil keypoints to synthesize image data that includes gaze redirection based, at least in part, upon these new predicted keypoints.

Figure 8A:
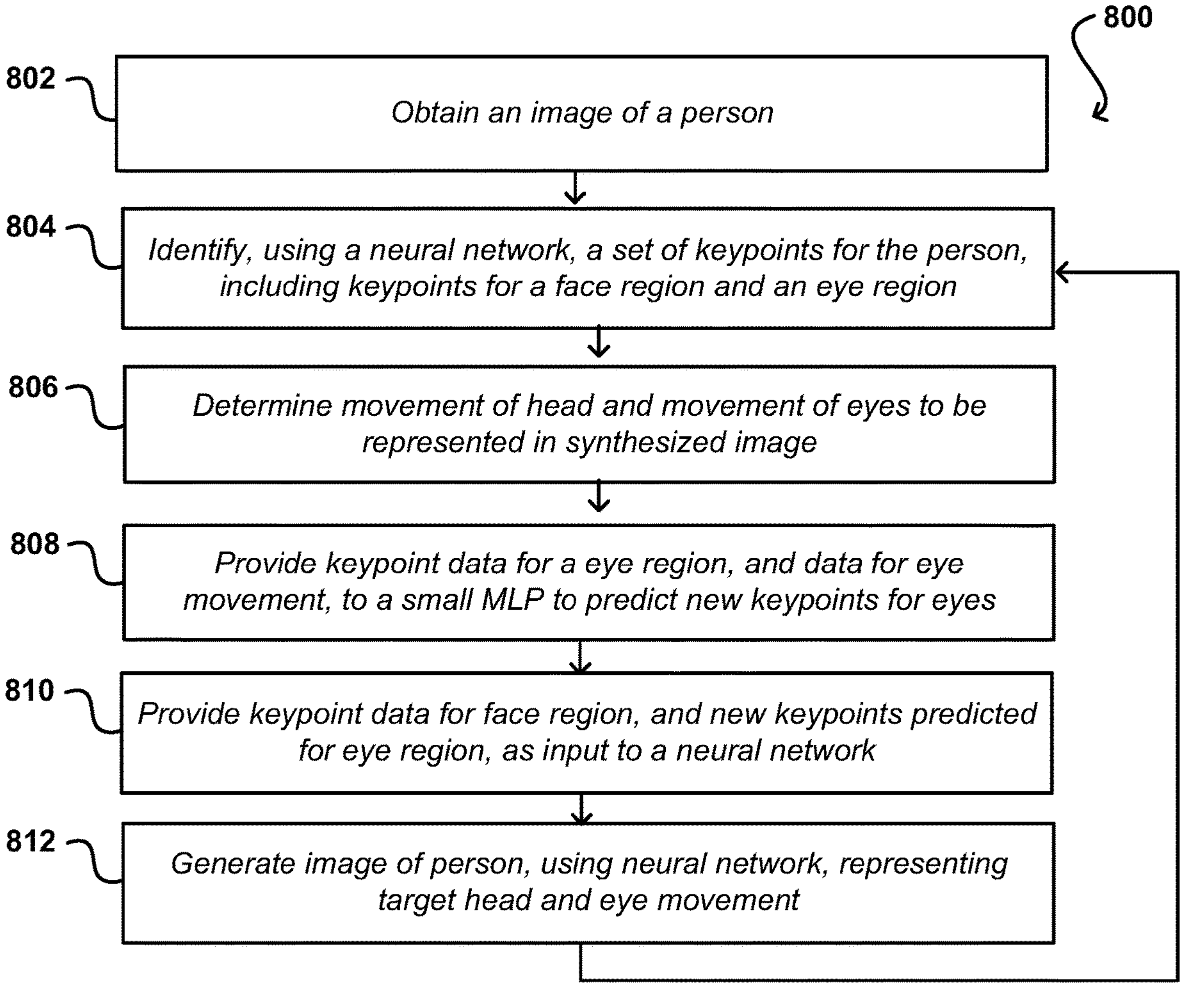
FIGS. 8A and 8B illustrate processes for generating images, according to at least one embodiment.

In at least one embodiment, a process 800 for performing gaze redirection during image synthesis can be performed, as illustrated in FIG. 8A. In at least one embodiment, an image of a person can be obtained 802, such as may correspond to a frame of a video captured by a camera to be presented on one or more remote devices. In at least one embodiment, one or more neural networks can be used to identify 804 a set of keypoints for this person in this image, as may include keypoints for both a face region and an eye region, among other possible regions. In at least one embodiment, movement or redirection of a head and of eyes of this person can be determined 806 that are to be represented in a synthesized or reconstructed version of this image. In at least one embodiment, such motion may be represented by one or more motion vectors determined between captured video frames. In at least one embodiment, this keypoint data can be transmitted, along with image data for at least one key frame, to a receiving device. In at least one embodiment, keypoint data for at least an eye region can be provided 808, along with target motion data such as a generated motion vector, as input to a network, such as an MLP, to predict new keypoints for these pupils or eyes, or for this eye region. In at least one embodiment, these new predicted keypoints for this eye region can be provided 810, along with keypoints for at least a face region, as input to a generative neural network. In at least one embodiment, motion data for a head can be provided as input as well. In at least one embodiment, this neural network can then be used to generate 812, or reconstruct, an image of this person, where this image can represent target head and eye movement, as was represented using these generated motion vectors. In at least one embodiment, this can allow for independent control of gaze redirection and head redirection, at least to an extent that a gaze can be redirected for a given head orientation. In at least one embodiment, this can provide for more natural reconstruction when this synthesized data is presented, as gaze direction will not move completely together with head movement, which does not accurately represent natural motion of a person. In at least one embodiment, such an approach can be used for other features of other types of objects as well, where those features may have at least some amount of independent motion from one or more other features or portions of those objects. In at least one embodiment, these objects can include any types of organisms that have independent natural motion of eyes, or other features, relative to a head or other portion, as may include animals or insects, in addition to humans.

Figure 8B:
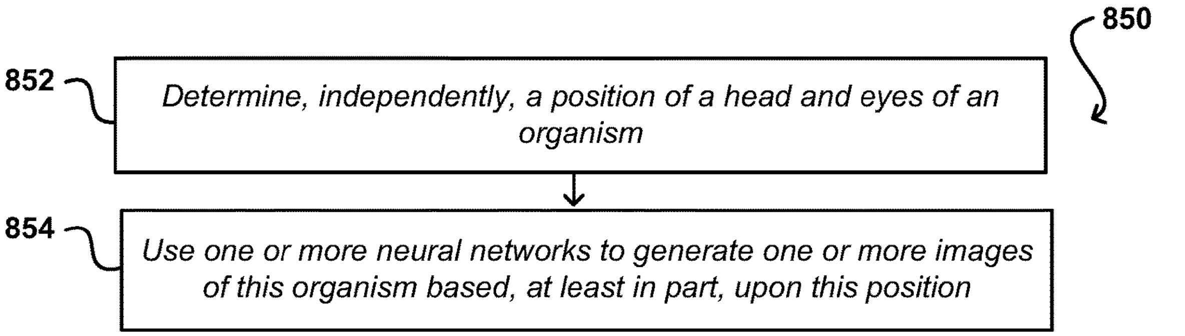

In at least one embodiment, a process 850 for generating images can be performed as illustrated in FIG. 8B. In at least one embodiment, a position of a head and eyes of an organisms can be determined 852, such as by analyzing one or more images of that organism using a trained neural network. In at least one embodiment, one or more neural networks can be used 854 to generate one or more images of this organism based, at least in part, upon this position. In at least one embodiment, this may include generating reconstructed image data representing at least partially independent movement of this head and these eyes.

Figure 9A:
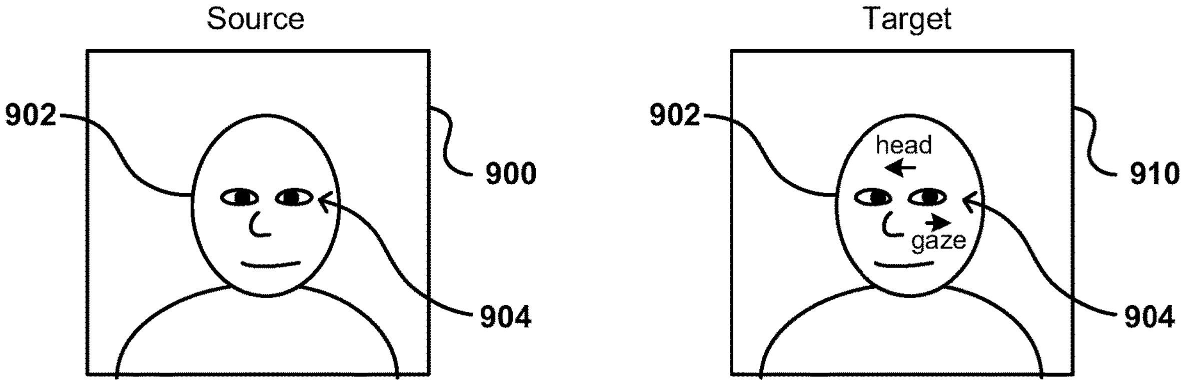
FIGS. 9A, 9B, and 9C illustrate images with different augmentations, according to at least one embodiment.

In at least one embodiment, a network such as that described with respect to FIGS. 1-5 and 7 can be trained to synthesize images, or otherwise infer image data, that reflect accurate and natural image representations for one or more types of motion, which may be at least partially independent from each other. In at least one embodiment, such a network may be trained to reconstruct images using training data that represents motion of one or more objects represented in an image. In at least one embodiment, such a network can be also trained using data that is augmented, or otherwise modified, based upon aspects that relate to movements or adjustments of a camera capturing image data, or a virtual camera defining a point of view and other such aspects for rendering image data. In at least one embodiment, a pair of source images can be used as training data for such a network including source image 900 and target image 910 as illustrated in FIG. 9A. In at least one embodiment, target image 910 can differ from source image 900 by an amount of motion of an object, such as motion of a head 902 and/or motion of eyes 904 of a person represented in these images. In at least one embodiment, a neural network can be trained to synthesize images based at least in part upon this motion, such that if this network is given source image 900 and appropriate motion data, this network can synthesize an image that is almost identical to target image 910.

Figure 9B:
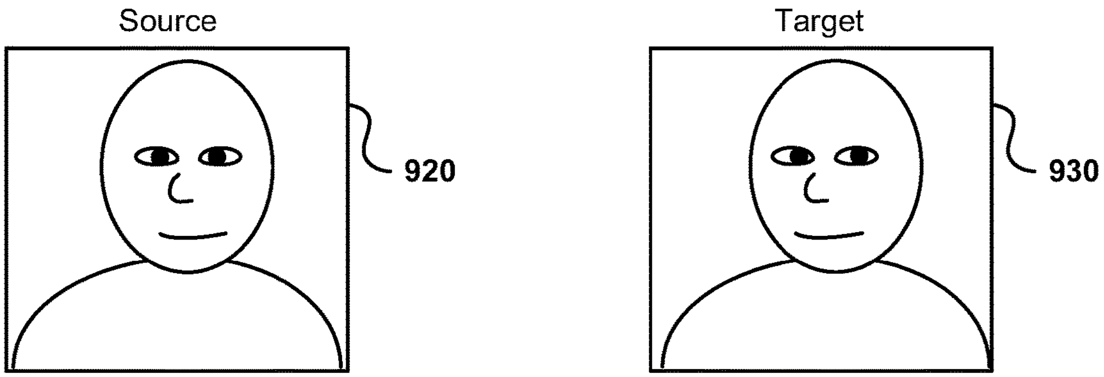
Figure 9C:
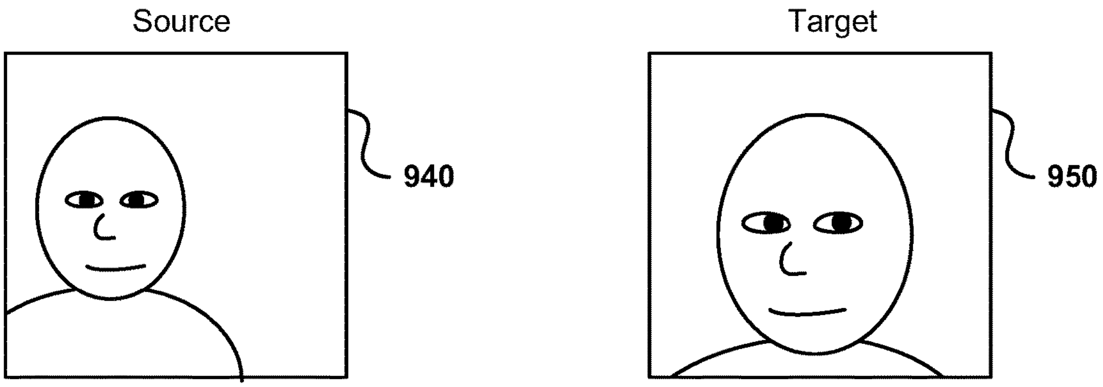

In at least one embodiment, image reconstruction can occur at different resolutions, so there can be advantages to training using different resolutions, such as to use a first stage that trains using training data at a first resolution, and then a second stage that trains using data at a second, higher resolution as discussed previously herein, such as an SDTV resolution followed by a 4K resolution. In at least one embodiment, accuracy of image reconstruction can also benefit from training based at least in part upon motions or adjustments of a camera used to capture or generate these images. In at least one embodiment, this can include adjustments such as a zoom, pan, or tilt of a camera. In at least one embodiment, source and training data can be modified or augmented to represent such motion. In at least one embodiment, this can include modifying source image 900 using a crop, resize, rescale, and/or or similar action to generate source image 920 in FIG. 9B, which corresponds to what would be represented in response to a zoom action of a camera being performed between these two images. In at least one embodiment, a similar augmentation, or set of augmentations, can be performed with respect to target image 910, to generate target image 930. In at least one embodiment, this "zoomed" source image 920 and "zoomed" target image 930 can then also be used as additional training data to train a neural network to synthesize data, so this network can train to synthesize accurate image data under different zoom levels or conditions.

In at least one embodiment, different augmentations can also be applied to source and target images of a pair of training images in order to train an image synthesis network to accurately reconstruct images where changes may be due to changes in camera position, orientation, or settings between frames. In at least one embodiment, source image 900 may have a crop position selected to represent a pan motion of a camera in source image 940, where an orientation of this person has not changed, but a position where that person is located has changed between these images. In at least one embodiment, target image 910 can have at least one different augmentation applied, here having a crop region and image resizing (or rescaling) amount selected to cause target image 950 to correspond to a zoom and tilt operation of a camera, such that a position and zoom level of this person has changed relative to source image 940. In at least one embodiment, it can be seen that there are also eye and head movements represented between source image 940 and target image 950. In at least one embodiment, training for different motions of a person, organism, or object, as well as different potential motions or adjustments of a camera, can help to improve a robustness of a network to synthesize image data under different circumstances, and can help this network to perform more accurate reconstruction under these circumstances, and various combinations of these circumstances. In at least one embodiment, other augmentations can be applied as well, as may include addition of different amounts or types of noise, random cropping, random scaling, brightness and contrast adjustments, artificial blur (e.g., regular or motion), and addition of artificial compression artifacts. In at least one embodiment, any augmentation can be added or reflected in training data that may mimic an image impact or artifact that may occur during use, such as during a videoconference based upon image capture and reconstruction.

In at least one embodiment, training of a network can be performed using all of this training data at once, but such an approach may lead a network to have problems converging, or may result in less accurate reconstruction in certain situations. In at least one embodiment, a multi-stage training process can be used in which a network is first trained without data augmentation, in order to ensure that this network is trained for accurate reconstruction based upon motion of a person, organism, or object, which may be of most importance. In at least one embodiment, once this training has occurred sufficiently, augmentation can then be added for further training, while still training using data without augmentation, so that this network learns to handle augmentation without forgetting how to accurately reconstruct without augmentation. In at least one embodiment, training using augmentations can also be broken into separate stages, such as where training data is added that first represents similar augmentations to pairs of source and target images. In at least one embodiment, a separate and subsequent stage can add in training data where source and target images have different augmentations applied, or only one of these source and target images has one or more augmentation applied. In at least one embodiment, adding complexity of training data in subsequent stages can help a network to converge, as well as to retain accuracy of earlier training while learning to handle this additional complexity for accurate reconstruction.

Figure 10A:
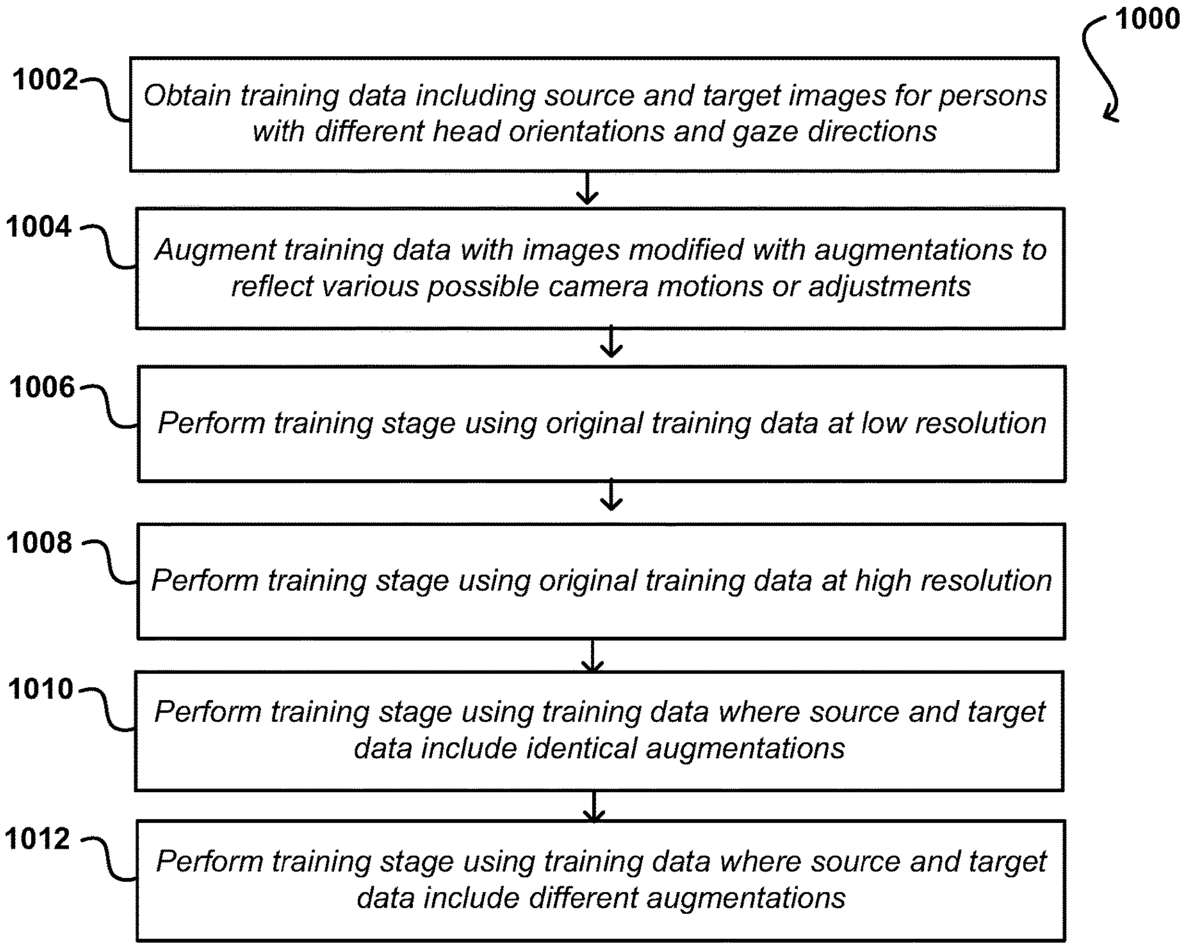
FIGS. 10A and 10B illustrate processes for training a network and using that network for generating images, according to at least one embodiment.

In at least one embodiment, a process 1000 for training a network to perform image reconstruction can be performed as illustrated in FIG. 10A. In at least one embodiment, training data can be obtained 1002 that includes source and target images, such as different frames of a video, for persons with different head orientations and gaze directions, although various other motions or changes can be used for training as well. In at least one embodiment, this training data set can be augmented 1004 with images modified with one or more augmentations to reflect various possible camera motions or adjustments, such as pan or zoom operations of a camera, or addition of compression artifacts. In at least one embodiment, a neural network can be trained to reconstruct images from this set using a multi-stage training process. In at least one embodiment, a training stage can be performed 1006 using original training data, without augmentations, at a first or lower resolution. In at least one embodiment, a subsequent training stage can be performed 1008 using this original training data without augmentations, but at a second, higher resolution. In at least one embodiment, each stage can complete when a network is determined to converge or another such end criterion is met, such as a maximum number of iterations or processing of all available training data. In at least one embodiment, a training stage can then be performed 1010 where source and target data are added that include identical augmentations, such as identical cropping, resizing, or addition of virtual features as discussed herein. In at least one embodiment, after successful completion of this training stage, another training stage can be performed 1012 wherein additional training data is added that includes source and target data with different augmentations added. In at least one embodiment, this stage can also continue until this network converges at this stage with this additional training data, or another appropriate end criterion is satisfied. In at least one embodiment, a same loss function can be used for all stages to compare generated target images given source and motion (or other modification) data, and using a target image as ground truth against which to compare a synthesized or reconstructed image, and adjusting network parameters to attempt to minimize one or more loss values, using a training system such as that described with respect to FIG. 6.

Figure 10B:
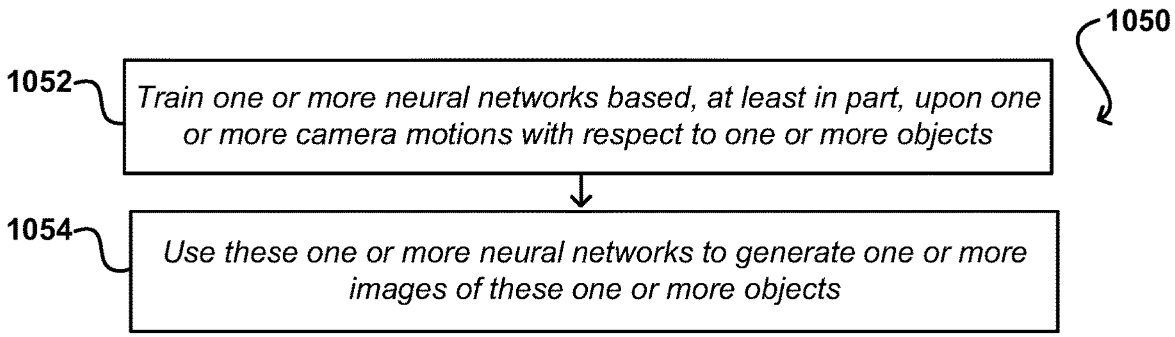

In at least one embodiment, a process 1050 for generating one or more images can be performed as illustrated in FIG. 10B. In at least one embodiment, one or more neural networks are trained 1052 based, at least in part, upon one or more camera motions with respect to one or more objects. In at least one embodiment, this can include introducing augmentations into a set of training images to represent these camera motions. In at least one embodiment, these one or more neural networks can then be used 1054 to generate one or more images of these one or more objects, such as to perform image reconstruction corresponding to motion of these one or more objects or a camera used to capture or generate images of these objects. In at least one embodiment, a distillation process can also be used to reduce a size of this network after training. In at least one embodiment, distillation can be performed to "distill," or transfer, knowledge learned by a larger model or network to a smaller one, which can help to improve performance and reduce resource requirements at inference time. In at least one embodiment, a multi-stage procedure can be used for distillation as well, to enable inferencing to be performed with sequentially smaller models until a model with accurate knowledge is maintained that achieves a desired size or performance. In at least one embodiment, a teacher-student training approach can be used for distillation.

Figure 11A:
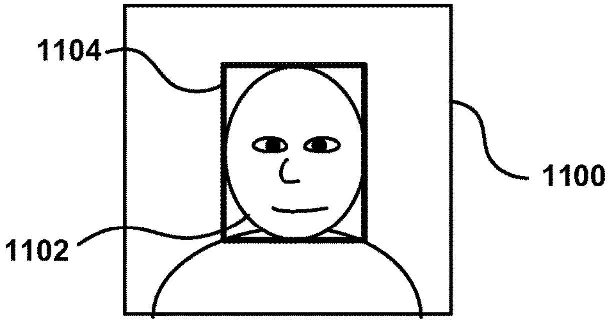
FIGS. 11A, 11B, 11C, 11D, and 11E illustrate steps to determining features and predicting face regions, according to at least one embodiment.
Figure 11B:
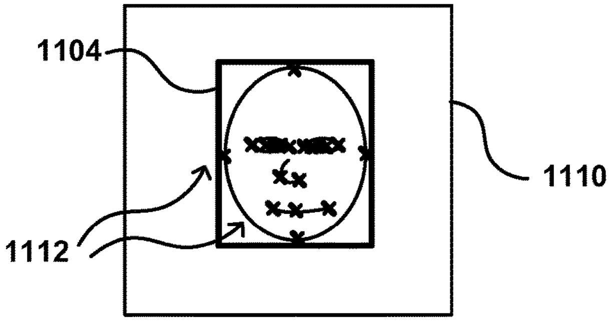

In at least one embodiment, facial features can be detected for individual images (or video frames) in a sequence for use in reconstructing those images (or video frames) on a remote device, as can be performed using systems such as those discussed with respect to FIGS. 1-5 and 7. In at least one embodiment, an amount of processing to be performed can be reduced by detecting a region of interest for an individual image, such as a face region determined using any of a number of different face detection algorithms or techniques, such as may include those presented above. In at least one embodiment, such an approach can require a face detector to be executed on each of these images, regardless of whether there is significant movement between frames. In at least one embodiment, an amount of processing can be further reduced by utilizing image features, identified within a face region of a given frame, to predict a face region in a next frame in a same sequence. In at least one embodiment, a first image can be received, such as image 1100 in FIG. 11A, which includes a representation of at least a portion of an organism or object, such as a person. In at least one embodiment, a face detector can analyze data for this image to determine a face region 1104 of this image. In at least one embodiment, a face region can include a portion or subset of pixels in an image that represent a portion of a face of a person or organism, with potentially a buffer on an order of around a few pixels around these face pixels to account for some amount of noise or variance. In at least one embodiment, an output of a face detection algorithm can be coordinates of a bounding box around that face region, among other such boundary designations. In at least one embodiment, as illustrated in image 1110 of FIG. 11B, a feature detection network can then process data within this face region 1104 to identify a set of facial features 1112, such as by considering only that region or cropping this image to that region, while retaining coordinates that identify a location of that cropped region. In at least one embodiment, as mentioned above, these may include any appropriate features or keypoints useful in performing image reconstruction, and are not limited to well-understood facial features or landmarks.

Figure 11C:
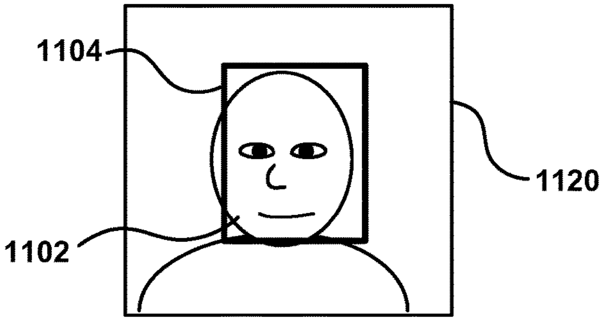
Figure 11D:
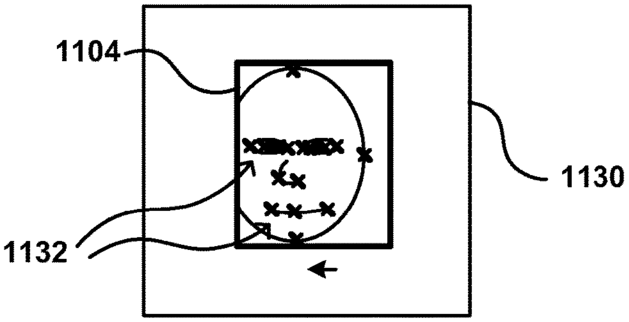
Figure 11E:
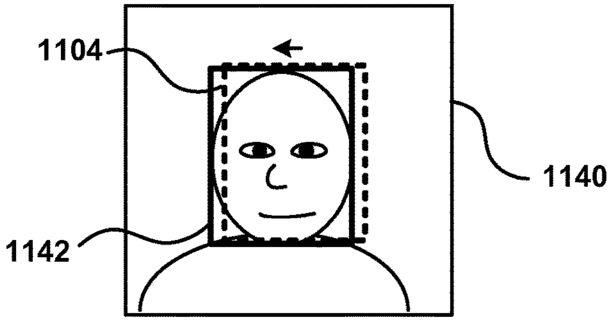

In at least one embodiment, a subsequent image 1120 in this sequence can be received, such as that illustrated in FIG. 11C. In at least one embodiment, instead of performing feature detection on this image again, locations of features 1112 in prior image 1110 can be used to predict a face region in this subsequent image 1120. In at least one embodiment, unless there is a significant amount of motion between frames, which may impact reconstruction ability based on keypoints anyway, then at least a subset of features identified in image 1110 should still be visible in a predicted face region 1104 predicted for this subsequent image, which in this case for a first iteration will likely be similar, if not exactly similar, to bounding box 1104 in FIG. 11A. In at least one embodiment, using this predicted bounding box still enables a facial feature network to identify a number of facial features 1132 as illustrated in image 1130 of FIG. 11D. In at least one embodiment, these features should still be sufficient for image reconstruction, as they can be used to determine movement of a face of a person, as well as eyes in embodiments where separate gaze tracking is utilized. In at least one embodiment, these new feature positions can then be used to predict a position of a new bounding box, or face region 1142, in a subsequent image in this sequence, as illustrated in image 1140 of FIG. 11E. In at least one embodiment, as illustrated this new face region differs slightly from prior face region (indicated by a dotted line bounding box), and follows motion of this face based upon corresponding moves in identified facial features of this person. In at least one embodiment, particularly for high frame rates, motion between typical frame rates will be limited, such that changes in facial features can be used to predict face location in a subsequent frame. In at least one embodiment, this new face region can then be considered, such as through cropping to a slightly different region, for feature detection for this next image in this sequence.

In at least one embodiment, positions of facial features in one frame can be used, without reference to prior frames, to predict a face location in a subsequent frame. In at least one embodiment, positions of facial features in one or more prior images or frames may also be considered. In at least one embodiment, analyzing changes in feature position from two or more prior frames can help to determine motion of this face with respect to a camera view, as may be due to motion or adjustment of this face or this camera, or both, and use this motion to more accurately predict a face position in a next image. In at least one embodiment, use of this prior frame data may be differently weighted or decayed over time, such that more recent data is considered more heavily as a direction or amount of motion can change over time, such that more recent position data should be given more consideration that position data further back in a sequence. In at least one embodiment, a face detection algorithm can be executed on a first frame in a sequence, and then predicted face regions used for subsequent frames up until there is a scene change or more than a threshold amount of motion, for example, at which time a face detection algorithm may be run on a next frame. In at least one embodiment, this prediction can be performed in hardware or software, such as on a same processor, or set of processors or circuits, that performs a facial detection process. In at least one embodiment, such prediction can conserve power, processing resources or flops, and memory requirements relative to performing a full face detection on each image of a sequence.

Figure 12A:
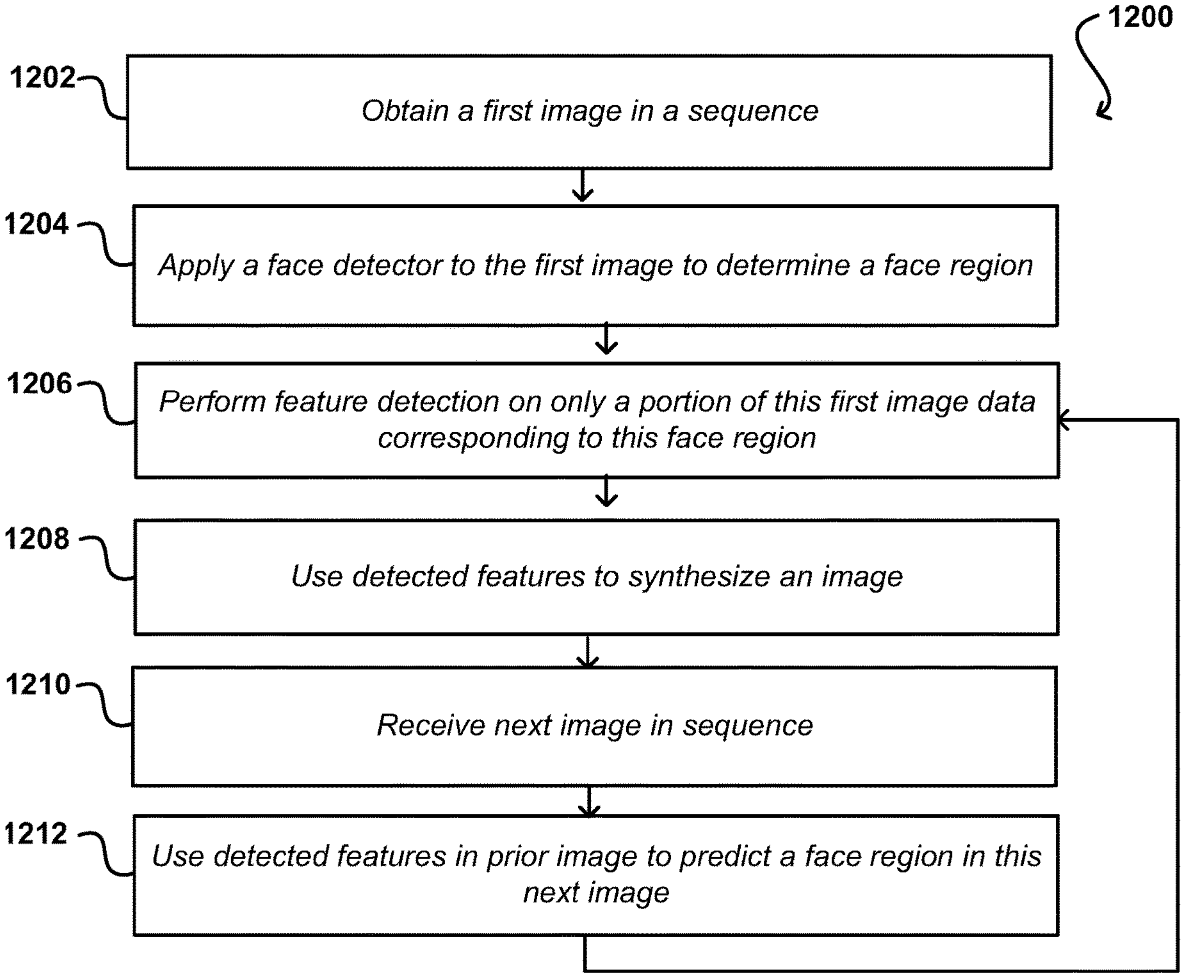
FIGS. 12A and 12B illustrate processes for generating images, according to at least one embodiment.

In at least one embodiment, a process 1200 for detecting a face region in a sequence of images can be performed as illustrated in FIG. 12A. In at least one embodiment, a first image in a sequence can be obtained 1202. In at least one embodiment, a face detector can be applied 1204 to this first image to determine a face region. In at least one embodiment, feature detection can then be performed 1206 on only a portion of this first image that corresponds to this determined face region. In at least one embodiment, this may include cropping this first image to this face region and considering only this cropped portion. In at least one embodiment, these detected features or keypoints can be used 1208 to synthesize or reconstruct an image, such as by using a system as described with respect to FIGS. 1-5 or 7. In at least one embodiment, a next image in this sequence can be received 1210 or obtained. In at least one embodiment, detected features from this prior image in this sequence can be used 1212 to predict a face region in this next image. In at least one embodiment, this process can continue, with face regions in a next image being predicted based, at least in part, upon locations of facial features determined for at least one prior image in that sequence.

Figure 12B:
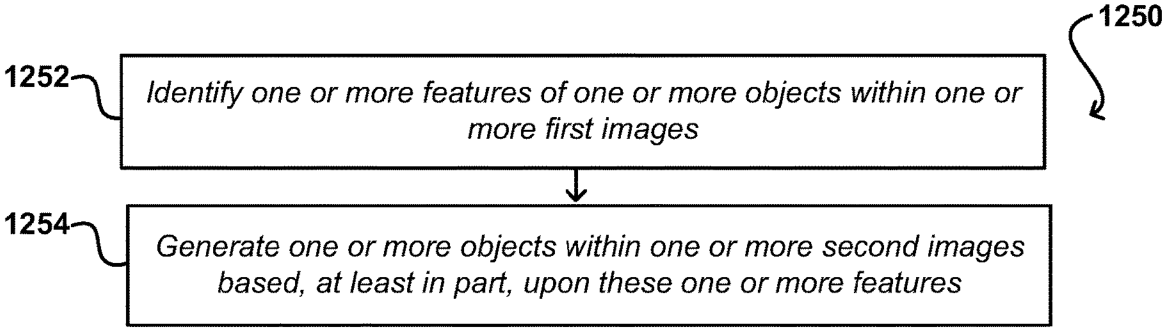

In at least one embodiment, a process 1250 for generating one or more images can be performed as illustrated in FIG. 12B. In at least one embodiment, one or more features of one or more objects can be identified 1252 within one or more first image. In at least one embodiment, these can include facial features identified within a face region of these first images. In at least one embodiment, one or more objects can be generated within one or more second images based, at least in part, upon these one or more image features, such as where these image features were used to predict face regions for identifying face regions in these one or more first images.

Figure 13:
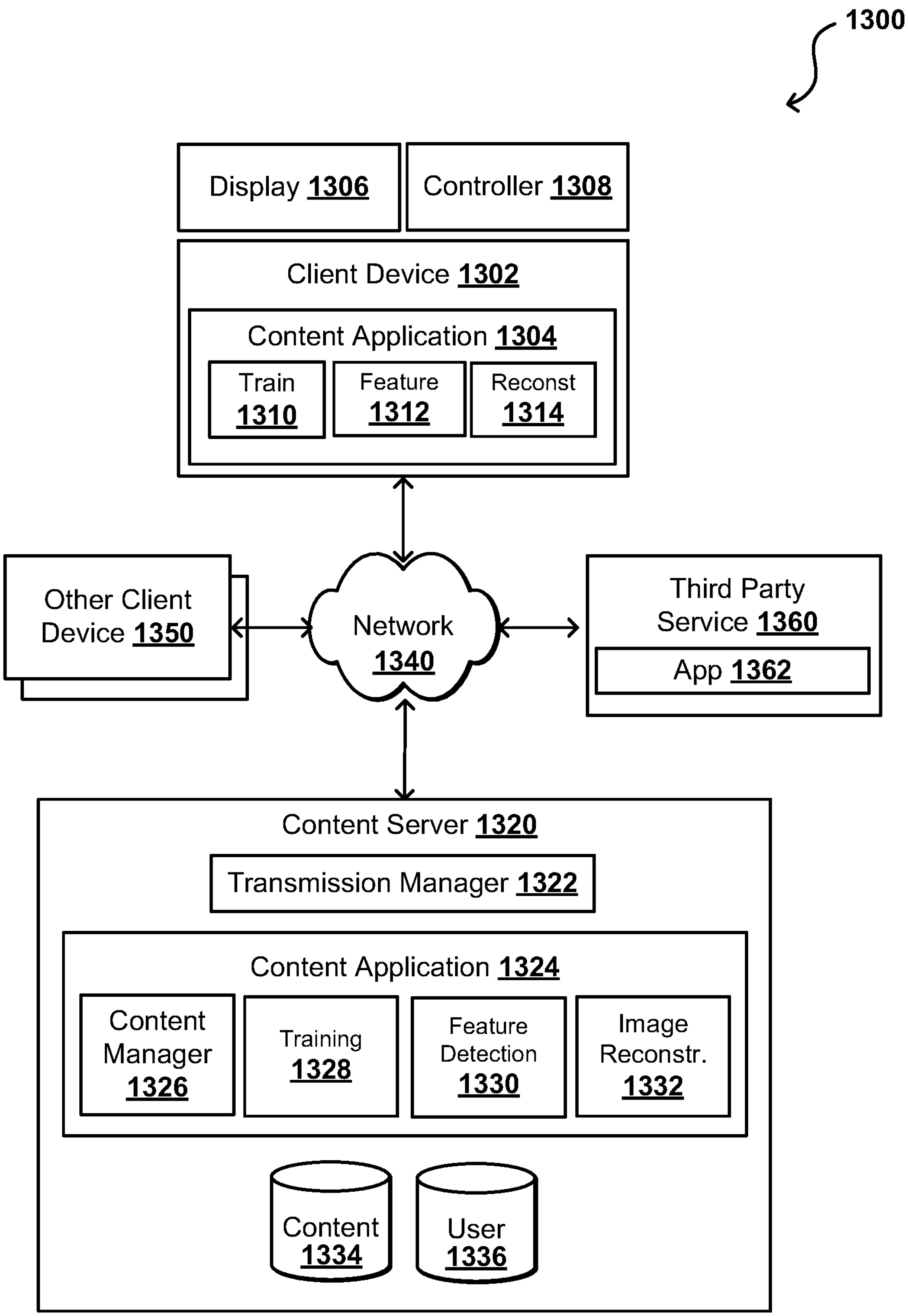
FIG. 13 illustrates a networked computing environment in which aspects of image reconstruction can be performed, according to at least one embodiment.

In at least one embodiment, aspects of image reconstruction can be performed on a single device, or may be distributed in various locations on various different devices, as discussed with respect to systems of FIGS. 1-5 and 7. In at least one embodiment, a client device 1302 can perform analysis for a session according to a content application 1304 executing on client device 1302 and data stored locally on that client device as illustrated in FIG. 13. In at least one embodiment, a content application 1324 executing on content server 1320 may initiate a session associated with at least client device 1302, as may utilize a session manager and user data stored in a user database 1334, and can cause content 1332 to be processed or generated for a content application 1324 through use of a content manager 1324, which may utilize one or more neural networks trained using a training module 1328 or process. In at least one embodiment, these networks can perform tasks such as image synthesis or reconstruction, as may include a feature detection component 1330 for and an image reconstruction component 1332 for synthesizing an image using detected features or keypoints. In at least one embodiment, results of any of these components can be transmitted to client device 1302 using an appropriate transmission manager 1322 to send by download, streaming, or another such transmission channel. In at least one embodiment, client device 1302 receiving this content can provide this content to a corresponding application 1304, which may also or alternatively include a content manager for providing at least some of this content for presentation via client device 1302, such as image or video content through a display 1306. In at least one embodiment, a training component 1310 be used to train a network of a feature detection component 1312 or an image reconstruction component 1314, and these networks can be used once trained by a content application 1302, such as a videoconferencing application, to synthesize media content. In at least one embodiment, where this functionality executes can depend, at least in part, upon where tasks occur and where this interconnect exists. In at least one embodiment, data that is transmitted across network 1340 may be compressed before transmission, with a receiving entity or system then attempting to restore quality to this compressed video. In at least one embodiment, at least some of this content may already be stored on, rendered on, or accessible to client device 1302 such that transmission over network 1340 is not required for at least that portion of content, such as where that content may have been previously downloaded or stored locally on a hard drive or optical disk. In at least one embodiment, a transmission mechanism such as data streaming can be used to transfer this content from server 1320, or content database 1334, to client device 1302. In at least one embodiment, at least a portion of this content can be obtained or streamed from another source, such as a third party service 1360 that may also include an application 1362 for performing any such tasks. In at least one embodiment, portions of this functionality can be performed using multiple computing devices, or multiple processors within one or more computing devices, such as may include a combination of CPUs and GPUs. In at least one embodiment, locations where at least some of this functionality is performed may be configurable, or may depend upon factors such as a type of client device 1302 or availability of a network connection with appropriate bandwidth, among other such factors. In at least one embodiment, one or more neural networks can be used for performing or assisting in this functionality, where those neural networks (or at least network parameters for those networks) can be provided by content server 1320 or third party system 1360. In at least one embodiment, generated content or data can also be provided, or made available, to other client devices 1350, that may perform similar calculations or training tasks, such as for download or streaming from a data source storing a copy of that content.

Inference and Training Logic

Figure 14A:
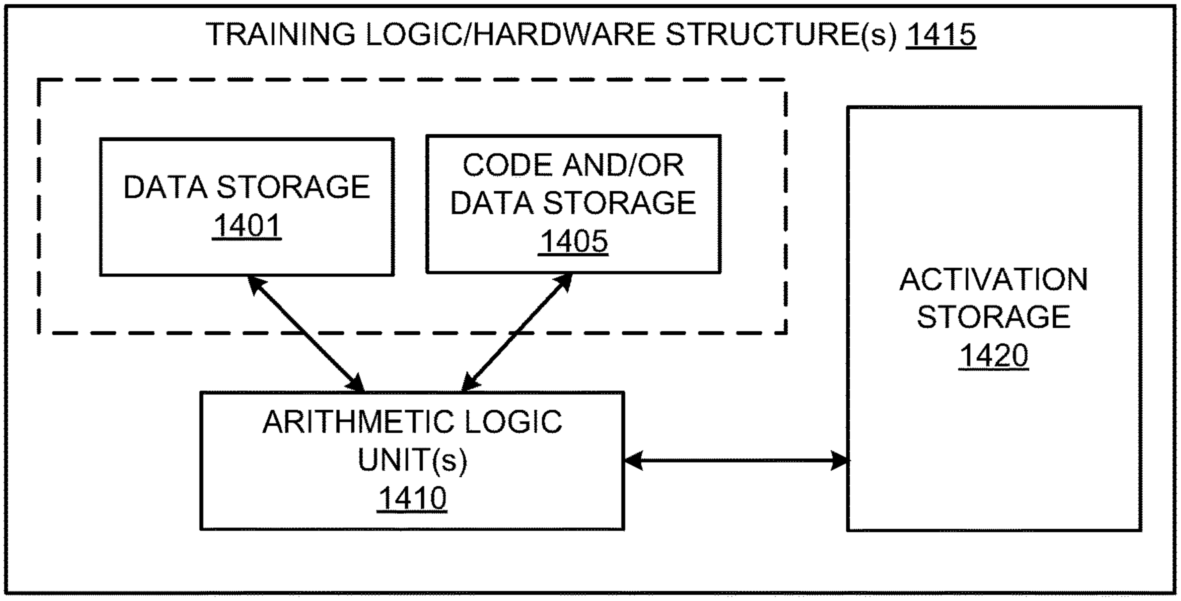
FIG. 14A illustrates inference and/or training logic, according to at least one embodiment.

FIG. 14A illustrates inference and/or training logic 1415 used to perform inferencing and/or training operations associated with one or more embodiments. Details regarding inference and/or training logic 1415 are provided below in conjunction with FIGS. 14A and/or 14B.

In at least one embodiment, inference and/or training logic 1415 may include, without limitation, code and/or data storage 1401 to store forward and/or output weight and/or input/output data, and/or other parameters to configure neurons or layers of a neural network trained and/or used for inferencing in aspects of one or more embodiments. In at least one embodiment, training logic 1415 may include, or be coupled to code and/or data storage 1401 to store graph code or other software to control timing and/or order, in which weight and/or other parameter information is to be loaded to configure, logic, including integer and/or floating point units (collectively, arithmetic logic units (ALUs)). In at least one embodiment, code, such as graph code, loads weight or other parameter information into processor ALUs based on an architecture of a neural network to which such code corresponds. In at least one embodiment, code and/or data storage 1401 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 1401 may be included with other on-chip or off-chip data storage, including a processor's L1, L2, or L3 cache or system memory.

In at least one embodiment, any portion of code and/or data storage 1401 may be internal or external to one or more processors or other hardware logic devices or circuits. In at least one embodiment, code and/or code and/or data storage 1401 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 1401 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 1415 may include, without limitation, a code and/or data storage 1405 to store backward and/or output weight and/or input/output data corresponding to neurons or layers of a neural network trained and/or used for inferencing in aspects of one or more embodiments. In at least one embodiment, code and/or data storage 1405 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 1415 may include, or be coupled to code and/or data storage 1405 to store graph code or other software to control timing and/or order, in which weight and/or other parameter information is to be loaded to configure, logic, including integer and/or floating point units (collectively, arithmetic logic units (ALUs)).

In at least one embodiment, code, such as graph code, causes the loading of weight or other parameter information into processor ALUs based on an architecture of a neural network to which such code corresponds. In at least one embodiment, any portion of code and/or data storage 1405 may be included with other on-chip or off-chip data storage, including a processor's L1, L2, or L3 cache or system memory. In at least one embodiment, any portion of code and/or data storage 1405 may be internal or external to one or more processors or other hardware logic devices or circuits. In at least one embodiment, code and/or data storage 1405 may be cache memory, DRAM, SRAM, non-volatile memory (e.g., flash memory), or other storage. In at least one embodiment, a choice of whether code and/or data storage 1405 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 1401 and code and/or data storage 1405 may be separate storage structures. In at least one embodiment, code and/or data storage 1401 and code and/or data storage 1405 may be a combined storage structure. In at least one embodiment, code and/or data storage 1401 and code and/or data storage 1405 may be partially combined and partially separate. In at least one embodiment, any portion of code and/or data storage 1401 and code and/or data storage 1405 may be included with other on-chip or off-chip data storage, including a processor's L1, L2, or L3 cache or system memory.

In at least one embodiment, inference and/or training logic 1415 may include, without limitation, one or more arithmetic logic unit(s) ("ALU(s)") 1410, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 1420 that are functions of input/output and/or weight parameter data stored in code and/or data storage 1401 and/or code and/or data storage 1405. In at least one embodiment, activations stored in activation storage 1420 are generated according to linear algebraic and or matrix-based mathematics performed by ALU(s) 1410 in response to performing instructions or other code, wherein weight values stored in code and/or data storage 1405 and/or data storage 1401 are used as operands along with other values, such as bias values, gradient information, momentum values, or other parameters or hyperparameters, any or all of which may be stored in code and/or data storage 1405 or code and/or data storage 1401 or another storage on or off-chip.

In at least one embodiment, ALU(s) 1410 are included within one or more processors or other hardware logic devices or circuits, whereas in another embodiment, ALU(s) 1410 may be external to a processor or other hardware logic device or circuit that uses them (e.g., a co-processor). In at least one embodiment, ALUs 1410 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 1401, code and/or data storage 1405, and activation storage 1420 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 1420 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 1420 may be cache memory, DRAM, SRAM, non-volatile memory (e.g., flash memory), or other storage. In at least one embodiment, activation storage 1420 may be completely or partially within or external to one or more processors or other logical circuits. In at least one embodiment, a choice of whether activation storage 1420 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 1415 illustrated in FIG. 14A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 1415 illustrated in FIG. 14A may be used in conjunction with central processing unit ("CPU") hardware, graphics processing unit ("GPU") hardware or other hardware, such as field programmable gate arrays ("FPGAs").

Figure 14B:
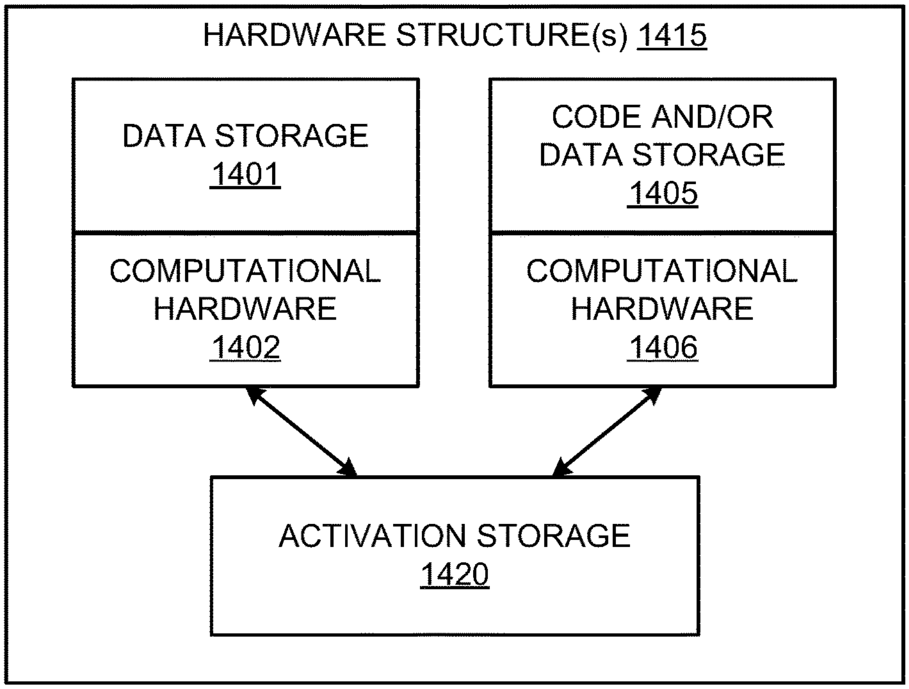
FIG. 14B illustrates inference and/or training logic, according to at least one embodiment.

FIG. 14B illustrates inference and/or training logic 1415, according to at least one embodiment. In at least one embodiment, inference and/or training logic 1415 may include, without limitation, hardware logic in which computational resources are dedicated or otherwise exclusively used in conjunction with weight values or other information corresponding to one or more layers of neurons within a neural network. In at least one embodiment, inference and/or training logic 1415 illustrated in FIG. 14B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 1415 illustrated in FIG. 14B may be used in conjunction with central processing unit (CPU) hardware, graphics processing unit (GPU) hardware or other hardware, such as field programmable gate arrays (FPGAs). In at least one embodiment, inference and/or training logic 1415 includes, without limitation, code and/or data storage 1401 and code and/or data storage 1405, which may be used to store code (e.g., graph code), weight values and/or other information, including bias values, gradient information, momentum values, and/or other parameter or hyperparameter information. In at least one embodiment illustrated in FIG. 14B, each of code and/or data storage 1401 and code and/or data storage 1405 is associated with a dedicated computational resource, such as computational hardware 1402 and computational hardware 1406, respectively. In at least one embodiment, each of computational hardware 1402 and computational hardware 1406 comprises one or more ALUs that perform mathematical functions, such as linear algebraic functions, only on information stored in code and/or data storage 1401 and code and/or data storage 1405, respectively, result of which is stored in activation storage 1420.

In at least one embodiment, each of code and/or data storage 1401 and 1405 and corresponding computational hardware 1402 and 1406, respectively, correspond to different layers of a neural network, such that resulting activation from one storage/computational pair 1401/1402 of code and/or data storage 1401 and computational hardware 1402 is provided as an input to a next storage/computational pair 1405/1406 of code and/or data storage 1405 and computational hardware 1406, in order to mirror a conceptual organization of a neural network. In at least one embodiment, each of storage/computational pairs 1401/1402 and 1405/1406 may correspond to more than one neural network layer. In at least one embodiment, additional storage/computation pairs (not shown) subsequent to or in parallel with storage/computation pairs 1401/1402 and 1405/1406 may be included in inference and/or training logic 1415.

Neural Network Training and Deployment

Figure 15:
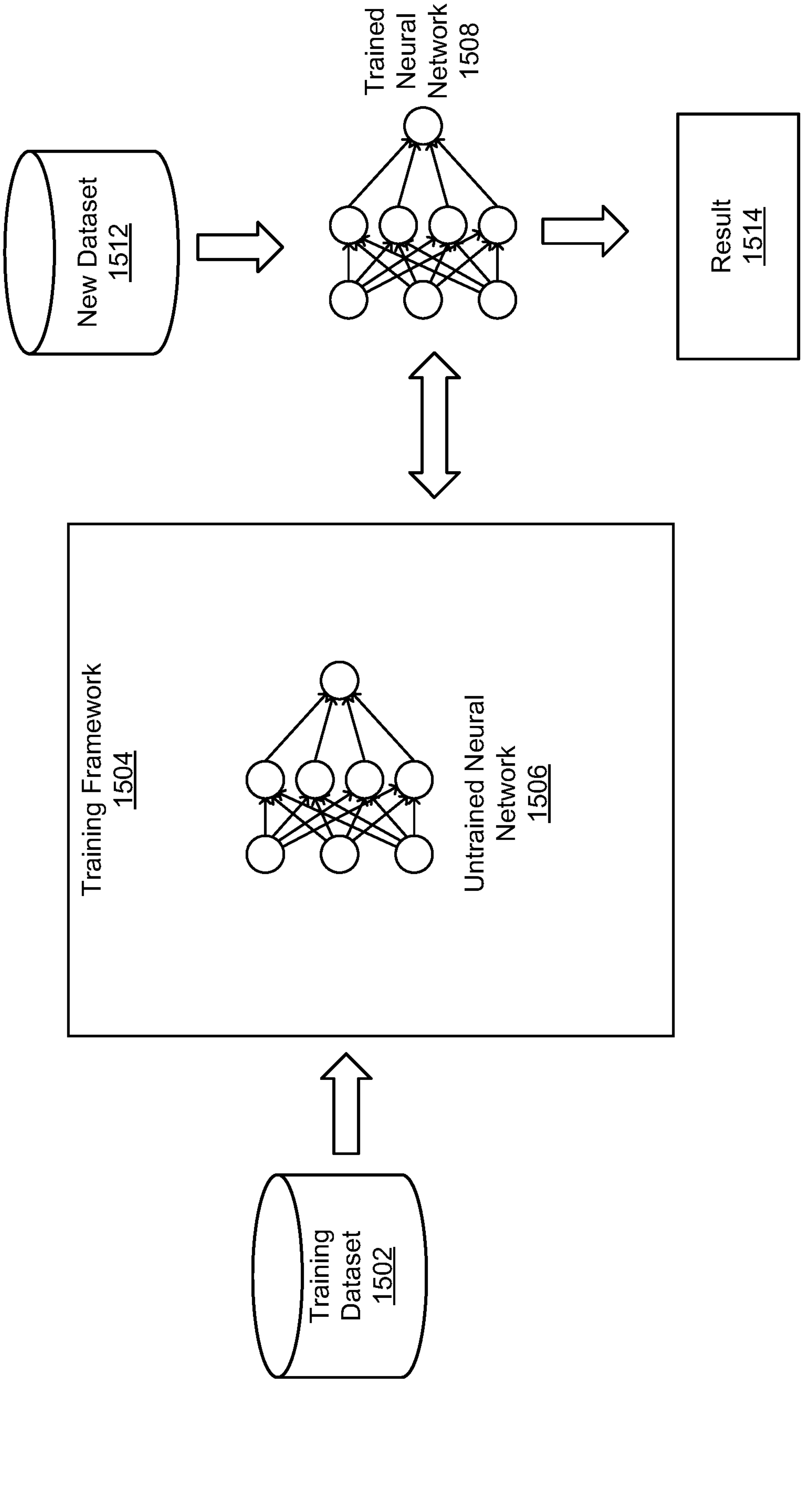
FIG. 15 illustrates training and deployment of a neural network, according to at least one embodiment.

FIG. 15 illustrates training and deployment of a deep neural network, according to at least one embodiment. In at least one embodiment, untrained neural network 1506 is trained using a training dataset 1502. In at least one embodiment, training framework 1504 is a PyTorch framework, whereas in other embodiments, training framework 1504 is a TensorFlow, Boost, Caffe, Microsoft Cognitive Toolkit/CNTK, MXNet, Chainer, Keras, Deeplearning4j, or other training framework. In at least one embodiment, training framework 1504 trains an untrained neural network 1506 and enables it to be trained using processing resources described herein to generate a trained neural network 1508. In at least one embodiment, weights may be chosen randomly or by pre-training using a deep belief network. In at least one embodiment, training may be performed in either a supervised, partially supervised, or unsupervised manner.

In at least one embodiment, untrained neural network 1506 is trained using supervised learning, wherein training dataset 1502 includes an input paired with a desired output for an input, or where training dataset 1502 includes input having a known output and an output of neural network 1506 is manually graded. In at least one embodiment, untrained neural network 1506 is trained in a supervised manner and processes inputs from training dataset 1502 and compares resulting outputs against a set of expected or desired outputs. In at least one embodiment, errors are then propagated back through untrained neural network 1506. In at least one embodiment, training framework 1504 adjusts weights that control untrained neural network 1506. In at least one embodiment, training framework 1504 includes tools to monitor how well untrained neural network 1506 is converging towards a model, such as trained neural network 1508, suitable to generating correct answers, such as in result 1514, based on input data such as a new dataset 1512. In at least one embodiment, training framework 1504 trains untrained neural network 1506 repeatedly while adjust weights to refine an output of untrained neural network 1506 using a loss function and adjustment algorithm, such as stochastic gradient descent. In at least one embodiment, training framework 1504 trains untrained neural network 1506 until untrained neural network 1506 achieves a desired accuracy. In at least one embodiment, trained neural network 1508 can then be deployed to implement any number of machine learning operations.

In at least one embodiment, untrained neural network 1506 is trained using unsupervised learning, wherein untrained neural network 1506 attempts to train itself using unlabeled data. In at least one embodiment, unsupervised learning training dataset 1502 will include input data without any associated output data or "ground truth" data. In at least one embodiment, untrained neural network 1506 can learn groupings within training dataset 1502 and can determine how individual inputs are related to untrained dataset 1502. In at least one embodiment, unsupervised training can be used to generate a self-organizing map in trained neural network 1508 capable of performing operations useful in reducing dimensionality of new dataset 1512. In at least one embodiment, unsupervised training can also be used to perform anomaly detection, which allows identification of data points in new dataset 1512 that deviate from normal patterns of new dataset 1512.

In at least one embodiment, semi-supervised learning may be used, which is a technique in which in training dataset 1502 includes a mix of labeled and unlabeled data. In at least one embodiment, training framework 1504 may be used to perform incremental learning, such as through transferred learning techniques. In at least one embodiment, incremental learning enables trained neural network 1508 to adapt to new dataset 1512 without forgetting knowledge instilled within trained neural network 1508 during initial training.

In at least one embodiment, training framework 1504 is a framework processed in connection with a software development toolkit such as an OpenVINO (Open Visual Inference and Neural network Optimization) toolkit. In at least one embodiment, an OpenVINO toolkit is a toolkit such as those developed by Intel Corporation of Santa Clara, CA.

In at least one embodiment, OpenVINO is a toolkit for facilitating development of applications, specifically neural network applications, for various tasks and operations, such as human vision emulation, speech recognition, natural language processing, recommendation systems, and/or variations thereof. In at least one embodiment, OpenVINO supports neural networks such as convolutional neural networks (CNNs), recurrent and/or attention-based neural networks, and/or various other neural network models. In at least one embodiment, OpenVINO supports various software libraries such as OpenCV, OpenCL, and/or variations thereof.

In at least one embodiment, OpenVINO supports neural network models for various tasks and operations, such as classification, segmentation, object detection, face recognition, speech recognition, pose estimation (e.g., humans and/or objects), monocular depth estimation, image inpainting, style transfer, action recognition, colorization, and/or variations thereof.

In at least one embodiment, OpenVINO comprises one or more software tools and/or modules for model optimization, also referred to as a model optimizer. In at least one embodiment, a model optimizer is a command line tool that facilitates transitions between training and deployment of neural network models. In at least one embodiment, a model optimizer optimizes neural network models for execution on various devices and/or processing units, such as a GPU, CPU, PPU, GPGPU, and/or variations thereof. In at least one embodiment, a model optimizer generates an internal representation of a model, and optimizes said model to generate an intermediate representation. In at least one embodiment, a model optimizer reduces a number of layers of a model. In at least one embodiment, a model optimizer removes layers of a model that are utilized for training. In at least one embodiment, a model optimizer performs various neural network operations, such as modifying inputs to a model (e.g., resizing inputs to a model), modifying a size of inputs of a model (e.g., modifying a batch size of a model), modifying a model structure (e.g., modifying layers of a model), normalization, standardization, quantization (e.g., converting weights of a model from a first representation, such as floating point, to a second representation, such as integer), and/or variations thereof.

In at least one embodiment, OpenVINO comprises one or more software libraries for inferencing, also referred to as an inference engine. In at least one embodiment, an inference engine is a C++ library, or any suitable programming language library. In at least one embodiment, an inference engine is utilized to infer input data. In at least one embodiment, an inference engine implements various classes to infer input data and generate one or more results. In at least one embodiment, an inference engine implements one or more API functions to process an intermediate representation, set input and/or output formats, and/or execute a model on one or more devices.

In at least one embodiment, OpenVINO provides various abilities for heterogeneous execution of one or more neural network models. In at least one embodiment, heterogeneous execution, or heterogeneous computing, refers to one or more computing processes and/or systems that utilize one or more types of processors and/or cores. In at least one embodiment, OpenVINO provides various software functions to execute a program on one or more devices. In at least one embodiment, OpenVINO provides various software functions to execute a program and/or portions of a program on different devices. In at least one embodiment, OpenVINO provides various software functions to, for example, run a first portion of code on a CPU and a second portion of code on a GPU and/or FPGA. In at least one embodiment, OpenVINO provides various software functions to execute one or more layers of a neural network on one or more devices (e.g., a first set of layers on a first device, such as a GPU, and a second set of layers on a second device, such as a CPU).

In at least one embodiment, OpenVINO includes various functionality similar to functionalities associated with a CUDA programming model, such as various neural network model operations associated with frameworks such as TensorFlow, PyTorch, and/or variations thereof. In at least one embodiment, one or more CUDA programming model operations are performed using OpenVINO. In at least one embodiment, various systems, methods, and/or techniques described herein are implemented using OpenVINO.

Data Center

Figure 16:
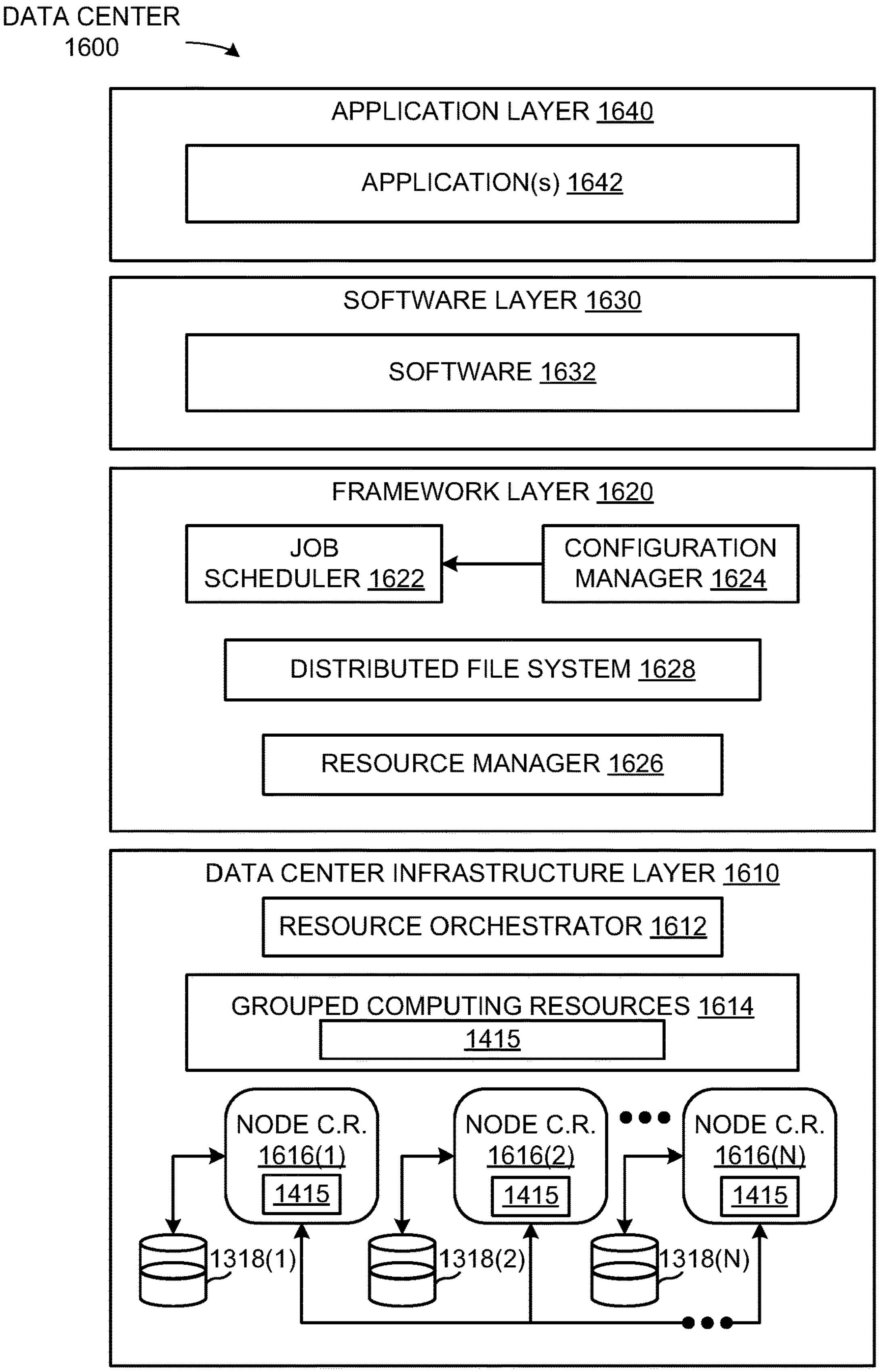
FIG. 16 illustrates an example data center system, according to at least one embodiment.

FIG. 16 illustrates an example data center 1600, in which at least one embodiment may be used. In at least one embodiment, data center 1600 includes a data center infrastructure layer 1610, a framework layer 1620, a software layer 1630 and an application layer 1640.

In at least one embodiment, as shown in FIG. 16, data center infrastructure layer 1610 may include a resource orchestrator 1612, grouped computing resources 1614, and node computing resources ("node C.R.s") 1616(1)-1616(N), where "N" represents a positive integer (which may be a different integer "N" than used in other figures). In at least one embodiment, node C.R.s 1616(1)-1616(N) may include, but are not limited to, any number of central processing units ("CPUs") or other processors (including accelerators, field programmable gate arrays (FPGAs), graphics processors, etc.), memory storage devices 1618(1)-1618(N) (e.g., dynamic read-only memory, solid state storage or disk drives), network input/output ("NW I/O") devices, network switches, virtual machines ("VMs"), power modules, and cooling modules, etc. In at least one embodiment, one or more node C.R.s from among node C.R.s 1616(1)-1616(N) may be a server having one or more of above-mentioned computing resources.

In at least one embodiment, grouped computing resources 1614 may include separate groupings of node C.R.s housed within one or more racks (not shown), or many racks housed in data centers at various geographical locations (also not shown). In at least one embodiment, separate groupings of node C.R.s within grouped computing resources 1614 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1612 may configure or otherwise control one or more node C.R.s 1616(1)-1616(N) and/or grouped computing resources 1614. In at least one embodiment, resource orchestrator 1612 may include a software design infrastructure ("SDI") management entity for data center 1600. In at least one embodiment, resource orchestrator 1412 may include hardware, software or some combination thereof.

In at least one embodiment, as shown in FIG. 16, framework layer 1620 includes a job scheduler 1622, a configuration manager 1624, a resource manager 1626 and a distributed file system 1628. In at least one embodiment, framework layer 1620 may include a framework to support software 1632 of software layer 1630 and/or one or more application(s) 1642 of application layer 1640. In at least one embodiment, software 1632 or application(s) 1642 may respectively include web-based service software or applications, such as those provided by Amazon Web Services, Google Cloud and Microsoft Azure. In at least one embodiment, framework layer 1620 may be, but is not limited to, a type of free and open-source software web application framework such as Apache Spark™ (hereinafter "Spark") that may utilize distributed file system 1628 for large-scale data processing (e.g., "big data"). In at least one embodiment, job scheduler 1622 may include a Spark driver to facilitate scheduling of workloads supported by various layers of data center 1600. In at least one embodiment, configuration manager 1624 may be capable of configuring different layers such as software layer 1630 and framework layer 1620 including Spark and distributed file system 1628 for supporting large-scale data processing. In at least one embodiment, resource manager 1626 may be capable of managing clustered or grouped computing resources mapped to or allocated for support of distributed file system 1628 and job scheduler 1622. In at least one embodiment, clustered or grouped computing resources may include grouped computing resources 1614 at data center infrastructure layer 1610. In at least one embodiment, resource manager 1626 may coordinate with resource orchestrator 1612 to manage these mapped or allocated computing resources.

In at least one embodiment, software 1632 included in software layer 1630 may include software used by at least portions of node C.R.s 1616(1)-1616(N), grouped computing resources 1614, and/or distributed file system 1628 of framework layer 1620. In at least one embodiment, one or more types of software may include, but are not limited to, Internet web page search software, e-mail virus scan software, database software, and streaming video content software.

In at least one embodiment, application(s) 1642 included in application layer 1640 may include one or more types of applications used by at least portions of node C.R.s 1616 (1)-1616(N), grouped computing resources 1614, and/or distributed file system 1628 of framework layer 1620. In at least one embodiment, one or more types of applications may include, but are not limited to, any number of a genomics application, a cognitive compute, application and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1624, resource manager 1626, and resource orchestrator 1612 may implement any number and type of self-modifying actions based on any amount and type of data acquired in any technically feasible fashion. In at least one embodiment, self-modifying actions may relieve a data center operator of data center 1600 from making possibly bad configuration decisions and possibly avoiding underutilized and/or poor performing portions of a data center.

In at least one embodiment, data center 1600 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1600. In at least one embodiment, trained machine learning models corresponding to one or more neural networks may be used to infer or predict information using resources described above with respect to data center 1600 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, inference and/or training logic 1415 may be used in system FIG. 16 for inferencing or predicting operations based, at least in part, on weight parameters calculated using neural network training operations, neural network functions and/or architectures, or neural network use cases described herein.

In at least one embodiment, such components can be utilized to generate one or more objects within one or more second images based, at least in part, on one or more features of the one or more objects within one or more first images.

Autonomous Vehicle

Figure 17A:
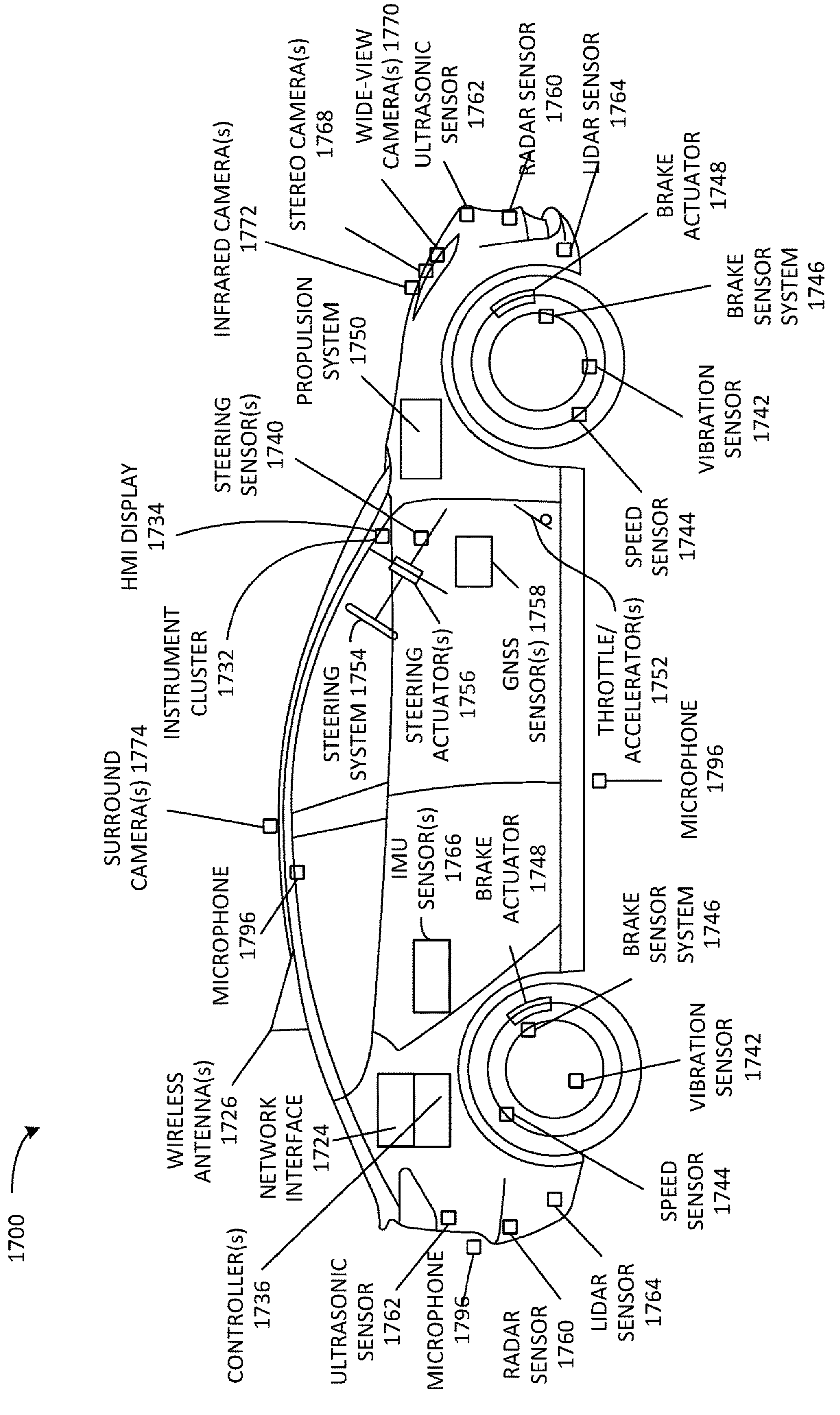
FIG. 17A illustrates an example of an autonomous vehicle, according to at least one embodiment.

FIG. 17A illustrates an example of an autonomous vehicle 1700, according to at least one embodiment. In at least one embodiment, autonomous vehicle 1700 (alternatively referred to herein as "vehicle 1700") may be, without limitation, a passenger vehicle, such as a car, a truck, a bus, and/or another type of vehicle that accommodates one or more passengers. In at least one embodiment, vehicle 1700 may be a semi-tractor-trailer truck used for hauling cargo. In at least one embodiment, vehicle 1700 may be an airplane, robotic vehicle, or other kind of vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles" (e.g., Standard No. J3016-201806, published on Jun. 15, 2018, Standard No. J3016-201609, published on Sep. 30, 2016, and previous and future versions of this standard). In at least one embodiment, vehicle 1700 may be capable of functionality in accordance with one or more of Level 1 through Level 5 of autonomous driving levels. For example, in at least one embodiment, vehicle 1700 may be capable of conditional automation (Level 3), high automation (Level 4), and/or full automation (Level 5), depending on embodiment.

In at least one embodiment, vehicle 1700 may include, without limitation, components such as a chassis, a vehicle body, wheels (e.g., 2, 4, 6, 8, 18, etc.), tires, axles, and other components of a vehicle. In at least one embodiment, vehicle 1700 may include, without limitation, a propulsion system 1750, such as an internal combustion engine, hybrid electric power plant, an all-electric engine, and/or another propulsion system type. In at least one embodiment, propulsion system 1750 may be connected to a drive train of vehicle 1700, which may include, without limitation, a transmission, to enable propulsion of vehicle 1700. In at least one embodiment, propulsion system 1750 may be controlled in response to receiving signals from a throttle/accelerator(s) 1752.

In at least one embodiment, a steering system 1754, which may include, without limitation, a steering wheel, is used to steer vehicle 1700 (e.g., along a desired path or route) when propulsion system 1750 is operating (e.g., when vehicle 1700 is in motion). In at least one embodiment, steering system 1754 may receive signals from steering actuator(s) 1756. In at least one embodiment, a steering wheel may be optional for full automation (Level 5) functionality. In at least one embodiment, a brake sensor system 1746 may be used to operate vehicle brakes in response to receiving signals from brake actuator(s) 1748 and/or brake sensors.

In at least one embodiment, controller(s) 1736, which may include, without limitation, one or more system on chips ("SoCs") (not shown in FIG. 17A) and/or graphics processing unit(s) ("GPU(s)"), provide signals (e.g., representative of commands) to one or more components and/or systems of vehicle 1700. For instance, in at least one embodiment, controller(s) 1736 may send signals to operate vehicle brakes via brake actuator(s) 1748, to operate steering system 1754 via steering actuator(s) 1756, to operate propulsion system 1750 via throttle/accelerator(s) 1752. In at least one embodiment, controller(s) 1736 may include one or more onboard (e.g., integrated) computing devices that process sensor signals, and output operation commands (e.g., signals representing commands) to enable autonomous driving and/or to assist a human driver in driving vehicle 1700. In at least one embodiment, controller(s) 1736 may include a first controller for autonomous driving functions, a second controller for functional safety functions, a third controller for artificial intelligence functionality (e.g., computer vision), a fourth controller for infotainment functionality, a fifth controller for redundancy in emergency conditions, and/or other controllers. In at least one embodiment, a single controller may handle two or more of above functionalities, two or more controllers may handle a single functionality, and/or any combination thereof.

In at least one embodiment, controller(s) 1736 provide signals for controlling one or more components and/or systems of vehicle 1700 in response to sensor data received from one or more sensors (e.g., sensor inputs). In at least one embodiment, sensor data may be received from, for example and without limitation, global navigation satellite systems ("GNSS") sensor(s) 1758 (e.g., Global Positioning System sensor(s)), RADAR sensor(s) 1760, ultrasonic sensor(s) 1762, LIDAR sensor(s) 1764, inertial measurement unit ("IMU") sensor(s) 1766 (e.g., accelerometer(s), gyroscope(s), a magnetic compass or magnetic compasses, magnetometer(s), etc.), microphone(s) 1796, stereo camera(s) 1768, wide-view camera(s) 1770 (e.g., fisheye cameras), infrared camera(s) 1772, surround camera(s) 1774 (e.g., 360 degree cameras), long-range cameras (not shown in FIG. 17A), mid-range camera(s) (not shown in FIG. 17A), speed sensor(s) 1744 (e.g., for measuring speed of vehicle 1700), vibration sensor(s) 1742, steering sensor(s) 1740, brake sensor(s) (e.g., as part of brake sensor system 1746), and/or other sensor types.

In at least one embodiment, one or more of controller(s) 1736 may receive inputs (e.g., represented by input data) from an instrument cluster 1732 of vehicle 1700 and provide outputs (e.g., represented by output data, display data, etc.) via a human-machine interface ("HMI") display 1734, an audible annunciator, a loudspeaker, and/or via other components of vehicle 1700. In at least one embodiment, outputs may include information such as vehicle velocity, speed, time, map data (e.g., a High Definition map (not shown in FIG. 17A)), location data (e.g., vehicle's 1700 location, such as on a map), direction, location of other vehicles (e.g., an occupancy grid), information about objects and status of objects as perceived by controller(s) 1736, etc. For example, in at least one embodiment, HMI display 1734 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

In at least one embodiment, vehicle 1700 further includes a network interface 1724 which may use wireless antenna(s) 1726 and/or modem(s) to communicate over one or more networks. For example, in at least one embodiment, network interface 1724 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000") networks, etc. In at least one embodiment, wireless antenna(s) 1726 may also enable communication between objects in environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc. protocols.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, inference and/or training logic 1415 may be used in system FIG. 17A for inferencing or predicting operations based, at least in part, on weight parameters calculated using neural network training operations, neural network functions and/or architectures, or neural network use cases described herein.

In at least one embodiment, such components can be utilized to generate one or more objects within one or more second images based, at least in part, on one or more features of the one or more objects within one or more first images.

Figure 17B:
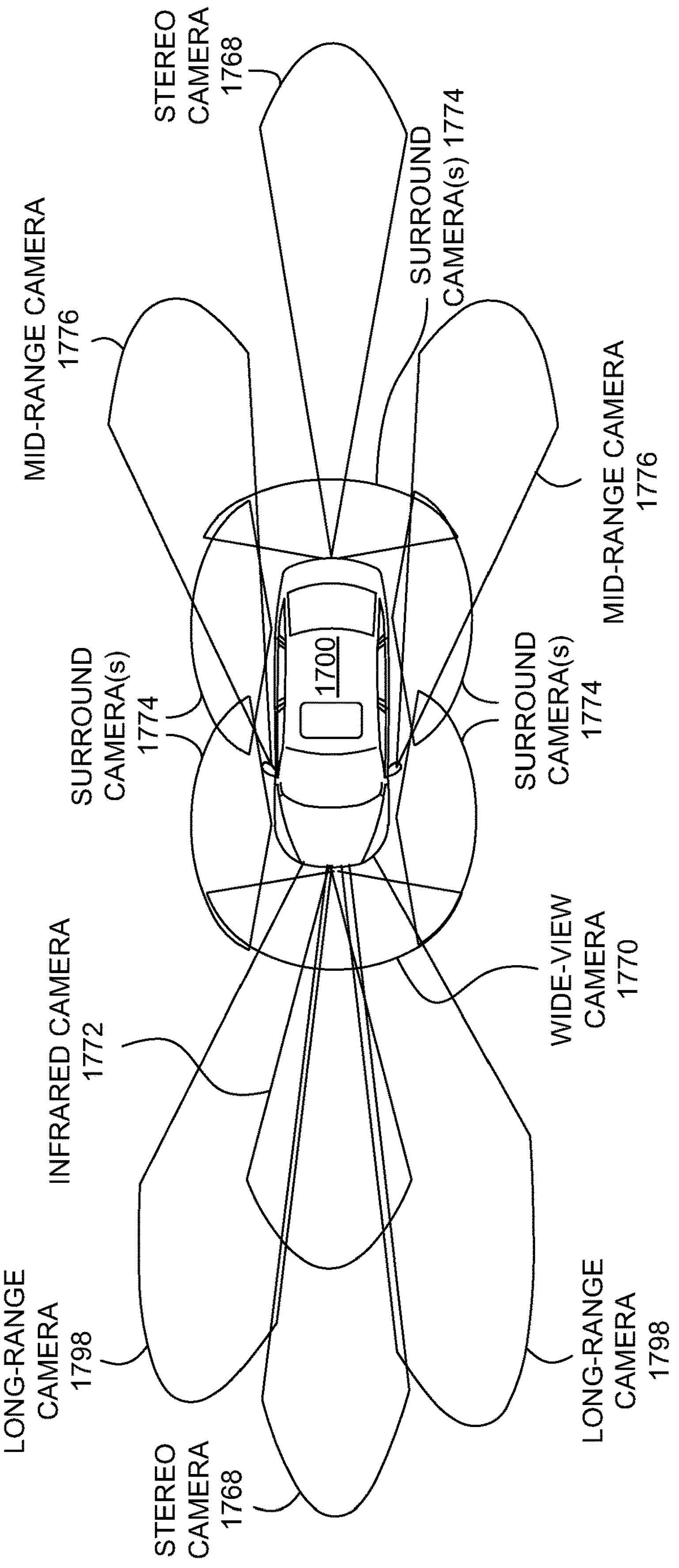
FIG. 17B illustrates an example of camera locations and fields of view for the autonomous vehicle of FIG. 17A, according to at least one embodiment.

FIG. 17B illustrates an example of camera locations and fields of view for autonomous vehicle 1700 of FIG. 17A, according to at least one embodiment. In at least one embodiment, cameras and respective fields of view are one example embodiment and are not intended to be limiting. For instance, in at least one embodiment, additional and/or alternative cameras may be included and/or cameras may be located at different locations on vehicle 1700.

In at least one embodiment, camera types for cameras may include, but are not limited to, digital cameras that may be adapted for use with components and/or systems of vehicle 1700. In at least one embodiment, camera(s) may operate at automotive safety integrity level ("ASIL") B and/or at another ASIL. In at least one embodiment, camera types may be capable of any image capture rate, such as 60 frames per second (fps), 1220 fps, 240 fps, etc., depending on embodiment. In at least one embodiment, cameras may be capable of using rolling shutters, global shutters, another type of shutter, or a combination thereof. In at least one embodiment, color filter array may include a red clear clear clear ("RCCC") color filter array, a red clear clear blue ("RCCB") color filter array, a red blue green clear ("RBGC") color filter array, a Foveon X3 color filter array, a Bayer sensors ("RGGB") color filter array, a monochrome sensor color filter array, and/or another type of color filter array. In at least one embodiment, clear pixel cameras, such as cameras with an RCCC, an RCCB, and/or an RBGC color filter array, may be used in an effort to increase light sensitivity.

In at least one embodiment, one or more of camera(s) may be used to perform advanced driver assistance systems ("ADAS") functions (e.g., as part of a redundant or fail-safe design). For example, in at least one embodiment, a Multi-Function Mono Camera may be installed to provide functions including lane departure warning, traffic sign assist and intelligent headlamp control. In at least one embodiment, one or more of camera(s) (e.g., all cameras) may record and provide image data (e.g., video) simultaneously.

In at least one embodiment, one or more camera may be mounted in a mounting assembly, such as a custom designed (three-dimensional ("3D") printed) assembly, in order to cut out stray light and reflections from within vehicle 1700 (e.g., reflections from dashboard reflected in windshield mirrors) which may interfere with camera image data capture abilities. With reference to wing-mirror mounting assemblies, in at least one embodiment, wing-mirror assemblies may be custom 3D printed so that a camera mounting plate matches a shape of a wing-mirror. In at least one embodiment, camera(s) may be integrated into wing-mirrors. In at least one embodiment, for side-view cameras, camera(s) may also be integrated within four pillars at each corner of a cabin.

In at least one embodiment, cameras with a field of view that include portions of an environment in front of vehicle 1700 (e.g., front-facing cameras) may be used for surround view, to help identify forward facing paths and obstacles, as well as aid in, with help of one or more of controller(s) 1736 and/or control SoCs, providing information critical to generating an occupancy grid and/or determining preferred vehicle paths. In at least one embodiment, front-facing cameras may be used to perform many similar ADAS functions as LIDAR, including, without limitation, emergency braking, pedestrian detection, and collision avoidance. In at least one embodiment, front-facing cameras may also be used for ADAS functions and systems including, without limitation, Lane Departure Warnings ("LDW"), Autonomous Cruise Control ("ACC"), and/or other functions such as traffic sign recognition.

In at least one embodiment, a variety of cameras may be used in a front-facing configuration, including, for example, a monocular camera platform that includes a CMOS ("complementary metal oxide semiconductor") color imager. In at least one embodiment, a wide-view camera 1770 may be used to perceive objects coming into view from a periphery (e.g., pedestrians, crossing traffic or bicycles). Although only one wide-view camera 1770 is illustrated in FIG. 17B, in other embodiments, there may be any number (including zero) wide-view cameras on vehicle 1700. In at least one embodiment, any number of long-range camera(s) 1798 (e.g., a long-view stereo camera pair) may be used for depth-based object detection, especially for objects for which a neural network has not yet been trained. In at least one embodiment, long-range camera(s) 1798 may also be used for object detection and classification, as well as basic object tracking.

In at least one embodiment, any number of stereo camera(s) 1768 may also be included in a front-facing configuration. In at least one embodiment, one or more of stereo camera(s) 1768 may include an integrated control unit comprising a scalable processing unit, which may provide a programmable logic ("FPGA") and a multi-core microprocessor with an integrated Controller Area Network ("CAN") or Ethernet interface on a single chip. In at least one embodiment, such a unit may be used to generate a 3D map of an environment of vehicle 1700, including a distance estimate for all points in an image. In at least one embodiment, one or more of stereo camera(s) 1768 may include, without limitation, compact stereo vision sensor(s) that may include, without limitation, two camera lenses (one each on left and right) and an image processing chip that may measure distance from vehicle 1700 to target object and use generated information (e.g., metadata) to activate autonomous emergency braking and lane departure warning functions. In at least one embodiment, other types of stereo camera(s) 1768 may be used in addition to, or alternatively from, those described herein.

In at least one embodiment, cameras with a field of view that include portions of environment to sides of vehicle 1700 (e.g., side-view cameras) may be used for surround view, providing information used to create and update an occupancy grid, as well as to generate side impact collision warnings. For example, in at least one embodiment, surround camera(s) 1774 (e.g., four surround cameras as illustrated in FIG. 17B) could be positioned on vehicle 1700. In at least one embodiment, surround camera(s) 1774 may include, without limitation, any number and combination of wide-view cameras, fisheye camera(s), 360 degree camera(s), and/or similar cameras. For instance, in at least one embodiment, four fisheye cameras may be positioned on a front, a rear, and sides of vehicle 1700. In at least one embodiment, vehicle 1700 may use three surround camera(s) 1774 (e.g., left, right, and rear), and may leverage one or more other camera(s) (e.g., a forward-facing camera) as a fourth surround-view camera.

In at least one embodiment, cameras with a field of view that include portions of an environment behind vehicle 1700 (e.g., rear-view cameras) may be used for parking assistance, surround view, rear collision warnings, and creating and updating an occupancy grid. In at least one embodiment, a wide variety of cameras may be used including, but not limited to, cameras that are also suitable as a front-facing camera(s) (e.g., long-range cameras 1798 and/or mid-range camera(s) 1776, stereo camera(s) 1768, infrared camera(s) 1772, etc.) as described herein.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, inference and/or training logic 1415 may be used in system FIG. 17B for inferencing or predicting operations based, at least in part, on weight parameters calculated using neural network training operations, neural network functions and/or architectures, or neural network use cases described herein.

In at least one embodiment, such components can be utilized to generate one or more objects within one or more second images based, at least in part, on one or more features of the one or more objects within one or more first images.

Figure 17C:
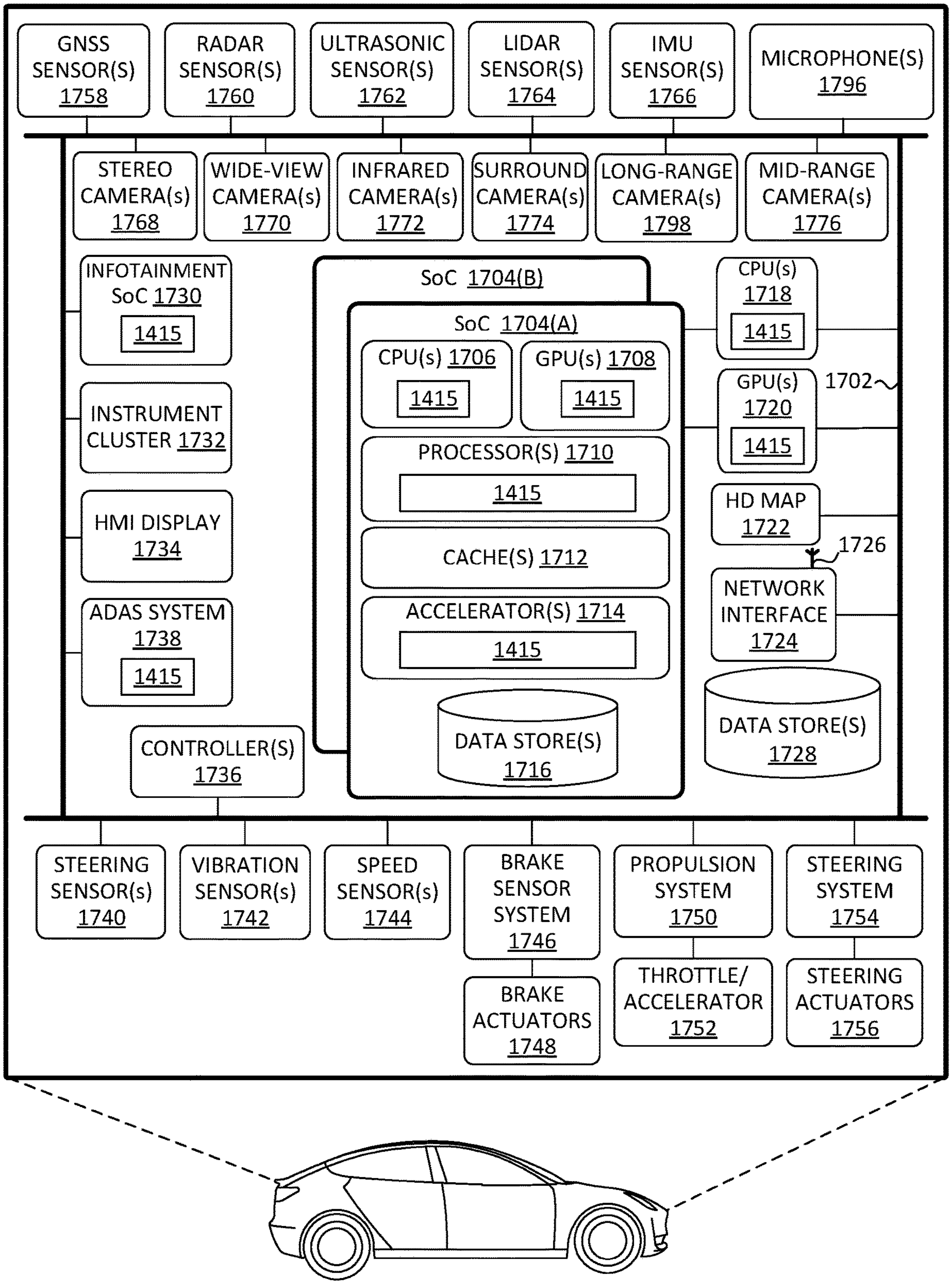
FIG. 17C is a block diagram illustrating an example system architecture for the autonomous vehicle of FIG. 17A, according to at least one embodiment.

FIG. 17C is a block diagram illustrating an example system architecture for autonomous vehicle 1700 of FIG. 17A, according to at least one embodiment. In at least one embodiment, each of components, features, and systems of vehicle 1700 in FIG. 17C is illustrated as being connected via a bus 1702. In at least one embodiment, bus 1702 may include, without limitation, a CAN data interface (alternatively referred to herein as a "CAN bus"). In at least one embodiment, a CAN may be a network inside vehicle 1700 used to aid in control of various features and functionality of vehicle 1700, such as actuation of brakes, acceleration, braking, steering, windshield wipers, etc. In at least one embodiment, bus 1702 may be configured to have dozens or even hundreds of nodes, each with its own unique identifier (e.g., a CAN ID). In at least one embodiment, bus 1702 may be read to find steering wheel angle, ground speed, engine revolutions per minute ("RPMs"), button positions, and/or other vehicle status indicators. In at least one embodiment, bus 1702 may be a CAN bus that is ASIL B compliant.

In at least one embodiment, in addition to, or alternatively from CAN, FlexRay and/or Ethernet protocols may be used. In at least one embodiment, there may be any number of busses forming bus 1702, which may include, without limitation, zero or more CAN busses, zero or more FlexRay busses, zero or more Ethernet busses, and/or zero or more other types of busses using different protocols. In at least one embodiment, two or more busses may be used to perform different functions, and/or may be used for redundancy. For example, a first bus may be used for collision avoidance functionality and a second bus may be used for actuation control. In at least one embodiment, each bus of bus 1702 may communicate with any of components of vehicle 1700, and two or more busses of bus 1702 may communicate with corresponding components. In at least one embodiment, each of any number of system(s) on chip(s) ("SoC(s)") 1704 (such as SoC 1704(A) and SoC 1704(B)), each of controller(s) 1736, and/or each computer within vehicle may have access to same input data (e.g., inputs from sensors of vehicle 1700), and may be connected to a common bus, such CAN bus.

In at least one embodiment, vehicle 1700 may include one or more controller(s) 1736, such as those described herein with respect to FIG. 17A. In at least one embodiment, controller(s) 1736 may be used for a variety of functions. In at least one embodiment, controller(s) 1736 may be coupled to any of various other components and systems of vehicle 1700, and may be used for control of vehicle 1700, artificial intelligence of vehicle 1700, infotainment for vehicle 1700, and/or other functions.

In at least one embodiment, vehicle 1700 may include any number of SoCs 1704. In at least one embodiment, each of SoCs 1704 may include, without limitation, central processing units ("CPU(s)") 1706, graphics processing units ("GPU(s)") 1708, processor(s) 1710, cache(s) 1712, accelerator(s) 1714, data store(s) 1716, and/or other components and features not illustrated. In at least one embodiment, SoC(s) 1704 may be used to control vehicle 1700 in a variety of platforms and systems. For example, in at least one embodiment, SoC(s) 1704 may be combined in a system (e.g., system of vehicle 1700) with a High Definition ("HD") map 1722 which may obtain map refreshes and/or updates via network interface 1724 from one or more servers (not shown in FIG. 17C).

In at least one embodiment, CPU(s) 1706 may include a CPU cluster or CPU complex (alternatively referred to herein as a "CCPLEX"). In at least one embodiment, CPU(s) 1706 may include multiple cores and/or level two ("L2") caches. For instance, in at least one embodiment, CPU(s) 1706 may include eight cores in a coherent multi-processor configuration. In at least one embodiment, CPU(s) 1706 may include four dual-core clusters where each cluster has a dedicated L2 cache (e.g., a 2 megabyte (MB) L2 cache). In at least one embodiment, CPU(s) 1706 (e.g., CCPLEX) may be configured to support simultaneous cluster operations enabling any combination of clusters of CPU(s) 1706 to be active at any given time.

In at least one embodiment, one or more of CPU(s) 1706 may implement power management capabilities that include, without limitation, one or more of following features: individual hardware blocks may be clock-gated automatically when idle to save dynamic power; each core clock may be gated when such core is not actively executing instructions due to execution of Wait for Interrupt ("WFI")/Wait for Event ("WFE") instructions; each core may be independently power-gated; each core cluster may be independently clock-gated when all cores are clock-gated or power-gated; and/or each core cluster may be independently power-gated when all cores are power-gated. In at least one embodiment, CPU(s) 1706 may further implement an enhanced algorithm for managing power states, where allowed power states and expected wakeup times are specified, and hardware/microcode determines which best power state to enter for core, cluster, and CCPLEX. In at least one embodiment, processing cores may support simplified power state entry sequences in software with work offloaded to microcode.

In at least one embodiment, GPU(s) 1708 may include an integrated GPU (alternatively referred to herein as an "iGPU"). In at least one embodiment, GPU(s) 1708 may be programmable and may be efficient for parallel workloads. In at least one embodiment, GPU(s) 1708 may use an enhanced tensor instruction set. In at least one embodiment, GPU(s) 1708 may include one or more streaming microprocessors, where each streaming microprocessor may include a level one ("L1") cache (e.g., an L1 cache with at least 96 KB storage capacity), and two or more streaming microprocessors may share an L2 cache (e.g., an L2 cache with a 512 KB storage capacity). In at least one embodiment, GPU(s) 1708 may include at least eight streaming microprocessors. In at least one embodiment, GPU(s) 1708 may use compute application programming interface(s) (API(s)). In at least one embodiment, GPU(s) 1708 may use one or more parallel computing platforms and/or programming models (e.g., NVIDIA's CUDA model).

In at least one embodiment, one or more of GPU(s) 1708 may be power-optimized for best performance in automotive and embedded use cases. For example, in at least one embodiment, GPU(s) 1708 could be fabricated on Fin field-effect transistor ("FinFET") circuitry. In at least one embodiment, each streaming microprocessor may incorporate a number of mixed-precision processing cores partitioned into multiple blocks. For example, and without limitation, 64 PF32 cores and 32 PF64 cores could be partitioned into four processing blocks. In at least one embodiment, each processing block could be allocated 16 FP32 cores, 8 FP64 cores, 16 INT32 cores, two mixed-precision NVIDIA Tensor cores for deep learning matrix arithmetic, a level zero ("L0")

instruction cache, a scheduler (e.g., warp scheduler) or sequencer, a dispatch unit, and/or a 64 KB register file. In at least one embodiment, streaming microprocessors may include independent parallel integer and floating-point data paths to provide for efficient execution of workloads with a mix of computation and addressing calculations. In at least one embodiment, streaming microprocessors may include independent thread scheduling capability to enable finer-grain synchronization and cooperation between parallel threads. In at least one embodiment, streaming microprocessors may include a combined L1 data cache and shared memory unit in order to improve performance while simplifying programming.

In at least one embodiment, one or more of GPU(s) 1708 may include a high bandwidth memory ("HBM") and/or a 16 GB HBM2 memory subsystem to provide, in some examples, about 900 GB/second peak memory bandwidth. In at least one embodiment, in addition to, or alternatively from, HBM memory, a synchronous graphics random-access memory ("SGRAM") may be used, such as a graphics double data rate type five synchronous random-access memory ("GDDR5").

In at least one embodiment, GPU(s) 1708 may include unified memory technology. In at least one embodiment, address translation services ("ATS") support may be used to allow GPU(s) 1708 to access CPU(s) 1706 page tables directly. In at least one embodiment, embodiment, when a GPU of GPU(s) 1708 memory management unit ("MMU") experiences a miss, an address translation request may be transmitted to CPU(s) 1706. In response, 2 CPU of CPU(s) 1706 may look in its page tables for a virtual-to-physical mapping for an address and transmit translation back to GPU(s) 1708, in at least one embodiment. In at least one embodiment, unified memory technology may allow a single unified virtual address space for memory of both CPU(s) 1706 and GPU(s) 1708, thereby simplifying GPU(s) 1708 programming and porting of applications to GPU(s) 1708.

In at least one embodiment, GPU(s) 1708 may include any number of access counters that may keep track of frequency of access of GPU(s) 1708 to memory of other processors. In at least one embodiment, access counter(s) may help ensure that memory pages are moved to physical memory of a processor that is accessing pages most frequently, thereby improving efficiency for memory ranges shared between processors.

In at least one embodiment, one or more of SoC(s) 1704 may include any number of cache(s) 1712, including those described herein. For example, in at least one embodiment, cache(s) 1712 could include a level three ("L3") cache that is available to both CPU(s) 1706 and GPU(s) 1708 (e.g., that is connected to CPU(s) 1706 and GPU(s) 1708). In at least one embodiment, cache(s) 1712 may include a write-back cache that may keep track of states of lines, such as by using a cache coherence protocol (e.g., MEI, MESI, MSI, etc.). In at least one embodiment, a L3 cache may include 4 MB of memory or more, depending on embodiment, although smaller cache sizes may be used.

In at least one embodiment, one or more of SoC(s) 1704 may include one or more accelerator(s) 1714 (e.g., hardware accelerators, software accelerators, or a combination thereof). In at least one embodiment, SoC(s) 1704 may include a hardware acceleration cluster that may include optimized hardware accelerators and/or large on-chip memory. In at least one embodiment, large on-chip memory (e.g., 4 MB of SRAM), may enable a hardware acceleration cluster to accelerate neural networks and other calculations. In at least one embodiment, a hardware acceleration cluster may be used to complement GPU(s) 1708 and to off-load some of tasks of GPU(s) 1708 (e.g., to free up more cycles of GPU(s) 1708 for performing other tasks). In at least one embodiment, accelerator(s) 1714 could be used for targeted workloads (e.g., perception, convolutional neural networks ("CNNs"), recurrent neural networks ("RNNs"), etc.) that are stable enough to be amenable to acceleration. In at least one embodiment, a CNN may include a region-based or regional convolutional neural networks ("RCNNs") and Fast RCNNs (e.g., as used for object detection) or other type of CNN.

In at least one embodiment, accelerator(s) 1714 (e.g., hardware acceleration cluster) may include one or more deep learning accelerator ("DLA"). In at least one embodiment, DLA(s) may include, without limitation, one or more Tensor processing units ("TPUs") that may be configured to provide an additional ten trillion operations per second for deep learning applications and inferencing. In at least one embodiment, TPUs may be accelerators configured to, and optimized for, performing image processing functions (e.g., for CNNs, RCNNs, etc.). In at least one embodiment, DLA(s) may further be optimized for a specific set of neural network types and floating point operations, as well as inferencing. In at least one embodiment, design of DLA(s) may provide more performance per millimeter than a typical general-purpose GPU, and typically vastly exceeds performance of a CPU. In at least one embodiment, TPU(s) may perform several functions, including a single-instance convolution function, supporting, for example, INT8, INT16, and FP16 data types for both features and weights, as well as post-processor functions. In at least one embodiment, DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

In at least one embodiment, DLA(s) may perform any function of GPU(s) 1708, and by using an inference accelerator, for example, a designer may target either DLA(s) or GPU(s) 1708 for any function. For example, in at least one embodiment, a designer may focus processing of CNNs and floating point operations on DLA(s) and leave other functions to GPU(s) 1708 and/or accelerator(s) 1714.

In at least one embodiment, accelerator(s) 1714 may include programmable vision accelerator ("PVA"), which may alternatively be referred to herein as a computer vision accelerator. In at least one embodiment, PVA may be designed and configured to accelerate computer vision algorithms for advanced driver assistance system ("ADAS") 1738, autonomous driving, augmented reality ("AR") applications, and/or virtual reality ("VR") applications. In at least one embodiment, PVA may provide a balance between performance and flexibility. For example, in at least one embodiment, each PVA may include, for example and without limitation, any number of reduced instruction set computer ("RISC") cores, direct memory access ("DMA"), and/or any number of vector processors.

In at least one embodiment, RISC cores may interact with image sensors (e.g., image sensors of any cameras described herein), image signal processor(s), etc. In at least one embodiment, each RISC core may include any amount of memory. In at least one embodiment, RISC cores may use any of a number of protocols, depending on embodiment. In at least one embodiment, RISC cores may execute a real-time operating system ("RTOS"). In at least one embodiment, RISC cores may be implemented using one or more integrated circuit devices, application specific integrated circuits ("ASICs"), and/or memory devices. For example, in at least one embodiment, RISC cores could include an instruction cache and/or a tightly coupled RAM.

In at least one embodiment, DMA may enable components of PVA to access system memory independently of CPU(s) 1706. In at least one embodiment, DMA may support any number of features used to provide optimization to a PVA including, but not limited to, supporting multi-dimensional addressing and/or circular addressing. In at least one embodiment, DMA may support up to six or more dimensions of addressing, which may include, without limitation, block width, block height, block depth, horizontal block stepping, vertical block stepping, and/or depth stepping.

In at least one embodiment, vector processors may be programmable processors that may be designed to efficiently and flexibly execute programming for computer vision algorithms and provide signal processing capabilities. In at least one embodiment, a PVA may include a PVA core and two vector processing subsystem partitions. In at least one embodiment, a PVA core may include a processor subsystem, DMA engine(s) (e.g., two DMA engines), and/or other peripherals. In at least one embodiment, a vector processing subsystem may operate as a primary processing engine of a PVA, and may include a vector processing unit ("VPU"), an instruction cache, and/or vector memory (e.g., "VMEM"). In at least one embodiment, VPU core may include a digital signal processor such as, for example, a single instruction, multiple data ("SID"), very long instruction word ("VLIW") digital signal processor. In at least one embodiment, a combination of SIMD and VLIW may enhance throughput and speed.

In at least one embodiment, each of vector processors may include an instruction cache and may be coupled to dedicated memory. As a result, in at least one embodiment, each of vector processors may be configured to execute independently of other vector processors. In at least one embodiment, vector processors that are included in a particular PVA may be configured to employ data parallelism. For instance, in at least one embodiment, plurality of vector processors included in a single PVA may execute a common computer vision algorithm, but on different regions of an image. In at least one embodiment, vector processors included in a particular PVA may simultaneously execute different computer vision algorithms, on one image, or even execute different algorithms on sequential images or portions of an image. In at least one embodiment, among other things, any number of PVAs may be included in hardware acceleration cluster and any number of vector processors may be included in each PVA. In at least one embodiment, PVA may include additional error correcting code ("ECC") memory, to enhance overall system safety.

In at least one embodiment, accelerator(s) 1714 may include a computer vision network on-chip and static random-access memory ("SRAM"), for providing a high-bandwidth, low latency SRAM for accelerator(s) 1714. In at least one embodiment, on-chip memory may include at least 4 MB SRAM, comprising, for example and without limitation, eight field-configurable memory blocks, that may be accessible by both a PVA and a DLA. In at least one embodiment, each pair of memory blocks may include an advanced peripheral bus ("APB") interface, configuration circuitry, a controller, and a multiplexer. In at least one embodiment, any type of memory may be used. In at least one embodiment, a PVA and a DLA may access memory via a backbone that provides a PVA and a DLA with high-speed access to memory. In at least one embodiment, a backbone may include a computer vision network on-chip that interconnects a PVA and a DLA to memory (e.g., using APB).

In at least one embodiment, a computer vision network on-chip may include an interface that determines, before transmission of any control signal/address/data, that both a PVA and a DLA provide ready and valid signals. In at least one embodiment, an interface may provide for separate phases and separate channels for transmitting control signals/addresses/data, as well as burst-type communications for continuous data transfer. In at least one embodiment, an interface may comply with International Organization for Standardization ("ISO") 26262 or International Electrotechnical Commission ("IEC") 61508 standards, although other standards and protocols may be used.

In at least one embodiment, one or more of SoC(s) 1704 may include a real-time ray-tracing hardware accelerator. In at least one embodiment, real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

In at least one embodiment, accelerator(s) 1714 can have a wide array of uses for autonomous driving. In at least one embodiment, a PVA may be used for key processing stages in ADAS and autonomous vehicles. In at least one embodiment, a PVA's capabilities are a good match for algorithmic domains needing predictable processing, at low power and low latency. In other words, a PVA performs well on semi-dense or dense regular computation, even on small data sets, which might require predictable run-times with low latency and low power. In at least one embodiment, such as in vehicle 1700, PVAs might be designed to run classic computer vision algorithms, as they can be efficient at object detection and operating on integer math.

For example, according to at least one embodiment of technology, a PVA is used to perform computer stereo vision. In at least one embodiment, a semi-global matching-based algorithm may be used in some examples, although this is not intended to be limiting. In at least one embodiment, applications for Level 3-5 autonomous driving use motion estimation/stereo matching on-the-fly (e.g., structure from motion, pedestrian recognition, lane detection, etc.). In at least one embodiment, a PVA may perform computer stereo vision functions on inputs from two monocular cameras.

In at least one embodiment, a PVA may be used to perform dense optical flow. For example, in at least one embodiment, a PVA could process raw RADAR data (e.g., using a 4D Fast Fourier Transform) to provide processed RADAR data. In at least one embodiment, a PVA is used for time of flight depth processing, by processing raw time of flight data to provide processed time of flight data, for example.

In at least one embodiment, a DLA may be used to run any type of network to enhance control and driving safety, including for example and without limitation, a neural network that outputs a measure of confidence for each object detection. In at least one embodiment, confidence may be represented or interpreted as a probability, or as providing a relative "weight" of each detection compared to other detections. In at least one embodiment, a confidence measure enables a system to make further decisions regarding which detections should be considered as true positive detections rather than false positive detections. In at least one embodiment, a system may set a threshold value for confidence and consider only detections exceeding threshold value as true positive detections. In an embodiment in which an automatic emergency braking ("AEB") system is used, false positive detections would cause vehicle to automatically perform emergency braking, which is obviously undesirable. In at least one embodiment, highly confident detections may be considered as triggers for AEB. In at least one embodiment, a DLA may run a neural network for regressing confidence value. In at least one embodiment, neural network may take as its input at least some subset of parameters, such as bounding box dimensions, ground plane estimate obtained (e.g., from another subsystem), output from IU sensor(s) 1766 that correlates with vehicle 1700 orientation, distance, 3D location estimates of object obtained from neural network and/or other sensors (e.g., LIDAR sensor(s) 1764 or RADAR sensor(s) 1760), among others.

In at least one embodiment, one or more of SoC(s) 1704 may include data store(s) 1716 (e.g., memory). In at least one embodiment, data store(s) 1716 may be on-chip memory of SoC(s) 1704, which may store neural networks to be executed on GPU(s) 1708 and/or a DLA. In at least one embodiment, data store(s) 1716 may be large enough in capacity to store multiple instances of neural networks for redundancy and safety. In at least one embodiment, data store(s) 1716 may comprise L2 or L3 cache(s).

In at least one embodiment, one or more of SoC(s) 1704 may include any number of processor(s) 1710 (e.g., embedded processors). In at least one embodiment, processor(s) 1710 may include a boot and power management processor that may be a dedicated processor and subsystem to handle boot power and management functions and related security enforcement. In at least one embodiment, a boot and power management processor may be a part of a boot sequence of SoC(s) 1704 and may provide runtime power management services. In at least one embodiment, a boot power and management processor may provide clock and voltage programming, assistance in system low power state transitions, management of SoC(s) 1704 thermals and temperature sensors, and/or management of SoC(s) 1704 power states. In at least one embodiment, each temperature sensor may be implemented as a ring-oscillator whose output frequency is proportional to temperature, and SoC(s) 1704 may use ring-oscillators to detect temperatures of CPU(s) 1706, GPU(s) 1708, and/or accelerator(s) 1714. In at least one embodiment, if temperatures are determined to exceed a threshold, then a boot and power management processor may enter a temperature fault routine and put SoC(s) 1704 into a lower power state and/or put vehicle 1700 into a chauffeur to safe stop mode (e.g., bring vehicle 1700 to a safe stop).

In at least one embodiment, processor(s) 1710 may further include a set of embedded processors that may serve as an audio processing engine which may be an audio subsystem that enables full hardware support for multi-channel audio over multiple interfaces, and a broad and flexible range of audio I/O interfaces. In at least one embodiment, an audio processing engine is a dedicated processor core with a digital signal processor with dedicated RAM.

In at least one embodiment, processor(s) 1710 may further include an always-on processor engine that may provide necessary hardware features to support low power sensor management and wake use cases. In at least one embodiment, an always-on processor engine may include, without limitation, a processor core, a tightly coupled RAM, supporting peripherals (e.g., timers and interrupt controllers), various I/O controller peripherals, and routing logic.

In at least one embodiment, processor(s) 1710 may further include a safety cluster engine that includes, without limitation, a dedicated processor subsystem to handle safety management for automotive applications. In at least one embodiment, a safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 1710 may further include a real-time camera engine that may include, without limitation, a dedicated processor subsystem for handling real-time camera management. In at least one embodiment, processor(s) 1710 may further include a high-dynamic range signal processor that may include, without limitation, an image signal processor that is a hardware engine that is part of a camera processing pipeline.

In at least one embodiment, processor(s) 1710 may include a video image compositor that may be a processing block (e.g., implemented on a microprocessor) that implements video post-processing functions needed by a video playback application to produce a final image for a player window. In at least one embodiment, a video image compositor may perform lens distortion correction on wide-view camera(s) 1770, surround camera(s) 1774, and/or on in-cabin monitoring camera sensor(s). In at least one embodiment, in-cabin monitoring camera sensor(s) are preferably monitored by a neural network running on another instance of SoC 1704, configured to identify in cabin events and respond accordingly. In at least one embodiment, an in-cabin system may perform, without limitation, lip reading to activate cellular service and place a phone call, dictate emails, change a vehicle's destination, activate or change a vehicle's infotainment system and settings, or provide voice-activated web surfing. In at least one embodiment, certain functions are available to a driver when a vehicle is operating in an autonomous mode and are disabled otherwise.

In at least one embodiment, a video image compositor may include enhanced temporal noise reduction for both spatial and temporal noise reduction. For example, in at least one embodiment, where motion occurs in a video, noise reduction weights spatial information appropriately, decreasing weights of information provided by adjacent frames. In at least one embodiment, where an image or portion of an image does not include motion, temporal noise reduction performed by video image compositor may use information from a previous image to reduce noise in a current image.

In at least one embodiment, a video image compositor may also be configured to perform stereo rectification on input stereo lens frames. In at least one embodiment, a video image compositor may further be used for user interface composition when an operating system desktop is in use, and GPU(s) 1708 are not required to continuously render new surfaces. In at least one embodiment, when GPU(s) 1708 are powered on and active doing 3D rendering, a video image compositor may be used to offload GPU(s) 1708 to improve performance and responsiveness.

In at least one embodiment, one or more SoC of SoC(s) 1704 may further include a mobile industry processor interface ("MIPI") camera serial interface for receiving video and input from cameras, a high-speed interface, and/or a video input block that may be used for a camera and related pixel input functions. In at least one embodiment, one or more of SoC(s) 1704 may further include an input/output controller(s) that may be controlled by software and may be used for receiving I/O signals that are uncommitted to a specific role.

In at least one embodiment, one or more Soc of SoC(s) 1704 may further include a broad range of peripheral interfaces to enable communication with peripherals, audio encoders/decoders ("codecs"), power management, and/or other devices. In at least one embodiment, SoC(s) 1704 may be used to process data from cameras (e.g., connected over Gigabit Multimedia Serial Link and Ethernet channels), sensors (e.g., LIDAR sensor(s) 1764, RADAR sensor(s) 1760, etc. that may be connected over Ethernet channels), data from bus 1702 (e.g., speed of vehicle 1700, steering wheel position, etc.), data from GNSS sensor(s) 1758 (e.g., connected over a Ethernet bus or a CAN bus), etc. In at least one embodiment, one or more SoC of SoC(s) 1704 may further include dedicated high-performance mass storage controllers that may include their own DMA engines, and that may be used to free CPU(s) 1706 from routine data management tasks.

In at least one embodiment, SoC(s) 1704 may be an end-to-end platform with a flexible architecture that spans automation Levels 3-5, thereby providing a comprehensive functional safety architecture that leverages and makes efficient use of computer vision and ADAS techniques for diversity and redundancy, and provides a platform for a flexible, reliable driving software stack, along with deep learning tools. In at least one embodiment, SoC(s) 1704 may be faster, more reliable, and even more energy-efficient and space-efficient than conventional systems. For example, in at least one embodiment, accelerator(s) 1714, when combined with CPU(s) 1706, GPU(s) 1708, and data store(s) 1716, may provide for a fast, efficient platform for Level 3-5 autonomous vehicles.

In at least one embodiment, computer vision algorithms may be executed on CPUs, which may be configured using a high-level programming language, such as C, to execute a wide variety of processing algorithms across a wide variety of visual data. However, in at least one embodiment, CPUs are oftentimes unable to meet performance requirements of many computer vision applications, such as those related to execution time and power consumption, for example. In at least one embodiment, many CPUs are unable to execute complex object detection algorithms in real-time, which is used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, in at least one embodiment, a CNN executing on a DLA or a discrete GPU (e.g., GPU(s) 1720) may include text and word recognition, allowing reading and understanding of traffic signs, including signs for which a neural network has not been specifically trained. In at least one embodiment, a DLA may further include a neural network that is able to identify, interpret, and provide semantic understanding of a sign, and to pass that semantic understanding to path planning modules running on a CPU Complex.

In at least one embodiment, multiple neural networks may be run simultaneously, as for Level 3, 4, or 5 driving. For example, in at least one embodiment, a warning sign stating "Caution: flashing lights indicate icy conditions," along with an electric light, may be independently or collectively interpreted by several neural networks. In at least one embodiment, such warning sign itself may be identified as a traffic sign by a first deployed neural network (e.g., a neural network that has been trained), text "flashing lights indicate icy conditions" may be interpreted by a second deployed neural network, which informs a vehicle's path planning software (preferably executing on a CPU Complex) that when flashing lights are detected, icy conditions exist. In at least one embodiment, a flashing light may be identified by operating a third deployed neural network over multiple frames, informing a vehicle's path-planning software of a presence (or an absence) of flashing lights. In at least one embodiment, all three neural networks may run simultaneously, such as within a DLA and/or on GPU(s) 1708.

In at least one embodiment, a CNN for facial recognition and vehicle owner identification may use data from camera sensors to identify presence of an authorized driver and/or owner of vehicle 1700. In at least one embodiment, an always-on sensor processing engine may be used to unlock a vehicle when an owner approaches a driver door and turns on lights, and, in a security mode, to disable such vehicle when an owner leaves such vehicle. In this way, SoC(s) 1704 provide for security against theft and/or carjacking.

In at least one embodiment, a CNN for emergency vehicle detection and identification may use data from microphones 1796 to detect and identify emergency vehicle sirens. In at least one embodiment, SoC(s) 1704 use a CNN for classifying environmental and urban sounds, as well as classifying visual data. In at least one embodiment, a CNN running on a DLA is trained to identify a relative closing speed of an emergency vehicle (e.g., by using a Doppler effect). In at least one embodiment, a CNN may also be trained to identify emergency vehicles specific to a local area in which a vehicle is operating, as identified by GNSS sensor(s) 1758. In at least one embodiment, when operating in Europe, a CNN will seek to detect European sirens, and when in North America, a CNN will seek to identify only North American sirens. In at least one embodiment, once an emergency vehicle is detected, a control program may be used to execute an emergency vehicle safety routine, slowing a vehicle, pulling over to a side of a road, parking a vehicle, and/or idling a vehicle, with assistance of ultrasonic sensor(s) 1762, until emergency vehicles pass.

In at least one embodiment, vehicle 1700 may include CPU(s) 1718 (e.g., discrete CPU(s), or dCPU(s)), that may be coupled to SoC(s) 1704 via a high-speed interconnect (e.g., PCIe). In at least one embodiment, CPU(s) 1718 may include an X86 processor, for example. CPU(s) 1718 may be used to perform any of a variety of functions, including arbitrating potentially inconsistent results between ADAS sensors and SoC(s) 1704, and/or monitoring status and health of controller(s) 1736 and/or an infotainment system on a chip ("infotainment SoC") 1730, for example. In at least one embodiment, SoC(s) 1704 includes one or more interconnects, and an interconnect can include a peripheral component interconnect express (PCIe).

In at least one embodiment, vehicle 1700 may include GPU(s) 1720 (e.g., discrete GPU(s), or dGPU(s)), that may be coupled to SoC(s) 1704 via a high-speed interconnect (e.g., NVIDIA's NVLINK channel). In at least one embodiment, GPU(s) 1720 may provide additional artificial intelligence functionality, such as by executing redundant and/or different neural networks, and may be used to train and/or update neural networks based at least in part on input (e.g., sensor data) from sensors of a vehicle 1700.

In at least one embodiment, vehicle 1700 may further include network interface 1724 which may include, without limitation, wireless antenna(s) 1726 (e.g., one or more wireless antennas for different communication protocols, such as a cellular antenna, a Bluetooth antenna, etc.). In at least one embodiment, network interface 1724 may be used to enable wireless connectivity to Internet cloud services (e.g., with server(s) and/or other network devices), with other vehicles, and/or with computing devices (e.g., client devices of passengers). In at least one embodiment, to communicate with other vehicles, a direct link may be established between vehicle 170 and another vehicle and/or an indirect link may be established (e.g., across networks and over the Internet). In at least one embodiment, direct links may be provided using a vehicle-to-vehicle communication link. In at least one embodiment, a vehicle-to-vehicle communication link may provide vehicle 1700 information about vehicles in proximity to vehicle 1700 (e.g., vehicles in front of, on a side of, and/or behind vehicle 1700). In at least one embodiment, such aforementioned functionality may be part of a cooperative adaptive cruise control functionality of vehicle 1700.

In at least one embodiment, network interface 1724 may include an SoC that provides modulation and demodulation functionality and enables controller(s) 1736 to communicate over wireless networks. In at least one embodiment, network interface 1724 may include a radio frequency front-end for up-conversion from baseband to radio frequency, and down conversion from radio frequency to baseband. In at least one embodiment, frequency conversions may be performed in any technically feasible fashion. For example, frequency conversions could be performed through well-known processes, and/or using super-heterodyne processes. In at least one embodiment, radio frequency front end functionality may be provided by a separate chip. In at least one embodiment, network interfaces may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

In at least one embodiment, vehicle 1700 may further include data store(s) 1728 which may include, without limitation, off-chip (e.g., off SoC(s) 1704) storage. In at least one embodiment, data store(s) 1728 may include, without limitation, one or more storage elements including RAM, SRAM, dynamic random-access memory ("DRAM"), video random-access memory ("VRAM"), flash memory, hard disks, and/or other components and/or devices that may store at least one bit of data.

In at least one embodiment, vehicle 1700 may further include GNSS sensor(s) 1758 (e.g., GPS and/or assisted GPS sensors), to assist in mapping, perception, occupancy grid generation, and/or path planning functions. In at least one embodiment, any number of GNSS sensor(s) 1758 may be used, including, for example and without limitation, a GPS using a USB connector with an Ethernet-to-Serial (e.g., RS-232) bridge.

In at least one embodiment, vehicle 1700 may further include RADAR sensor(s) 1760. In at least one embodiment, RADAR sensor(s) 1760 may be used by vehicle 1700 for long-range vehicle detection, even in darkness and/or severe weather conditions. In at least one embodiment, RADAR functional safety levels may be ASIL B. In at least one embodiment, RADAR sensor(s) 1760 may use a CAN bus and/or bus 1702 (e.g., to transmit data generated by RADAR sensor(s) 1760) for control and to access object tracking data, with access to Ethernet channels to access raw data in some examples. In at least one embodiment, a wide variety of RADAR sensor types may be used. For example, and without limitation, RADAR sensor(s) 1760 may be suitable for front, rear, and side RADAR use. In at least one embodiment, one or more sensor of RADAR sensors(s) 1760 is a Pulse Doppler RADAR sensor.

In at least one embodiment, RADAR sensor(s) 1760 may include different configurations, such as long-range with narrow field of view, short-range with wide field of view, short-range side coverage, etc. In at least one embodiment, long-range RADAR may be used for adaptive cruise control functionality. In at least one embodiment, long-range RADAR systems may provide a broad field of view realized by two or more independent scans, such as within a 250 m (meter) range. In at least one embodiment, RADAR sensor(s) 1760 may help in distinguishing between static and moving objects, and may be used by ADAS system 1738 for emergency brake assist and forward collision warning. In at least one embodiment, sensors 1760(*s*) included in a long-range RADAR system may include, without limitation, monostatic multimodal RADAR with multiple (e.g., six or more) fixed RADAR antennae and a high-speed CAN and FlexRay interface. In at least one embodiment, with six antennae, a central four antennae may create a focused beam pattern, designed to record vehicle's 1700 surroundings at higher speeds with minimal interference from traffic in adjacent lanes. In at least one embodiment, another two antennae may expand field of view, making it possible to quickly detect vehicles entering or leaving a lane of vehicle 1700.

In at least one embodiment, mid-range RADAR systems may include, as an example, a range of up to 160 m (front) or 80 m (rear), and a field of view of up to 42 degrees (front) or 150 degrees (rear). In at least one embodiment, short-range RADAR systems may include, without limitation, any number of RADAR sensor(s) 1760 designed to be installed at both ends of a rear bumper. When installed at both ends of a rear bumper, in at least one embodiment, a RADAR sensor system may create two beams that constantly monitor blind spots in a rear direction and next to a vehicle. In at least one embodiment, short-range RADAR systems may be used in ADAS system 1738 for blind spot detection and/or lane change assist.

In at least one embodiment, vehicle 1700 may further include ultrasonic sensor(s) 1762. In at least one embodiment, ultrasonic sensor(s) 1762, which may be positioned at a front, a back, and/or side location of vehicle 1700, may be used for parking assist and/or to create and update an occupancy grid. In at least one embodiment, a wide variety of ultrasonic sensor(s) 1762 may be used, and different ultrasonic sensor(s) 1762 may be used for different ranges of detection (e.g., 2.5 m, 4 m). In at least one embodiment, ultrasonic sensor(s) 1762 may operate at functional safety levels of ASIL B.

In at least one embodiment, vehicle 1700 may include LIDAR sensor(s) 1764. In at least one embodiment, LIDAR sensor(s) 1764 may be used for object and pedestrian detection, emergency braking, collision avoidance, and/or other functions. In at least one embodiment, LIDAR sensor(s) 1764 may operate at functional safety level ASIL B. In at least one embodiment, vehicle 1700 may include multiple LIDAR sensors 1764 (e.g., two, four, six, etc.) that may use an Ethernet channel (e.g., to provide data to a Gigabit Ethernet switch).

In at least one embodiment, LIDAR sensor(s) 1764 may be capable of providing a list of objects and their distances for a 360-degree field of view. In at least one embodiment, commercially available LIDAR sensor(s) 1764 may have an advertised range of approximately 100 m, with an accuracy of 2 cm to 3 cm, and with support for a 100 Mbps Ethernet connection, for example. In at least one embodiment, one or more non-protruding LIDAR sensors may be used. In such an embodiment, LIDAR sensor(s) 1764 may include a small device that may be embedded into a front, a rear, a side, and/or a corner location of vehicle 1700. In at least one embodiment, LIDAR sensor(s) 1764, in such an embodiment, may provide up to a 120-degree horizontal and 35-degree vertical field-of-view, with a 200 m range even for low-reflectivity objects. In at least one embodiment, front-mounted LIDAR sensor(s) 1764 may be configured for a horizontal field of view between 45 degrees and 135 degrees.

In at least one embodiment, LIDAR technologies, such as 3D flash LIDAR, may also be used. In at least one embodiment, 3D flash LIDAR uses a flash of a laser as a transmission source, to illuminate surroundings of vehicle 1700 up to approximately 200 m. In at least one embodiment, a flash LIDAR unit includes, without limitation, a receptor, which records laser pulse transit time and reflected light on each pixel, which in turn corresponds to a range from vehicle 1700 to objects. In at least one embodiment, flash LIDAR may allow for highly accurate and distortion-free images of surroundings to be generated with every laser flash. In at least one embodiment, four flash LIDAR sensors may be deployed, one at each side of vehicle 1700. In at least one embodiment, 3D flash LIDAR systems include, without limitation, a solid-state 3D staring array LIDAR camera with no moving parts other than a fan (e.g., a non-scanning LIDAR device). In at least one embodiment, flash LIDAR device may use a 5 nanosecond class I (eye-safe) laser pulse per frame and may capture reflected laser light as a 3D range point cloud and co-registered intensity data.

In at least one embodiment, vehicle 1700 may further include IMU sensor(s) 1766. In at least one embodiment, IU sensor(s) 1766 may be located at a center of a rear axle of vehicle 1700. In at least one embodiment, IU sensor(s) 1766 may include, for example and without limitation, accelerometer(s), magnetometer(s), gyroscope(s), a magnetic compass, magnetic compasses, and/or other sensor types. In at least one embodiment, such as in six-axis applications, IMU sensor(s) 1766 may include, without limitation, accelerometers and gyroscopes. In at least one embodiment, such as in nine-axis applications, IU sensor(s) 1766 may include, without limitation, accelerometers, gyroscopes, and magnetometers.

In at least one embodiment, IU sensor(s) 1766 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. In at least one embodiment, IMU sensor(s) 1766 may enable vehicle 1700 to estimate its heading without requiring input from a magnetic sensor by directly observing and correlating changes in velocity from a GPS to IMU sensor(s) 1766. In at least one embodiment, IMU sensor(s) 1766 and GNSS sensor(s) 1758 may be combined in a single integrated unit.

In at least one embodiment, vehicle 1700 may include microphone(s) 1796 placed in and/or around vehicle 1700. In at least one embodiment, microphone(s) 1796 may be used for emergency vehicle detection and identification, among other things.

In at least one embodiment, vehicle 1700 may further include any number of camera types, including stereo camera(s) 1768, wide-view camera(s) 1770, infrared camera(s) 1772, surround camera(s) 1774, long-range camera(s) 1798, mid-range camera(s) 1776, and/or other camera types. In at least one embodiment, cameras may be used to capture image data around an entire periphery of vehicle 1700. In at least one embodiment, which types of cameras used depends on vehicle 1700. In at least one embodiment, any combination of camera types may be used to provide necessary coverage around vehicle 1700. In at least one embodiment, a number of cameras deployed may differ depending on embodiment. For example, in at least one embodiment, vehicle 1700 could include six cameras, seven cameras, ten cameras, twelve cameras, or another number of cameras. In at least one embodiment, cameras may support, as an example and without limitation, Gigabit Multimedia Serial Link ("GMSL") and/or Gigabit Ethernet communications. In at least one embodiment, each camera might be as described with more detail previously herein with respect to FIG. 17A and FIG. 17B.

In at least one embodiment, vehicle 1700 may further include vibration sensor(s) 1742. In at least one embodiment, vibration sensor(s) 1742 may measure vibrations of components of vehicle 1700, such as axle(s). For example, in at least one embodiment, changes in vibrations may indicate a change in road surfaces. In at least one embodiment, when two or more vibration sensors 1742 are used, differences between vibrations may be used to determine friction or slippage of road surface (e.g., when a difference in vibration is between a power-driven axle and a freely rotating axle).

In at least one embodiment, vehicle 1700 may include ADAS system 1738. In at least one embodiment, ADAS system 1738 may include, without limitation, an SoC, in some examples. In at least one embodiment, ADAS system 1738 may include, without limitation, any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW)" system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

In at least one embodiment, ACC system may use RADAR sensor(s) 1760, LIDAR sensor(s) 1764, and/or any number of camera(s). In at least one embodiment, ACC system may include a longitudinal ACC system and/or a lateral ACC system. In at least one embodiment, a longitudinal ACC system monitors and controls distance to another vehicle immediately ahead of vehicle 1700 and automatically adjusts speed of vehicle 1700 to maintain a safe distance from vehicles ahead. In at least one embodiment, a lateral ACC system performs distance keeping, and advises vehicle 1700 to change lanes when necessary. In at least one embodiment, a lateral ACC is related to other ADAS applications, such as LC and CW.

In at least one embodiment, a CACC system uses information from other vehicles that may be received via network interface 1724 and/or wireless antenna(s) 1726 from other vehicles via a wireless link, or indirectly, over a network connection (e.g., over the Internet). In at least one embodiment, direct links may be provided by a vehicle-to-vehicle ("V2V") communication link, while indirect links may be provided by an infrastructure-to-vehicle ("I2V") communication link. In general, V2V communication provides information about immediately preceding vehicles (e.g., vehicles immediately ahead of and in same lane as vehicle 1700), while I2V communication provides information about traffic further ahead. In at least one embodiment, a CACC system may include either or both I2V and V2V information sources. In at least one embodiment, given information of vehicles ahead of vehicle 1700, a CACC system may be more reliable and it has potential to improve traffic flow smoothness and reduce congestion on road.

In at least one embodiment, an FCW system is designed to alert a driver to a hazard, so that such driver may take corrective action. In at least one embodiment, an FCW system uses a front-facing camera and/or RADAR sensor(s) 1760, coupled to a dedicated processor, DSP, FPGA, and/or ASIC, that is electrically coupled to provide driver feedback, such as a display, speaker, and/or vibrating component. In at least one embodiment, an FCW system may provide a warning, such as in form of a sound, visual warning, vibration and/or a quick brake pulse.

In at least one embodiment, an AEB system detects an impending forward collision with another vehicle or other object, and may automatically apply brakes if a driver does not take corrective action within a specified time or distance parameter. In at least one embodiment, AEB system may use front-facing camera(s) and/or RADAR sensor(s) 1760, coupled to a dedicated processor, DSP, FPGA, and/or ASIC. In at least one embodiment, when an AEB system detects a hazard, it will typically first alert a driver to take corrective action to avoid collision and, if that driver does not take corrective action, that AEB system may automatically apply brakes in an effort to prevent, or at least mitigate, an impact of a predicted collision. In at least one embodiment, an AEB system may include techniques such as dynamic brake support and/or crash imminent braking.

In at least one embodiment, an LDW system provides visual, audible, and/or tactile warnings, such as steering wheel or seat vibrations, to alert driver when vehicle 1700 crosses lane markings. In at least one embodiment, an LDW system does not activate when a driver indicates an intentional lane departure, such as by activating a turn signal. In at least one embodiment, an LDW system may use front-side facing cameras, coupled to a dedicated processor, DSP, FPGA, and/or ASIC, that is electrically coupled to provide driver feedback, such as a display, speaker, and/or vibrating component. In at least one embodiment, an LKA system is a variation of an LDW system. In at least one embodiment, an LKA system provides steering input or braking to correct vehicle 1700 if vehicle 1700 starts to exit its lane.

In at least one embodiment, a BSW system detects and warns a driver of vehicles in an automobile's blind spot. In at least one embodiment, a BSW system may provide a visual, audible, and/or tactile alert to indicate that merging or changing lanes is unsafe. In at least one embodiment, a BSW system may provide an additional warning when a driver uses a turn signal. In at least one embodiment, a BSW system may use rear-side facing camera(s) and/or RADAR sensor(s) 1760, coupled to a dedicated processor, DSP, FPGA, and/or ASIC, that is electrically coupled to driver feedback, such as a display, speaker, and/or vibrating component.

In at least one embodiment, an RCTW system may provide visual, audible, and/or tactile notification when an object is detected outside a rear-camera range when vehicle 1700 is backing up. In at least one embodiment, an RCTW system includes an AEB system to ensure that vehicle brakes are applied to avoid a crash. In at least one embodiment, an RCTW system may use one or more rear-facing RADAR sensor(s) 1760, coupled to a dedicated processor, DSP, FPGA, and/or ASIC, that is electrically coupled to provide driver feedback, such as a display, speaker, and/or vibrating component.

In at least one embodiment, conventional ADAS systems may be prone to false positive results which may be annoying and distracting to a driver, but typically are not catastrophic, because conventional ADAS systems alert a driver and allow that driver to decide whether a safety condition truly exists and act accordingly. In at least one embodiment, vehicle 1700 itself decides, in case of conflicting results, whether to heed result from a primary computer or a secondary computer (e.g., a first controller or a second controller of controllers 1736). For example, in at least one embodiment, ADAS system 1738 may be a backup and/or secondary computer for providing perception information to a backup computer rationality module. In at least one embodiment, a backup computer rationality monitor may run redundant diverse software on hardware components to detect faults in perception and dynamic driving tasks. In at least one embodiment, outputs from ADAS system 1738 may be provided to a supervisory MCU. In at least one embodiment, if outputs from a primary computer and outputs from a secondary computer conflict, a supervisory MCU determines how to reconcile conflict to ensure safe operation.

In at least one embodiment, a primary computer may be configured to provide a supervisory MCU with a confidence score, indicating that primary computer's confidence in a chosen result. In at least one embodiment, if that confidence score exceeds a threshold, that supervisory MCU may follow that primary computer's direction, regardless of whether that secondary computer provides a conflicting or inconsistent result. In at least one embodiment, where a confidence score does not meet a threshold, and where primary and secondary computers indicate different results (e.g., a conflict), a supervisory MCU may arbitrate between computers to determine an appropriate outcome.

In at least one embodiment, a supervisory MCU may be configured to run a neural network(s) that is trained and configured to determine, based at least in part on outputs from a primary computer and outputs from a secondary computer, conditions under which that secondary computer provides false alarms. In at least one embodiment, neural network(s) in a supervisory MCU may learn when a secondary computer's output may be trusted, and when it cannot. For example, in at least one embodiment, when that secondary computer is a RADAR-based FCW system, a neural network(s) in that supervisory MCU may learn when an FCW system is identifying metallic objects that are not, in fact, hazards, such as a drainage grate or manhole cover that triggers an alarm. In at least one embodiment, when a secondary computer is a camera-based LDW system, a neural network in a supervisory MCU may learn to override LDW when bicyclists or pedestrians are present and a lane departure is, in fact, a safest maneuver. In at least one embodiment, a supervisory MCU may include at least one of a DLA or a GPU suitable for running neural network(s) with associated memory. In at least one embodiment, a supervisory MCU may comprise and/or be included as a component of SoC(s) 1704.

In at least one embodiment, ADAS system 1738 may include a secondary computer that performs ADAS functionality using traditional rules of computer vision. In at least one embodiment, that secondary computer may use classic computer vision rules (if-then), and presence of a neural network(s) in a supervisory MCU may improve reliability, safety and performance. For example, in at least one embodiment, diverse implementation and intentional non-identity makes an overall system more fault-tolerant, especially to faults caused by software (or software-hardware interface) functionality. For example, in at least one embodiment, if there is a software bug or error in software running on a primary computer, and non-identical software code running on a secondary computer provides a consistent overall result, then a supervisory MCU may have greater confidence that an overall result is correct, and a bug in software or hardware on that primary computer is not causing a material error.

In at least one embodiment, an output of ADAS system 1738 may be fed into a primary computer's perception block and/or a primary computer's dynamic driving task block. For example, in at least one embodiment, if ADAS system 1738 indicates a forward crash warning due to an object immediately ahead, a perception block may use this information when identifying objects. In at least one embodiment, a secondary computer may have its own neural network that is trained and thus reduces a risk of false positives, as described herein.

In at least one embodiment, vehicle 1700 may further include infotainment SoC 1730 (e.g., an in-vehicle infotainment system (IVI)). Although illustrated and described as an SoC, infotainment system SoC 1730, in at least one embodiment, may not be an SoC, and may include, without limitation, two or more discrete components. In at least one embodiment, infotainment SoC 1730 may include, without limitation, a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to vehicle 1700. For example, infotainment SoC 1730 could include radios, disk players, navigation systems, video players, USB and Bluetooth connectivity, carputers, in-car entertainment, WiFi, steering wheel audio controls, hands free voice control, a heads-up display ("HUD"), HMI display 1734, a telematics device, a control panel (e.g., for controlling and/or interacting with various components, features, and/or systems), and/or other components. In at least one embodiment, infotainment SoC 1730 may further be used to provide information (e.g., visual and/or audible) to user(s) of vehicle 1700, such as information from ADAS system 1738, autonomous driving information such as planned vehicle maneuvers, trajectories, surrounding environment information (e.g., intersection information, vehicle information, road information, etc.), and/or other information.

In at least one embodiment, infotainment SoC 1730 may include any amount and type of GPU functionality. In at least one embodiment, infotainment SoC 1730 may communicate over bus 1702 with other devices, systems, and/or components of vehicle 1700. In at least one embodiment, infotainment SoC 1730 may be coupled to a supervisory MCU such that a GPU of an infotainment system may perform some self-driving functions in event that primary controller(s) 1736 (e.g., primary and/or backup computers of vehicle 1700) fail. In at least one embodiment, infotainment SoC 1730 may put vehicle 1700 into a chauffeur to safe stop mode, as described herein.

In at least one embodiment, vehicle 1700 may further include instrument cluster 1732 (e.g., a digital dash, an electronic instrument cluster, a digital instrument panel, etc.). In at least one embodiment, instrument cluster 1732 may include, without limitation, a controller and/or supercomputer (e.g., a discrete controller or supercomputer). In at least one embodiment, instrument cluster 1732 may include, without limitation, any number and combination of a set of instrumentation such as a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. In some examples, information may be displayed and/or shared among infotainment SoC 1730 and instrument cluster 1732. In at least one embodiment, instrument cluster 1732 may be included as part of infotainment SoC 1730, or vice versa.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, inference and/or training logic 1415 may be used in system FIG. 17C for inferencing or predicting operations based, at least in part, on weight parameters calculated using neural network training operations, neural network functions and/or architectures, or neural network use cases described herein.

In at least one embodiment, such components can be utilized to generate one or more objects within one or more second images based, at least in part, on one or more features of the one or more objects within one or more first images.

Figure 17D:
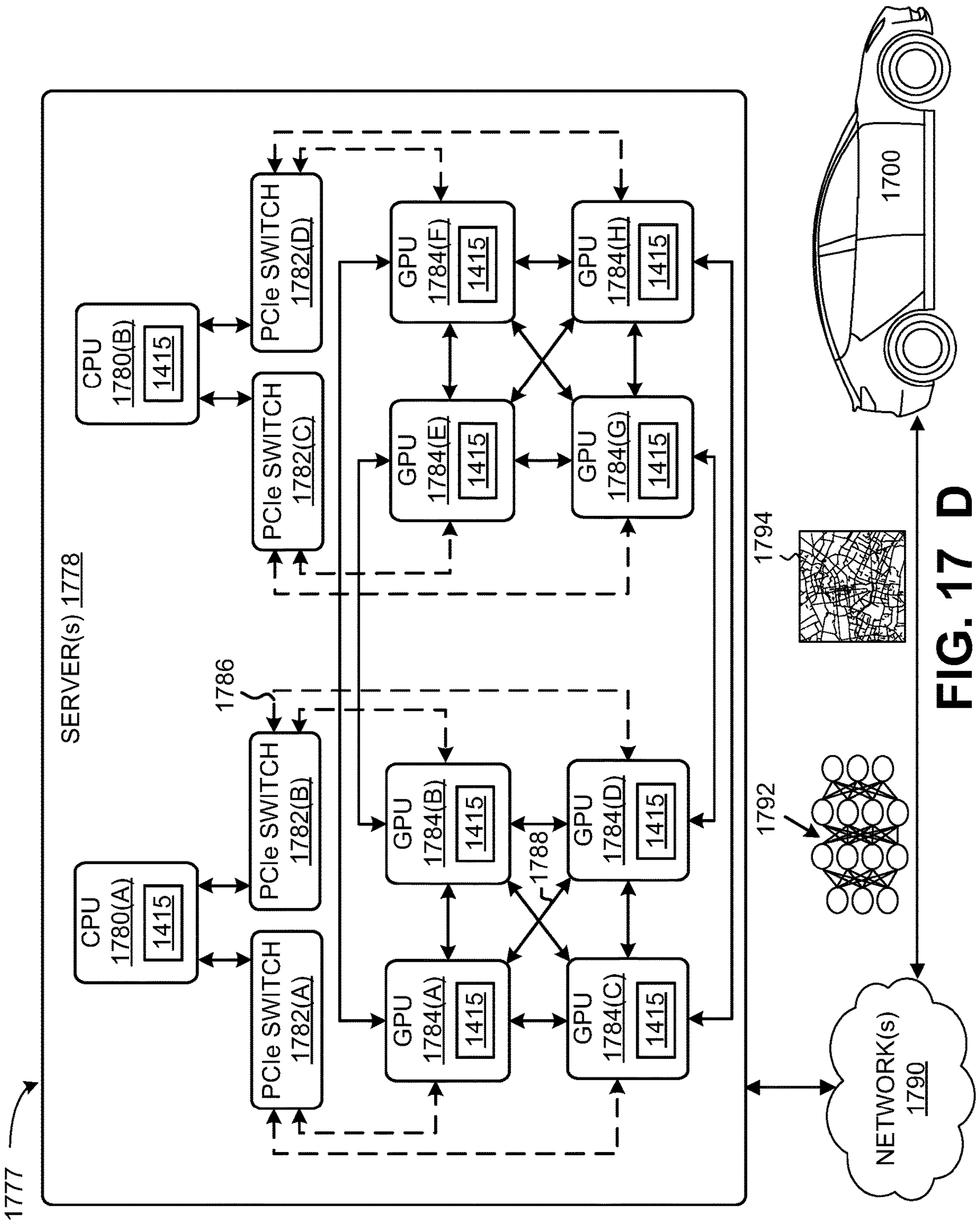
FIG. 17D is a diagram illustrating a system for communication between cloud-based server(s) and the autonomous vehicle of FIG. 17A, according to at least one embodiment.

FIG. 17D is a diagram of a system for communication between cloud-based server(s) and autonomous vehicle 1700 of FIG. 17A, according to at least one embodiment. In at least one embodiment, system may include, without limitation, server(s) 1778, network(s) 1790, and any number and type of vehicles, including vehicle 1700. In at least one embodiment, server(s) 1778 may include, without limitation, a plurality of GPUs 1784(A)-1784(H) (collectively referred to herein as GPUs 1784), PCIe switches 1782(A)-1782(D) (collectively referred to herein as PCIe switches 1782), and/or CPUs 1780(A)-1780(B) (collectively referred to herein as CPUs 1780). In at least one embodiment, GPUs 1784, CPUs 1780, and PCIe switches 1782 may be interconnected with high-speed interconnects such as, for example and without limitation, NVLink interfaces 1788 developed by NVIDIA and/or PCIe connections 1786. In at least one embodiment, GPUs 1784 are connected via an NVLink and/or NVSwitch SoC and GPUs 1784 and PCIe switches 1782 are connected via PCIe interconnects. Although eight GPUs 1784, two CPUs 1780, and four PCIe switches 1782 are illustrated, this is not intended to be limiting. In at least one embodiment, each of server(s) 1778 may include, without limitation, any number of GPUs 1784, CPUs 1780, and/or PCIe switches 1782, in any combination. For example, in at least one embodiment, server(s) 1778 could each include eight, sixteen, thirty-two, and/or more GPUs 1784.

In at least one embodiment, server(s) 1778 may receive, over network(s) 1790 and from vehicles, image data representative of images showing unexpected or changed road conditions, such as recently commenced road-work. In at least one embodiment, server(s) 1778 may transmit, over network(s) 1790 and to vehicles, neural networks 1792, updated or otherwise, and/or map information 1794, including, without limitation, information regarding traffic and road conditions. In at least one embodiment, updates to map information 1794 may include, without limitation, updates for HD map 1722, such as information regarding construction sites, potholes, detours, flooding, and/or other obstructions. In at least one embodiment, neural networks 1792, and/or map information 1794 may have resulted from new training and/or experiences represented in data received from any number of vehicles in an environment, and/or based at least in part on training performed at a data center (e.g., using server(s) 1778 and/or other servers).

In at least one embodiment, server(s) 1778 may be used to train machine learning models (e.g., neural networks) based at least in part on training data. In at least one embodiment, training data may be generated by vehicles, and/or may be generated in a simulation (e.g., using a game engine). In at least one embodiment, any amount of training data is tagged (e.g., where associated neural network benefits from supervised learning) and/or undergoes other pre-processing. In at least one embodiment, any amount of training data is not tagged and/or pre-processed (e.g., where associated neural network does not require supervised learning). In at least one embodiment, once machine learning models are trained, machine learning models may be used by vehicles (e.g., transmitted to vehicles over network(s) 1790), and/or machine learning models may be used by server(s) 1778 to remotely monitor vehicles.

In at least one embodiment, server(s) 1778 may receive data from vehicles and apply data to up-to-date real-time neural networks for real-time intelligent inferencing. In at least one embodiment, server(s) 1778 may include deep-learning supercomputers and/or dedicated AI computers powered by GPU(s) 1784, such as a DGX and DGX Station machines developed by NVIDIA. However, in at least one embodiment, server(s) 1778 may include deep learning infrastructure that uses CPU-powered data centers.

In at least one embodiment, deep-learning infrastructure of server(s) 1778 may be capable of fast, real-time inferencing, and may use that capability to evaluate and verify health of processors, software, and/or associated hardware in vehicle 1700. For example, in at least one embodiment, deep-learning infrastructure may receive periodic updates from vehicle 1700, such as a sequence of images and/or objects that vehicle 1700 has located in that sequence of images (e.g., via computer vision and/or other machine learning object classification techniques). In at least one embodiment, deep-learning infrastructure may run its own neural network to identify objects and compare them with objects identified by vehicle 1700 and, if results do not match and deep-learning infrastructure concludes that AI in vehicle 1700 is malfunctioning, then server(s) 1778 may transmit a signal to vehicle 1700 instructing a fail-safe computer of vehicle 1700 to assume control, notify passengers, and complete a safe parking maneuver.

In at least one embodiment, server(s) 1778 may include GPU(s) 1784 and one or more programmable inference accelerators (e.g., NVIDIA's TensorRT 3 devices). In at least one embodiment, a combination of GPU-powered servers and inference acceleration may make real-time responsiveness possible. In at least one embodiment, such as where performance is less critical, servers powered by CPUs, FPGAs, and other processors may be used for inferencing. In at least one embodiment, hardware structure(s) 1415 are used to perform one or more embodiments. Details regarding hardware structure(x) 1415 are provided herein in conjunction with FIGS. 14A and/or 14B.

Computer Systems

Figure 18:
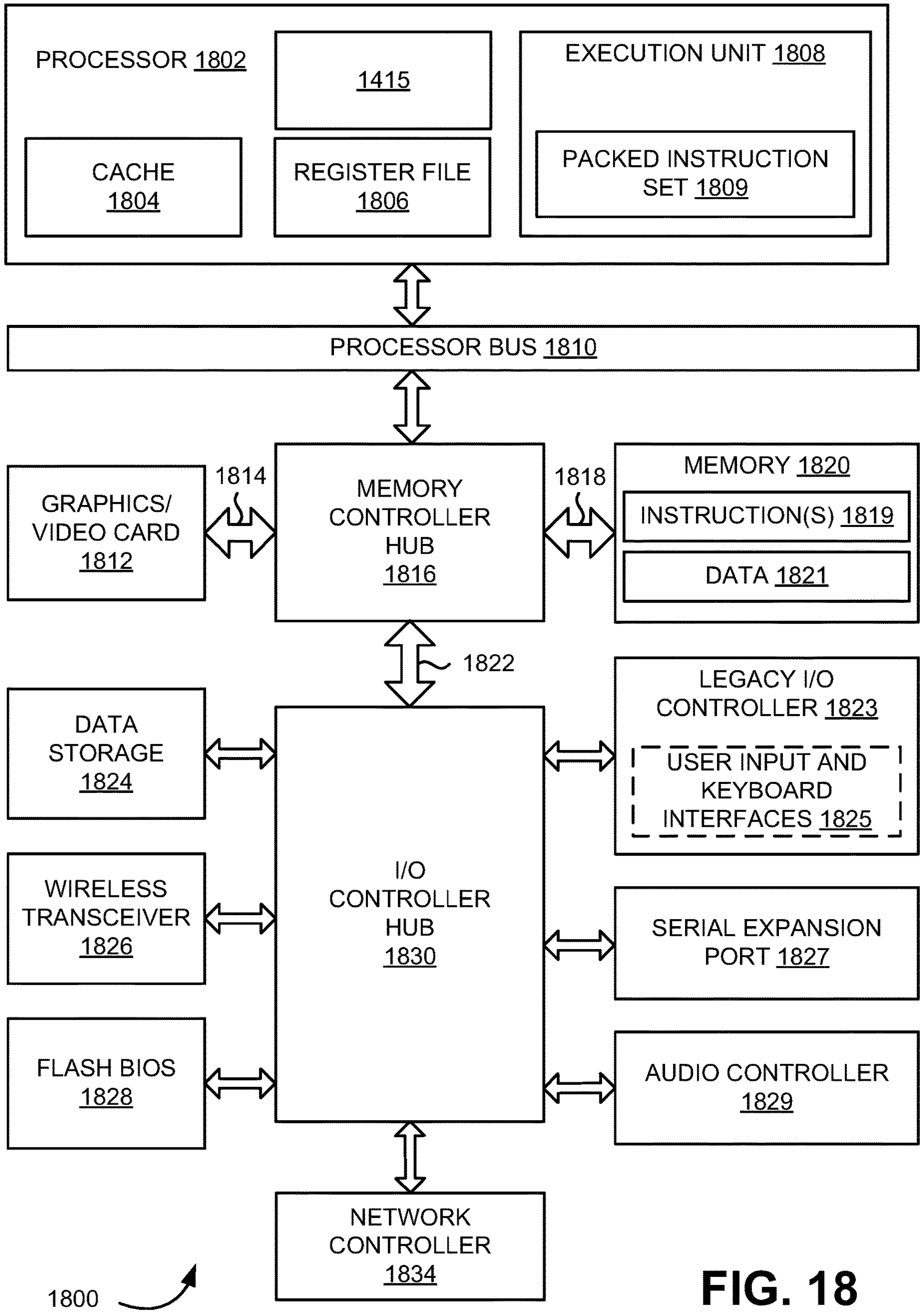
FIG. 18 is a block diagram illustrating a computer system, according to at least one embodiment.

FIG. 18 is a block diagram illustrating an exemplary computer system, which may be a system with interconnected devices and components, a system-on-a-chip (SOC) or some combination thereof formed with a processor that may include execution units to execute an instruction, according to at least one embodiment. In at least one embodiment, a computer system 1800 may include, without limitation, a component, such as a processor 1802 to employ execution units including logic to perform algorithms for process data, in accordance with present disclosure, such as in embodiment described herein. In at least one embodiment, computer system 1800 may include processors, such as PENTIUM® Processor family, Xeon™ Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1800 may execute a version of WINDOWS operating system available from Microsoft Corporation of Redmond, Wash., although other operating systems (UNIX and Linux, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 1800 may include, without limitation, processor 1802 that may include, without limitation, one or more execution units 1808 to perform machine learning model training and/or inferencing according to techniques described herein. In at least one embodiment, computer system 1800 is a single processor desktop or server system, but in another embodiment, computer system 1800 may be a multiprocessor system. In at least one embodiment, processor 1802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 1802 may be coupled to a processor bus 1810 that may transmit data signals between processor 1802 and other components in computer system 1800.

In at least one embodiment, processor 1802 may include, without limitation, a Level 1 ("L1") internal cache memory ("cache") 1804. In at least one embodiment, processor 1802 may have a single internal cache or multiple levels of internal cache. In at least one embodiment, cache memory may reside external to processor 1802. Other embodiments may also include a combination of both internal and external caches depending on particular implementation and needs. In at least one embodiment, a register file 1806 may store different types of data in various registers including, without limitation, integer registers, floating point registers, status registers, and an instruction pointer register.

In at least one embodiment, execution unit 1808, including, without limitation, logic to perform integer and floating point operations, also resides in processor 1802. In at least one embodiment, processor 1802 may also include a microcode ("ucode") read only memory ("ROM") that stores microcode for certain macro instructions. In at least one embodiment, execution unit 1808 may include logic to handle a packed instruction set 1809. In at least one embodiment, by including packed instruction set 1809 in an instruction set of a general-purpose processor, along with associated circuitry to execute instructions, operations used by many multimedia applications may be performed using packed data in processor 1802. In at least one embodiment, many multimedia applications may be accelerated and executed more efficiently by using a full width of a processor's data bus for performing operations on packed data, which may eliminate a need to transfer smaller units of data across that processor's data bus to perform one or more operations one data element at a time.

In at least one embodiment, execution unit 1808 may also be used in microcontrollers, embedded processors, graphics devices, DSPs, and other types of logic circuits. In at least one embodiment, computer system 1800 may include, without limitation, a memory 1820. In at least one embodiment, memory 1820 may be a Dynamic Random Access Memory ("DRAM") device, a Static Random Access Memory ("SRAM") device, a flash memory device, or another memory device. In at least one embodiment, memory 1820 may store instruction(s) 1819 and/or data 1821 represented by data signals that may be executed by processor 1802.

In at least one embodiment, a system logic chip may be coupled to processor bus 1810 and memory 1820. In at least one embodiment, a system logic chip may include, without limitation, a memory controller hub ("MCH") 1816, and processor 1802 may communicate with MCH 1816 via processor bus 1810. In at least one embodiment, MCH 1816 may provide a high bandwidth memory path 1818 to memory 1820 for instruction and data storage and for storage of graphics commands, data and textures. In at least one embodiment, MCH 1816 may direct data signals between processor 1802, memory 1820, and other components in computer system 1800 and to bridge data signals between processor bus 1810, memory 1820, and a system I/O interface 1822. In at least one embodiment, a system logic chip may provide a graphics port for coupling to a graphics controller. In at least one embodiment, MCH 1816 may be coupled to memory 1820 through high bandwidth memory path 1818 and a graphics/video card 1812 may be coupled to MCH 1816 through an Accelerated Graphics Port ("AGP") interconnect 1814.

In at least one embodiment, computer system 1800 may use system I/O interface 1822 as a proprietary hub interface bus to couple MCH 1816 to an I/O controller hub ("ICH") 1830. In at least one embodiment, ICH 1830 may provide direct connections to some I/O devices via a local I/O bus. In at least one embodiment, a local I/O bus may include, without limitation, a high-speed I/O bus for connecting peripherals to memory 1820, a chipset, and processor 1802. Examples may include, without limitation, an audio controller 1829, a firmware hub ("flash BIOS") 1828, a wireless transceiver 1826, a data storage 1824, a legacy I/O controller 1823 containing user input and keyboard interfaces 1825, a serial expansion port 1827, such as a Universal Serial Bus ("USB") port, and a network controller 1834. In at least one embodiment, data storage 1824 may comprise a hard disk drive, a floppy disk drive, a CD-ROM device, a flash memory device, or other mass storage device.

In at least one embodiment, FIG. 18 illustrates a system, which includes interconnected hardware devices or "chips", whereas in other embodiments, FIG. 18 may illustrate an exemplary SoC. In at least one embodiment, devices illustrated in FIG. 18 may be interconnected with proprietary interconnects, standardized interconnects (e.g., PCIe) or some combination thereof. In at least one embodiment, one or more components of computer system 1800 are interconnected using compute express link (CXL) interconnects.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, inference and/or training logic 1415 may be used in system FIG. 18 for inferencing or predicting operations based, at least in part, on weight parameters calculated using neural network training operations, neural network functions and/or architectures, or neural network use cases described herein.

In at least one embodiment, such components can be utilized to generate one or more objects within one or more second images based, at least in part, on one or more features of the one or more objects within one or more first images.

Figure 19:
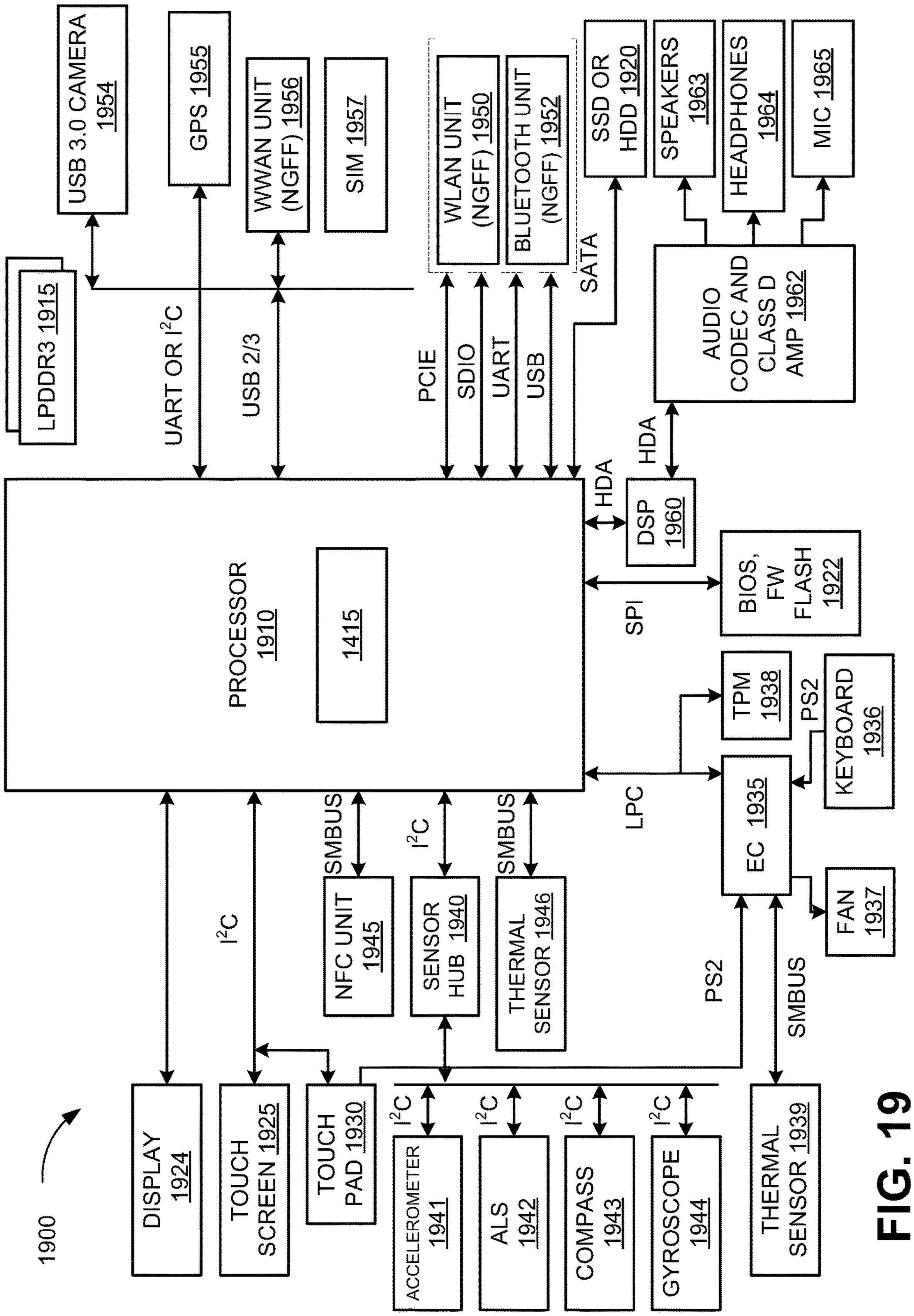
FIG. 19 is a block diagram illustrating a computer system, according to at least one embodiment.

FIG. 19 is a block diagram illustrating an electronic device 1900 for utilizing a processor 1910, according to at least one embodiment. In at least one embodiment, electronic device 1900 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 1900 may include, without limitation, processor 1910 communicatively coupled to any suitable number or kind of components, peripherals, modules, or devices. In at least one embodiment, processor 1910 is coupled using a bus or interface, such as a $I^2C$ bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3, etc.), or a Universal Asynchronous Receiver/Transmitter ("UART") bus. In at least one embodiment, FIG. 19 illustrates a system, which includes interconnected hardware devices or "chips", whereas in other embodiments, FIG. 19 may illustrate an exemplary SoC. In at least one embodiment, devices illustrated in FIG. 19 may be interconnected with proprietary interconnects, standardized interconnects (e.g., PCIe) or some combination thereof. In at least one embodiment, one or more components of FIG. 19 are interconnected using compute express link (CXL) interconnects.

In at least one embodiment, FIG. 19 may include a display 1924, a touch screen 1925, a touch pad 1930, a Near Field Communications unit ("NFC") 1945, a sensor hub 1940, a thermal sensor 1946, an Express Chipset ("EC") 1935, a Trusted Platform Module ("TPM") 1938, BIOS/firmware/flash memory ("BIOS, FW Flash") 1922, a DSP 1960, a drive 1920 such as a Solid State Disk ("SSD") or a Hard Disk Drive ("HDD"), a wireless local area network unit ("WLAN") 1950, a Bluetooth unit 1952, a Wireless Wide Area Network unit ("WWAN") 1956, a Global Positioning System (GPS) unit 1955, a camera ("USB 3.0 camera") 1954 such as a USB 3.0 camera, and/or a Low Power Double Data Rate ("LPDDR") memory unit ("LPDDR3") 1915 implemented in, for example, an LPDDR3 standard. These components may each be implemented in any suitable manner.

In at least one embodiment, other components may be communicatively coupled to processor 1910 through components described herein. In at least one embodiment, an accelerometer 1941, an ambient light sensor ("ALS") 1942, a compass 1943, and a gyroscope 1944 may be communicatively coupled to sensor hub 1940. In at least one embodiment, a thermal sensor 1939, a fan 1937, a keyboard 1936, and touch pad 1930 may be communicatively coupled to EC 1935. In at least one embodiment, speakers 1963, headphones 1964, and a microphone ("mic") 1965 may be communicatively coupled to an audio unit ("audio codec and class D amp") 1962, which may in turn be communicatively coupled to DSP 1960. In at least one embodiment, audio unit 1962 may include, for example and without limitation, an audio coder/decoder ("codec") and a class D amplifier. In at least one embodiment, a SIM card ("SIM") 1957 may be communicatively coupled to WWAN unit 1956. In at least one embodiment, components such as WLAN unit 1950 and Bluetooth unit 1952, as well as WWAN unit 1956 may be implemented in a Next Generation Form Factor ("NGFF").

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, inference and/or training logic 1415 may be used in system FIG. 19 for inferencing or predicting operations based, at least in part, on weight parameters calculated using neural network training operations, neural network functions and/or architectures, or neural network use cases described herein.

In at least one embodiment, such components can be utilized to generate one or more objects within one or more second images based, at least in part, on one or more features of the one or more objects within one or more first images.

Figure 20:
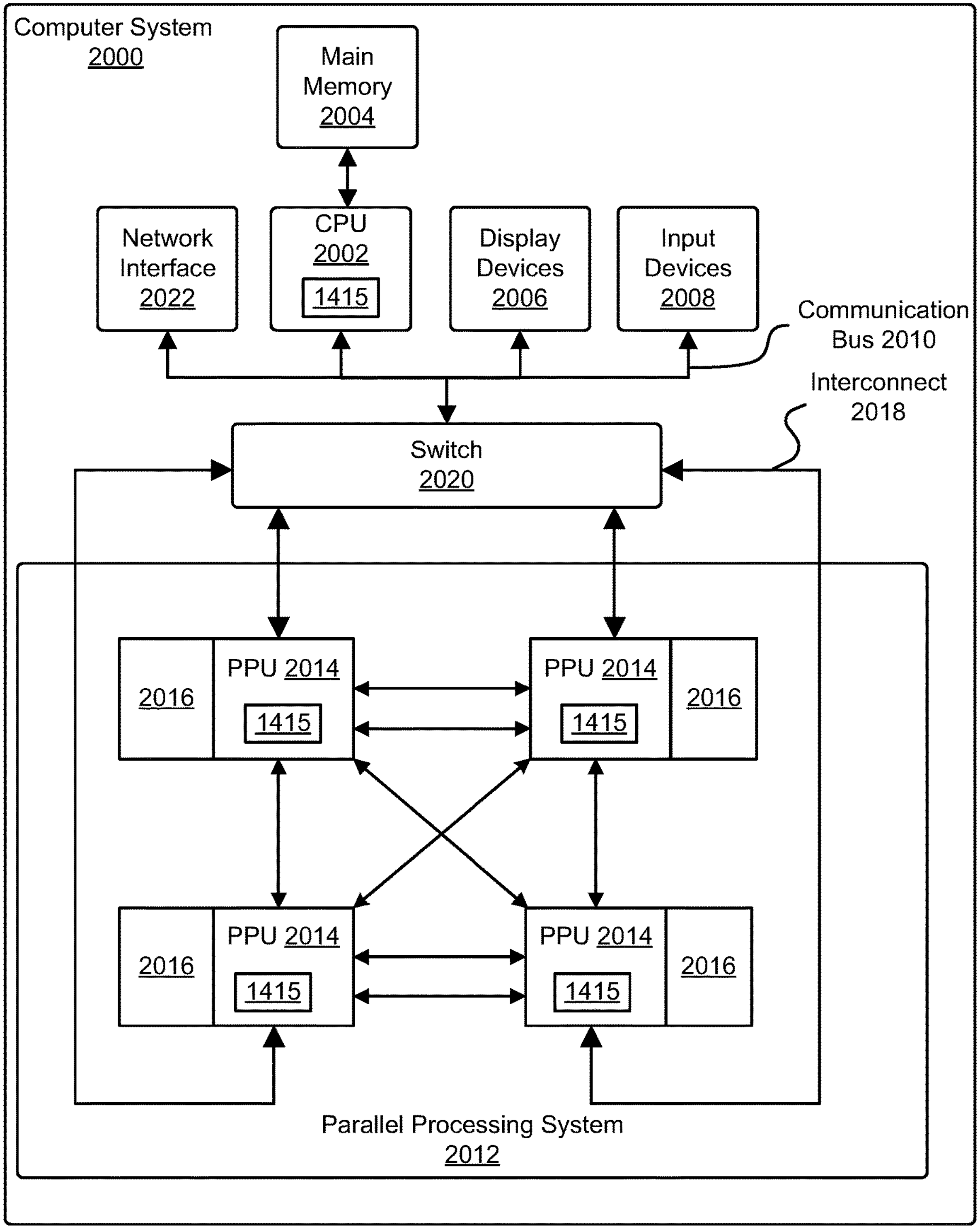
FIG. 20 illustrates a computer system, according to at least one embodiment.

FIG. 20 illustrates a computer system 2000, according to at least one embodiment. In at least one embodiment, computer system 2000 is configured to implement various processes and methods described throughout this disclosure.

In at least one embodiment, computer system 2000 comprises, without limitation, at least one central processing unit ("CPU") 2002 that is connected to a communication bus 2010 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 2000 includes, without limitation, a main memory 2004 and control logic (e.g., implemented as hardware, software, or a combination thereof) and data are stored in main memory 2004, which may take form of random access memory ("RAM"). In at least one embodiment, a network interface subsystem ("network interface") 2022 provides an interface to other computing devices and networks for receiving data from and transmitting data to other systems with computer system 2000.

In at least one embodiment, computer system 2000, in at least one embodiment, includes, without limitation, input devices 2008, a parallel processing system 2012, and display devices 2006 that can be implemented using a conventional cathode ray tube ("CRT"), a liquid crystal display ("LCD"), a light emitting diode ("LED") display, a plasma display, or other suitable display technologies. In at least one embodiment, user input is received from input devices 2008 such as keyboard, mouse, touchpad, microphone, etc. In at least one embodiment, each module described herein can be situated on a single semiconductor platform to form a processing system.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, inference and/or training logic 1415 may be used in system FIG. 20 for inferencing or predicting operations based, at least in part, on weight parameters calculated using neural network training operations, neural network functions and/or architectures, or neural network use cases described herein.

In at least one embodiment, such components can be utilized to generate one or more objects within one or more second images based, at least in part, on one or more features of the one or more objects within one or more first images.

Figure 21:
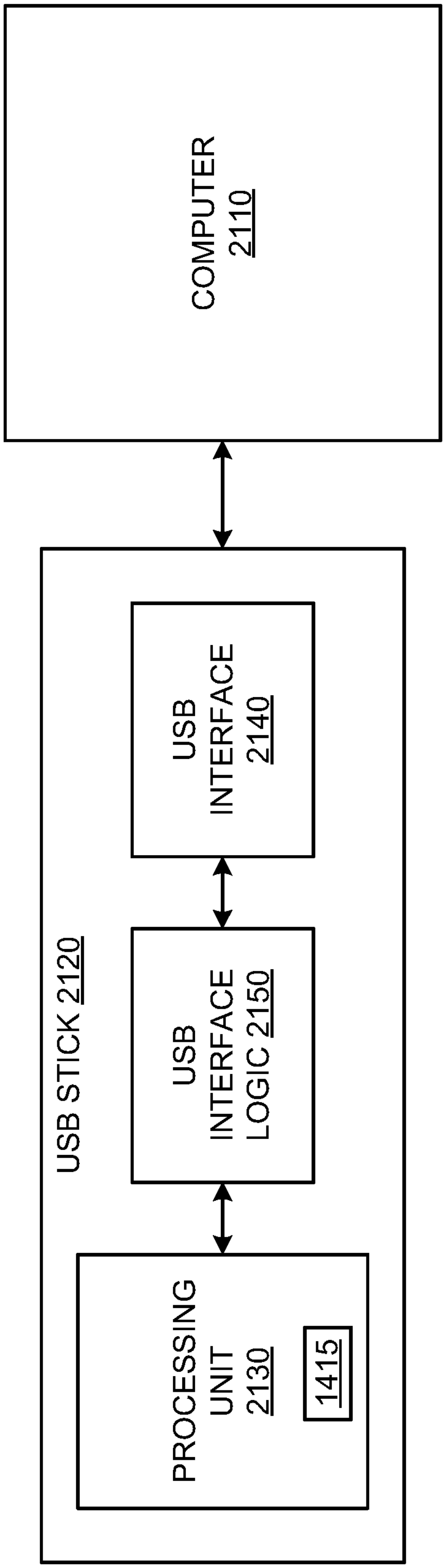
FIG. 21 illustrates a computer system, according to at least one embodiment.

FIG. 21 illustrates a computer system 2100, according to at least one embodiment. In at least one embodiment, computer system 2100 includes, without limitation, a computer 2110 and a USB stick 2120. In at least one embodiment, computer 2110 may include, without limitation, any number and type of processor(s) (not shown) and a memory (not shown). In at least one embodiment, computer 2110 includes, without limitation, a server, a cloud instance, a laptop, and a desktop computer.

In at least one embodiment, USB stick 2120 includes, without limitation, a processing unit 2130, a USB interface 2140, and USB interface logic 2150. In at least one embodiment, processing unit 2130 may be any instruction execution system, apparatus, or device capable of executing instructions. In at least one embodiment, processing unit 2130 may include, without limitation, any number and type of processing cores (not shown). In at least one embodiment, processing unit 2130 comprises an application specific integrated circuit ("ASIC") that is optimized to perform any amount and type of operations associated with machine learning. For instance, in at least one embodiment, processing unit 2130 is a tensor processing unit ("TPC") that is optimized to perform machine learning inference operations. In at least one embodiment, processing unit 2130 is a vision processing unit ("VPU") that is optimized to perform machine vision and machine learning inference operations.

In at least one embodiment, USB interface 2140 may be any type of USB connector or USB socket. For instance, in at least one embodiment, USB interface 2140 is a USB 3.0 Type-C socket for data and power. In at least one embodiment, USB interface 2140 is a USB 3.0 Type-A connector. In at least one embodiment, USB interface logic 2150 may include any amount and type of logic that enables processing unit 2130 to interface with devices (e.g., computer 2110) via USB connector 2140.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, inference and/or training logic 1415 may be used in system FIG. 21 for inferencing or predicting operations based, at least in part, on weight parameters calculated using neural network training operations, neural network functions and/or architectures, or neural network use cases described herein.

In at least one embodiment, such components can be utilized to generate one or more objects within one or more second images based, at least in part, on one or more features of the one or more objects within one or more first images.

Figure 22A:
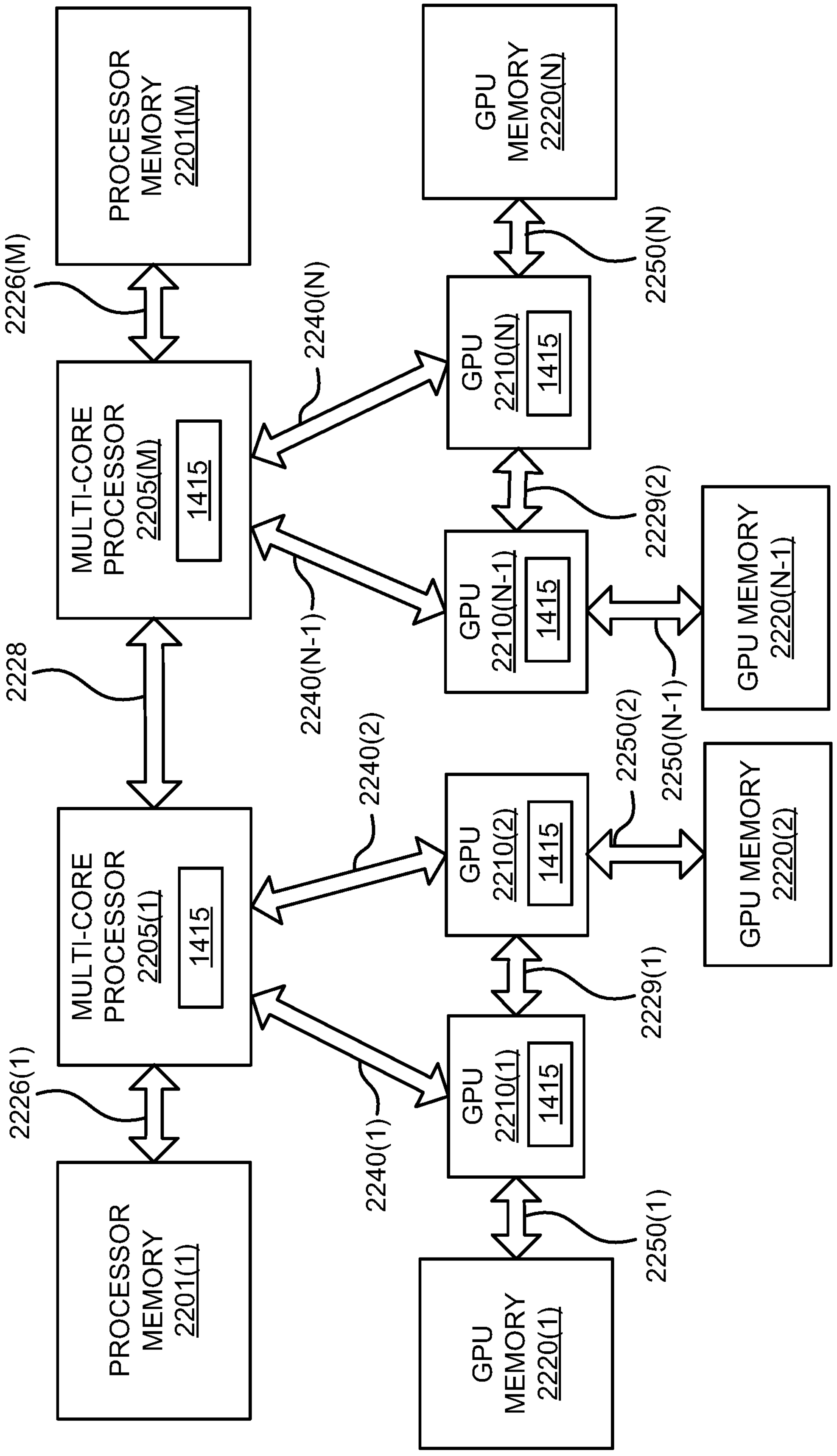
FIG. 22A illustrates a computer system, according to at least one embodiment.

FIG. 22A illustrates an exemplary architecture in which a plurality of GPUs 2210(1)-2210(N) is communicatively coupled to a plurality of multi-core processors 2205(1)-2205 (M) over high-speed links 2240(1)-2240(N) (e.g., buses, point-to-point interconnects, etc.). In at least one embodiment, high-speed links 2240(1)-2240(N) support a communication throughput of 4 GB/s, 30 GB/s, 80 GB/s or higher. In at least one embodiment, various interconnect protocols may be used including, but not limited to, PCIe 4.0 or 5.0 and NVLink 2.0. In various figures, "N" and "M" represent positive integers, values of which may be different from figure to figure. In at least one embodiment, one or more GPUs in a plurality of GPUs 2210(1)-2210(N) includes one or more graphics cores (also referred to simply as "cores") 2500 as disclosed in FIGS. 25A and 25B. In at least one embodiment, one or more graphics cores 2500 may be referred to as streaming multiprocessors ("SMs"), stream processors ("SPs"), stream processing units ("SPUs"), compute units ("CUs"), execution units ("EUs"), and/or slices, where a slice in this context can refer to a portion of processing resources in a processing unit (e.g., 16 cores, a ray tracing unit, a thread director or scheduler).

In addition, and in at least one embodiment, two or more of GPUs 2210 are interconnected over high-speed links 2229(1)-2229(2), which may be implemented using similar or different protocols/links than those used for high-speed links 2240(1)-2240(N). Similarly, two or more of multi-core processors 2205 may be connected over a high-speed link 2228 which may be symmetric multi-processor (SMP) buses operating at 20 GB/s, 30 GB/s, 120 GB/s or higher. Alternatively, all communication between various system components shown in FIG. 22A may be accomplished using similar protocols/links (e.g., over a common interconnection fabric).

In at least one embodiment, each multi-core processor 2205 is communicatively coupled to a processor memory 2201(1)-2201(M), via memory interconnects 2226(1)-2226 (M), respectively, and each GPU 2210(1)-2210(N) is communicatively coupled to GPU memory 2220(1)-2220(N) over GPU memory interconnects 2250(1)-2250(N), respectively. In at least one embodiment, memory interconnects 2226 and 2250 may utilize similar or different memory access technologies. By way of example, and not limitation, processor memories 2201(1)-2201(M) and GPU memories 2220 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In at least one embodiment, some portion of processor memories 2201 may be volatile memory and another portion may be non-volatile memory (e.g., using a two-level memory (2LM) hierarchy).

As described herein, although various multi-core processors 2205 and GPUs 2210 may be physically coupled to a particular memory 2201, 2220, respectively, and/or a unified memory architecture may be implemented in which a virtual system address space (also referred to as "effective address" space) is distributed among various physical memories. For example, processor memories 2201(1)-2201(M) may each comprise 64 GB of system memory address space and GPU memories 2220(1)-2220(N) may each comprise 32 GB of system memory address space resulting in a total of 256 GB addressable memory when M=2 and N=4. Other values for N and M are possible.

Figure 22B:
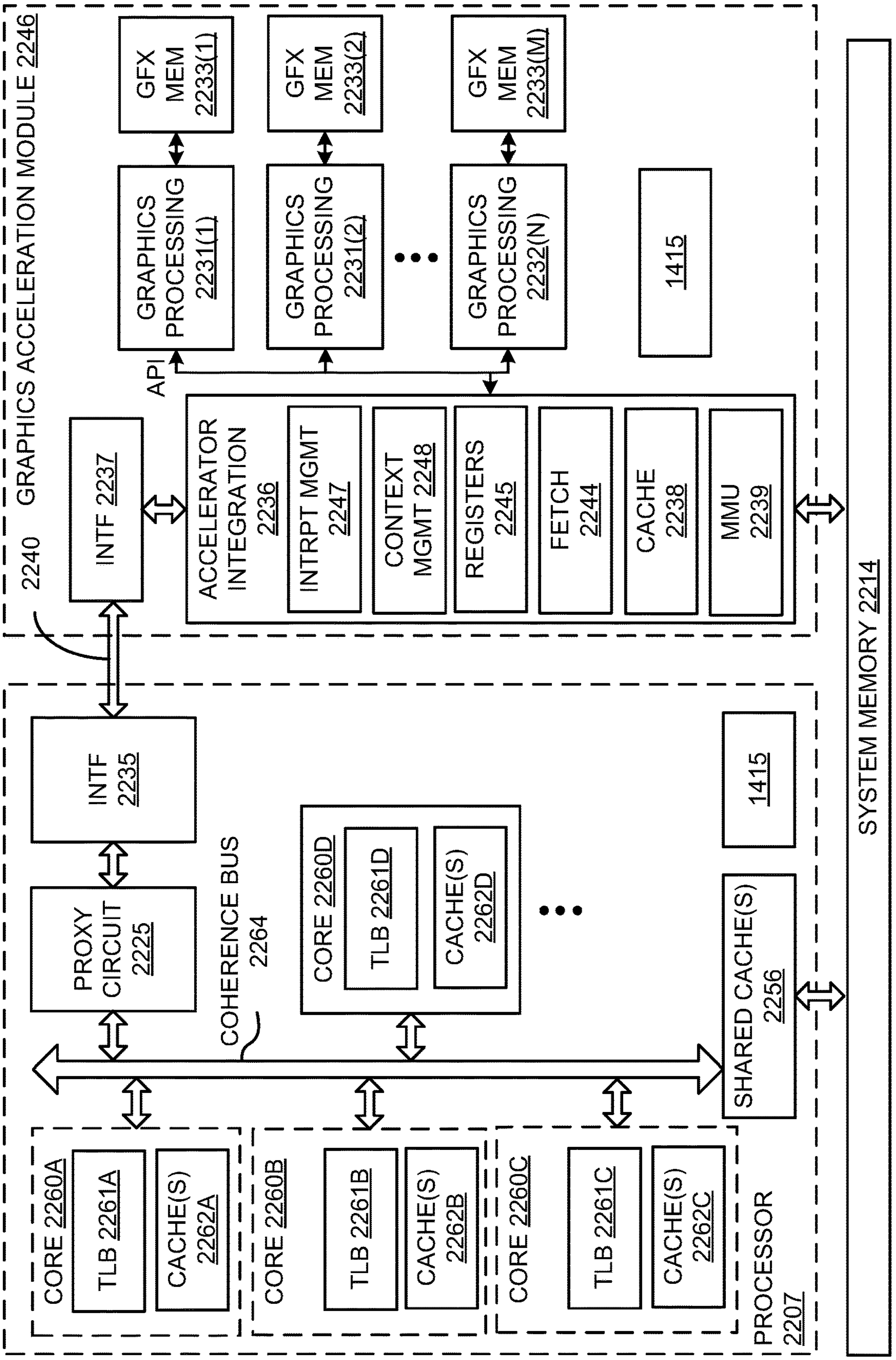
FIG. 22B illustrates a computer system, according to at least one embodiment.

FIG. 22B illustrates additional details for an interconnection between a multi-core processor 2207 and a graphics acceleration module 2246 in accordance with one exemplary embodiment. In at least one embodiment, graphics acceleration module 2246 may include one or more GPU chips integrated on a line card which is coupled to processor 2207 via high-speed link 2240 (e.g., a PCIe bus, NVLink, etc.). In at least one embodiment, graphics acceleration module 2246 may alternatively be integrated on a package or chip with processor 2207.

In at least one embodiment, processor 2207 includes a plurality of cores 2260A-2260D (which may be referred to as "execution units"), each with a translation lookaside buffer ("TLB") 2261A-2261D and one or more caches 2262A-2262D. In at least one embodiment, cores 2260A-2260D may include various other components for executing instructions and processing data that are not illustrated. In at least one embodiment, caches 2262A-2262D may comprise Level 1 (L1) and Level 2 (L2) caches. In addition, one or more shared caches 2256 may be included in caches 2262A-2262D and shared by sets of cores 2260A-2260D. For example, one embodiment of processor 2207 includes 24 cores, each with its own L1 cache, twelve shared L2 caches, and twelve shared L3 caches. In this embodiment, one or more L2 and L3 caches are shared by two adjacent cores. In at least one embodiment, processor 2207 and graphics acceleration module 2246 connect with system memory 2214, which may include processor memories 2201(1)-2201 (M) of FIG. 22A.

In at least one embodiment, coherency is maintained for data and instructions stored in various caches 2262A-2262D, 2256 and system memory 2214 via inter-core communication over a coherence bus 2264. In at least one embodiment, for example, each cache may have cache coherency logic/circuitry associated therewith to communicate to over coherence bus 2264 in response to detected reads or writes to particular cache lines. In at least one embodiment, a cache snooping protocol is implemented over coherence bus 2264 to snoop cache accesses.

In at least one embodiment, a proxy circuit 2225 communicatively couples graphics acceleration module 2246 to coherence bus 2264, allowing graphics acceleration module 2246 to participate in a cache coherence protocol as a peer of cores 2260A-2260D. In particular, in at least one embodiment, an interface 2235 provides connectivity to proxy circuit 2225 over high-speed link 2240 and an interface 2237 connects graphics acceleration module 2246 to high-speed link 2240.

In at least one embodiment, an accelerator integration circuit 2236 provides cache management, memory access, context management, and interrupt management services on behalf of a plurality of graphics processing engines 2231 (1)-2231(N) of graphics acceleration module 2246. In at least one embodiment, graphics processing engines 2231 (1)-2231(N) may each comprise a separate graphics processing unit (GPU). In at least one embodiment, plurality of graphics processing engines 2231(1)-2231(N) of graphics acceleration module 2246 include one or more graphics cores 2500 as discussed in connection with FIGS. 25A and 25B. In at least one embodiment, graphics processing engines 2231(1)-2231(N) alternatively may comprise different types of graphics processing engines within a GPU, such as graphics execution units, media processing engines (e.g., video encoders/decoders), samplers, and blit engines. In at least one embodiment, graphics acceleration module 2246 may be a GPU with a plurality of graphics processing engines 2231(1)-2231(N) or graphics processing engines 2231(1)-2231(N) may be individual GPUs integrated on a common package, line card, or chip.

In at least one embodiment, accelerator integration circuit 2236 includes a memory management unit (MMU) 2239 for performing various memory management functions such as virtual-to-physical memory translations (also referred to as effective-to-real memory translations) and memory access protocols for accessing system memory 2214. In at least one embodiment, MMU 2239 may also include a translation lookaside buffer (TLB) (not shown) for caching virtual/effective to physical/real address translations. In at least one embodiment, a cache 2238 can store commands and data for efficient access by graphics processing engines 2231(1)-2231(N). In at least one embodiment, data stored in cache 2238 and graphics memories 2233(1)-2233(M) is kept coherent with core caches 2262A-2262D, 2256 and system memory 2214, possibly using a fetch unit 2244. As mentioned, this may be accomplished via proxy circuit 2225 on behalf of cache 2238 and memories 2233(1)-2233(M) (e.g., sending updates to cache 2238 related to modifications/accesses of cache lines on processor caches 2262A-2262D, 2256 and receiving updates from cache 2238).

In at least one embodiment, a set of registers 2245 store context data for threads executed by graphics processing engines 2231(1)-2231(N) and a context management circuit 2248 manages thread contexts. For example, context management circuit 2248 may perform save and restore operations to save and restore contexts of various threads during contexts switches (e.g., where a first thread is saved and a second thread is stored so that a second thread can be execute by a graphics processing engine). For example, on a context switch, context management circuit 2248 may store current register values to a designated region in memory (e.g., identified by a context pointer). It may then restore register values when returning to a context. In at least one embodiment, an interrupt management circuit 2247 receives and processes interrupts received from system devices.

In at least one embodiment, virtual/effective addresses from a graphics processing engine 2231 are translated to real/physical addresses in system memory 2214 by MMU 2239. In at least one embodiment, accelerator integration circuit 2236 supports multiple (e.g., 4, 8, 16) graphics accelerator modules 2246 and/or other accelerator devices. In at least one embodiment, graphics accelerator module 2246 may be dedicated to a single application executed on processor 2207 or may be shared between multiple applications. In at least one embodiment, a virtualized graphics execution environment is presented in which resources of graphics processing engines 2231(1)-2231(N) are shared with multiple applications or virtual machines (VMs). In at least one embodiment, resources may be subdivided into "slices" which are allocated to different VMs and/or applications based on processing requirements and priorities associated with VMs and/or applications.

In at least one embodiment, accelerator integration circuit 2236 performs as a bridge to a system for graphics acceleration module 2246 and provides address translation and system memory cache services. In addition, in at least one embodiment, accelerator integration circuit 2236 may provide virtualization facilities for a host processor to manage virtualization of graphics processing engines 2231(1)-2231(N), interrupts, and memory management.

In at least one embodiment, because hardware resources of graphics processing engines 2231(1)-2231(N) are mapped explicitly to a real address space seen by host processor 2207, any host processor can address these resources directly using an effective address value. In at least one embodiment, one function of accelerator integration circuit 2236 is physical separation of graphics processing engines 2231(1)-2231(N) so that they appear to a system as independent units.

In at least one embodiment, one or more graphics memories 2233(1)-2233(M) are coupled to each of graphics processing engines 2231(1)-2231(N), respectively and N=M. In at least one embodiment, graphics memories 2233(1)-2233(M) store instructions and data being processed by each of graphics processing engines 2231(1)-2231(N). In at least one embodiment, graphics memories 2233(1)-2233(M) may be volatile memories such as DRAMs (including stacked DRAMs), GDDR memory (e.g., GDDR5, GDDR6), or HBM, and/or may be non-volatile memories such as 3D XPoint or Nano-Ram.

In at least one embodiment, to reduce data traffic over high-speed link 2240, biasing techniques can be used to ensure that data stored in graphics memories 2233(1)-2233(M) is data that will be used most frequently by graphics processing engines 2231(1)-2231(N) and preferably not used by cores 2260A-2260D (at least not frequently). Similarly, in at least one embodiment, a biasing mechanism attempts to keep data needed by cores (and preferably not graphics processing engines 2231(1)-2231(N)) within caches 2262A-2262D, 2256 and system memory 2214.

Figure 22C:
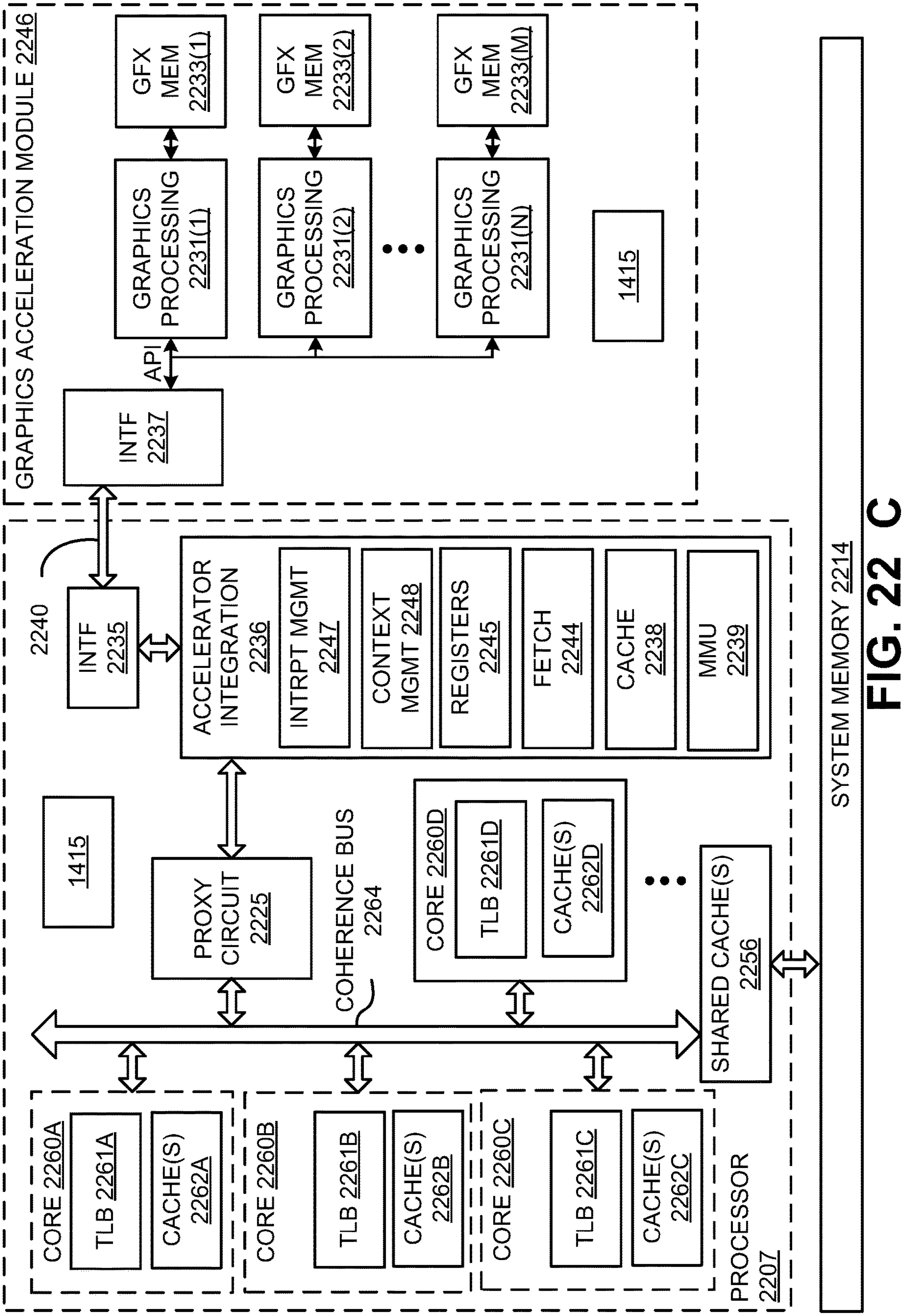
FIG. 22C illustrates a computer system, according to at least one embodiment.

FIG. 22C illustrates another exemplary embodiment in which accelerator integration circuit 2236 is integrated within processor 2207. In this embodiment, graphics processing engines 2231(1)-2231(N) communicate directly over high-speed link 2240 to accelerator integration circuit 2236 via interface 2237 and interface 2235 (which, again, may be any form of bus or interface protocol). In at least one embodiment, accelerator integration circuit 2236 may perform similar operations as those described with respect to FIG. 22B, but potentially at a higher throughput given its close proximity to coherence bus 2264 and caches 2262A-2262D, 2256. In at least one embodiment, an accelerator integration circuit supports different programming models including a dedicated-process programming model (no graphics acceleration module virtualization) and shared programming models (with virtualization), which may include programming models which are controlled by accelerator integration circuit 2236 and programming models which are controlled by graphics acceleration module 2246.

In at least one embodiment, graphics processing engines 2231(1)-2231(N) are dedicated to a single application or process under a single operating system. In at least one embodiment, a single application can funnel other application requests to graphics processing engines 2231(1)-2231(N), providing virtualization within a VM/partition.

In at least one embodiment, graphics processing engines 2231(1)-2231(N), may be shared by multiple VM/application partitions. In at least one embodiment, shared models may use a system hypervisor to virtualize graphics processing engines 2231(1)-2231(N) to allow access by each operating system. In at least one embodiment, for single-partition systems without a hypervisor, graphics processing engines 2231(1)-2231(N) are owned by an operating system. In at least one embodiment, an operating system can virtualize graphics processing engines 2231(1)-2231(N) to provide access to each process or application.

In at least one embodiment, graphics acceleration module 2246 or an individual graphics processing engine 2231(1)-2231(N) selects a process element using a process handle. In at least one embodiment, process elements are stored in system memory 2214 and are addressable using an effective address to real address translation technique described herein. In at least one embodiment, a process handle may be an implementation-specific value provided to a host process when registering its context with graphics processing engine 2231(1)-2231(N) (that is, calling system software to add a process element to a process element linked list). In at least one embodiment, a lower 16-bits of a process handle may be an offset of a process element within a process element linked list.

Figure 22D:
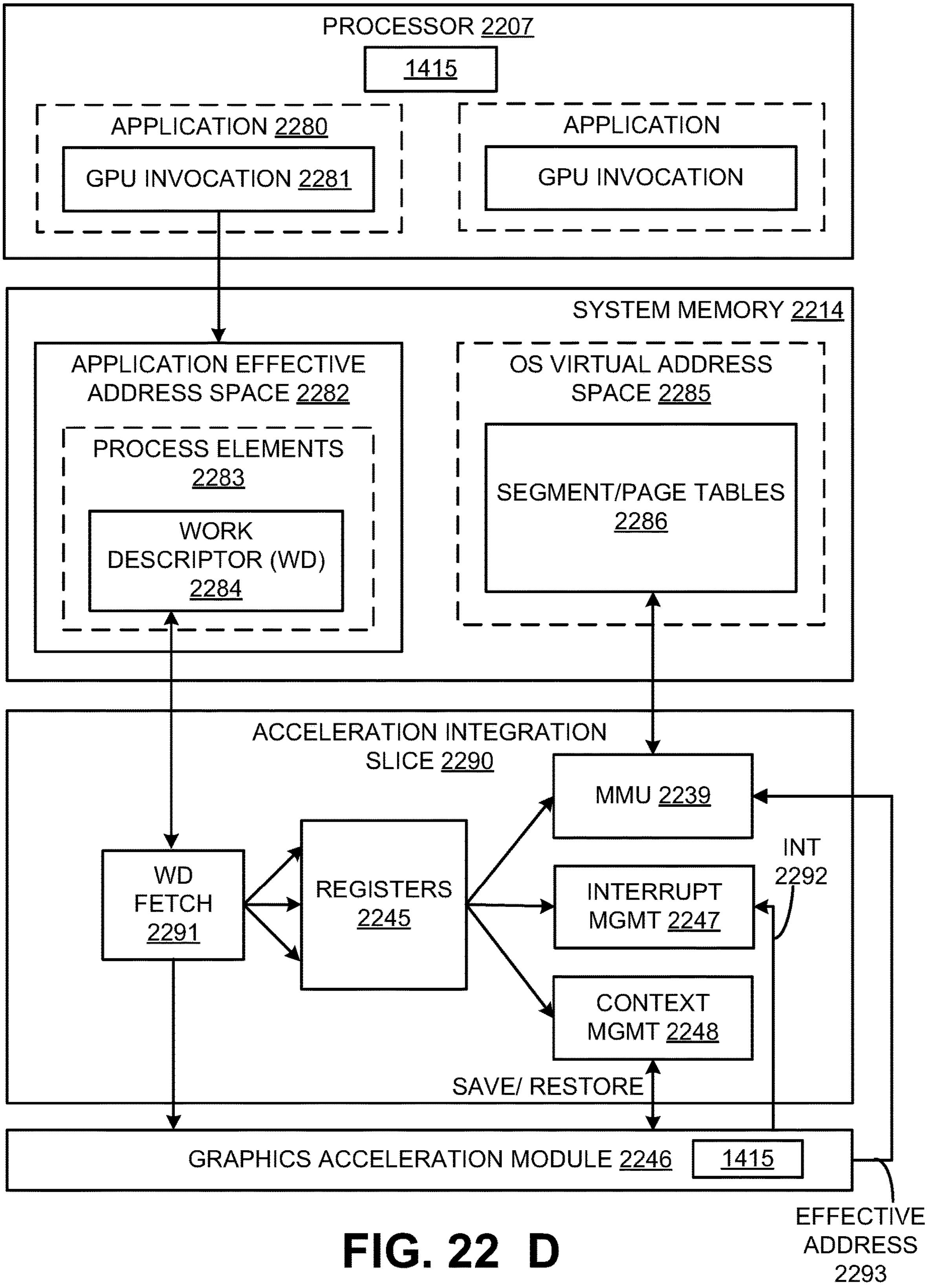
FIG. 22D illustrates a computer system, according to at least one embodiment.

FIG. 22D illustrates an exemplary accelerator integration slice 2290. In at least one embodiment, a "slice" comprises a specified portion of processing resources of accelerator integration circuit 2236. In at least one embodiment, an application is effective address space 2282 within system memory 2214 stores process elements 2283. In at least one embodiment, process elements 2283 are stored in response to GPU invocations 2281 from applications 2280 executed on processor 2207. In at least one embodiment, a process element 2283 contains process state for corresponding application 2280. In at least one embodiment, a work descriptor (WD) 2284 contained in process element 2283 can be a single job requested by an application or may contain a pointer to a queue of jobs. In at least one embodiment, WD 2284 is a pointer to a job request queue in an application's effective address space 2282.

In at least one embodiment, graphics acceleration module 2246 and/or individual graphics processing engines 2231 (1)-2231(N) can be shared by all or a subset of processes in a system. In at least one embodiment, an infrastructure for setting up process states and sending a WD 2284 to a graphics acceleration module 2246 to start a job in a virtualized environment may be included.

In at least one embodiment, a dedicated-process programming model is implementation-specific. In at least one embodiment, in this model, a single process owns graphics acceleration module 2246 or an individual graphics processing engine 2231. In at least one embodiment, when graphics acceleration module 2246 is owned by a single process, a hypervisor initializes accelerator integration circuit 2236 for an owning partition and an operating system initializes accelerator integration circuit 2236 for an owning process when graphics acceleration module 2246 is assigned.

In at least one embodiment, in operation, a WD fetch unit 2291 in accelerator integration slice 2290 fetches next WD 2284, which includes an indication of work to be done by one or more graphics processing engines of graphics acceleration module 2246. In at least one embodiment, data from WD 2284 may be stored in registers 2245 and used by MMU 2239, interrupt management circuit 2247 and/or context management circuit 2248 as illustrated. For example, one embodiment of MMU 2239 includes segment/page walk circuitry for accessing segment/page tables 2286 within an OS virtual address space 2285. In at least one embodiment, interrupt management circuit 2247 may process interrupt events 2292 received from graphics acceleration module 2246. In at least one embodiment, when performing graphics operations, an effective address 2293 generated by a graphics processing engine 2231(1)-2231(N) is translated to a real address by MMU 2239.

In at least one embodiment, registers 2245 are duplicated for each graphics processing engine 2231(1)-2231(N) and/or graphics acceleration module 2246 and may be initialized by a hypervisor or an operating system. In at least one embodiment, each of these duplicated registers may be included in an accelerator integration slice 2290. Exemplary registers that may be initialized by a hypervisor are shown in Table 1.

TABLE 1

Hypervisor Initialized Registers

| Register # | Description |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

Operating System Initialized Registers

| Register # | Description |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In at least one embodiment, each WD 2284 is specific to a particular graphics acceleration module 2246 and/or graphics processing engines 2231(1)-2231(N). In at least one embodiment, it contains all information required by a graphics processing engine 2231(1)-2231(N) to do work, or it can be a pointer to a memory location where an application has set up a command queue of work to be completed.

Figure 22E:
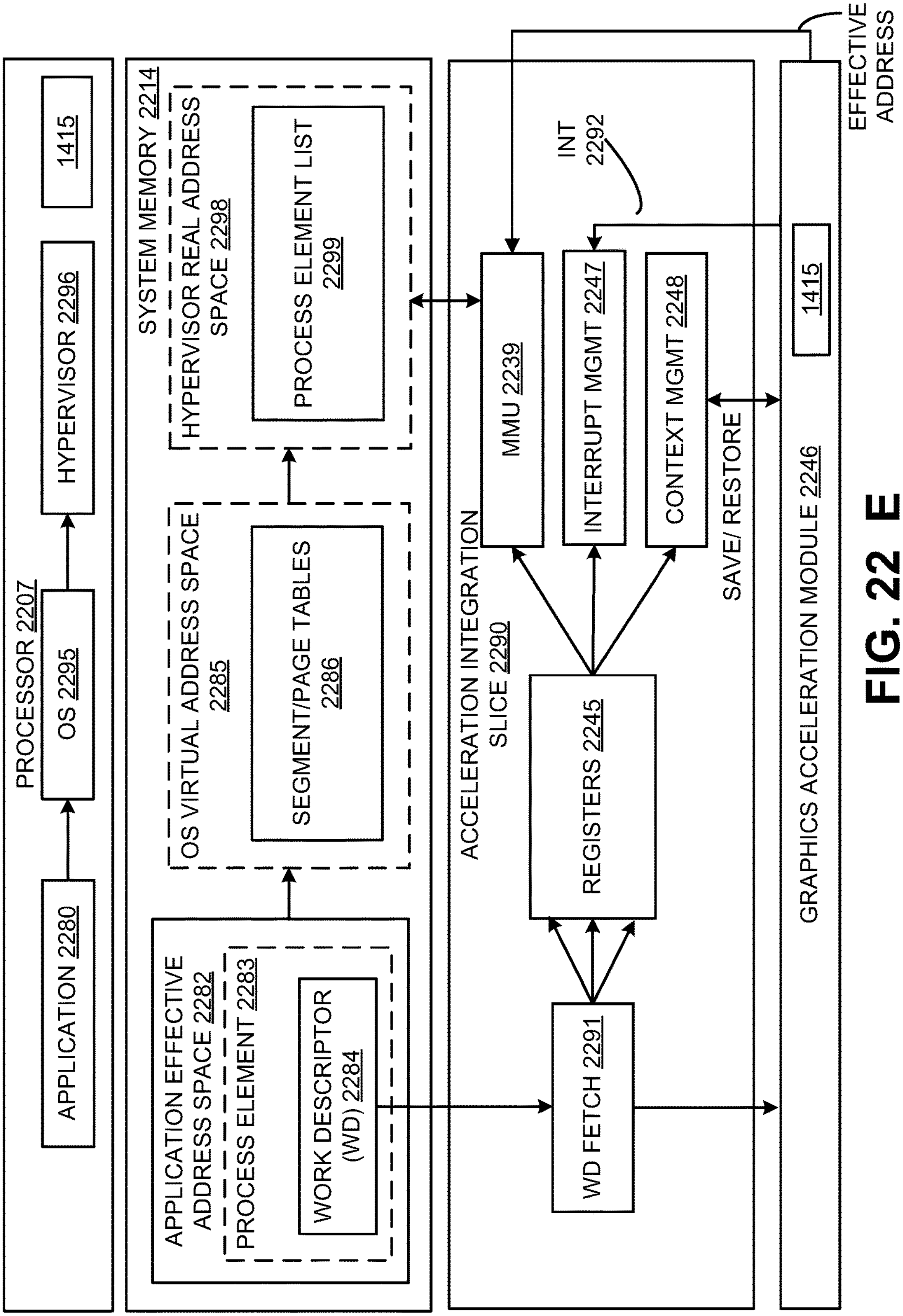
FIGS. 22E and 22F illustrate a shared programming model, according to at least one embodiment.

FIG. 22E illustrates additional details for one exemplary embodiment of a shared model. This embodiment includes a hypervisor real address space 2298 in which a process element list 2299 is stored. In at least one embodiment, hypervisor real address space 2298 is accessible via a hypervisor 2296 which virtualizes graphics acceleration module engines for operating system 2295.

In at least one embodiment, shared programming models allow for all or a subset of processes from all or a subset of partitions in a system to use a graphics acceleration module 2246. In at least one embodiment, there are two programming models where graphics acceleration module 2246 is shared by multiple processes and partitions, namely time-sliced shared and graphics directed shared.

In at least one embodiment, in this model, system hypervisor 2296 owns graphics acceleration module 2246 and makes its function available to all operating systems 2295. In at least one embodiment, for a graphics acceleration module 2246 to support virtualization by system hypervisor 2296, graphics acceleration module 2246 may adhere to certain requirements, such as (1) an application's job request must be autonomous (that is, state does not need to be maintained between jobs), or graphics acceleration module 2246 must provide a context save and restore mechanism, (2) an application's job request is guaranteed by graphics acceleration module 2246 to complete in a specified amount of time, including any translation faults, or graphics acceleration module 2246 provides an ability to preempt processing of a job, and (3) graphics acceleration module 2246 must be guaranteed fairness between processes when operating in a directed shared programming model.

In at least one embodiment, application 2280 is required to make an operating system 2295 system call with a graphics acceleration module type, a work descriptor (WD), an authority mask register (AMR) value, and a context save/restore area pointer (CSRP). In at least one embodiment, graphics acceleration module type describes a targeted acceleration function for a system call. In at least one embodiment, graphics acceleration module type may be a system-specific value. In at least one embodiment, WD is formatted specifically for graphics acceleration module 2246 and can be in a form of a graphics acceleration module 2246 command, an effective address pointer to a user-defined structure, an effective address pointer to a queue of commands, or any other data structure to describe work to be done by graphics acceleration module 2246.

In at least one embodiment, an AMR value is an AMR state to use for a current process. In at least one embodiment, a value passed to an operating system is similar to an application setting an AMR. In at least one embodiment, if accelerator integration circuit 2236 (not shown) and graphics acceleration module 2246 implementations do not support a User Authority Mask Override Register (UAMOR), an operating system may apply a current UAMOR value to an AMR value before passing an AMR in a hypervisor call. In at least one embodiment, hypervisor 2296 may optionally apply a current Authority Mask Override Register (AMOR) value before placing an AMR into process element 2283. In at least one embodiment, CSRP is one of registers 2245 containing an effective address of an area in an application's effective address space 2282 for graphics acceleration module 2246 to save and restore context state. In at least one embodiment, this pointer is optional if no state is required to be saved between jobs or when a job is preempted. In at least one embodiment, context save/restore area may be pinned system memory.

Upon receiving a system call, operating system 2295 may verify that application 2280 has registered and been given authority to use graphics acceleration module 2246. In at least one embodiment, operating system 2295 then calls hypervisor 2296 with information shown in Table 3.

TABLE 3

OS to Hypervisor Call Parameters

| Parameter # | Description |
|---|---|
| 1 | A work descriptor (WD) |
| 2 | An Authority Mask Register (AMR) value (potentially masked) |
| 3 | An effective address (EA) Context Save/Restore |
| 4 | A process ID (PID) and optional thread ID (TID) Area Pointer (CSRP) |
| 5 | A virtual address (VA) accelerator utilization record pointer (AURP) |
| 6 | Virtual address of storage segment table pointer (SSTP) |
| 7 | A logical interrupt service number (LISN) |

In at least one embodiment, upon receiving a hypervisor call, hypervisor 2296 verifies that operating system 2295 has registered and been given authority to use graphics acceleration module 2246. In at least one embodiment, hypervisor 2296 then puts process element 2283 into a process element linked list for a corresponding graphics acceleration module 2246 type. In at least one embodiment, a process element may include information shown in Table 4.

TABLE 4

Process Element Information

| Element # | Description |
|---|---|
| 1 | A work descriptor (WD) |
| 2 | An Authority Mask Register (AMR) value (potentially masked). |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |
| 8 | Interrupt vector table, derived from hypervisor call parameters |
| 9 | A state register (SR) value |
| 10 | A logical partition ID (LPID) |
| 11 | A real address (RA) hypervisor accelerator utilization record pointer |
| 12 | Storage Descriptor Register (SDR) |

In at least one embodiment, hypervisor initializes a plurality of accelerator integration slice 2290 registers 2245.

Figure 22F:
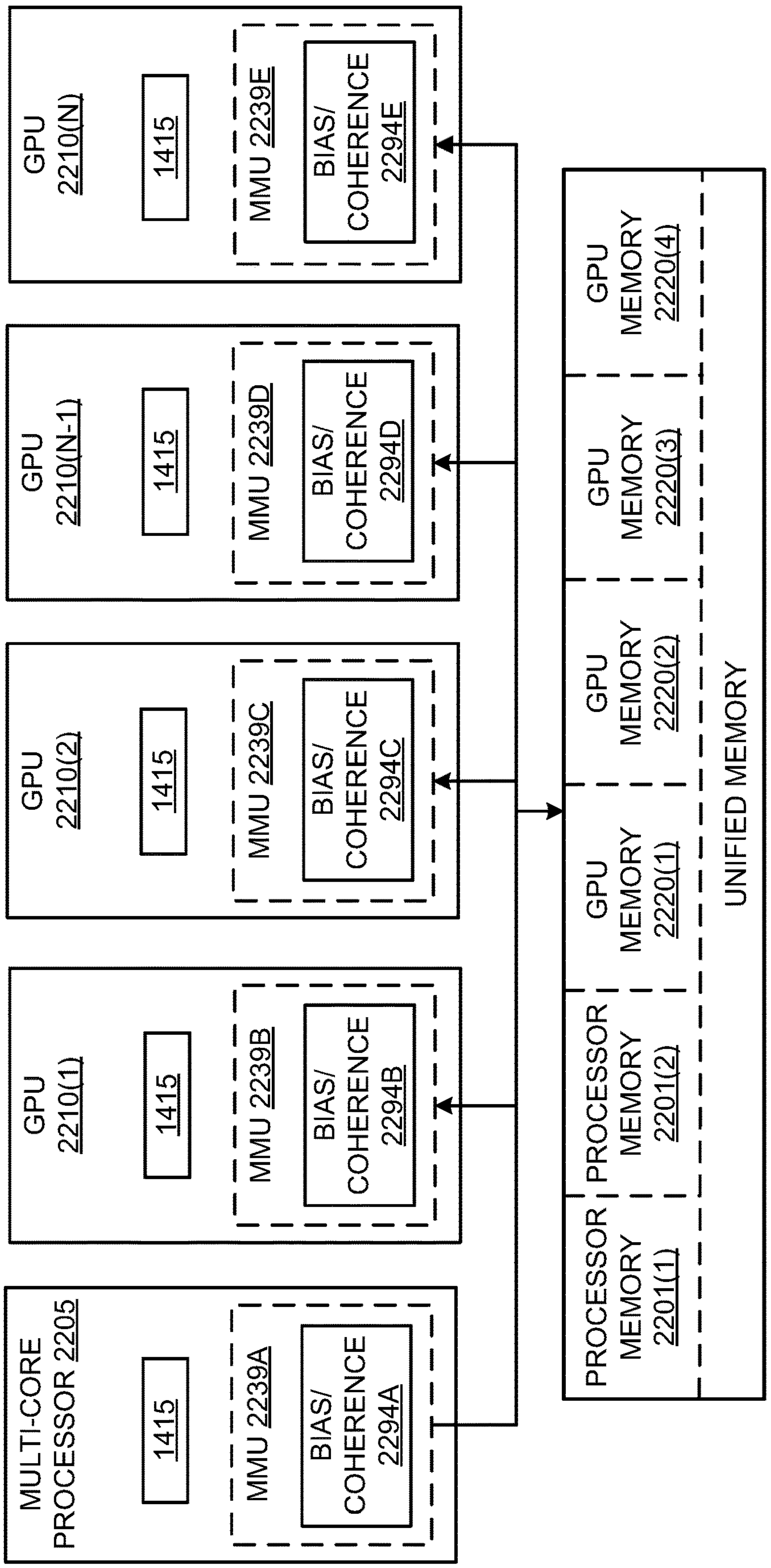

As illustrated in FIG. 22F, in at least one embodiment, a unified memory is used, addressable via a common virtual memory address space used to access physical processor memories 2201(1)-2201(N) and GPU memories 2220(1)-2220(N). In this implementation, operations executed on GPUs 2210(1)-2210(N) utilize a same virtual/effective memory address space to access processor memories 2201(1)-2201(M) and vice versa, thereby simplifying programmability. In at least one embodiment, a first portion of a virtual/effective address space is allocated to processor memory 2201(1), a second portion to second processor memory 2201(N), a third portion to GPU memory 2220(1), and so on. In at least one embodiment, an entire virtual/effective memory space (sometimes referred to as an effective address space) is thereby distributed across each of processor memories 2201 and GPU memories 2220, allowing any processor or GPU to access any physical memory with a virtual address mapped to that memory.

In at least one embodiment, bias/coherence management circuitry 2294A-2294E within one or more of MMUs 2239A-2239E ensures cache coherence between caches of one or more host processors (e.g., 2205) and GPUs 2210 and implements biasing techniques indicating physical memories in which certain types of data should be stored. In at least one embodiment, while multiple instances of bias/coherence management circuitry 2294A-2294E are illustrated in FIG. 22F, bias/coherence circuitry may be implemented within an MMU of one or more host processors 2205 and/or within accelerator integration circuit 2236.

One embodiment allows GPU memories 2220 to be mapped as part of system memory, and accessed using shared virtual memory (SVM) technology, but without suffering performance drawbacks associated with full system cache coherence. In at least one embodiment, an ability for GPU memories 2220 to be accessed as system memory without onerous cache coherence overhead provides a beneficial operating environment for GPU offload. In at least one embodiment, this arrangement allows software of host processor 2205 to setup operands and access computation results, without overhead of tradition I/O DMA data copies. In at least one embodiment, such traditional copies involve driver calls, interrupts and memory mapped I/O (MMIO) accesses that are all inefficient relative to simple memory accesses. In at least one embodiment, an ability to access GPU memories 2220 without cache coherence overheads can be critical to execution time of an offloaded computation. In at least one embodiment, in cases with substantial streaming write memory traffic, for example, cache coherence overhead can significantly reduce an effective write bandwidth seen by a GPU 2210. In at least one embodiment, efficiency of operand setup, efficiency of results access, and efficiency of GPU computation may play a role in determining effectiveness of a GPU offload.

In at least one embodiment, selection of GPU bias and host processor bias is driven by a bias tracker data structure. In at least one embodiment, a bias table may be used, for example, which may be a page-granular structure (e.g., controlled at a granularity of a memory page) that includes 1 or 2 bits per GPU-attached memory page. In at least one embodiment, a bias table may be implemented in a stolen memory range of one or more GPU memories 2220, with or without a bias cache in a GPU 2210 (e.g., to cache frequently/recently used entries of a bias table). Alternatively, in at least one embodiment, an entire bias table may be maintained within a GPU.

In at least one embodiment, a bias table entry associated with each access to a GPU attached memory 2220 is accessed prior to actual access to a GPU memory, causing following operations. In at least one embodiment, local requests from a GPU 2210 that find their page in GPU bias are forwarded directly to a corresponding GPU memory 2220. In at least one embodiment, local requests from a GPU that find their page in host bias are forwarded to processor 2205 (e.g., over a high-speed link as described herein). In at least one embodiment, requests from processor 2205 that find a requested page in host processor bias complete a request like a normal memory read. Alternatively, requests directed to a GPU-biased page may be forwarded to a GPU 2210. In at least one embodiment, a GPU may then transition a page to a host processor bias if it is not currently using a page. In at least one embodiment, a bias state of a page can be changed either by a software-based mechanism, a hardware-assisted software-based mechanism, or, for a limited set of cases, a purely hardware-based mechanism.

In at least one embodiment, one mechanism for changing bias state employs an API call (e.g., OpenCL), which, in turn, calls a GPU's device driver which, in turn, sends a message (or enqueues a command descriptor) to a GPU directing it to change a bias state and, for some transitions, perform a cache flushing operation in a host. In at least one embodiment, a cache flushing operation is used for a transition from host processor 2205 bias to GPU bias, but is not for an opposite transition.

In at least one embodiment, cache coherency is maintained by temporarily rendering GPU-biased pages uncacheable by host processor 2205. In at least one embodiment, to access these pages, processor 2205 may request access from GPU 2210, which may or may not grant access right away. In at least one embodiment, thus, to reduce communication between processor 2205 and GPU 2210 it is beneficial to ensure that GPU-biased pages are those which are required by a GPU but not host processor 2205 and vice versa.

Hardware structure(s) 1415 are used to perform one or more embodiments. Details regarding a hardware structure(s) 1415 may be provided herein in conjunction with FIGS. 14A and/or 14B.

Figure 23:
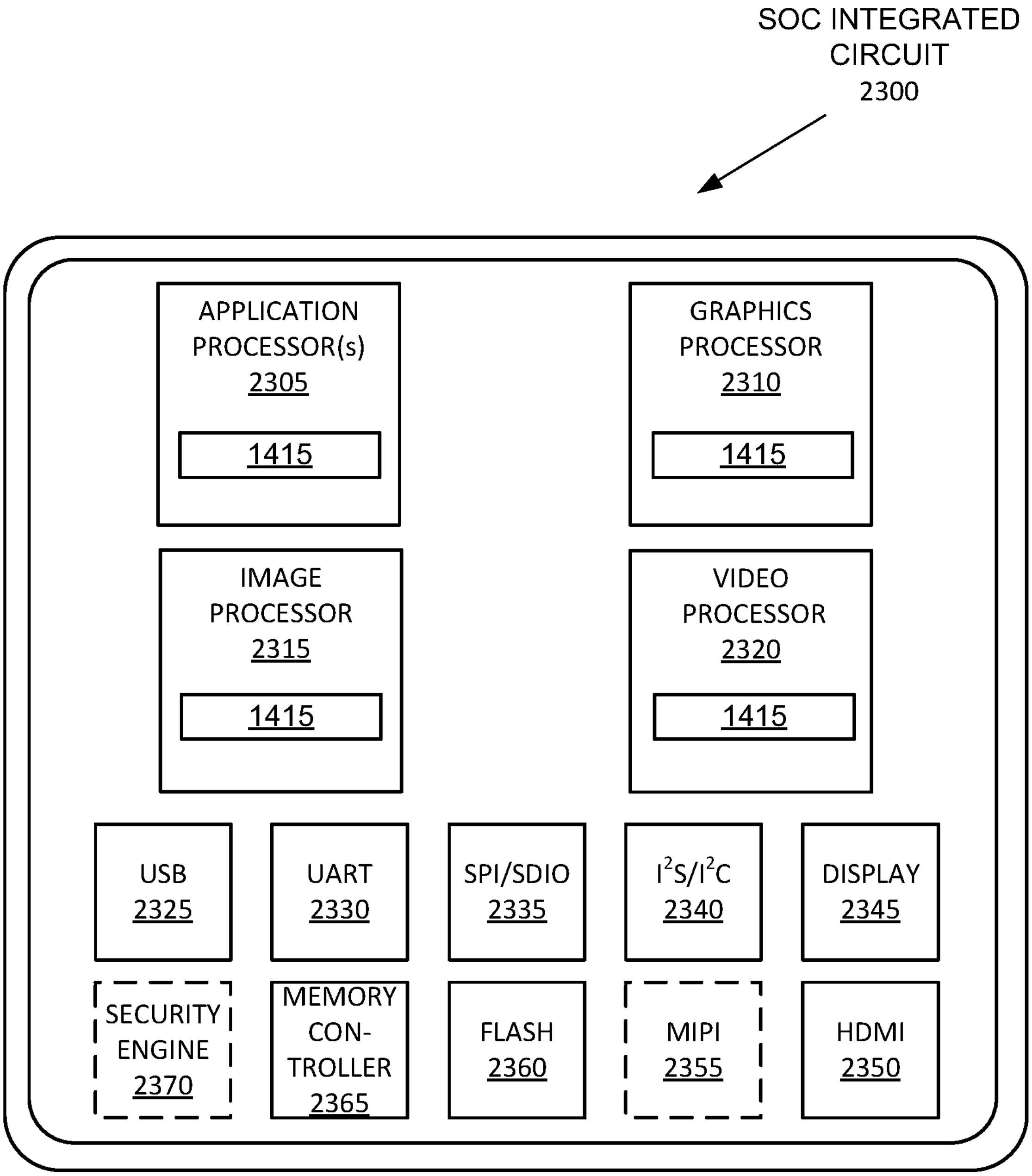
FIG. 23 illustrates exemplary integrated circuits and associated graphics processors, according to at least one embodiment.

FIG. 23 illustrates exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIG. 23 is a block diagram illustrating an exemplary system on a chip integrated circuit 2300 that may be fabricated using one or more IP cores, according to at least one embodiment. In at least one embodiment, integrated circuit 2300 includes one or more application processor(s) 2305 (e.g., CPUs), at least one graphics processor 2310, and may additionally include an image processor 2315 and/or a video processor 2320, any of which may be a modular IP core. In at least one embodiment, integrated circuit 2300 includes peripheral or bus logic including a USB controller 2325, a UART controller 2330, an SPI/SDIO controller 2335, and an $I^2S/I^2C$ controller 2340. In at least one embodiment, integrated circuit 2300 can include a display device 2345 coupled to one or more of a high-definition multimedia interface (HDMI) controller 2350 and a mobile industry processor interface (MIPI) display interface 2355. In at least one embodiment, storage may be provided by a flash memory subsystem 2360 including flash memory and a flash memory controller. In at least one embodiment, a memory interface may be provided via a memory controller 2365 for access to SDRAM or SRAM memory devices. In at least one embodiment, some integrated circuits additionally include an embedded security engine 2370.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, inference and/or training logic 1415 may be used in integrated circuit 2300 for inferencing or predicting operations based, at least in part, on weight parameters calculated using neural network training operations, neural network functions and/or architectures, or neural network use cases described herein.

In at least one embodiment, such components can be utilized to generate one or more objects within one or more second images based, at least in part, on one or more features of the one or more objects within one or more first images.

Figure 24A:
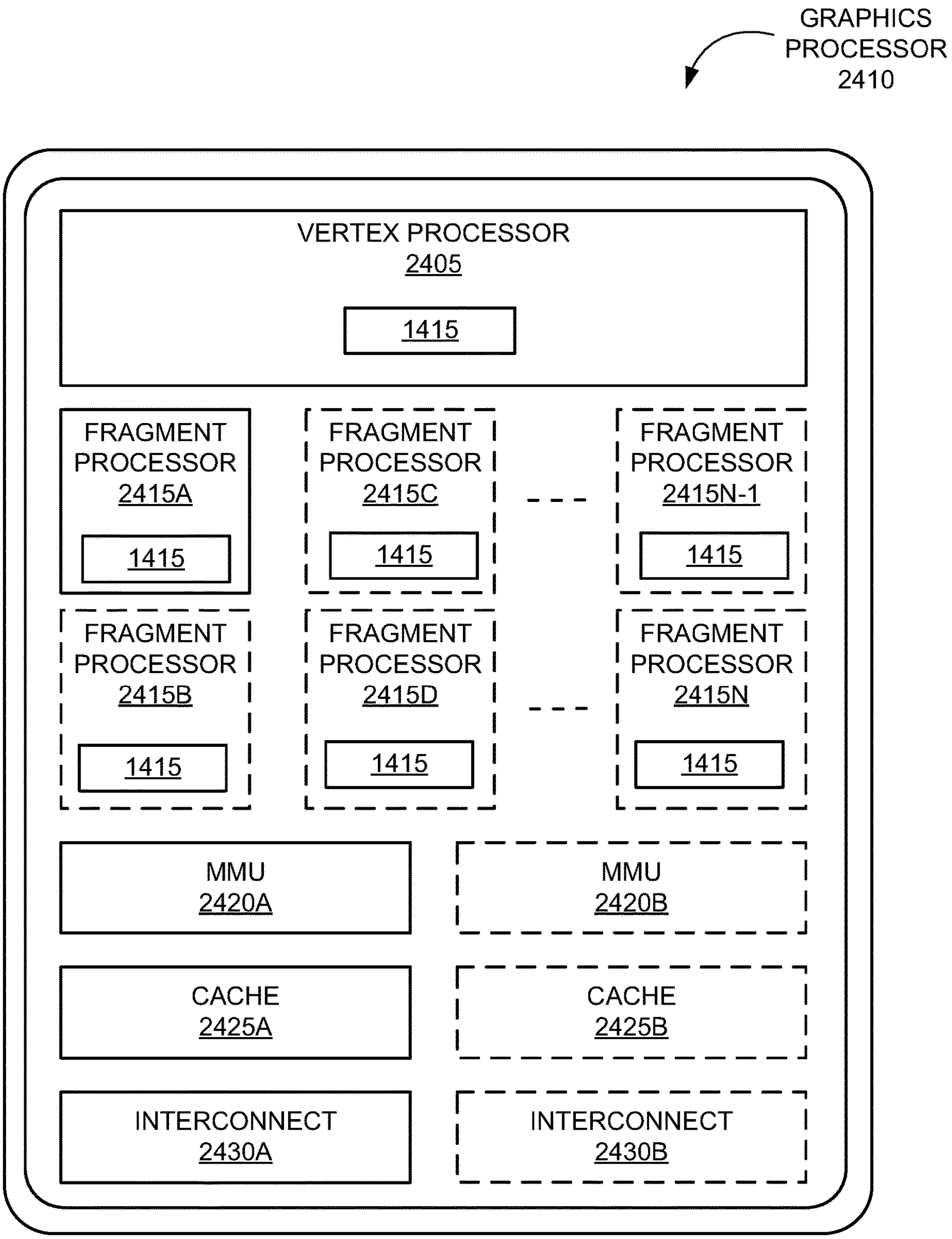
FIGS. 24A-24B illustrate exemplary integrated circuits and associated graphics processors, according to at least one embodiment.
Figure 24B:
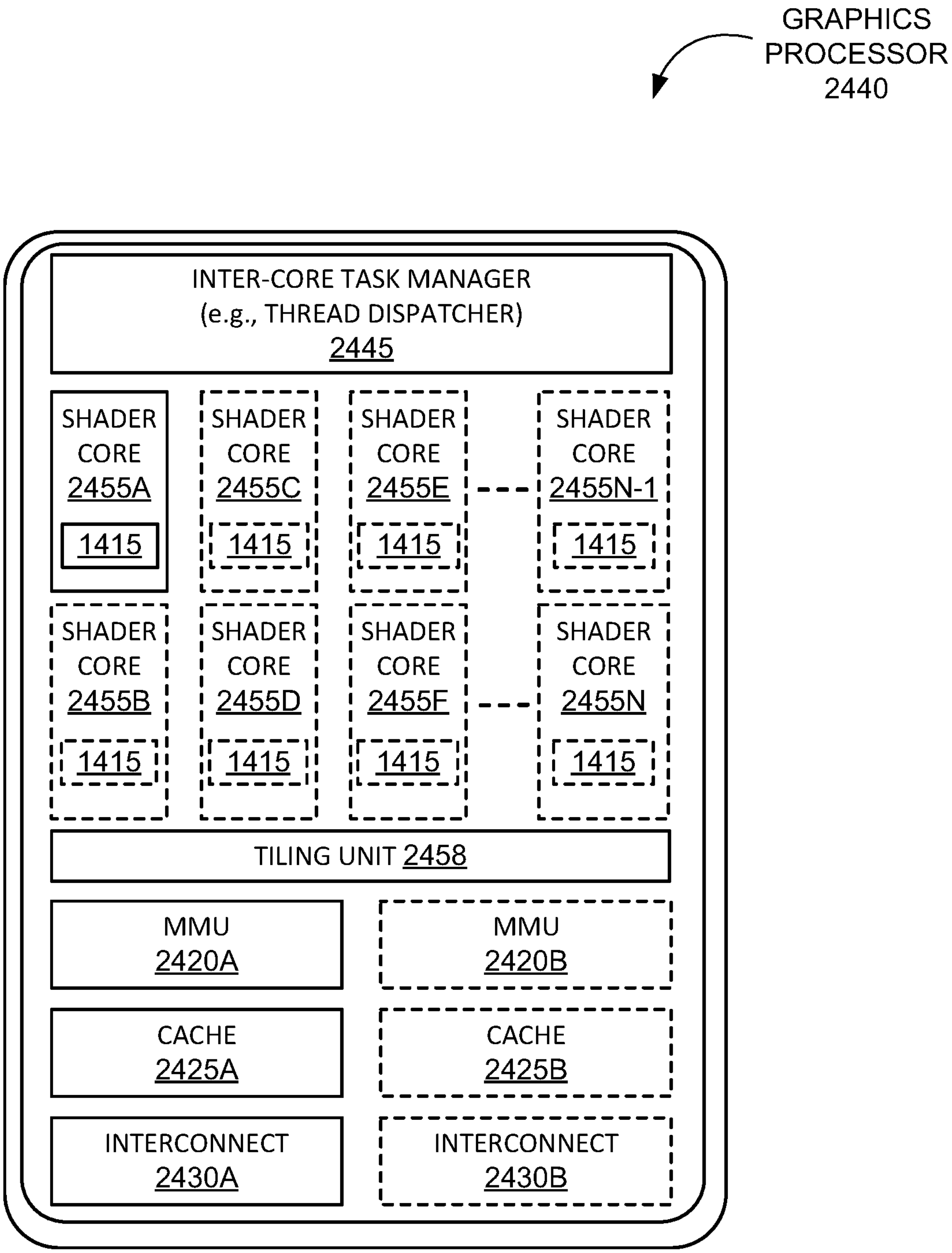

FIGS. 24A-24B illustrate exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIGS. 24A-24B are block diagrams illustrating exemplary graphics processors for use within an SoC, according to embodiments described herein. FIG. 24A illustrates an exemplary graphics processor 2410 of a system on a chip integrated circuit that may be fabricated using one or more IP cores, according to at least one embodiment. FIG. 24B illustrates an additional exemplary graphics processor 2440 of a system on a chip integrated circuit that may be fabricated using one or more IP cores, according to at least one embodiment. In at least one embodiment, graphics processor 2410 of FIG. 24A is a low power graphics processor core. In at least one embodiment, graphics processor 2440 of FIG. 24B is a higher performance graphics processor core. In at least one embodiment, each of graphics processors 2410, 2440 can be variants of graphics processor 2310 of FIG. 23.

In at least one embodiment, graphics processor 2410 includes a vertex processor 2405 and one or more fragment processor(s) 2415A-2415N (e.g., 2415A, 2415B, 2415C, 2415D, through 2415N−1, and 2415N). In at least one embodiment, graphics processor 2410 can execute different shader programs via separate logic, such that vertex processor 2405 is optimized to execute operations for vertex shader programs, while one or more fragment processor(s) 2415A-2415N execute fragment (e.g., pixel) shading operations for fragment or pixel shader programs. In at least one embodiment, vertex processor 2405 performs a vertex processing stage of a 3D graphics pipeline and generates primitives and vertex data. In at least one embodiment, fragment processor(s) 2415A-2415N use primitive and vertex data generated by vertex processor 2405 to produce a framebuffer that is displayed on a display device. In at least one embodiment, fragment processor(s) 2415A-2415N are optimized to execute fragment shader programs as provided for in an OpenGL API, which may be used to perform similar operations as a pixel shader program as provided for in a Direct 3D API.

In at least one embodiment, graphics processor 2410 additionally includes one or more memory management units (MMUs) 2420A-2420B, cache(s) 2425A-2425B, and circuit interconnect(s) 2430A-2430B. In at least one embodiment, one or more MMU(s) 2420A-2420B provide for virtual to physical address mapping for graphics processor 2410, including for vertex processor 2405 and/or fragment processor(s) 2415A-2415N, which may reference vertex or image/texture data stored in memory, in addition to vertex or image/texture data stored in one or more cache(s) 2425A-2425B. In at least one embodiment, one or more MMU(s) 2420A-2420B may be synchronized with other MMUs within a system, including one or more MMUs associated with one or more application processor(s) 2305, image processors 2315, and/or video processors 2320 of FIG. 23, such that each processor 2305-2320 can participate in a shared or unified virtual memory system. In at least one embodiment, one or more circuit interconnect(s) 2430A-2430B enable graphics processor 2410 to interface with other IP cores within SoC, either via an internal bus of SoC or via a direct connection.

In at least one embodiment, graphics processor 2440 includes one or more shader core(s) 2455A-2455N (e.g., 2455A, 2455B, 2455C, 2455D, 2455E, 2455F, through 2455N−1, and 2455N) as shown in FIG. 24B, which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 2440 includes an inter-core task manager 2445, which acts as a thread dispatcher to dispatch execution threads to one or more shader cores 2455A-2455N and a tiling unit 2458 to accelerate tiling operations for tile-based rendering, in which rendering operations for a scene are subdivided in image space, for example to exploit local spatial coherence within a scene or to optimize use of internal caches.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, inference and/or training logic 1415 may be used in integrated circuit 24A and/or 24B for inferencing or predicting operations based, at least in part, on weight parameters calculated using neural network training operations, neural network functions and/or architectures, or neural network use cases described herein.

In at least one embodiment, such components can be utilized to generate one or more objects within one or more second images based, at least in part, on one or more features of the one or more objects within one or more first images.

Figure 25A:
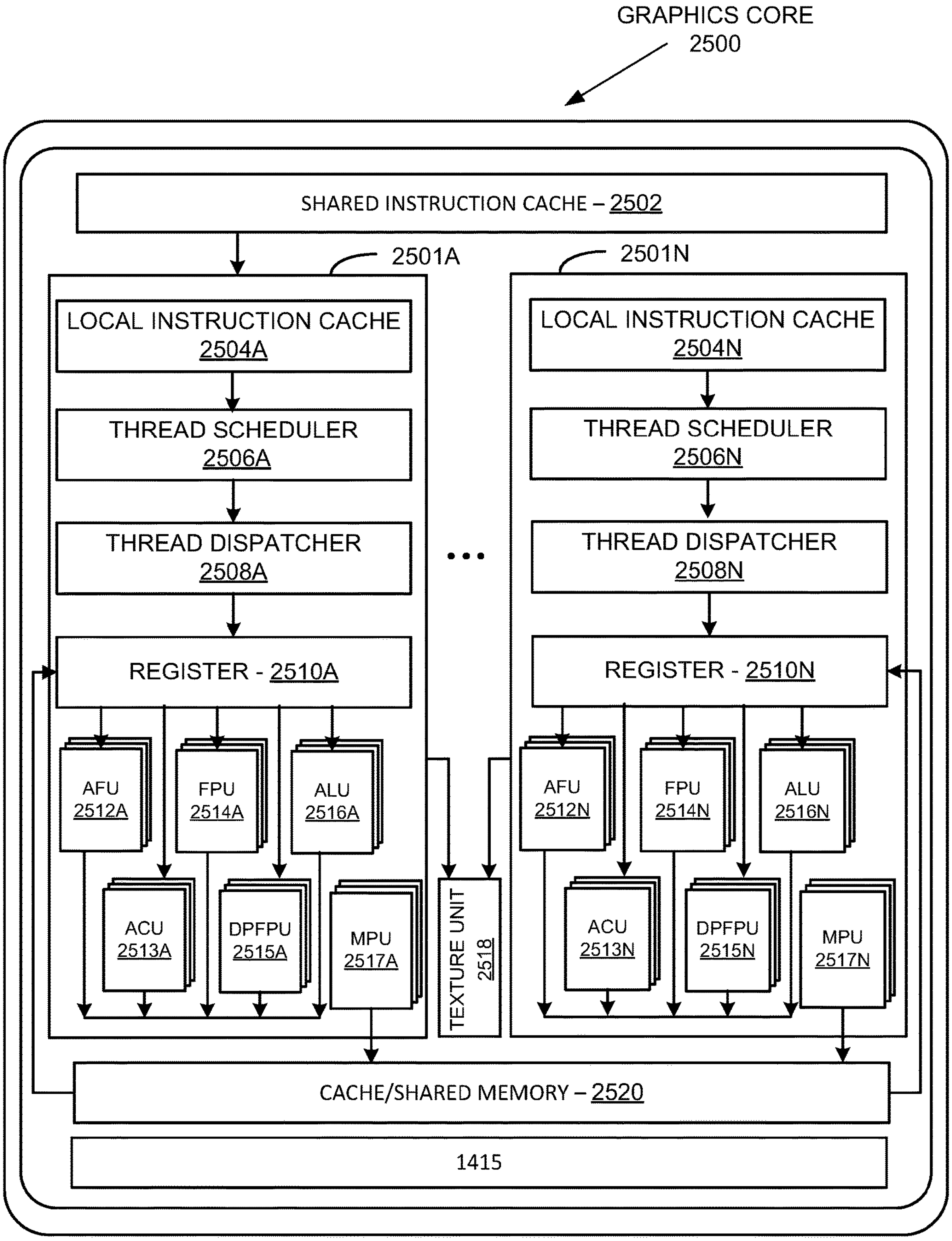
FIGS. 25A-25B illustrate additional exemplary graphics processor logic according to at least one embodiment.
Figure 25B:
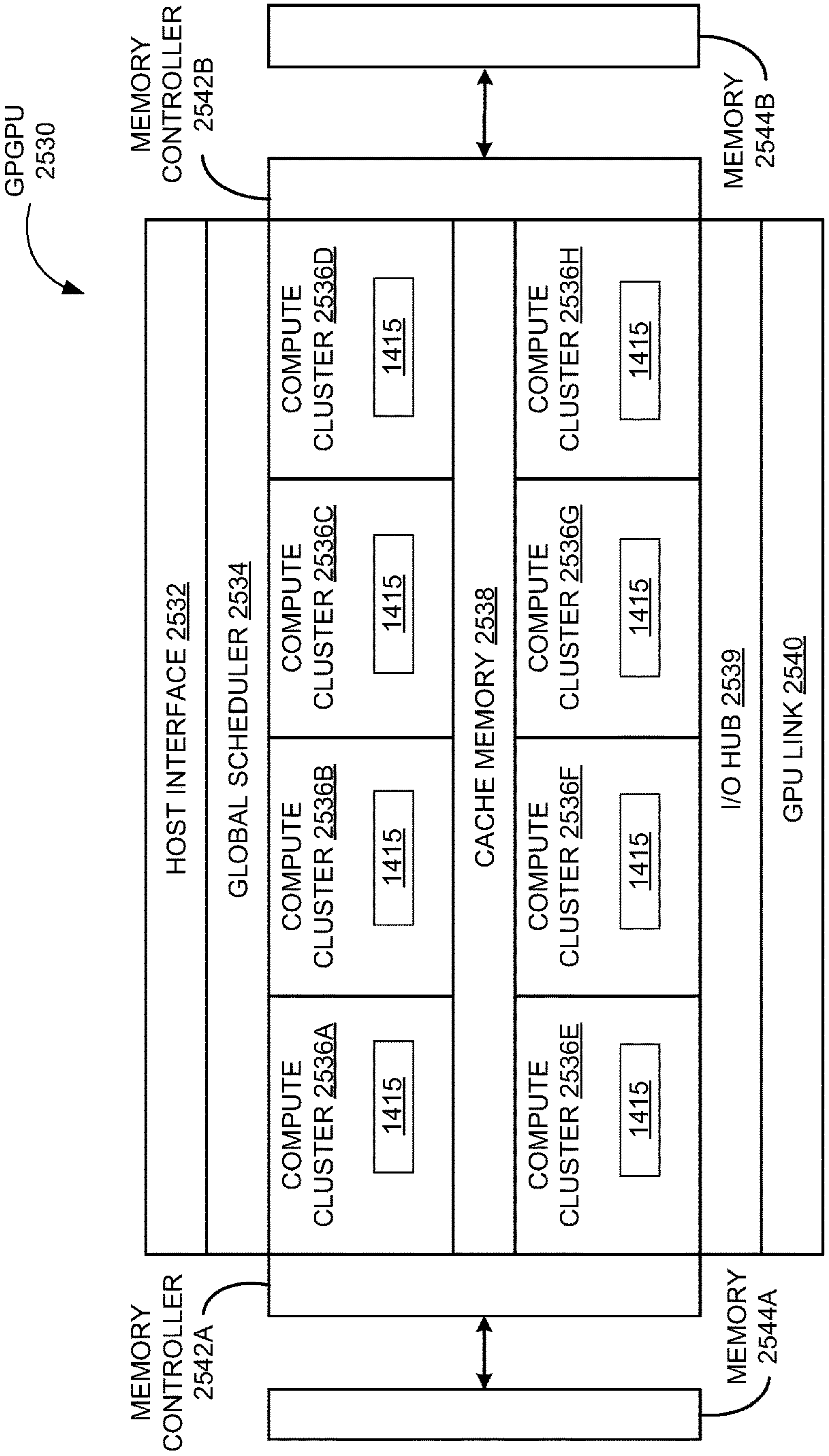

FIGS. 25A-25B illustrate additional exemplary graphics processor logic according to embodiments described herein. FIG. 25A illustrates a graphics core 2500 that may be included within graphics processor 2310 of FIG. 23, in at least one embodiment, and may be a unified shader core 2455A-2455N as in FIG. 24B in at least one embodiment. FIG. 25B illustrates a highly-parallel general-purpose graphics processing unit ("GPGPU") 2530 suitable for deployment on a multi-chip module in at least one embodiment.

In at least one embodiment, graphics core 2500 includes a shared instruction cache 2502, a texture unit 2518, and a cache/shared memory 2520 (e.g., including L1, L2, L3, last level cache, or other caches) that are common to execution resources within graphics core 2500. In at least one embodiment, graphics core 2500 can include multiple slices 2501A-2501N or a partition for each core, and a graphics processor can include multiple instances of graphics core 2500. In at least one embodiment, each slice 2501A-2501N refers to graphics core 2500. In at least one embodiment, slices 2501A-2501N have sub-slices, which are part of a slice 2501A-2501N. In at least one embodiment, slices 2501A-2501N are independent of other slices or dependent on other slices. In at least one embodiment, slices 2501A-2501N can include support logic including a local instruction cache 2504A-2504N, a thread scheduler (sequencer) 2506A-2506N, a thread dispatcher 2508A-2508N, and a set of registers 2510A-2510N. In at least one embodiment, slices 2501A-2501N can include a set of additional function units (AFUs 2512A-2512N), floating-point units (FPUs 2514A-2514N), integer arithmetic logic units (ALUs 2516A-2516N), address computational units (ACUs 2513A-2513N), double-precision floating-point units (DPFPUs 2515A-2515N), and matrix processing units (MPUs 2517A-2517N).

In at least one embodiment, each slice 2501A-2501N includes one or more engines for floating point and integer vector operations and one or more engines to accelerate convolution and matrix operations in AI, machine learning, or large dataset workloads. In at least one embodiment, one or more slices 2501A-2501N include one or more vector engines to compute a vector (e.g., compute mathematical operations for vectors). In at least one embodiment, a vector engine can compute a vector operation in 16-bit floating point (also referred to as "FP16"), 32-bit floating point (also referred to as "FP32"), or 64-bit floating point (also referred to as "FP64"). In at least one embodiment, one or more slices 2501A-2501N includes 16 vector engines that are paired with 16 matrix math units to compute matrix/tensor operations, where vector engines and math units are exposed via matrix extensions. In at least one embodiment, a slice a specified portion of processing resources of a processing unit, e.g., 16 cores and a ray tracing unit or 8 cores, a thread scheduler, a thread dispatcher, and additional functional units for a processor. In at least one embodiment, graphics core 2500 includes one or more matrix engines to compute matrix operations, e.g., when computing tensor operations.

In at least one embodiment, one or more slices 2501A-2501N includes one or more ray tracing units to compute ray tracing operations (e.g., 16 ray tracing units per slice slices 2501A-2501N). In at least one embodiment, a ray tracing unit computes ray traversal, triangle intersection, bounding box intersect, or other ray tracing operations.

In at least one embodiment, one or more slices 2501A-2501N includes a media slice that encodes, decodes, and/or transcodes data; scales and/or format converts data; and/or performs video quality operations on video data.

In at least one embodiment, one or more slices 2501A-2501N are linked to L2 cache and memory fabric, link connectors, high-bandwidth memory (HBM) (e.g., HBM2e, HDM3) stacks, and a media engine. In at least one embodiment, one or more slices 2501A-2501N include multiple cores (e.g., 16 cores) and multiple ray tracing units (e.g., 16) paired to each core. In at least one embodiment, one or more slices 2501A-2501N has one or more L1 caches. In at least one embodiment, one or more slices 2501A-2501N include one or more vector engines; one or more instruction caches to store instructions; one or more L1 caches to cache data; one or more shared local memories (SLMs) to store data, e.g., corresponding to instructions; one or more samplers to sample data; one or more ray tracing units to perform ray tracing operations; one or more geometries to perform operations in geometry pipelines and/or apply geometric transformations to vertices or polygons; one or more rasterizers to describe an image in vector graphics format (e.g., shape) and convert it into a raster image (e.g., a series of pixels, dots, or lines, which when displayed together, create an image that is represented by shapes); one or more a Hierarchical Depth Buffer (Hiz) to buffer data; and/or one or more pixel backends. In at least one embodiment, a slice 2501A-2501N includes a memory fabric, e.g., an L2 cache.

In at least one embodiment, FPUs 2514A-2514N can perform single-precision (32-bit) and half-precision (16-bit) floating point operations, while DPFPUs 2515A-2515N perform double precision (64-bit) floating point operations. In at least one embodiment, ALUs 2516A-2516N can perform variable precision integer operations at 8-bit, 16-bit, and 32-bit precision, and can be configured for mixed precision operations. In at least one embodiment, MPUs 2517A-2517N can also be configured for mixed precision matrix operations, including half-precision floating point and 8-bit integer operations. In at least one embodiment, MPUs 2517-2517N can perform a variety of matrix operations to accelerate machine learning application frameworks, including enabling support for accelerated general matrix to matrix multiplication (GEMM). In at least one embodiment, AFUs 2512A-2512N can perform additional logic operations not supported by floating-point or integer units, including trigonometric operations (e.g., sine, cosiInference and/or training logic 1415 are used to perform inferencing and/or training operations associated with one or more embodiments. Details regarding inference and/or training logic 1415 are provided herein in conjunction with FIGS. 14A and/or 14B. In at least one embodiment, inference and/or training logic 1415 may be used in graphics core 2500 for inferencing or predicting operations based, at least in part, on weight parameters calculated using neural network training operations, neural network functions and/or architectures, or neural network use cases described herein.

In at least one embodiment, graphics core 2500 includes an interconnect and a link fabric sublayer that is attached to a switch and a GPU-GPU bridge that enables multiple graphics processors 2500 (e.g., 8) to be interlinked without glue to each other with load/store units (LSUs), data transfer units, and sync semantics across multiple graphics processors 2500. In at least one embodiment, interconnects include standardized interconnects (e.g., PCIe) or some combination thereof.

In at least one embodiment, graphics core 2500 includes multiple tiles. In at least one embodiment, a tile is an individual die or one or more dies, where individual dies can be connected with an interconnect (e.g., embedded multi-die interconnect bridge (EMIB)). In at least one embodiment, graphics core 2500 includes a compute tile, a memory tile (e.g., where a memory tile can be exclusively accessed by different tiles or different chipsets such as a Rambo tile), substrate tile, a base tile, a HMB tile, a link tile, and EMIB tile, where all tiles are packaged together in graphics core 2500 as part of a GPU. In at least one embodiment, graphics core 2500 can include multiple tiles in a single package (also referred to as a "multi tile package"). In at least one embodiment, a compute tile can have 8 graphics cores 2500, an L1 cache; and a base tile can have a host interface with PCIe 5.0, HBM2e, MDFI, and EMIB, a link tile with 8 links, 8 ports with an embedded switch. In at least one embodiment, tiles are connected with face-to-face (F2F) chip-on-chip bonding through fine-pitched, 36-micron, microbumps (e.g., copper pillars). In at least one embodiment, graphics core 2500 includes memory fabric, which includes memory, and is tile that is accessible by multiple tiles. In at least one embodiment, graphics core 2500 stores, accesses, or loads its own hardware contexts in memory, where a hardware context is a set of data loaded from registers before a process resumes, and where a hardware context can indicate a state of hardware (e.g., state of a GPU).

In at least one embodiment, graphics core 2500 includes serializer/deserializer (SERDES) circuitry that converts a serial data stream to a parallel data stream, or converts a parallel data stream to a serial data stream.

In at least one embodiment, graphics core 2500 includes a high speed coherent unified fabric (GPU to GPU), load/store units, bulk data transfer and sync semantics, and connected GPUs through an embedded switch, where a GPU-GPU bridge is controlled by a controller.

In at least one embodiment, graphics core 2500 performs an API, where said API abstracts hardware of graphics core 2500 and access libraries with instructions to perform math operations (e.g., math kernel library), deep neural network operations (e.g., deep neural network library), vector operations, collective communications, thread building blocks, video processing, data analytics library, and/or ray tracing operations.

In at least one embodiment, such components can be utilized to generate one or more objects within one or more second images based, at least in part, on one or more features of the one or more objects within one or more first images.

FIG. 25B illustrates a general-purpose processing unit (GPGPU) 2530 that can be configured to enable highly-parallel compute operations to be performed by an array of graphics processing units, in at least one embodiment. In at least one embodiment, GPGPU 2530 can be linked directly to other instances of GPGPU 2530 to create a multi-GPU cluster to improve training speed for deep neural networks. In at least one embodiment, GPGPU 2530 includes a host interface 2532 to enable a connection with a host processor. In at least one embodiment, host interface 2532 is a PCI Express interface. In at least one embodiment, host interface 2532 can be a vendor-specific communications interface or communications fabric. In at least one embodiment, GPGPU 2530 receives commands from a host processor and uses a global scheduler 2534 (which may be referred to as a thread sequencer and/or asynchronous compute engine) to distribute execution threads associated with those commands to a set of compute clusters 2536A-2536H. In at least one embodiment, compute clusters 2536A-2536H share a cache memory 2538. In at least one embodiment, cache memory 2538 can serve as a higher-level cache for cache memories within compute clusters 2536A-2536H.

In at least one embodiment, GPGPU 2530 includes memory 2544A-2544B coupled with compute clusters 2536A-2536H via a set of memory controllers 2542A-2542B (e.g., one or more controllers for HBM2e). In at least one embodiment, memory 2544A-2544B can include various types of memory devices including dynamic random access memory (DRAM) or graphics random access memory, such as synchronous graphics random access memory (SGRAM), including graphics double data rate (GDDR) memory.

In at least one embodiment, compute clusters 2536A-2536H each include a set of graphics cores, such as graphics core 2500 of FIG. 25A, which can include multiple types of integer and floating point logic units that can perform computational operations at a range of precisions including suited for machine learning computations. For example, in at least one embodiment, at least a subset of floating point units in each of compute clusters 2536A-2536H can be configured to perform 16-bit or 32-bit floating point operations, while a different subset of floating point units can be configured to perform 64-bit floating point operations.

In at least one embodiment, multiple instances of GPGPU 2530 can be configured to operate as a compute cluster. In at least one embodiment, communication used by compute clusters 2536A-2536H for synchronization and data exchange varies across embodiments. In at least one embodiment, multiple instances of GPGPU 2530 communicate over host interface 2532. In at least one embodiment, GPGPU 2530 includes an I/O hub 2539 that couples GPGPU 2530 with a GPU link 2540 that enables a direct connection to other instances of GPGPU 2530. In at least one embodiment, GPU link 2540 is coupled to a dedicated GPU-to-GPU bridge that enables communication and synchronization between multiple instances of GPGPU 2530. In at least one embodiment, GPU link 2540 couples with a high-speed interconnect to transmit and receive data to other GPGPUs or parallel processors. In at least one embodiment, multiple instances of GPGPU 2530 are located in separate data processing systems and communicate via a network device that is accessible via host interface 2532. In at least one embodiment GPU link 2540 can be configured to enable a connection to a host processor in addition to or as an alternative to host interface 2532.

In at least one embodiment, GPGPU 2530 can be configured to train neural networks. In at least one embodiment, GPGPU 2530 can be used within an inferencing platform. In at least one embodiment, in which GPGPU 2530 is used for inferencing, GPGPU 2530 may include fewer compute clusters 2536A-2536H relative to when GPGPU 2530 is used for training a neural network. In at least one embodiment, memory technology associated with memory 2544A-2544B may differ between inferencing and training configurations, with higher bandwidth memory technologies devoted to training configurations. In at least one embodiment, an inferencing configuration of GPGPU 2530 can support inferencing specific instructions. For example, in at least one embodiment, an inferencing configuration can provide support for one or more 8-bit integer dot product instructions, which may be used during inferencing operations for deployed neural networks.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, inference and/or training logic 1415 may be used in GPGPU 2530 for inferencing or predicting operations based, at least in part, on weight parameters calculated using neural network training operations, neural network functions and/or architectures, or neural network use cases described herein.

In at least one embodiment, such components can be utilized to generate one or more objects within one or more second images based, at least in part, on one or more features of the one or more objects within one or more first images.

Figure 26:
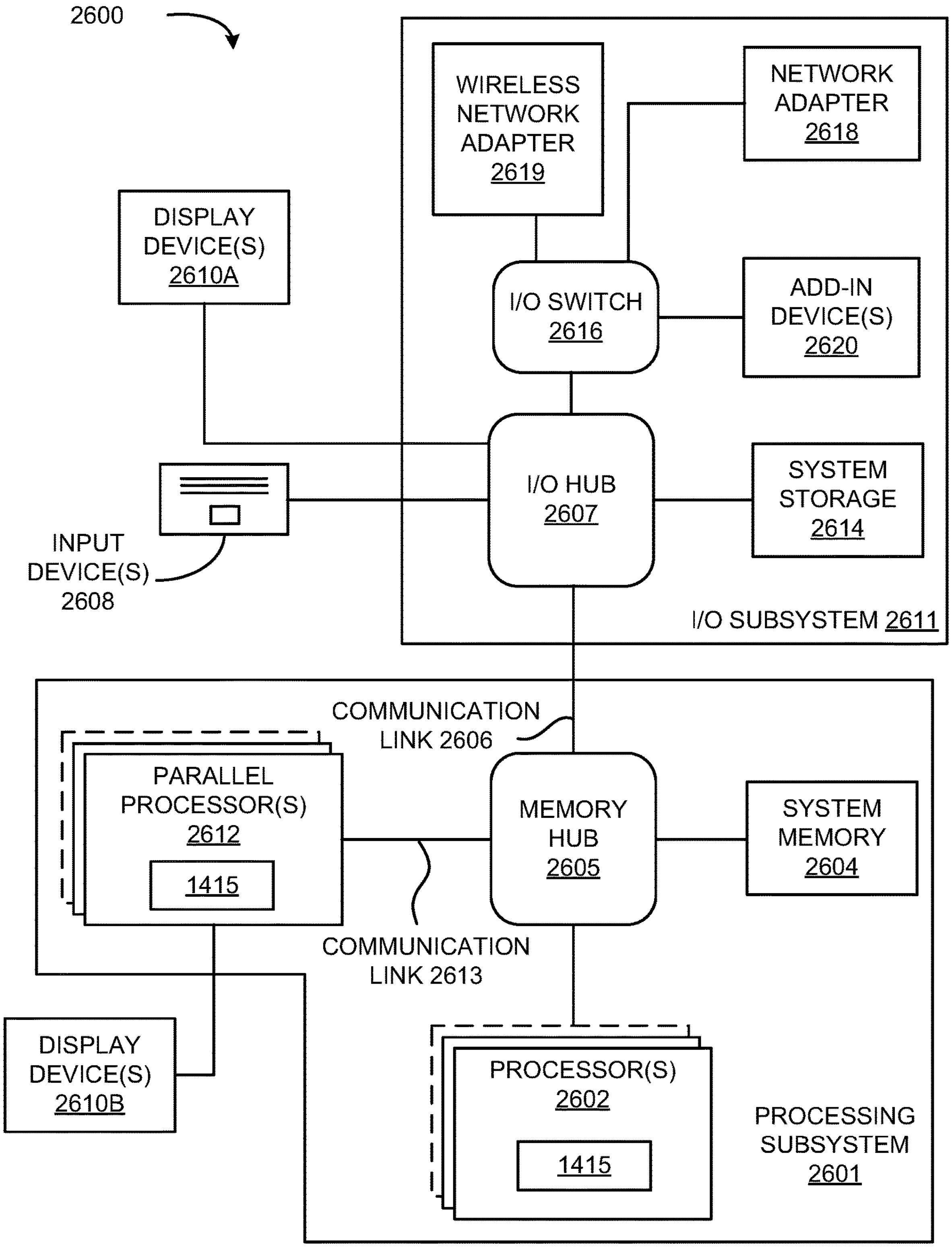
FIG. 26 illustrates a computer system, according to at least one embodiment.

FIG. 26 is a block diagram illustrating a computing system 2600 according to at least one embodiment. In at least one embodiment, computing system 2600 includes a processing subsystem 2601 having one or more processor(s) 2602 and a system memory 2604 communicating via an interconnection path that may include a memory hub 2605. In at least one embodiment, memory hub 2605 may be a separate component within a chipset component or may be integrated within one or more processor(s) 2602. In at least one embodiment, memory hub 2605 couples with an I/O subsystem 2611 via a communication link 2606. In at least one embodiment, I/O subsystem 2611 includes an I/O hub 2607 that can enable computing system 2600 to receive input from one or more input device(s) 2608. In at least one embodiment, I/O hub 2607 can enable a display controller, which may be included in one or more processor(s) 2602, to provide outputs to one or more display device(s) 2610A. In at least one embodiment, one or more display device(s) 2610A coupled with I/O hub 2607 can include a local, internal, or embedded display device.

In at least one embodiment, processing subsystem 2601 includes one or more parallel processor(s) 2612 coupled to memory hub 2605 via a bus or other communication link 2613. In at least one embodiment, communication link 2613 may use one of any number of standards based communication link technologies or protocols, such as, but not limited to PCI Express, or may be a vendor-specific communications interface or communications fabric. In at least one embodiment, one or more parallel processor(s) 2612 form a computationally focused parallel or vector processing system that can include a large number of processing cores and/or processing clusters, such as a many-integrated core (MIC) processor. In at least one embodiment, some or all of parallel processor(s) 2612 form a graphics processing subsystem that can output pixels to one of one or more display device(s) 2610A coupled via I/O Hub 2607. In at least one embodiment, parallel processor(s) 2612 can also include a display controller and display interface (not shown) to enable a direct connection to one or more display device(s) 2610B. In at least one embodiment, parallel processor(s) 2612 include one or more cores, such as graphics cores 2500 discussed herein.

In at least one embodiment, a system storage unit 2614 can connect to I/O hub 2607 to provide a storage mechanism for computing system 2600. In at least one embodiment, an I/O switch 2616 can be used to provide an interface mechanism to enable connections between I/O hub 2607 and other components, such as a network adapter 2618 and/or a wireless network adapter 2619 that may be integrated into platform, and various other devices that can be added via one or more add-in device(s) 2620. In at least one embodiment, network adapter 2618 can be an Ethernet adapter or another wired network adapter. In at least one embodiment, wireless network adapter 2619 can include one or more of a Wi-Fi, Bluetooth, near field communication (NFC), or other network device that includes one or more wireless radios.

In at least one embodiment, computing system 2600 can include other components not explicitly shown, including USB or other port connections, optical storage drives, video capture devices, and like, may also be connected to I/O hub 2607. In at least one embodiment, communication paths interconnecting various components in FIG. 26 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, parallel processor(s) 2612 incorporate circuitry optimized for graphics and video processing, including, for example, video output circuitry, and constitutes a graphics processing unit (GPU), e.g., parallel processor(s) 2612 includes graphics core 2500. In at least one embodiment, parallel processor(s) 2612 incorporate circuitry optimized for general purpose processing. In at least embodiment, components of computing system 2600 may be integrated with one or more other system elements on a single integrated circuit. For example, in at least one embodiment, parallel processor(s) 2612, memory hub 2605, processor(s) 2602, and I/O hub 2607 can be integrated into a system on chip (SoC) integrated circuit. In at least one embodiment, components of computing system 2600 can be integrated into a single package to form a system in package (SIP) configuration. In at least one embodiment, at least a portion of components of computing system 2600 can be integrated into a multi-chip module (MCM), which can be interconnected with other multi-chip modules into a modular computing system.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, inference and/or training logic 1415 may be used in system FIG. 2600 for inferencing or predicting operations based, at least in part, on weight parameters calculated using neural network training operations, neural network functions and/or architectures, or neural network use cases described herein.

In at least one embodiment, such components can be utilized to generate one or more objects within one or more second images based, at least in part, on one or more features of the one or more objects within one or more first images.

Processors

Figure 27A:
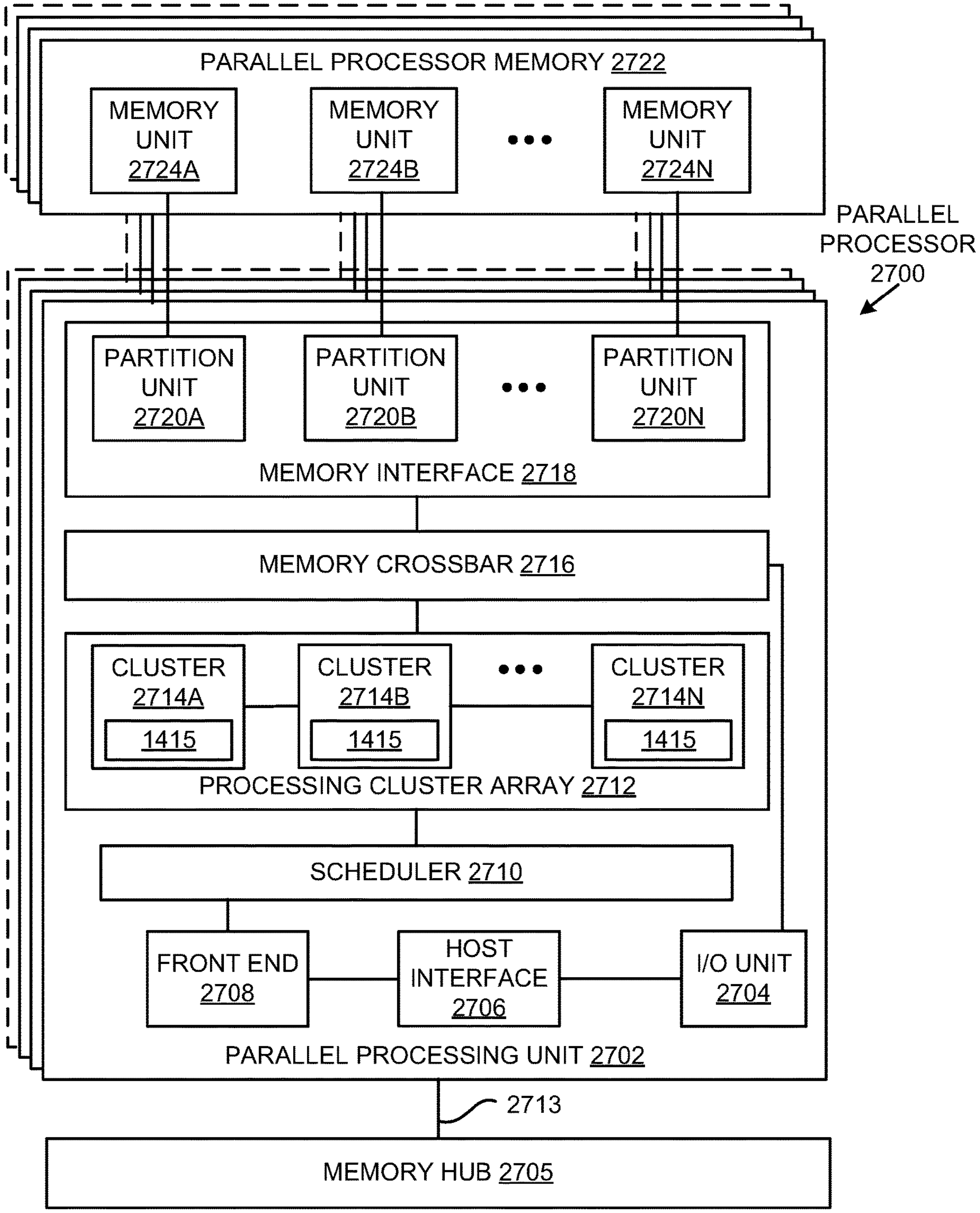
FIG. 27A illustrates a parallel processor, according to at least one embodiment.

FIG. 27A illustrates a parallel processor 2700 according to at least one embodiment. In at least one embodiment, various components of parallel processor 2700 may be implemented using one or more integrated circuit devices, such as programmable processors, application specific integrated circuits (ASICs), or field programmable gate arrays (FPGA). In at least one embodiment, illustrated parallel processor 2700 is a variant of one or more parallel processor (s) 2612 shown in FIG. 26 according to an exemplary embodiment. In at least one embodiment, a parallel processor 2700 includes one or more graphics cores 2500.

In at least one embodiment, parallel processor 2700 includes a parallel processing unit 2702. In at least one embodiment, parallel processing unit 2702 includes an I/O unit 2704 that enables communication with other devices, including other instances of parallel processing unit 2702. In at least one embodiment, I/O unit 2704 may be directly connected to other devices. In at least one embodiment, I/O unit 2704 connects with other devices via use of a hub or switch interface, such as a memory hub 2705. In at least one embodiment, connections between memory hub 2705 and I/O unit 2704 form a communication link 2713. In at least one embodiment, I/O unit 2704 connects with a host interface 2706 and a memory crossbar 2716, where host interface 2706 receives commands directed to performing processing operations and memory crossbar 2716 receives commands directed to performing memory operations.

In at least one embodiment, when host interface 2706 receives a command buffer via I/O unit 2704, host interface 2706 can direct work operations to perform those commands to a front end 2708. In at least one embodiment, front end 2708 couples with a scheduler 2710 (which may be referred to as a sequencer), which is configured to distribute commands or other work items to a processing cluster array 2712. In at least one embodiment, scheduler 2710 ensures that processing cluster array 2712 is properly configured and in a valid state before tasks are distributed to a cluster of processing cluster array 2712. In at least one embodiment, scheduler 2710 is implemented via firmware logic executing on a microcontroller. In at least one embodiment, microcontroller implemented scheduler 2710 is configurable to perform complex scheduling and work distribution operations at coarse and fine granularity, enabling rapid preemption and context switching of threads executing on processing array 2712. In at least one embodiment, host software can prove workloads for scheduling on processing cluster array 2712 via one of multiple graphics processing paths. In at least one embodiment, workloads can then be automatically distributed across processing array cluster 2712 by scheduler 2710 logic within a microcontroller including scheduler 2710.

In at least one embodiment, processing cluster array 2712 can include up to "N" processing clusters (e.g., cluster 2714A, cluster 2714B, through cluster 2714N), where "N" represents a positive integer (which may be a different integer "N" than used in other figures). In at least one embodiment, each cluster 2714A-2714N of processing cluster array 2712 can execute a large number of concurrent threads. In at least one embodiment, scheduler 2710 can allocate work to clusters 2714A-2714N of processing cluster array 2712 using various scheduling and/or work distribution algorithms, which may vary depending on workload arising for each type of program or computation. In at least one embodiment, scheduling can be handled dynamically by scheduler 2710, or can be assisted in part by compiler logic during compilation of program logic configured for execution by processing cluster array 2712. In at least one embodiment, different clusters 2714A-2714N of processing cluster array 2712 can be allocated for processing different types of programs or for performing different types of computations.

In at least one embodiment, processing cluster array 2712 can be configured to perform various types of parallel processing operations. In at least one embodiment, processing cluster array 2712 is configured to perform general-purpose parallel compute operations. For example, in at least one embodiment, processing cluster array 2712 can include logic to execute processing tasks including filtering of video and/or audio data, performing modeling operations, including physics operations, and performing data transformations.

In at least one embodiment, processing cluster array 2712 is configured to perform parallel graphics processing operations. In at least one embodiment, processing cluster array 2712 can include additional logic to support execution of such graphics processing operations, including but not limited to, texture sampling logic to perform texture operations, as well as tessellation logic and other vertex processing logic. In at least one embodiment, processing cluster array 2712 can be configured to execute graphics processing related shader programs such as, but not limited to, vertex shaders, tessellation shaders, geometry shaders, and pixel shaders. In at least one embodiment, parallel processing unit 2702 can transfer data from system memory via I/O unit 2704 for processing. In at least one embodiment, during processing, transferred data can be stored to on-chip memory (e.g., parallel processor memory 2722) during processing, then written back to system memory.

In at least one embodiment, when parallel processing unit 2702 is used to perform graphics processing, scheduler 2710 can be configured to divide a processing workload into approximately equal sized tasks, to better enable distribution of graphics processing operations to multiple clusters 2714A-2714N of processing cluster array 2712. In at least one embodiment, portions of processing cluster array 2712 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 2714A-2714N may be stored in buffers to allow intermediate data to be transmitted between clusters 2714A-2714N for further processing.

In at least one embodiment, processing cluster array 2712 can receive processing tasks to be executed via scheduler 2710, which receives commands defining processing tasks from front end 2708. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 2710 may be configured to fetch indices corresponding to tasks or may receive indices from front end 2708. In at least one embodiment, front end 2708 can be configured to ensure processing cluster array 2712 is configured to a valid state before a workload specified by incoming command buffers (e.g., batch-buffers, push buffers, etc.) is initiated.

In at least one embodiment, each of one or more instances of parallel processing unit 2702 can couple with a parallel processor memory 2722. In at least one embodiment, parallel processor memory 2722 can be accessed via memory crossbar 2716, which can receive memory requests from processing cluster array 2712 as well as I/O unit 2704. In at least one embodiment, memory crossbar 2716 can access parallel processor memory 2722 via a memory interface 2718. In at least one embodiment, memory interface 2718 can include multiple partition units (e.g., partition unit 2720A, partition unit 2720B, through partition unit 2720N) that can each couple to a portion (e.g., memory unit) of parallel processor memory 2722. In at least one embodiment, a number of partition units 2720A-2720N is configured to be equal to a number of memory units, such that a first partition unit 2720A has a corresponding first memory unit 2724A, a second partition unit 2720B has a corresponding memory unit 2724B, and an N-th partition unit 2720N has a corresponding N-th memory unit 2724N. In at least one embodiment, a number of partition units 2720A-2720N may not be equal to a number of memory units.

In at least one embodiment, memory units 2724A-2724N can include various types of memory devices, including dynamic random access memory (DRAM) or graphics random access memory, such as synchronous graphics random access memory (SGRAM), including graphics double data rate (GDDR) memory. In at least one embodiment, memory units 2724A-2724N may also include 3D stacked memory, including but not limited to high bandwidth memory (HBM), HBM2e, or HDM3. In at least one embodiment, render targets, such as frame buffers or texture maps may be stored across memory units 2724A-2724N, allowing partition units 2720A-2720N to write portions of each render target in parallel to efficiently use available bandwidth of parallel processor memory 2722. In at least one embodiment, a local instance of parallel processor memory 2722 may be excluded in favor of a unified memory design that utilizes system memory in conjunction with local cache memory.

In at least one embodiment, any one of clusters 2714A-2714N of processing cluster array 2712 can process data that will be written to any of memory units 2724A-2724N within parallel processor memory 2722. In at least one embodiment, memory crossbar 2716 can be configured to transfer an output of each cluster 2714A-2714N to any partition unit 2720A-2720N or to another cluster 2714A-2714N, which can perform additional processing operations on an output. In at least one embodiment, each cluster 2714A-2714N can communicate with memory interface 2718 through memory crossbar 2716 to read from or write to various external memory devices. In at least one embodiment, memory crossbar 2716 has a connection to memory interface 2718 to communicate with I/O unit 2704, as well as a connection to a local instance of parallel processor memory 2722, enabling processing units within different processing clusters 2714A-2714N to communicate with system memory or other memory that is not local to parallel processing unit 2702. In at least one embodiment, memory crossbar 2716 can use virtual channels to separate traffic streams between clusters 2714A-2714N and partition units 2720A-2720N.

In at least one embodiment, multiple instances of parallel processing unit 2702 can be provided on a single add-in card, or multiple add-in cards can be interconnected. In at least one embodiment, different instances of parallel processing unit 2702 can be configured to interoperate even if different instances have different numbers of processing cores, different amounts of local parallel processor memory, and/or other configuration differences. For example, in at least one embodiment, some instances of parallel processing unit 2702 can include higher precision floating point units relative to other instances. In at least one embodiment, systems incorporating one or more instances of parallel processing unit 2702 or parallel processor 2700 can be implemented in a variety of configurations and form factors, including but not limited to desktop, laptop, or handheld personal computers, servers, workstations, game consoles, and/or embedded systems.

Figure 27B:
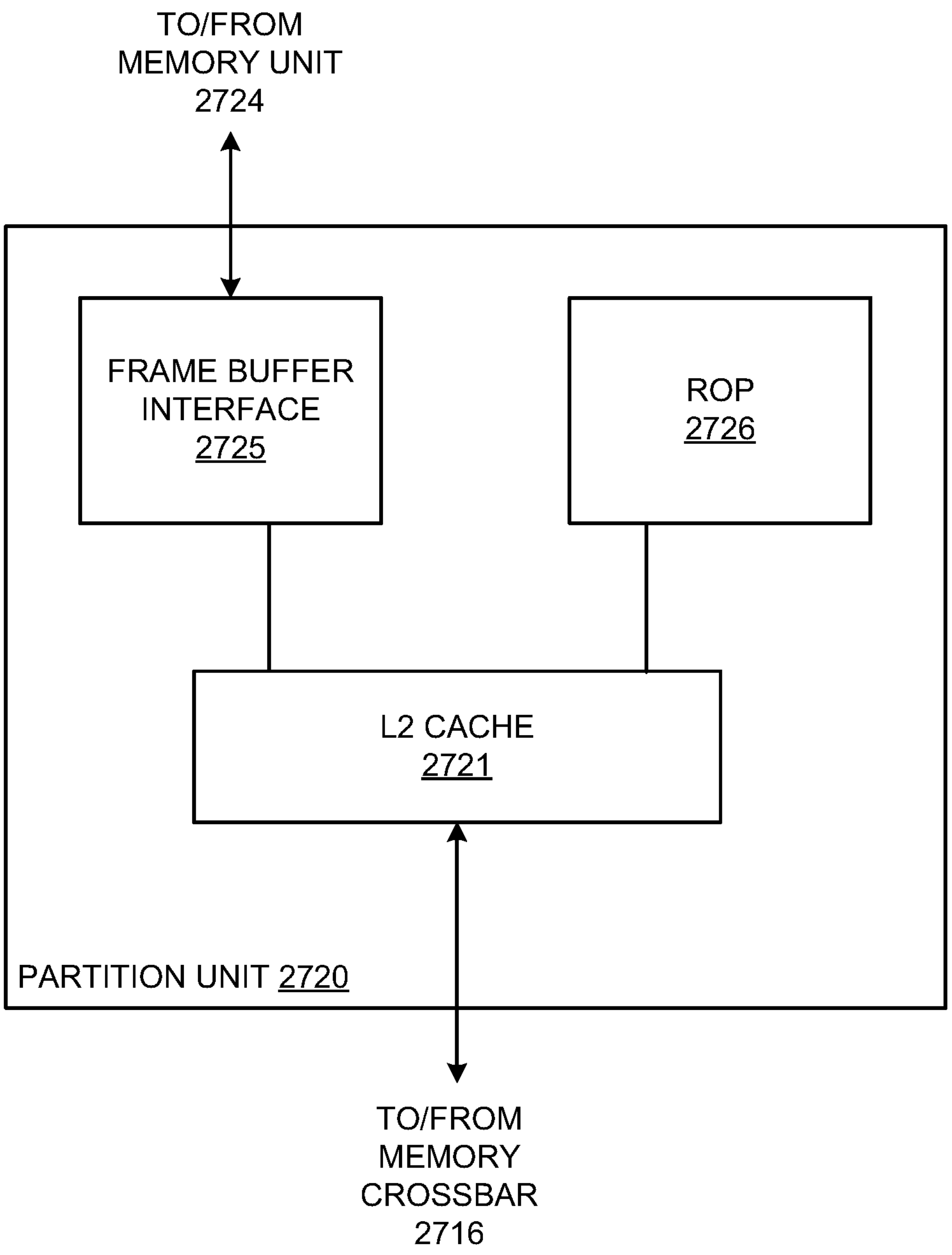
FIG. 27B illustrates a partition unit, according to at least one embodiment.

FIG. 27B is a block diagram of a partition unit 2720 according to at least one embodiment. In at least one embodiment, partition unit 2720 is an instance of one of partition units 2720A-2720N of FIG. 27A. In at least one embodiment, partition unit 2720 includes an L2 cache 2721, a frame buffer interface 2725, and a ROP 2726 (raster operations unit). In at least one embodiment, L2 cache 2721 is a read/write cache that is configured to perform load and store operations received from memory crossbar 2716 and ROP 2726. In at least one embodiment, read misses and urgent write-back requests are output by L2 cache 2721 to frame buffer interface 2725 for processing. In at least one embodiment, updates can also be sent to a frame buffer via frame buffer interface 2725 for processing. In at least one embodiment, frame buffer interface 2725 interfaces with one of memory units in parallel processor memory, such as memory units 2724A-2724N of FIG. 27 (e.g., within parallel processor memory 2722).

In at least one embodiment, ROP 2726 is a processing unit that performs raster operations such as stencil, z test, blending, etc. In at least one embodiment, ROP 2726 then outputs processed graphics data that is stored in graphics memory. In at least one embodiment, ROP 2726 includes compression logic to compress depth or color data that is written to memory and decompress depth or color data that is read from memory. In at least one embodiment, compression logic can be lossless compression logic that makes use of one or more of multiple compression algorithms. In at least one embodiment, a type of compression that is performed by ROP 2726 can vary based on statistical characteristics of data to be compressed. For example, in at least one embodiment, delta color compression is performed on depth and color data on a per-tile basis.

In at least one embodiment, ROP 2726 is included within each processing cluster (e.g., cluster 2714A-2714N of FIG. 27A) instead of within partition unit 2720. In at least one embodiment, read and write requests for pixel data are transmitted over memory crossbar 2716 instead of pixel fragment data. In at least one embodiment, processed graphics data may be displayed on a display device, such as one of one or more display device(s) 2610 of FIG. 26, routed for further processing by processor(s) 2602, or routed for further processing by one of processing entities within parallel processor 2700 of FIG. 27A.

Figure 27C:
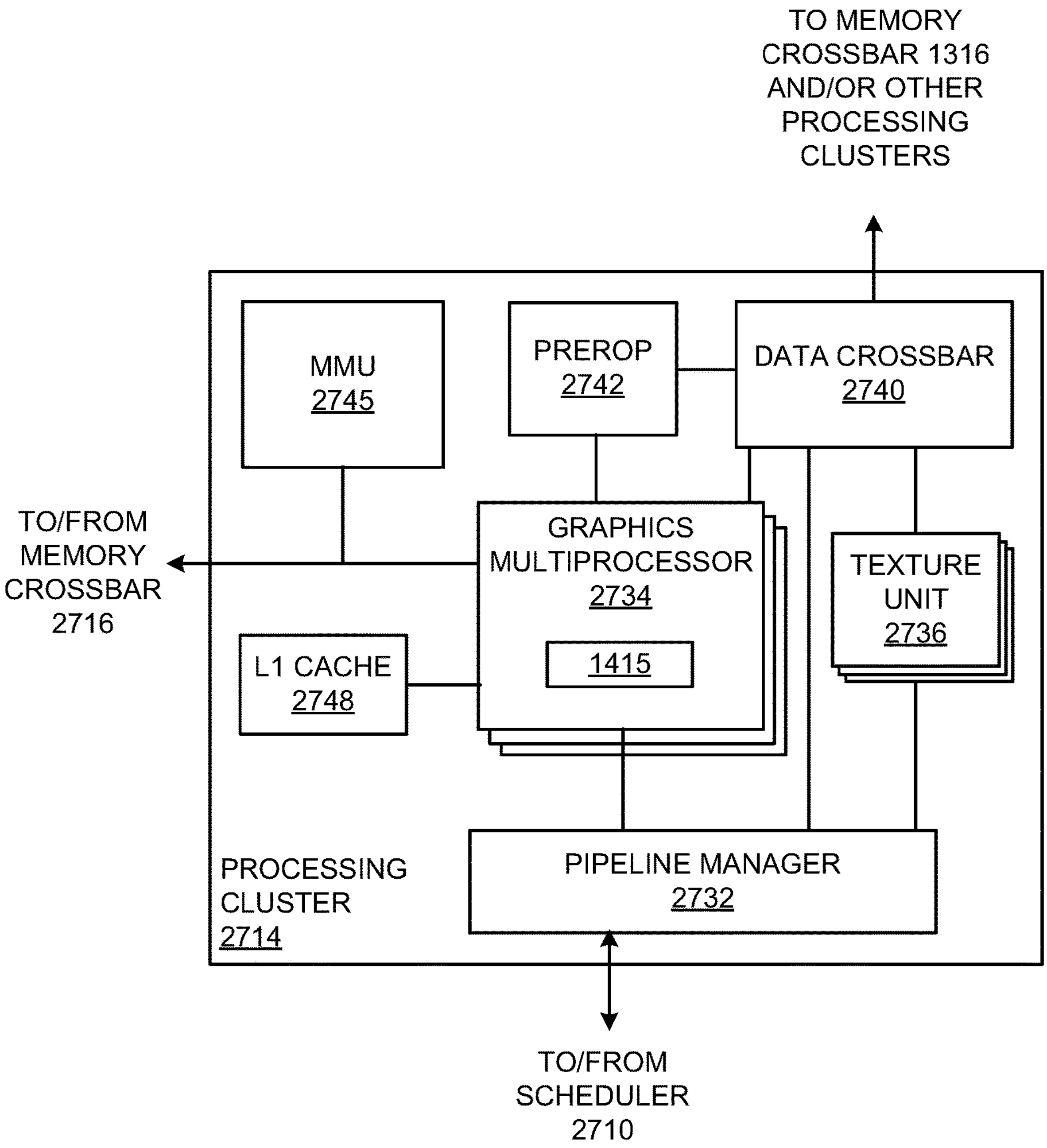
FIG. 27C illustrates a processing cluster, according to at least one embodiment.

FIG. 27C is a block diagram of a processing cluster 2714 within a parallel processing unit according to at least one embodiment. In at least one embodiment, a processing cluster is an instance of one of processing clusters 2714A-2714N of FIG. 27A. In at least one embodiment, processing cluster 2714 can be configured to execute many threads in parallel, where "thread" refers to an instance of a particular program executing on a particular set of input data. In at least one embodiment, single-instruction, multiple-data (SIMD) instruction issue techniques are used to support parallel execution of a large number of threads without providing multiple independent instruction units. In at least one embodiment, single-instruction, multiple-thread (SIMT) techniques are used to support parallel execution of a large number of generally synchronized threads, using a common instruction unit configured to issue instructions to a set of processing engines within each one of processing clusters.

In at least one embodiment, operation of processing cluster 2714 can be controlled via a pipeline manager 2732 that distributes processing tasks to SIMT parallel processors. In at least one embodiment, pipeline manager 2732 receives instructions from scheduler 2710 of FIG. 27A and manages execution of those instructions via a graphics multiprocessor 2734 and/or a texture unit 2736. In at least one embodiment, graphics multiprocessor 2734 is an exemplary instance of a SIMT parallel processor. However, in at least one embodiment, various types of SIMT parallel processors of differing architectures may be included within processing cluster 2714. In at least one embodiment, one or more instances of graphics multiprocessor 2734 can be included within a processing cluster 2714. In at least one embodiment, graphics multiprocessor 2734 can process data and a data crossbar 2740 can be used to distribute processed data to one of multiple possible destinations, including other shader units. In at least one embodiment, pipeline manager 2732 can facilitate distribution of processed data by specifying destinations for processed data to be distributed via data crossbar 2740.

In at least one embodiment, each graphics multiprocessor 2734 within processing cluster 2714 can include an identical set of functional execution logic (e.g., arithmetic logic units, load-store units, etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 2714 constitute a thread. In at least one embodiment, a set of threads executing across a set of parallel processing engines is a thread group. In at least one embodiment, a thread group executes a common program on different input data. In at least one embodiment, each thread within a thread group can be assigned to a different processing engine within a graphics multiprocessor 2734. In at least one embodiment, a thread group may include fewer threads than a number of processing engines within graphics multiprocessor 2734. In at least one embodiment, when a thread group includes fewer threads than a number of processing engines, one or more of processing engines may be idle during cycles in which that thread group is being processed. In at least one embodiment, a thread group may also include more threads than a number of processing engines within graphics multiprocessor 2734. In at least one embodiment, when a thread group includes more threads than number of processing engines within graphics multiprocessor 2734, processing can be performed over consecutive clock cycles. In at least one embodiment, multiple thread groups can be executed concurrently on a graphics multiprocessor 2734.

In at least one embodiment, graphics multiprocessor 2734 includes an internal cache memory to perform load and store operations. In at least one embodiment, graphics multiprocessor 2734 can forego an internal cache and use a cache memory (e.g., L1 cache 2748) within processing cluster 2714. In at least one embodiment, each graphics multiprocessor 2734 also has access to L2 caches within partition units (e.g., partition units 2720A-2720N of FIG. 27A) that are shared among all processing clusters 2714 and may be used to transfer data between threads. In at least one embodiment, graphics multiprocessor 2734 may also access off-chip global memory, which can include one or more of local parallel processor memory and/or system memory. In at least one embodiment, any memory external to parallel processing unit 2702 may be used as global memory. In at least one embodiment, processing cluster 2714 includes multiple instances of graphics multiprocessor 2734 and can share common instructions and data, which may be stored in L1 cache 2748.

In at least one embodiment, each processing cluster 2714 may include an MMU 2745 (memory management unit) that is configured to map virtual addresses into physical addresses. In at least one embodiment, one or more instances of MMU 2745 may reside within memory interface 2718 of FIG. 27A. In at least one embodiment, MMU 2745 includes a set of page table entries (PTEs) used to map a virtual address to a physical address of a tile and optionally a cache line index. In at least one embodiment, MMU 2745 may include address translation lookaside buffers (TLB) or caches that may reside within graphics multiprocessor 2734 or L1 2748 cache or processing cluster 2714. In at least one embodiment, a physical address is processed to distribute surface data access locally to allow for efficient request interleaving among partition units. In at least one embodiment, a cache line index may be used to determine whether a request for a cache line is a hit or miss.

In at least one embodiment, a processing cluster 2714 may be configured such that each graphics multiprocessor 2734 is coupled to a texture unit 2736 for performing texture mapping operations, e.g., determining texture sample positions, reading texture data, and filtering texture data. In at least one embodiment, texture data is read from an internal texture L1 cache (not shown) or from an L1 cache within graphics multiprocessor 2734 and is fetched from an L2 cache, local parallel processor memory, or system memory, as needed. In at least one embodiment, each graphics multiprocessor 2734 outputs processed tasks to data crossbar 2740 to provide processed task to another processing cluster 2714 for further processing or to store processed task in an L2 cache, local parallel processor memory, or system memory via memory crossbar 2716. In at least one embodiment, a preROP 2742 (pre-raster operations unit) is configured to receive data from graphics multiprocessor 2734, and direct data to ROP units, which may be located with partition units as described herein (e.g., partition units 2720A-2720N of FIG. 27A). In at least one embodiment, preROP 2742 unit can perform optimizations for color blending, organizing pixel color data, and performing address translations.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, inference and/or training logic 1415 may be used in graphics processing cluster 2714 for inferencing or predicting operations based, at least in part, on weight parameters calculated using neural network training operations, neural network functions and/or architectures, or neural network use cases described herein.

In at least one embodiment, such components can be utilized to generate one or more objects within one or more second images based, at least in part, on one or more features of the one or more objects within one or more first images.

Figure 27D:
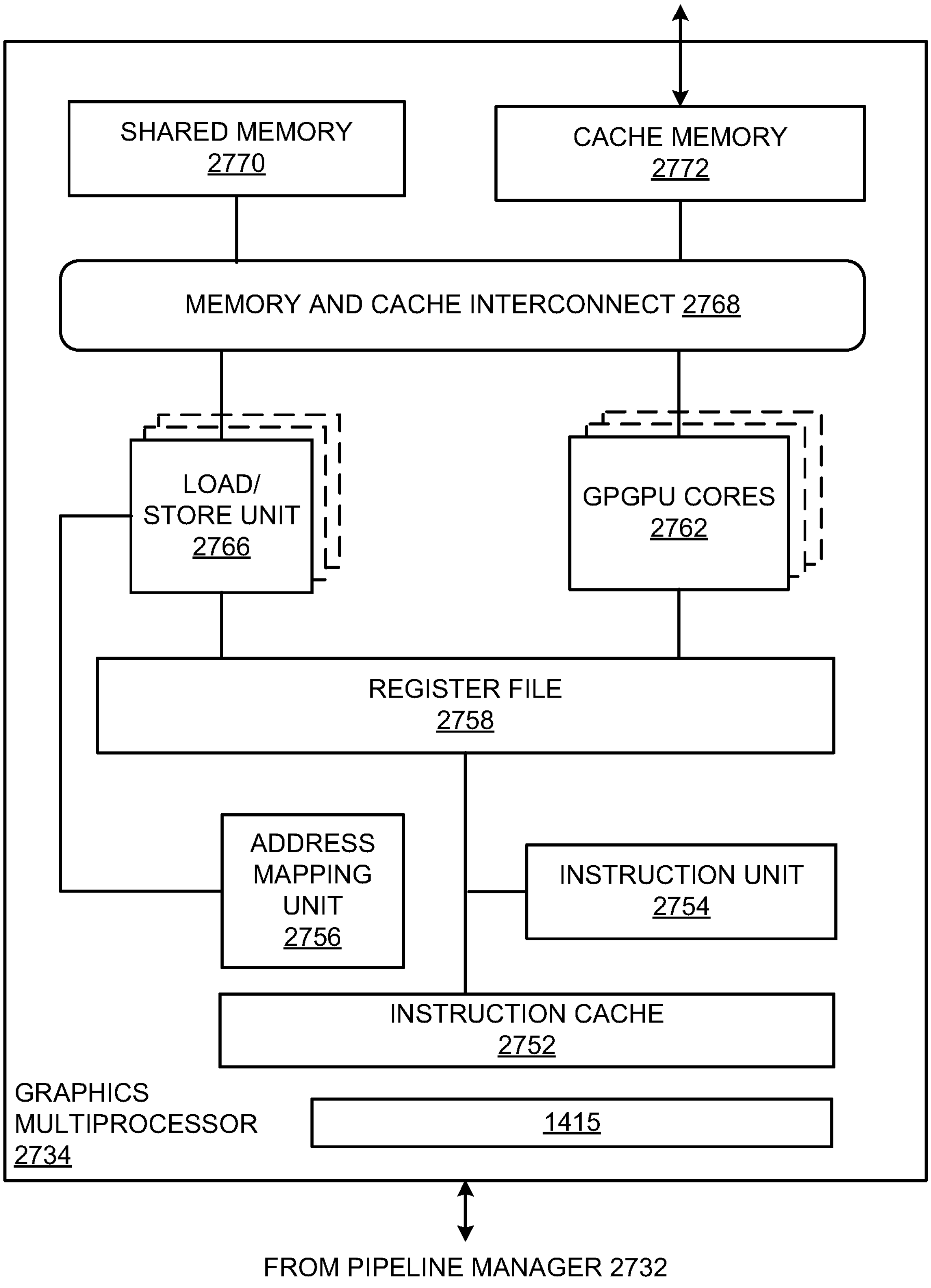
FIG. 27D illustrates a graphics multiprocessor, according to at least one embodiment.

FIG. 27D shows a graphics multiprocessor 2734 according to at least one embodiment. In at least one embodiment, graphics multiprocessor 2734 couples with pipeline manager 2732 of processing cluster 2714. In at least one embodiment, graphics multiprocessor 2734 has an execution pipeline including but not limited to an instruction cache 2752, an instruction unit 2754, an address mapping unit 2756, a register file 2758, one or more general purpose graphics processing unit (GPGPU) cores 2762, and one or more load/store units 2766, where one or more load/store units 2766 can perform load/store operations to load/store instructions corresponding to performing an operation. In at least one embodiment, GPGPU cores 2762 and load/store units 2766 are coupled with cache memory 2772 and shared memory 2770 via a memory and cache interconnect 2768.

In at least one embodiment, instruction cache 2752 receives a stream of instructions to execute from pipeline manager 2732. In at least one embodiment, instructions are cached in instruction cache 2752 and dispatched for execution by an instruction unit 2754. In at least one embodiment, instruction unit 2754 can dispatch instructions as thread groups (e.g., warps, wavefronts, waves), with each thread of thread group assigned to a different execution unit within GPGPU cores 2762. In at least one embodiment, an instruction can access any of a local, shared, or global address space by specifying an address within a unified address space. In at least one embodiment, address mapping unit 2756 can be used to translate addresses in a unified address space into a distinct memory address that can be accessed by load/store units 2766.

In at least one embodiment, register file 2758 provides a set of registers for functional units of graphics multiprocessor 2734. In at least one embodiment, register file 2758 provides temporary storage for operands connected to data paths of functional units (e.g., GPGPU cores 2762, load/store units 2766) of graphics multiprocessor 2734. In at least one embodiment, register file 2758 is divided between each of functional units such that each functional unit is allocated a dedicated portion of register file 2758. In at least one embodiment, register file 2758 is divided between different warps (which may be referred to as wavefronts and/or waves) being executed by graphics multiprocessor 2734.

In at least one embodiment, GPGPU cores 2762 can each include floating point units (FPUs) and/or integer arithmetic logic units (ALUs) that are used to execute instructions of graphics multiprocessor 2734. In at least one embodiment, GPGPU cores 2762 can be similar in architecture or can differ in architecture. In at least one embodiment, a first portion of GPGPU cores 2762 include a single precision FPU and an integer ALU while a second portion of GPGPU cores include a double precision FPU. In at least one embodiment, FPUs can implement IEEE 754-2008 standard floating point arithmetic or enable variable precision floating point arithmetic. In at least one embodiment, graphics multiprocessor 2734 can additionally include one or more fixed function or special function units to perform specific functions such as copy rectangle or pixel blending operations. In at least one embodiment, one or more of GPGPU cores 2762 can also include fixed or special function logic.

In at least one embodiment, GPGPU cores 2762 include SIMD logic capable of performing a single instruction on multiple sets of data. In at least one embodiment, GPGPU cores 2762 can physically execute SIMD4, SIMD8, and SIMD16 instructions and logically execute SIMD1, SIMD2, and SIMD32 instructions. In at least one embodiment, SIMD instructions for GPGPU cores can be generated at compile time by a shader compiler or automatically generated when executing programs written and compiled for single program multiple data (SPMD) or SIMT architectures. In at least one embodiment, multiple threads of a program configured for an SIMT execution model can executed via a single SIMD instruction. For example, in at least one embodiment, eight SIMT threads that perform same or similar operations can be executed in parallel via a single SIMD8 logic unit.

In at least one embodiment, memory and cache interconnect 2768 is an interconnect network that connects each functional unit of graphics multiprocessor 2734 to register file 2758 and to shared memory 2770. In at least one embodiment, memory and cache interconnect 2768 is a crossbar interconnect that allows load/store unit 2766 to implement load and store operations between shared memory 2770 and register file 2758. In at least one embodiment, register file 2758 can operate at a same frequency as GPGPU cores 2762, thus data transfer between GPGPU cores 2762 and register file 2758 can have very low latency. In at least one embodiment, shared memory 2770 can be used to enable communication between threads that execute on functional units within graphics multiprocessor 2734. In at least one embodiment, cache memory 2772 can be used as a data cache for example, to cache texture data communicated between functional units and texture unit 2736. In at least one embodiment, shared memory 2770 can also be used as a program managed cache. In at least one embodiment, threads executing on GPGPU cores 2762 can programmatically store data within shared memory in addition to automatically cached data that is stored within cache memory 2772.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high-speed interconnect such as PCIe or NVLink). In at least one embodiment, a GPU may be integrated on a package or chip as cores and communicatively coupled to cores over an internal processor bus/interconnect internal to a package or chip. In at least one embodiment, regardless a manner in which a GPU is connected, processor cores may allocate work to such GPU in a form of sequences of commands/instructions contained in a work descriptor. In at least one embodiment, that GPU then uses dedicated circuitry/logic for efficiently processing these commands/instructions.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, inference and/or training logic 1415 may be used in graphics multiprocessor 2734 for inferencing or predicting operations based, at least in part, on weight parameters calculated using neural network training operations, neural network functions and/or architectures, or neural network use cases described herein.

In at least one embodiment, such components can be utilized to generate one or more objects within one or more second images based, at least in part, on one or more features of the one or more objects within one or more first images.

Figure 28:
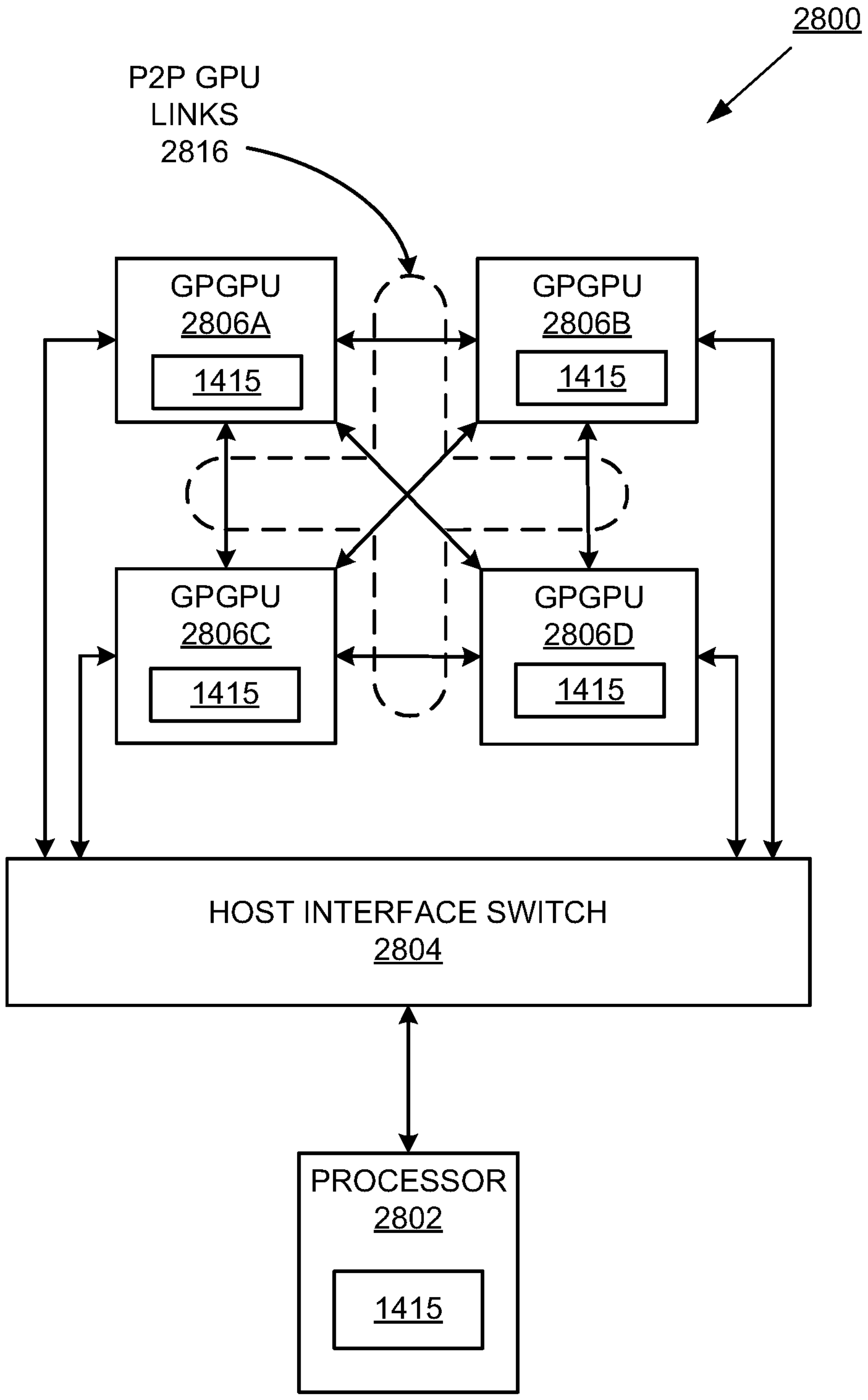
FIG. 28 illustrates a multi-graphics processing unit (GPU) system, according to at least one embodiment.

FIG. 28 illustrates a multi-GPU computing system 2800, according to at least one embodiment. In at least one embodiment, multi-GPU computing system 2800 can include a processor 2802 coupled to multiple general purpose graphics processing units (GPGPUs) 2806A-D via a host interface switch 2804. In at least one embodiment, host interface switch 2804 is a PCI express switch device that couples processor 2802 to a PCI express bus over which processor 2802 can communicate with GPGPUs 2806A-D. In at least one embodiment, GPGPUs 2806A-D can interconnect via a set of high-speed point-to-point GPU-to-GPU links 2816. In at least one embodiment, GPU-to-GPU links 2816 connect to each of GPGPUs 2806A-D via a dedicated GPU link. In at least one embodiment, P2P GPU links 2816 enable direct communication between each of GPGPUs 2806A-D without requiring communication over host interface bus 2804 to which processor 2802 is connected. In at least one embodiment, with GPU-to-GPU traffic directed to P2P GPU links 2816, host interface bus 2804 remains available for system memory access or to communicate with other instances of multi-GPU computing system 2800, for example, via one or more network devices. While in at least one embodiment GPGPUs 2806A-D connect to processor 2802 via host interface switch 2804, in at least one embodiment processor 2802 includes direct support for P2P GPU links 2816 and can connect directly to GPGPUs 2806A-D.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, inference and/or training logic 1415 may be used in multi-GPU computing system 2800 for inferencing or predicting operations based, at least in part, on weight parameters calculated using neural network training operations, neural network functions and/or architectures, or neural network use cases described herein.

In at least one embodiment, multi-GPU computing system 2800 includes one or more graphics cores 2500.

In at least one embodiment, such components can be utilized to generate one or more objects within one or more second images based, at least in part, on one or more features of the one or more objects within one or more first images.

Figure 29:
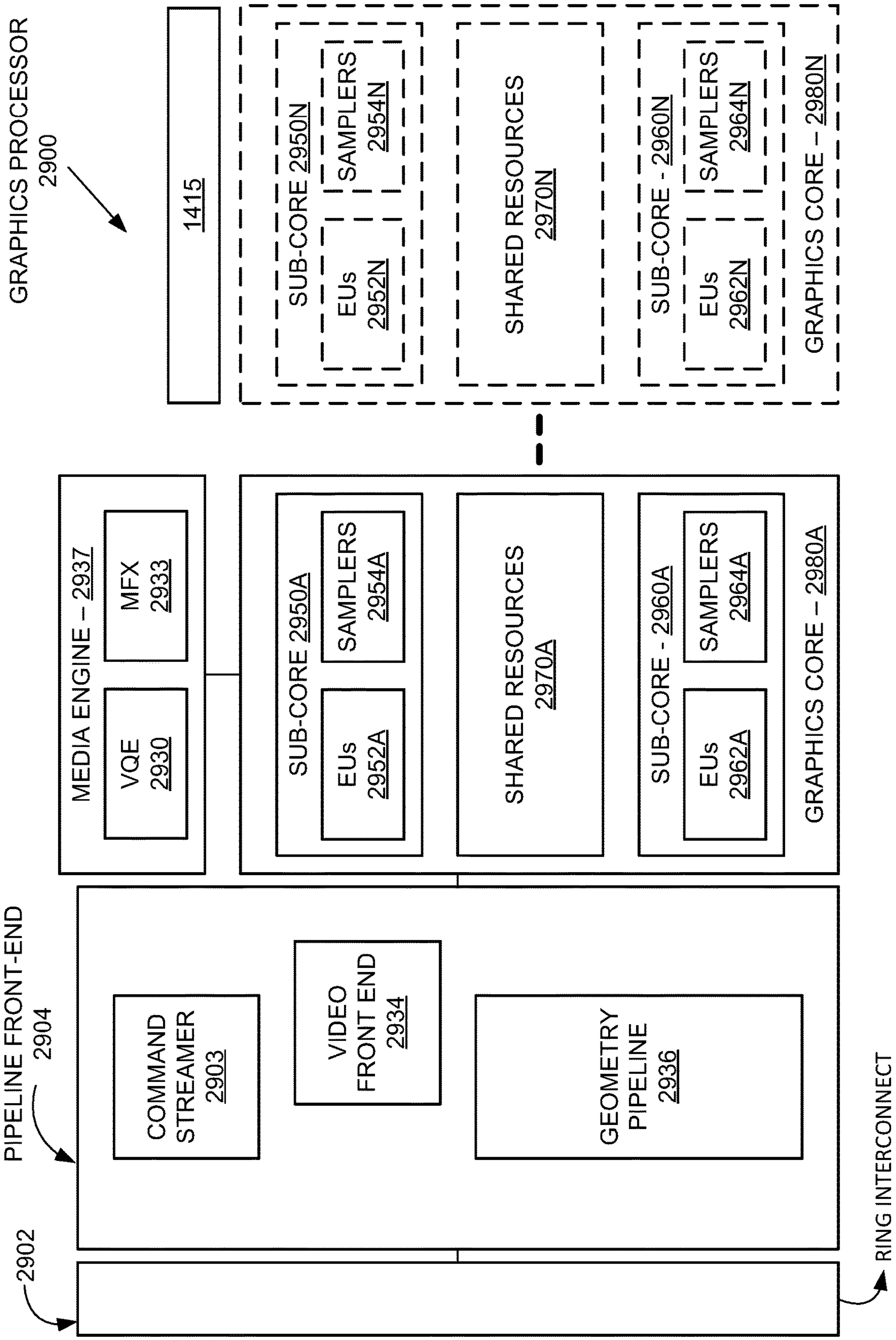
FIG. 29 illustrates a graphics processor, according to at least one embodiment.

FIG. 29 is a block diagram of a graphics processor 2900, according to at least one embodiment. In at least one embodiment, graphics processor 2900 includes a ring interconnect 2902, a pipeline front-end 2904, a media engine 2937, and graphics cores 2980A-2980N. In at least one embodiment, ring interconnect 2902 couples graphics processor 2900 to other processing units, including other graphics processors or one or more general-purpose processor cores. In at least one embodiment, graphics processor 2900 is one of many processors integrated within a multi-core processing system. In at least one embodiment, graphics processor 2900 includes graphics core 2500.

In at least one embodiment, graphics processor 2900 receives batches of commands via ring interconnect 2902. In at least one embodiment, incoming commands are interpreted by a command streamer 2903 in pipeline front-end 2904. In at least one embodiment, graphics processor 2900 includes scalable execution logic to perform 3D geometry processing and media processing via graphics core(s) 2980A-2980N. In at least one embodiment, for 3D geometry processing commands, command streamer 2903 supplies commands to geometry pipeline 2936. In at least one embodiment, for at least some media processing commands, command streamer 2903 supplies commands to a video front end 2934, which couples with media engine 2937. In at least one embodiment, media engine 2937 includes a Video Quality Engine (VQE) 2930 for video and image post-processing and a multi-format encode/decode (MFX) 2933 engine to provide hardware-accelerated media data encoding and decoding. In at least one embodiment, geometry pipeline 2936 and media engine 2937 each generate execution threads for thread execution resources provided by at least one graphics core 2980.

In at least one embodiment, graphics processor 2900 includes scalable thread execution resources featuring graphics cores 2980A-2980N (which can be modular and are sometimes referred to as core slices), each having multiple sub-cores 2950A-50N, 2960A-2960N (sometimes referred to as core sub-slices). In at least one embodiment, graphics processor 2900 can have any number of graphics cores 2980A. In at least one embodiment, graphics processor 2900 includes a graphics core 2980A having at least a first sub-core 2950A and a second sub-core 2960A. In at least one embodiment, graphics processor 2900 is a low power processor with a single sub-core (e.g., 2950A). In at least one embodiment, graphics processor 2900 includes multiple graphics cores 2980A-2980N, each including a set of first sub-cores 2950A-2950N and a set of second sub-cores 2960A-2960N. In at least one embodiment, each sub-core in first sub-cores 2950A-2950N includes at least a first set of execution units 2952A-2952N and media/texture samplers 2954A-2954N. In at least one embodiment, each sub-core in second sub-cores 2960A-2960N includes at least a second set of execution units 2962A-2962N and samplers 2964A-2964N. In at least one embodiment, each sub-core 2950A-2950N, 2960A-2960N shares a set of shared resources 2970A-2970N. In at least one embodiment, shared resources include shared cache memory and pixel operation logic. In at least one embodiment, graphics processor 2900 includes load/store units in pipeline front-end 2904.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, inference and/or training logic 1415 may be used in graphics processor 2900 for inferencing or predicting operations based, at least in part, on weight parameters calculated using neural network training operations, neural network functions and/or architectures, or neural network use cases described herein.

In at least one embodiment, such components can be utilized to generate one or more objects within one or more second images based, at least in part, on one or more features of the one or more objects within one or more first images.

Figure 30:
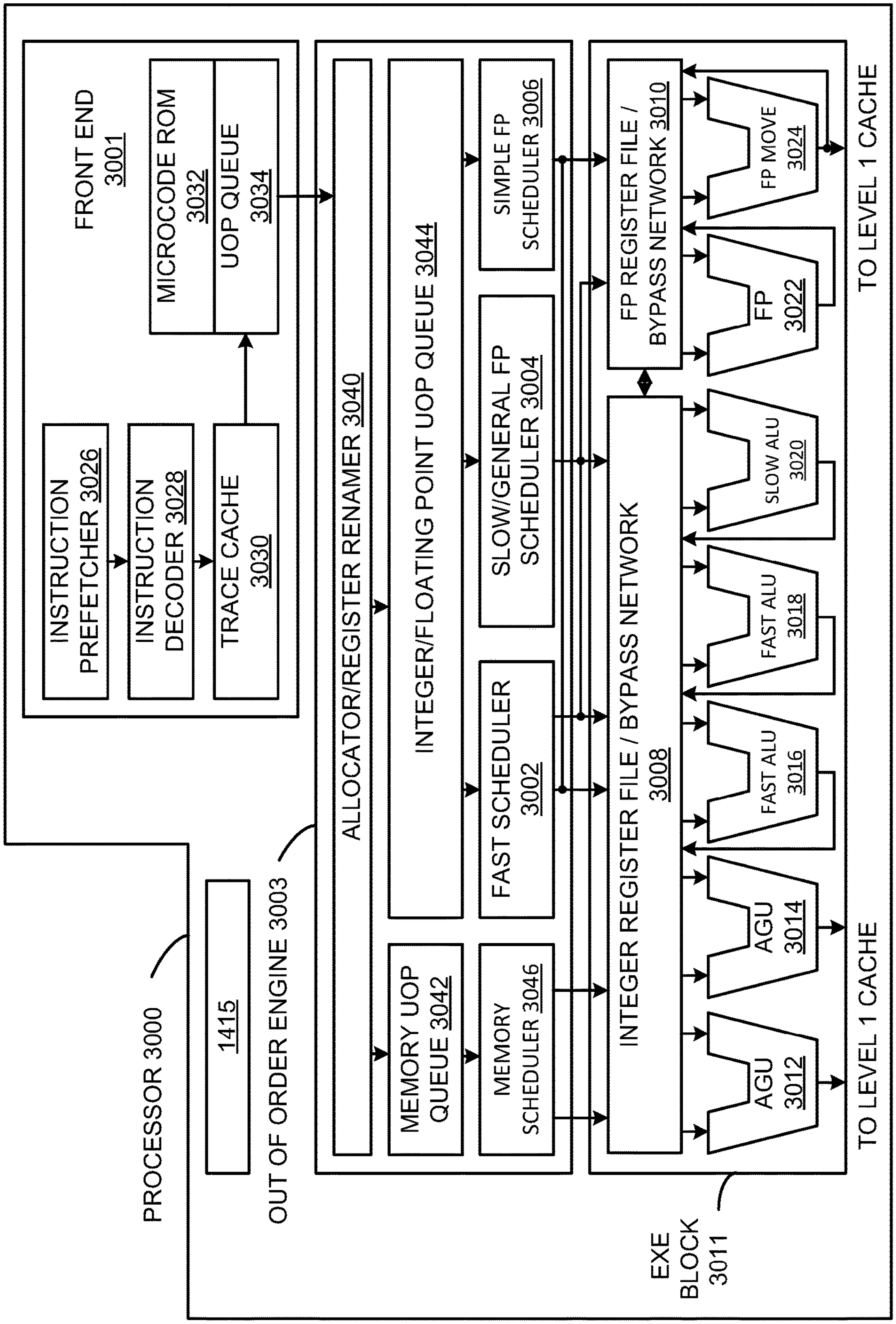
FIG. 30 is a block diagram illustrating a processor micro-architecture for a processor, according to at least one embodiment.

FIG. 30 is a block diagram illustrating micro-architecture for a processor 3000 that may include logic circuits to perform instructions, according to at least one embodiment. In at least one embodiment, processor 3000 may perform instructions, including x86 instructions, ARM instructions, specialized instructions for application-specific integrated circuits (ASICs), etc. In at least one embodiment, processor 3000 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany single instruction, multiple data ("SIMD") and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processor 3000 may perform instructions to accelerate machine learning or deep learning algorithms, training, or inferencing.

In at least one embodiment, processor 3000 includes an in-order front end ("front end") 3001 to fetch instructions to be executed and prepare instructions to be used later in a processor pipeline. In at least one embodiment, front end 3001 may include several units. In at least one embodiment, an instruction prefetcher 3026 fetches instructions from memory and feeds instructions to an instruction decoder 3028 which in turn decodes or interprets instructions. For example, in at least one embodiment, instruction decoder 3028 decodes a received instruction into one or more operations called "micro-instructions" or "micro-operations" (also called "micro ops" or "uops" or "μ-ops") that a machine may execute. In at least one embodiment, instruction decoder 3028 parses an instruction into an opcode and corresponding data and control fields that may be used by micro-architecture to perform operations in accordance with at least one embodiment. In at least one embodiment, a trace cache 3030 may assemble decoded uops into program ordered sequences or traces in a uop queue 3034 for execution. In at least one embodiment, when trace cache 3030 encounters a complex instruction, a microcode ROM 3032 provides uops needed to complete an operation.

In at least one embodiment, some instructions may be converted into a single micro-op, whereas others need several micro-ops to complete full operation. In at least one embodiment, if more than four micro-ops are needed to complete an instruction, instruction decoder 3028 may access microcode ROM 3032 to perform that instruction. In at least one embodiment, an instruction may be decoded into a small number of micro-ops for processing at instruction decoder 3028. In at least one embodiment, an instruction may be stored within microcode ROM 3032 should a number of micro-ops be needed to accomplish such operation. In at least one embodiment, trace cache 3030 refers to an entry point programmable logic array ("PLA") to determine a correct micro-instruction pointer for reading microcode sequences to complete one or more instructions from microcode ROM 3032 in accordance with at least one embodiment. In at least one embodiment, after microcode ROM 3032 finishes sequencing micro-ops for an instruction, front end 3001 of a machine may resume fetching micro-ops from trace cache 3030.

In at least one embodiment, out-of-order execution engine ("out of order engine") 3003 may prepare instructions for execution. In at least one embodiment, out-of-order execution logic has a number of buffers to smooth out and re-order flow of instructions to optimize performance as they go down a pipeline and get scheduled for execution. In at least one embodiment, out-of-order execution engine 3003 includes, without limitation, an allocator/register renamer 3040, a memory uop queue 3042, an integer/floating point uop queue 3044, a memory scheduler 3046, a fast scheduler 3002, a slow/general floating point scheduler ("slow/general FP scheduler") 3004, and a simple floating point scheduler ("simple FP scheduler") 3006. In at least one embodiment, fast schedule 3002, slow/general floating point scheduler 3004, and simple floating point scheduler 3006 are also collectively referred to herein as "uop schedulers 3002, 3004, 3006." In at least one embodiment, allocator/register renamer 3040 allocates machine buffers and resources that each uop needs in order to execute. In at least one embodiment, allocator/register renamer 3040 renames logic registers onto entries in a register file. In at least one embodiment, allocator/register renamer 3040 also allocates an entry for each uop in one of two uop queues, memory uop queue 3042 for memory operations and integer/floating point uop queue 3044 for non-memory operations, in front of memory scheduler 3046 and uop schedulers 3002, 3004, 3006. In at least one embodiment, uop schedulers 3002, 3004, 3006, determine when a uop is ready to execute based on readiness of their dependent input register operand sources and availability of execution resources uops need to complete their operation. In at least one embodiment, fast scheduler 3002 may schedule on each half of a main clock cycle while slow/general floating point scheduler 3004 and simple floating point scheduler 3006 may schedule once per main processor clock cycle. In at least one embodiment, uop schedulers 3002, 3004, 3006 arbitrate for dispatch ports to schedule uops for execution.

In at least one embodiment, execution block 3011 includes, without limitation, an integer register file/bypass network 3008, a floating point register file/bypass network ("FP register file/bypass network") 3010, address generation units ("AGUs") 3012 and 3014, fast Arithmetic Logic Units (ALUs) ("fast ALUs") 3016 and 3018, a slow Arithmetic Logic Unit ("slow ALU") 3020, a floating point ALU ("FP") 3022, and a floating point move unit ("FP move") 3024. In at least one embodiment, integer register file/bypass network 3008 and floating point register file/bypass network 3010 are also referred to herein as "register files 3008, 3010." In at least one embodiment, AGUSs 3012 and 3014, fast ALUs 3016 and 3018, slow ALU 3020, floating point ALU 3022, and floating point move unit 3024 are also referred to herein as "execution units 3012, 3014, 3016, 3018, 3020, 3022, and 3024." In at least one embodiment, execution block 3011 may include, without limitation, any number (including zero) and type of register files, bypass networks, address generation units, and execution units, in any combination.

In at least one embodiment, register networks 3008, 3010 may be arranged between uop schedulers 3002, 3004, 3006, and execution units 3012, 3014, 3016, 3018, 3020, 3022, and 3024. In at least one embodiment, integer register file/bypass network 3008 performs integer operations. In at least one embodiment, floating point register file/bypass network 3010 performs floating point operations. In at least one embodiment, each of register networks 3008, 3010 may include, without limitation, a bypass network that may bypass or forward just completed results that have not yet been written into a register file to new dependent uops. In at least one embodiment, register networks 3008, 3010 may communicate data with each other. In at least one embodiment, integer register file/bypass network 3008 may include, without limitation, two separate register files, one register file for a low-order thirty-two bits of data and a second register file for a high order thirty-two bits of data. In at least one embodiment, floating point register file/bypass network 3010 may include, without limitation, 128-bit wide entries because floating point instructions typically have operands from 64 to 128 bits in width.

In at least one embodiment, execution units 3012, 3014, 3016, 3018, 3020, 3022, 3024 may execute instructions. In at least one embodiment, register networks 3008, 3010 store integer and floating point data operand values that microinstructions need to execute. In at least one embodiment, processor 3000 may include, without limitation, any number and combination of execution units 3012, 3014, 3016, 3018, 3020, 3022, 3024. In at least one embodiment, floating point ALU 3022 and floating point move unit 3024, may execute floating point, MMX, SIMD, AVX and SSE, or other operations, including specialized machine learning instructions. In at least one embodiment, floating point ALU 3022 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 3016, 3018. In at least one embodiment, fast ALUS 3016, 3018 may execute fast operations with an effective latency of half a clock cycle. In at least one embodiment, most complex integer operations go to slow ALU 3020 as slow ALU 3020 may include, without limitation, integer execution hardware for long-latency type of operations, such as a multiplier, shifts, flag logic, and branch processing. In at least one embodiment, memory load/store operations may be executed by AGUs 3012, 3014. In at least one embodiment, fast ALU 3016, fast ALU 3018, and slow ALU 3020 may perform integer operations on 64-bit data operands. In at least one embodiment, fast ALU 3016, fast ALU 3018, and slow ALU 3020 may be implemented to support a variety of data bit sizes including sixteen, thirty-two, 128, 256, etc. In at least one embodiment, floating point ALU 3022 and floating point move unit 3024 may be implemented to support a range of operands having bits of various widths, such as 128-bit wide packed data operands in conjunction with SIMD and multimedia instructions.

In at least one embodiment, uop schedulers 3002, 3004, 3006 dispatch dependent operations before a parent load has finished executing. In at least one embodiment, as uops may be speculatively scheduled and executed in processor 3000, processor 3000 may also include logic to handle memory misses. In at least one embodiment, if a data load misses in a data cache, there may be dependent operations in flight in a pipeline that have left a scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and a replay mechanism of at least one embodiment of a processor may also be designed to catch instruction sequences for text string comparison operations.

In at least one embodiment, "registers" may refer to on-board processor storage locations that may be used as part of instructions to identify operands. In at least one embodiment, registers may be those that may be usable from outside of a processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

In at least one embodiment, processor 3000 or each core of processor 3000 includes one or more prefetchers, one or more fetchers, one or more pre-decoders, one or more decoders to decode data (e.g., instructions), one or more instruction queues to process instructions (e.g., corresponding to operations or API calls), one or more micro-operation (pOP) cache to store pOPs, one or more micro-operation (pOP) queues, an in-order execution engine, one or more load buffers, one or more store buffers, one or more reorder buffers, one or more fill buffers, an out-of-order execution engine, one or more ports, one or more shift and/or shifter units, one or more fused multiply accumulate (FMA) units, one or more load and store units ("LSUs") to perform load of store operations corresponding to loading/storing data (e.g., instructions) to perform an operation (e.g., perform an API, an API call), one or more matrix multiply accumulate (MMA) units, and/or one or more shuffle units to perform any function further described herein with respect to said processor 3000. In at least one embodiment processor 3000 can access, use, perform, or execute instructions corresponding to calling an API.

In at least one embodiment, processor 3000 includes one or more ultra path interconnects (UPIs), e.g., that is a point-to-point processor interconnect; one or more PCIe's; one or more accelerators to accelerate computations or operations; and/or one or more memory controllers. In at least one embodiment, processor 3000 includes a shared last level cache (LLC) that is coupled to one or more memory controllers, which can enable shared memory access across processor cores.

In at least one embodiment, processor 3000 or a core of processor 3000 has a mesh architecture where processor cores, on-chip caches, memory controllers, and I/O controllers are organized in rows and columns, with wires and switches connecting them at each intersection to allow for turns. In at least one embodiment, processor 3000 has a one or more higher memory bandwidths (HMBs, e.g., HMBe) to store data or cache data, e.g., in Double Data Rate 5 Synchronous Dynamic Random-Access Memory (DDR5 SDRAM). In at least one embodiment, one or more components of processor 3000 are interconnected using compute express link (CXL) interconnects. In at least one embodiment, a memory controller uses a "least recently used" (LRU) approach to determine what gets stored in a cache. In at least one embodiment, processor 3000 includes one or more PCIe's (e.g., PCIe 5.0).

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment portions or all of inference and/or training logic 1415 may be incorporated into execution block 3011 and other memory or registers shown or not shown. For example, in at least one embodiment, training and/or inferencing techniques described herein may use one or more of ALUs illustrated in execution block 3011. Moreover, weight parameters may be stored in on-chip or off-chip memory and/or registers (shown or not shown) that configure ALUs of execution block 3011 to perform one or more machine learning algorithms, neural network architectures, use cases, or training techniques described herein.

In at least one embodiment, such components can be utilized to generate one or more objects within one or more second images based, at least in part, on one or more features of the one or more objects within one or more first images.

Figure 31:
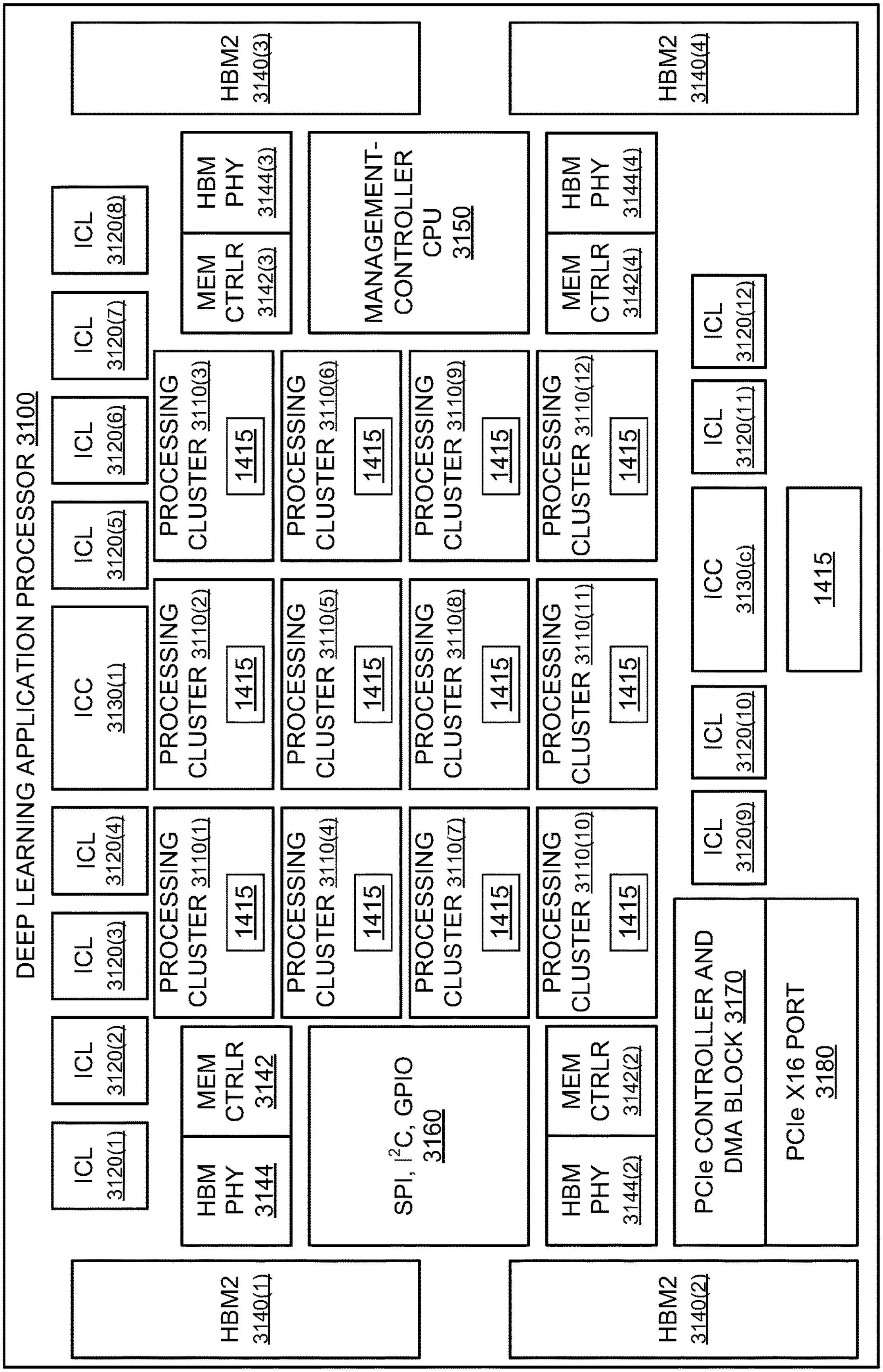
FIG. 31 illustrates a deep learning application processor, according to at least one embodiment.

FIG. 31 illustrates a deep learning application processor 3100, according to at least one embodiment. In at least one embodiment, deep learning application processor 3100 uses instructions that, if executed by deep learning application processor 3100, cause deep learning application processor 3100 to perform some or all of processes and techniques described throughout this disclosure. In at least one embodiment, deep learning application processor 3100 is an application-specific integrated circuit (ASIC). In at least one embodiment, application processor 3100 performs matrix multiply operations either "hard-wired" into hardware as a result of performing one or more instructions or both. In at least one embodiment, deep learning application processor 3100 includes, without limitation, processing clusters 3110(1)-3110(12), Inter-Chip Links ("ICLs") 3120(1)-3120(12), Inter-Chip Controllers ("ICCs") 3130(1)-3130(2), high-bandwidth memory second generation ("HBM2") 3140(1)-3140(4), memory controllers ("Mem Ctrlrs") 3142(1)-3142(4), high bandwidth memory physical layer ("HBM PHY") 3144(1)-3144(4), a management-controller central processing unit ("management-controller CPU") 3150, a Serial Peripheral Interface, Inter-Integrated Circuit, and General Purpose Input/Output block ("SPI, $I^2C$, GPIO") 3160, a peripheral component interconnect express controller and direct memory access block ("PCIe Controller and DMA") 3170, and a sixteen-lane peripheral component interconnect express port ("PCI Express×16") 3180.

In at least one embodiment, processing clusters 3110 may perform deep learning operations, including inference or prediction operations based on weight parameters calculated one or more training techniques, including those described herein. In at least one embodiment, each processing cluster 3110 may include, without limitation, any number and type of processors. In at least one embodiment, deep learning application processor 3100 may include any number and type of processing clusters 3100. In at least one embodiment, Inter-Chip Links 3120 are bi-directional. In at least one embodiment, Inter-Chip Links 3120 and Inter-Chip Controllers 3130 enable multiple deep learning application processors 3100 to exchange information, including activation information resulting from performing one or more machine learning algorithms embodied in one or more neural networks. In at least one embodiment, deep learning application processor 3100 may include any number (including zero) and type of ICLs 3120 and ICCs 3130.

In at least one embodiment, HBM2s 3140 provide a total of 32 Gigabytes (GB) of memory. In at least one embodiment, HBM2 3140(*i*) is associated with both memory controller 3142(*i*) and HBM PHY 3144(*i*) where "i" is an arbitrary integer. In at least one embodiment, any number of HBM2s 3140 may provide any type and total amount of high bandwidth memory and may be associated with any number (including zero) and type of memory controllers 3142 and HBM PHYs 3144. In at least one embodiment, SPI, $I^2C$, GPIO 3160, PCIe Controller and DMA 3170, and/or PCIe 3180 may be replaced with any number and type of blocks that enable any number and type of communication standards in any technically feasible fashion.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, deep learning application processor is used to train a machine learning model, such as a neural network, to predict or infer information provided to deep learning application processor 3100. In at least one embodiment, deep learning application processor 3100 is used to infer or predict information based on a trained machine learning model (e.g., neural network) that has been trained by another processor or system or by deep learning application processor 3100. In at least one embodiment, processor 3100 may be used to perform one or more neural network use cases described herein.

In at least one embodiment, such components can be utilized to generate one or more objects within one or more second images based, at least in part, on one or more features of the one or more objects within one or more first images.

Figure 32:
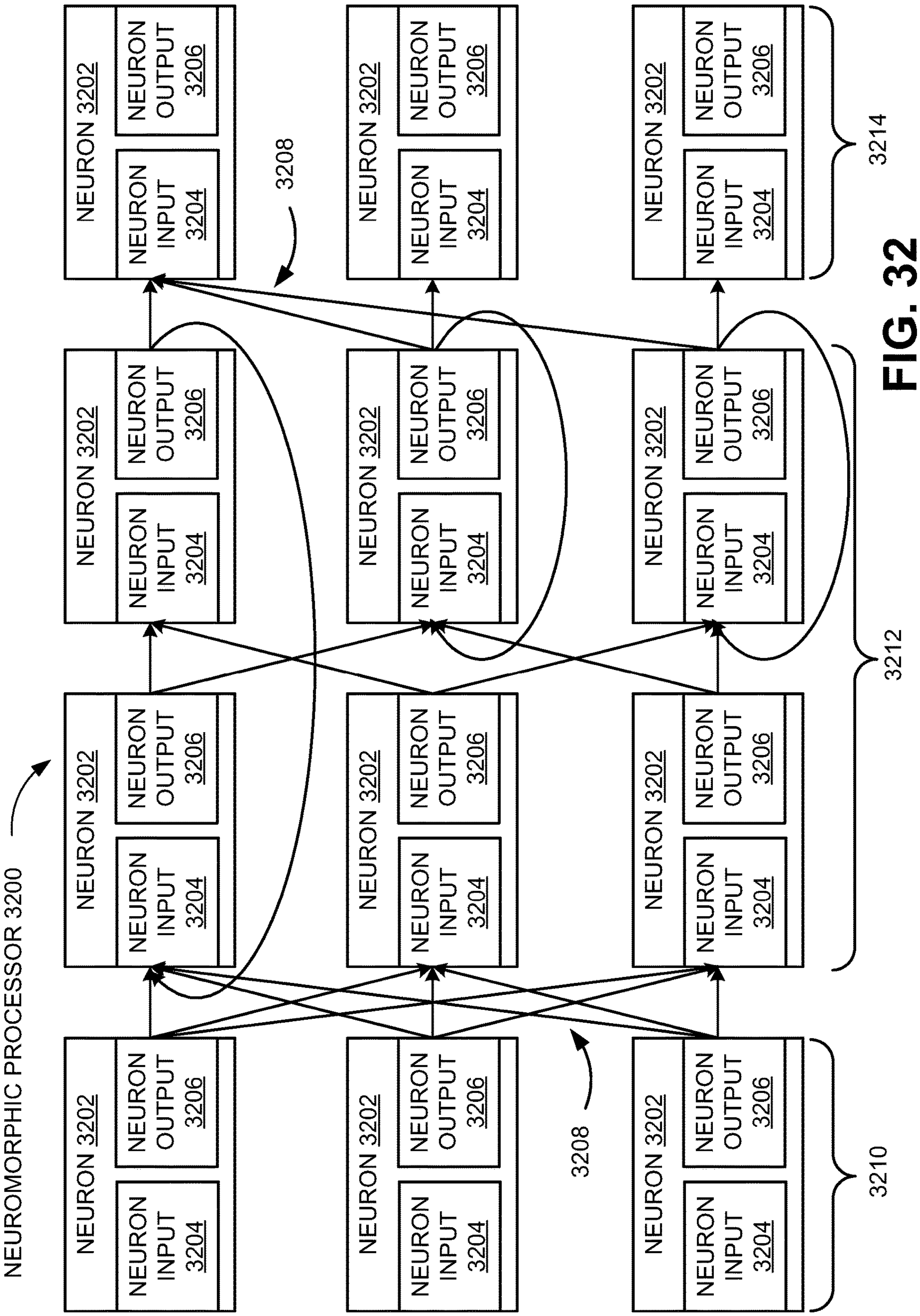
FIG. 32 is a block diagram illustrating an example neuromorphic processor, according to at least one embodiment.

FIG. 32 is a block diagram of a neuromorphic processor 3200, according to at least one embodiment. In at least one embodiment, neuromorphic processor 3200 may receive one or more inputs from sources external to neuromorphic processor 3200. In at least one embodiment, these inputs may be transmitted to one or more neurons 3202 within neuromorphic processor 3200. In at least one embodiment, neurons 3202 and components thereof may be implemented using circuitry or logic, including one or more arithmetic logic units (ALUs). In at least one embodiment, neuromorphic processor 3200 may include, without limitation, thousands or millions of instances of neurons 3202, but any suitable number of neurons 3202 may be used. In at least one embodiment, each instance of neuron 3202 may include a neuron input 3204 and a neuron output 3206. In at least one embodiment, neurons 3202 may generate outputs that may be transmitted to inputs of other instances of neurons 3202. For example, in at least one embodiment, neuron inputs 3204 and neuron outputs 3206 may be interconnected via synapses 3208.

In at least one embodiment, neurons 3202 and synapses 3208 may be interconnected such that neuromorphic processor 3200 operates to process or analyze information received by neuromorphic processor 3200. In at least one embodiment, neurons 3202 may transmit an output pulse (or "fire" or "spike") when inputs received through neuron input 3204 exceed a threshold. In at least one embodiment, neurons 3202 may sum or integrate signals received at neuron inputs 3204. For example, in at least one embodiment, neurons 3202 may be implemented as leaky integrate-and-fire neurons, wherein if a sum (referred to as a "membrane potential") exceeds a threshold value, neuron 3202 may generate an output (or "fire") using a transfer function such as a sigmoid or threshold function. In at least one embodiment, a leaky integrate-and-fire neuron may sum signals received at neuron inputs 3204 into a membrane potential and may also apply a decay factor (or leak) to reduce a membrane potential. In at least one embodiment, a leaky integrate-and-fire neuron may fire if multiple input signals are received at neuron inputs 3204 rapidly enough to exceed a threshold value (i.e., before a membrane potential decays too low to fire). In at least one embodiment, neurons 3202 may be implemented using circuits or logic that receive inputs, integrate inputs into a membrane potential, and decay a membrane potential. In at least one embodiment, inputs may be averaged, or any other suitable transfer function may be used. Furthermore, in at least one embodiment, neurons 3202 may include, without limitation, comparator circuits or logic that generate an output spike at neuron output 3206 when result of applying a transfer function to neuron input 3204 exceeds a threshold. In at least one embodiment, once neuron 3202 fires, it may disregard previously received input information by, for example, resetting a membrane potential to 0 or another suitable default value. In at least one embodiment, once membrane potential is reset to 0, neuron 3202 may resume normal operation after a suitable period of time (or refractory period).

In at least one embodiment, neurons 3202 may be interconnected through synapses 3208. In at least one embodiment, synapses 3208 may operate to transmit signals from an output of a first neuron 3202 to an input of a second neuron 3202. In at least one embodiment, neurons 3202 may transmit information over more than one instance of synapse 3208. In at least one embodiment, one or more instances of neuron output 3206 may be connected, via an instance of synapse 3208, to an instance of neuron input 3204 in same neuron 3202. In at least one embodiment, an instance of neuron 3202 generating an output to be transmitted over an instance of synapse 3208 may be referred to as a "pre-synaptic neuron" with respect to that instance of synapse 3208. In at least one embodiment, an instance of neuron 3202 receiving an input transmitted over an instance of synapse 3208 may be referred to as a "post-synaptic neuron" with respect to that instance of synapse 3208. Because an instance of neuron 3202 may receive inputs from one or more instances of synapse 3208, and may also transmit outputs over one or more instances of synapse 3208, a single instance of neuron 3202 may therefore be both a "pre-synaptic neuron" and "post-synaptic neuron," with respect to various instances of synapses 3208, in at least one embodiment.

In at least one embodiment, neurons 3202 may be organized into one or more layers. In at least one embodiment, each instance of neuron 3202 may have one neuron output 3206 that may fan out through one or more synapses 3208 to one or more neuron inputs 3204. In at least one embodiment, neuron outputs 3206 of neurons 3202 in a first layer 3210 may be connected to neuron inputs 3204 of neurons 3202 in a second layer 3212. In at least one embodiment, layer 3210 may be referred to as a "feed-forward layer." In at least one embodiment, each instance of neuron 3202 in an instance of first layer 3210 may fan out to each instance of neuron 3202 in second layer 3212. In at least one embodiment, first layer 3210 may be referred to as a "fully connected feed-forward layer." In at least one embodiment, each instance of neuron 3202 in an instance of second layer 3212 may fan out to fewer than all instances of neuron 3202 in a third layer 3214. In at least one embodiment, second layer 3212 may be referred to as a "sparsely connected feed-forward layer." In at least one embodiment, neurons 3202 in second layer 3212 may fan out to neurons 3202 in multiple other layers, including to neurons 3202 also in second layer 3212. In at least one embodiment, second layer 3212 may be referred to as a "recurrent layer." In at least one embodiment, neuromorphic processor 3200 may include, without limitation, any suitable combination of recurrent layers and feed-forward layers, including, without limitation, both sparsely connected feed-forward layers and fully connected feed-forward layers.

In at least one embodiment, neuromorphic processor 3200 may include, without limitation, a reconfigurable interconnect architecture or dedicated hard-wired interconnects to connect synapse 3208 to neurons 3202. In at least one embodiment, neuromorphic processor 3200 may include, without limitation, circuitry or logic that allows synapses to be allocated to different neurons 3202 as needed based on neural network topology and neuron fan-in/out. For example, in at least one embodiment, synapses 3208 may be connected to neurons 3202 using an interconnect fabric, such as network-on-chip, or with dedicated connections. In at least one embodiment, synapse interconnections and components thereof may be implemented using circuitry or logic.

In at least one embodiment, such components can be utilized to generate one or more objects within one or more second images based, at least in part, on one or more features of the one or more objects within one or more first images.

Figure 33:
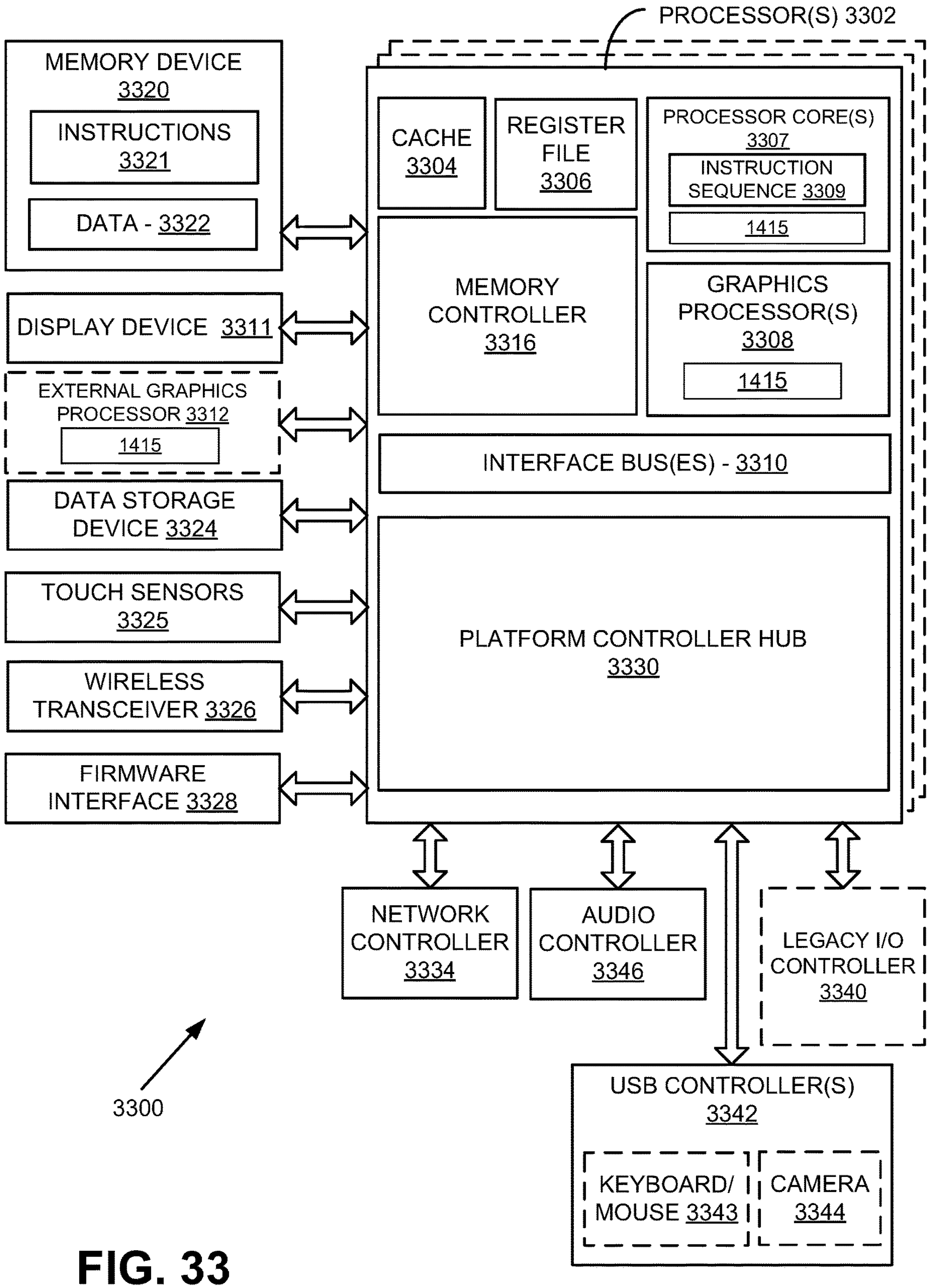
FIG. 33 illustrates at least portions of a graphics processor, according to one or more embodiments.

FIG. 33 is a block diagram of a processing system, according to at least one embodiment. In at least one embodiment, system 3300 includes one or more processors 3302 and one or more graphics processors 3308, and may be a single processor desktop system, a multiprocessor workstation system, or a server system having a large number of processors 3302 or processor cores 3307. In at least one embodiment, system 3300 is a processing platform incorporated within a system-on-a-chip (SoC) integrated circuit for use in mobile, handheld, or embedded devices. In at least one embodiment, one or more graphics processors 3308 include one or more graphics cores 2500.

In at least one embodiment, system 3300 can include, or be incorporated within a server-based gaming platform, a game console, including a game and media console, a mobile gaming console, a handheld game console, or an online game console. In at least one embodiment, system 3300 is a mobile phone, a smart phone, a tablet computing device or a mobile Internet device. In at least one embodiment, processing system 3300 can also include, couple with, or be integrated within a wearable device, such as a smart watch wearable device, a smart eyewear device, an augmented reality device, or a virtual reality device. In at least one embodiment, processing system 3300 is a television or set top box device having one or more processors 3302 and a graphical interface generated by one or more graphics processors 3308.

In at least one embodiment, one or more processors 3302 each include one or more processor cores 3307 to process instructions which, when executed, perform operations for system and user software. In at least one embodiment, each of one or more processor cores 3307 is configured to process a specific instruction sequence 3309. In at least one embodiment, instruction sequence 3309 may facilitate Complex Instruction Set Computing (CISC), Reduced Instruction Set Computing (RISC), or computing via a Very Long Instruction Word (VLIW). In at least one embodiment, processor cores 3307 may each process a different instruction sequence 3309, which may include instructions to facilitate emulation of other instruction sequences. In at least one embodiment, processor core 3307 may also include other processing devices, such a Digital Signal Processor (DSP).

In at least one embodiment, processor 3302 includes a cache memory 3304. In at least one embodiment, processor 3302 can have a single internal cache or multiple levels of internal cache. In at least one embodiment, cache memory is shared among various components of processor 3302. In at least one embodiment, processor 3302 also uses an external cache (e.g., a Level-3 (L3) cache or Last Level Cache (LLC)) (not shown), which may be shared among processor cores 3307 using known cache coherency techniques. In at least one embodiment, a register file 3306 is additionally included in processor 3302, which may include different types of registers for storing different types of data (e.g., integer registers, floating point registers, status registers, and an instruction pointer register). In at least one embodiment, register file 3306 may include general-purpose registers or other registers.

In at least one embodiment, one or more processor(s) 3302 are coupled with one or more interface bus(es) 3310 to transmit communication signals such as address, data, or control signals between processor 3302 and other components in system 3300. In at least one embodiment, interface bus 3310 can be a processor bus, such as a version of a Direct Media Interface (DMI) bus. In at least one embodiment, interface bus 3310 is not limited to a DMI bus, and may include one or more Peripheral Component Interconnect buses (e.g., PCI, PCI Express), memory busses, or other types of interface busses. In at least one embodiment processor(s) 3302 include an integrated memory controller 3316 and a platform controller hub 3330. In at least one embodiment, memory controller 3316 facilitates communication between a memory device and other components of system 3300, while platform controller hub (PCH) 3330 provides connections to I/O devices via a local I/O bus.

In at least one embodiment, a memory device 3320 can be a dynamic random access memory (DRAM) device, a static random access memory (SRAM) device, flash memory device, phase-change memory device, or some other memory device having suitable performance to serve as process memory. In at least one embodiment, memory device 3320 can operate as system memory for system 3300, to store data 3322 and instructions 3321 for use when one or more processors 3302 executes an application or process. In at least one embodiment, memory controller 3316 also couples with an optional external graphics processor 3312, which may communicate with one or more graphics processors 3308 in processors 3302 to perform graphics and media operations. In at least one embodiment, a display device 3311 can connect to processor(s) 3302. In at least one embodiment, display device 3311 can include one or more of an internal display device, as in a mobile electronic device or a laptop device, or an external display device attached via a display interface (e.g., DisplayPort, etc.). In at least one embodiment, display device 3311 can include a head mounted display (HMD) such as a stereoscopic display device for use in virtual reality (VR) applications or augmented reality (AR) applications.

In at least one embodiment, platform controller hub 3330 enables peripherals to connect to memory device 3320 and processor 3302 via a high-speed I/O bus. In at least one embodiment, I/O peripherals include, but are not limited to, an audio controller 3346, a network controller 3334, a firmware interface 3328, a wireless transceiver 3326, touch sensors 3325, a data storage device 3324 (e.g., hard disk drive, flash memory, etc.). In at least one embodiment, data storage device 3324 can connect via a storage interface (e.g., SATA) or via a peripheral bus, such as a Peripheral Component Interconnect bus (e.g., PCI, PCI Express). In at least one embodiment, touch sensors 3325 can include touch screen sensors, pressure sensors, or fingerprint sensors. In at least one embodiment, wireless transceiver 3326 can be a Wi-Fi transceiver, a Bluetooth transceiver, or a mobile network transceiver such as a 3G, 4G, or Long Term Evolution (LTE) transceiver. In at least one embodiment, firmware interface 3328 enables communication with system firmware, and can be, for example, a unified extensible firmware interface (UEFI). In at least one embodiment, network controller 3334 can enable a network connection to a wired network. In at least one embodiment, a high-performance network controller (not shown) couples with interface bus 3310. In at least one embodiment, audio controller 3346 is a multi-channel high definition audio controller. In at least one embodiment, system 3300 includes an optional legacy I/O controller 3340 for coupling legacy (e.g., Personal System 2 (PS/2)) devices to system 3300. In at least one embodiment, platform controller hub 3330 can also connect to one or more Universal Serial Bus (USB) controllers 3342 connect input devices, such as keyboard and mouse 3343 combinations, a camera 3344, or other USB input devices.

In at least one embodiment, an instance of memory controller 3316 and platform controller hub 3330 may be integrated into a discreet external graphics processor, such as external graphics processor 3312. In at least one embodiment, platform controller hub 3330 and/or memory controller 3316 may be external to one or more processor(s) 3302. For example, in at least one embodiment, system 3300 can include an external memory controller 3316 and platform controller hub 3330, which may be configured as a memory controller hub and peripheral controller hub within a system chipset that is in communication with processor(s) 3302.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment portions or all of inference and/or training logic 1415 may be incorporated into graphics processor 3308. For example, in at least one embodiment, training and/or inferencing techniques described herein may use one or more of ALUs embodied in a 3D pipeline. Moreover, in at least one embodiment, inferencing and/or training operations described herein may be done using logic other than logic illustrated in FIG. 14A or 14B. In at least one embodiment, weight parameters may be stored in on-chip or off-chip memory and/or registers (shown or not shown) that configure ALUs of graphics processor 3308 to perform one or more machine learning algorithms, neural network architectures, use cases, or training techniques described herein.

In at least one embodiment, such components can be utilized to generate one or more objects within one or more second images based, at least in part, on one or more features of the one or more objects within one or more first images.

Figure 34:
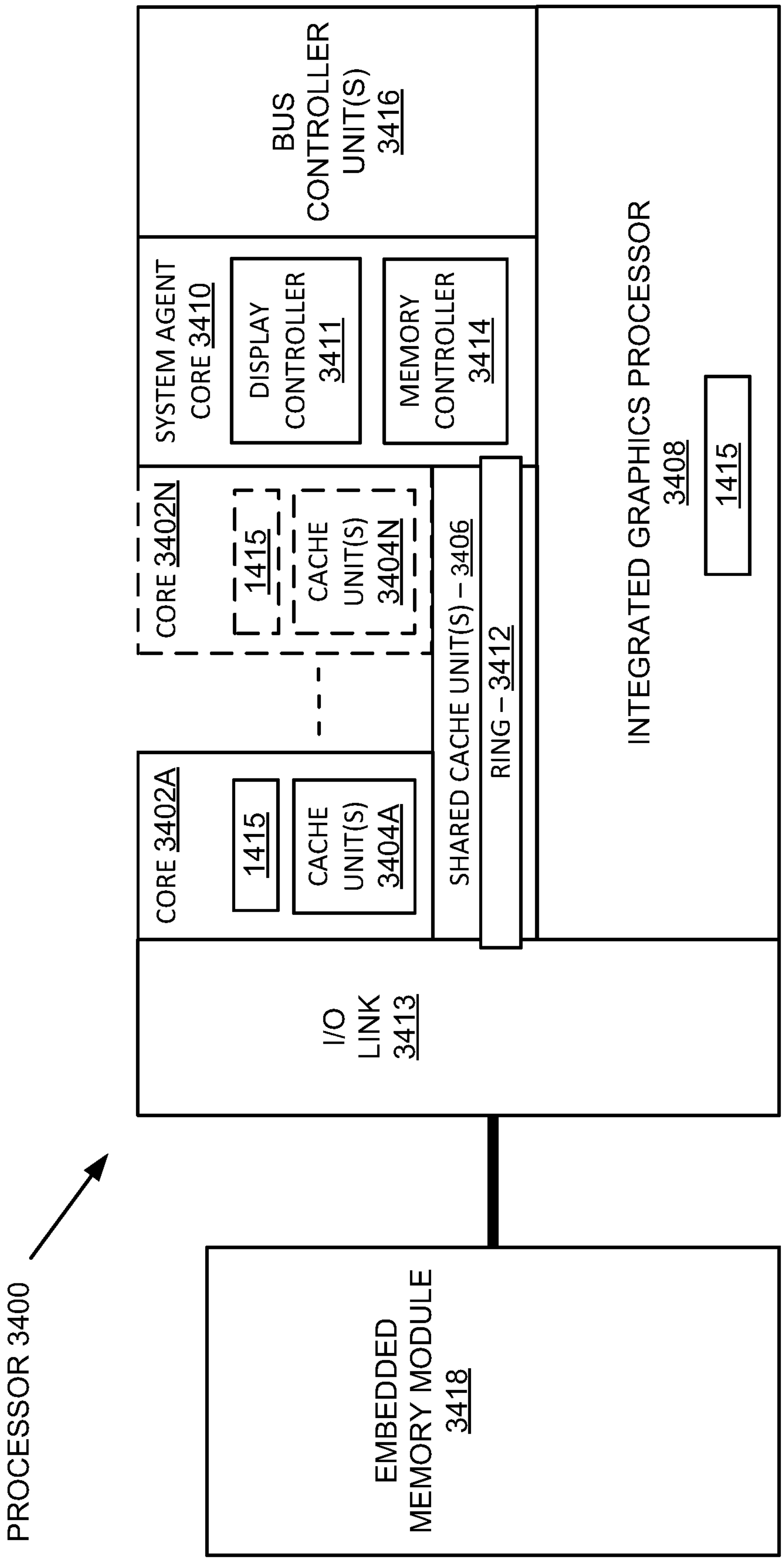
FIG. 34 illustrates at least portions of a graphics processor, according to one or more embodiments.

FIG. 34 is a block diagram of a processor 3400 having one or more processor cores 3402A-3402N, an integrated memory controller 3414, and an integrated graphics processor 3408, according to at least one embodiment. In at least one embodiment, processor 3400 can include additional cores up to and including additional core 3402N represented by dashed lined boxes. In at least one embodiment, each of processor cores 3402A-3402N includes one or more internal cache units 3404A-3404N. In at least one embodiment, each processor core also has access to one or more shared cached units 3406. In at least one embodiment, graphics processor 3408 includes one or more graphics cores 2500.

In at least one embodiment, internal cache units 3404A-3404N and shared cache units 3406 represent a cache memory hierarchy within processor 3400. In at least one embodiment, cache memory units 3404A-3404N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 3406 and 3404A-3404N.

In at least one embodiment, processor 3400 may also include a set of one or more bus controller units 3416 and a system agent core 3410. In at least one embodiment, bus controller units 3416 manage a set of peripheral buses, such as one or more PCI or PCI express busses. In at least one embodiment, system agent core 3410 provides management functionality for various processor components. In at least one embodiment, system agent core 3410 includes one or more integrated memory controllers 3414 to manage access to various external memory devices (not shown).

In at least one embodiment, one or more of processor cores 3402A-3402N include support for simultaneous multi-threading. In at least one embodiment, system agent core 3410 includes components for coordinating and operating cores 3402A-3402N during multi-threaded processing. In at least one embodiment, system agent core 3410 may additionally include a power control unit (PCU), which includes logic and components to regulate one or more power states of processor cores 3402A-3402N and graphics processor 3408.

In at least one embodiment, processor 3400 additionally includes graphics processor 3408 to execute graphics processing operations. In at least one embodiment, graphics processor 3408 couples with shared cache units 3406, and system agent core 3410, including one or more integrated memory controllers 3414. In at least one embodiment, system agent core 3410 also includes a display controller 3411 to drive graphics processor output to one or more coupled displays. In at least one embodiment, display controller 3411 may also be a separate module coupled with graphics processor 3408 via at least one interconnect, or may be integrated within graphics processor 3408.

In at least one embodiment, a ring-based interconnect unit 3412 is used to couple internal components of processor 3400. In at least one embodiment, an alternative interconnect unit may be used, such as a point-to-point interconnect, a switched interconnect, or other techniques. In at least one embodiment, graphics processor 3408 couples with ring interconnect 3412 via an I/O link 3413.

In at least one embodiment, I/O link 3413 represents at least one of multiple varieties of I/O interconnects, including an on package I/O interconnect which facilitates communication between various processor components and a high-performance embedded memory module 3418, such as an eDRAM module. In at least one embodiment, each of processor cores 3402A-3402N and graphics processor 3408 use embedded memory module 3418 as a shared Last Level Cache.

In at least one embodiment, processor cores 3402A-3402N are homogeneous cores executing a common instruction set architecture. In at least one embodiment, processor cores 3402A-3402N are heterogeneous in terms of instruction set architecture (ISA), where one or more of processor cores 3402A-3402N execute a common instruction set, while one or more other cores of processor cores 3402A-3402N executes a subset of a common instruction set or a different instruction set. In at least one embodiment, processor cores 3402A-3402N are heterogeneous in terms of microarchitecture, where one or more cores having a relatively higher power consumption couple with one or more power cores having a lower power consumption. In at least one embodiment, processor 3400 can be implemented on one or more chips or as an SoC integrated circuit.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment portions or all of inference and/or training logic 1415 may be incorporated into graphics processor 3408. For example, in at least one embodiment, training and/or inferencing techniques described herein may use one or more of ALUs embodied in a 3D pipeline, graphics core(s) 3402, shared function logic, or other logic in FIG. 34. Moreover, in at least one embodiment, inferencing and/or training operations described herein may be done using logic other than logic illustrated in FIG. 14A or 14B. In at least one embodiment, weight parameters may be stored in on-chip or off-chip memory and/or registers (shown or not shown) that configure ALUs of processor 3400 to perform one or more machine learning algorithms, neural network architectures, use cases, or training techniques described herein.

In at least one embodiment, such components can be utilized to generate one or more objects within one or more second images based, at least in part, on one or more features of the one or more objects within one or more first images.

Figure 35:
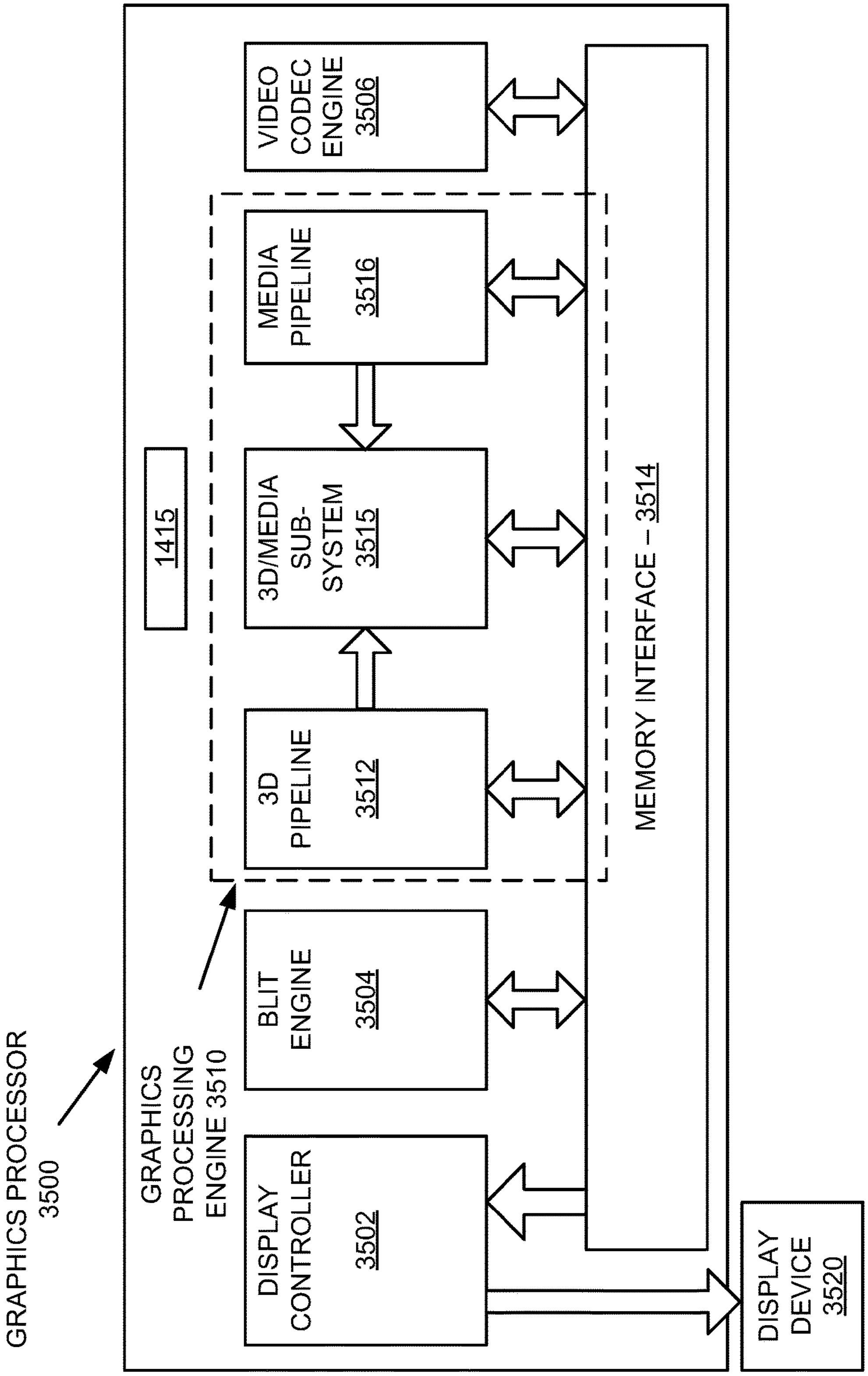
FIG. 35 illustrates at least portions of a graphics processor, according to one or more embodiments.

FIG. 35 is a block diagram of a graphics processor 3500, which may be a discrete graphics processing unit, or may be a graphics processor integrated with a plurality of processing cores. In at least one embodiment, graphics processor 3500 communicates via a memory mapped I/O interface to registers on graphics processor 3500 and with commands placed into memory. In at least one embodiment, graphics processor 3500 includes a memory interface 3514 to access memory. In at least one embodiment, memory interface 3514 is an interface to local memory, one or more internal caches, one or more shared external caches, and/or to system memory. In at least one embodiment, graphics processor 3500 includes graphics core 2500.

In at least one embodiment, graphics processor 3500 also includes a display controller 3502 to drive display output data to a display device 3520. In at least one embodiment, display controller 3502 includes hardware for one or more overlay planes for display device 3520 and composition of multiple layers of video or user interface elements. In at least one embodiment, display device 3520 can be an internal or external display device. In at least one embodiment, display device 3520 is a head mounted display device, such as a virtual reality (VR) display device or an augmented reality (AR) display device. In at least one embodiment, graphics processor 3500 includes a video codec engine 3506 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In at least one embodiment, graphics processor 3500 includes a block image transfer (BLIT) engine 3504 to perform two-dimensional (2D) rasterizer operations including, for example, bit-boundary block transfers. However, in at least one embodiment, 2D graphics operations are performed using one or more components of a graphics processing engine (GPE) 3510. In at least one embodiment, GPE 3510 is a compute engine for performing graphics operations, including three-dimensional (3D) graphics operations and media operations.

In at least one embodiment, GPE 3510 includes a 3D pipeline 3512 for performing 3D operations, such as rendering three-dimensional images and scenes using processing functions that act upon 3D primitive shapes (e.g., rectangle, triangle, etc.). In at least one embodiment, 3D pipeline 3512 includes programmable and fixed function elements that perform various tasks and/or spawn execution threads to a 3D/Media sub-system 3515. While 3D pipeline 3512 can be used to perform media operations, in at least one embodiment, GPE 3510 also includes a media pipeline 3516 that is used to perform media operations, such as video post-processing and image enhancement.

In at least one embodiment, media pipeline 3516 includes fixed function or programmable logic units to perform one or more specialized media operations, such as video decode acceleration, video de-interlacing, and video encode acceleration in place of, or on behalf of, video codec engine 3506. In at least one embodiment, media pipeline 3516 additionally includes a thread spawning unit to spawn threads for execution on 3D/Media sub-system 3515. In at least one embodiment, spawned threads perform computations for media operations on one or more graphics execution units included in 3D/Media sub-system 3515.

In at least one embodiment, 3D/Media subsystem 3515 includes logic for executing threads spawned by 3D pipeline 3512 and media pipeline 3516. In at least one embodiment, 3D pipeline 3512 and media pipeline 3516 send thread execution requests to 3D/Media subsystem 3515, which includes thread dispatch logic for arbitrating and dispatching various requests to available thread execution resources. In at least one embodiment, execution resources include an array of graphics execution units to process 3D and media threads. In at least one embodiment, 3D/Media subsystem 3515 includes one or more internal caches for thread instructions and data. In at least one embodiment, subsystem 3515 also includes shared memory, including registers and addressable memory, to share data between threads and to store output data.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment portions or all of inference and/or training logic 1415 may be incorporated into graphics processor 3500. For example, in at least one embodiment, training and/or inferencing techniques described herein may use one or more of ALUs embodied in 3D pipeline 3512. Moreover, in at least one embodiment, inferencing and/or training operations described herein may be done using logic other than logic illustrated in FIG. 14A or 14B. In at least one embodiment, weight parameters may be stored in on-chip or off-chip memory and/or registers (shown or not shown) that configure ALUs of graphics processor 3500 to perform one or more machine learning algorithms, neural network architectures, use cases, or training techniques described herein.

In at least one embodiment, such components can be utilized to generate one or more objects within one or more second images based, at least in part, on one or more features of the one or more objects within one or more first images.

Figure 36:
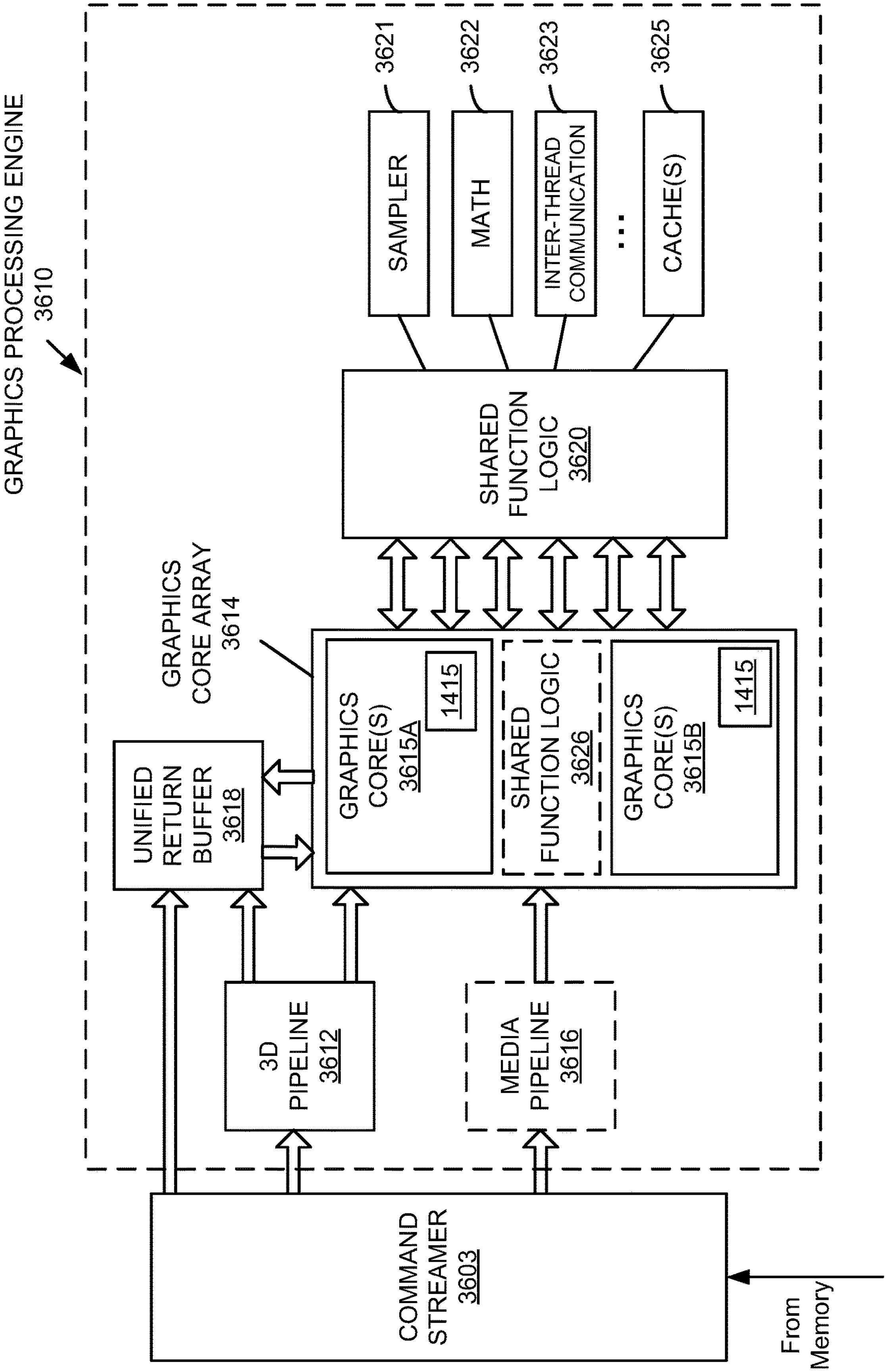
FIG. 36 is a block diagram of a graphics processing engine of a graphics processor in accordance with at least one embodiment.

FIG. 36 is a block diagram of a graphics processing engine 3610 of a graphics processor in accordance with at least one embodiment. In at least one embodiment, graphics processing engine (GPE) 3610 is a version of GPE 3510 shown in FIG. 35. In at least one embodiment, a media pipeline 3616 is optional and may not be explicitly included within GPE 3610. In at least one embodiment, a separate media and/or image processor is coupled to GPE 3610.

In at least one embodiment, GPE 3610 is coupled to or includes a command streamer 3603, which provides a command stream to a 3D pipeline 3612 and/or media pipeline 3616. In at least one embodiment, command streamer 3603 is coupled to memory, which can be system memory, or one or more of internal cache memory and shared cache memory. In at least one embodiment, command streamer 3603 receives commands from memory and sends commands to 3D pipeline 3612 and/or media pipeline 3616. In at least one embodiment, commands are instructions, primitives, or micro-operations fetched from a ring buffer, which stores commands for 3D pipeline 3612 and media pipeline 3616. In at least one embodiment, a ring buffer can additionally include batch command buffers storing batches of multiple commands. In at least one embodiment, commands for 3D pipeline 3612 can also include references to data stored in memory, such as, but not limited to, vertex and geometry data for 3D pipeline 3612 and/or image data and memory objects for media pipeline 3616. In at least one embodiment, 3D pipeline 3612 and media pipeline 3616 process commands and data by performing operations or by dispatching one or more execution threads to a graphics core array 3614. In at least one embodiment, graphics core array 3614 includes one or more blocks of graphics cores (e.g., graphics core(s) 3615A, graphics core(s) 3615B), each block including one or more graphics cores. In at least one embodiment, graphics core(s) 3615A, 3615B may be referred to as execution units ("EUs"). In at least one embodiment, each graphics core includes a set of graphics execution resources that includes general-purpose and graphics specific execution logic to perform graphics and compute operations, as well as fixed function texture processing and/or machine learning and artificial intelligence acceleration logic, including inference and/or training logic 1415 in FIG. 14A and FIG. 14B.

In at least one embodiment, 3D pipeline 3612 includes fixed function and programmable logic to process one or more shader programs, such as vertex shaders, geometry shaders, pixel shaders, fragment shaders, compute shaders, or other shader programs, by processing instructions and dispatching execution threads to graphics core array 3614. In at least one embodiment, graphics core array 3614 provides a unified block of execution resources for use in processing shader programs. In at least one embodiment, a multi-purpose execution logic (e.g., execution units) within graphics core(s) 3615A-3615B of graphic core array 3614 includes support for various 3D API shader languages and can execute multiple simultaneous execution threads associated with multiple shaders.

In at least one embodiment, graphics core array 3614 also includes execution logic to perform media functions, such as video and/or image processing. In at least one embodiment, execution units additionally include general-purpose logic that is programmable to perform parallel general-purpose computational operations, in addition to graphics processing operations.

In at least one embodiment, output data generated by threads executing on graphics core array 3614 can output data to memory in a unified return buffer (URB) 3618. In at least one embodiment, URB 3618 can store data for multiple threads. In at least one embodiment, URB 3618 may be used to send data between different threads executing on graphics core array 3614. In at least one embodiment, URB 3618 may additionally be used for synchronization between threads on graphics core array 3614 and fixed function logic within shared function logic 3620.

In at least one embodiment, graphics core array 3614 is scalable, such that graphics core array 3614 includes a variable number of graphics cores, each having a variable number of execution units based on a target power and performance level of GPE 3610. In at least one embodiment, execution resources are dynamically scalable, such that execution resources may be enabled or disabled as needed.

In at least one embodiment, graphics core array 3614 is coupled to shared function logic 3620 that includes multiple resources that are shared between graphics cores in graphics core array 3614. In at least one embodiment, shared functions performed by shared function logic 3620 are embodied in hardware logic units that provide specialized supplemental functionality to graphics core array 3614. In at least one embodiment, shared function logic 3620 includes but is not limited to a sampler unit 3621, a math unit 3622, and inter-thread communication (ITC) logic 3623. In at least one embodiment, one or more cache(s) 3625 are included in, or coupled to, shared function logic 3620.

In at least one embodiment, a shared function is used if demand for a specialized function is insufficient for inclusion within graphics core array 3614. In at least one embodiment, a single instantiation of a specialized function is used in shared function logic 3620 and shared among other execution resources within graphics core array 3614. In at least one embodiment, specific shared functions within shared function logic 3620 that are used extensively by graphics core array 3614 may be included within shared function logic 3626 within graphics core array 3614. In at least one embodiment, shared function logic 3626 within graphics core array 3614 can include some or all logic within shared function logic 3620. In at least one embodiment, all logic elements within shared function logic 3620 may be duplicated within shared function logic 3626 of graphics core array 3614. In at least one embodiment, shared function logic 3620 is excluded in favor of shared function logic 3626 within graphics core array 3614.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment portions or all of inference and/or training logic 1415 may be incorporated into graphics processor 3610. For example, in at least one embodiment, training and/or inferencing techniques described herein may use one or more of ALUs embodied in 3D pipeline 3612, graphics core(s) 3615, shared function logic 3626, shared function logic 3620, or other logic in FIG. 36. Moreover, in at least one embodiment, inferencing and/or training operations described herein may be done using logic other than logic illustrated in FIG. 14A or 14B. In at least one embodiment, weight parameters may be stored in on-chip or off-chip memory and/or registers (shown or not shown) that configure ALUs of graphics processor 3610 to perform one or more machine learning algorithms, neural network architectures, use cases, or training techniques described herein.

In at least one embodiment, such components can be utilized to generate one or more objects within one or more second images based, at least in part, on one or more features of the one or more objects within one or more first images.

Figure 37:
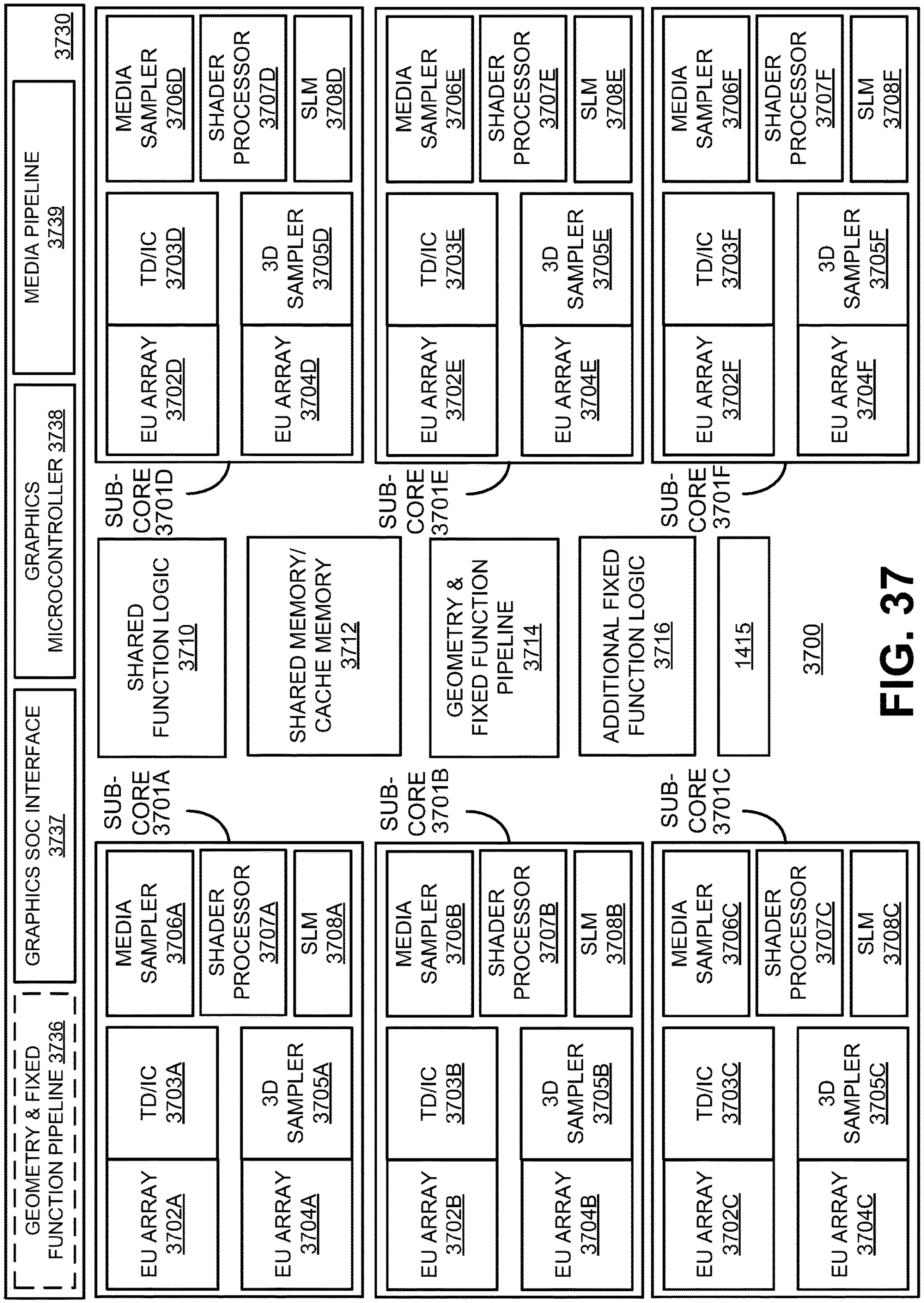
FIG. 37 is a block diagram of at least portions of a graphics processor core, according to at least one embodiment.

FIG. 37 is a block diagram of hardware logic of a graphics processor core 3700, according to at least one embodiment described herein. In at least one embodiment, graphics processor core 3700 includes graphics core 2500. In at least one embodiment, graphics processor core 3700 is included within a graphics core array. In at least one embodiment, graphics processor core 3700, sometimes referred to as a core slice, can be one or multiple graphics cores within a modular graphics processor. In at least one embodiment, graphics processor core 3700 is exemplary of one graphics core slice, and a graphics processor as described herein may include multiple graphics core slices based on target power and performance envelopes. In at least one embodiment, each graphics core 3700 can include a fixed function block 3730 coupled with multiple sub-cores 3701A-3701F, also referred to as sub-slices, that include modular blocks of general-purpose and fixed function logic.

In at least one embodiment, fixed function block 3730 includes a geometry and fixed function pipeline 3736 that can be shared by all sub-cores in graphics processor 3700, for example, in lower performance and/or lower power graphics processor implementations. In at least one embodiment, geometry and fixed function pipeline 3736 includes a 3D fixed function pipeline, a video front-end unit, a thread spawner and thread dispatcher, and a unified return buffer manager, which manages unified return buffers.

In at least one embodiment, fixed function block 3730 also includes a graphics SoC interface 3737, a graphics microcontroller 3738, and a media pipeline 3739. In at least one embodiment, graphics SoC interface 3737 provides an interface between graphics core 3700 and other processor cores within a system on a chip integrated circuit. In at least one embodiment, graphics microcontroller 3738 is a programmable sub-processor that is configurable to manage various functions of graphics processor 3700, including thread dispatch, scheduling, and pre-emption. In at least one embodiment, media pipeline 3739 includes logic to facilitate decoding, encoding, pre-processing, and/or post-processing of multimedia data, including image and video data. In at least one embodiment, media pipeline 3739 implements media operations via requests to compute or sampling logic within sub-cores 3701A-3701F.

In at least one embodiment, SoC interface 3737 enables graphics core 3700 to communicate with general-purpose application processor cores (e.g., CPUs) and/or other components within an SoC, including memory hierarchy elements such as a shared last level cache memory, system RAM, and/or embedded on-chip or on-package DRAM. In at least one embodiment, SoC interface 3737 can also enable communication with fixed function devices within an SoC, such as camera imaging pipelines, and enables use of and/or implements global memory atomics that may be shared between graphics core 3700 and CPUs within an SoC. In at least one embodiment, graphics SoC interface 3737 can also implement power management controls for graphics processor core 3700 and enable an interface between a clock domain of graphics processor core 3700 and other clock domains within an SoC. In at least one embodiment, SoC interface 3737 enables receipt of command buffers from a command streamer and global thread dispatcher that are configured to provide commands and instructions to each of one or more graphics cores within a graphics processor. In at least one embodiment, commands and instructions can be dispatched to media pipeline 3739, when media operations are to be performed, or a geometry and fixed function pipeline (e.g., geometry and fixed function pipeline 3736, and/or a geometry and fixed function pipeline 3714) when graphics processing operations are to be performed.

In at least one embodiment, graphics microcontroller 3738 can be configured to perform various scheduling and management tasks for graphics core 3700. In at least one embodiment, graphics microcontroller 3738 can perform graphics and/or compute workload scheduling on various graphics parallel engines within execution unit (EU) arrays 3702A-3702F, 3704A-3704F within sub-cores 3701A-3701F. In at least one embodiment, host software executing on a CPU core of an SoC including graphics core 3700 can submit workloads to one of multiple graphic processor paths, which invokes a scheduling operation on an appropriate graphics engine. In at least one embodiment, scheduling operations include determining which workload to run next, submitting a workload to a command streamer, preempting existing workloads running on an engine, monitoring progress of a workload, and notifying host software when a workload is complete. In at least one embodiment, graphics microcontroller 3738 can also facilitate low-power or idle states for graphics core 3700, providing graphics core 3700 with an ability to save and restore registers within graphics core 3700 across low-power state transitions independently from an operating system and/or graphics driver software on a system.

In at least one embodiment, graphics core 3700 may have greater than or fewer than illustrated sub-cores 3701A-3701F, up to N modular sub-cores. For each set of N sub-cores, in at least one embodiment, graphics core 3700 can also include shared function logic 3710, shared and/or cache memory 3712, geometry/fixed function pipeline 3714, as well as additional fixed function logic 3716 to accelerate various graphics and compute processing operations. In at least one embodiment, shared function logic 3710 can include logic units (e.g., sampler, math, and/or inter-thread communication logic) that can be shared by each N sub-cores within graphics core 3700. In at least one embodiment, shared and/or cache memory 3712 can be a last-level cache for N sub-cores 3701A-3701F within graphics core 3700 and can also serve as shared memory that is accessible by multiple sub-cores. In at least one embodiment, geometry/fixed function pipeline 3714 can be included instead of geometry/fixed function pipeline 3736 within fixed function block 3730 and can include similar logic units.

In at least one embodiment, graphics core 3700 includes additional fixed function logic 3716 that can include various fixed function acceleration logic for use by graphics core 3700. In at least one embodiment, additional fixed function logic 3716 includes an additional geometry pipeline for use in position-only shading. In position-only shading, at least two geometry pipelines exist, whereas in a full geometry pipeline within geometry and fixed function pipelines 3714, 3736, and a cull pipeline, which is an additional geometry pipeline that may be included within additional fixed function logic 3716. In at least one embodiment, a cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 3716 can execute position shaders in parallel with a main application and generally generates critical results faster than a full pipeline, as a cull pipeline fetches and shades position attributes of vertices, without performing rasterization and rendering of pixels to a frame buffer. In at least one embodiment, a cull pipeline can use generated critical results to compute visibility information for all triangles without regard to whether those triangles are culled. In at least one embodiment, a full pipeline (which in this instance may be referred to as a replay pipeline) can consume visibility information to skip culled triangles to shade only visible triangles that are finally passed to a rasterization phase.

In at least one embodiment, additional fixed function logic 3716 can also include machine-learning acceleration logic, such as fixed function matrix multiplication logic, for implementations including optimizations for machine learning training or inferencing.

In at least one embodiment, within each graphics sub-core 3701A-3701F includes a set of execution resources that may be used to perform graphics, media, and compute operations in response to requests by graphics pipeline, media pipeline, or shader programs. In at least one embodiment, graphics sub-cores 3701A-3701F include multiple EU arrays 3702A-3702F, 3704A-3704F, thread dispatch and inter-thread communication (TD/IC) logic 3703A-3703F, a 3D (e.g., texture) sampler 3705A-3705F, a media sampler 3706A-3706F, a shader processor 3707A-3707F, and shared local memory (SLM) 3708A-3708F. In at least one embodiment, EU arrays 3702A-3702F, 3704A-3704F each include multiple execution units, which are general-purpose graphics processing units capable of performing floating-point and integer/fixed-point logic operations in service of a graphics, media, or compute operation, including graphics, media, or compute shader programs. In at least one embodiment, TD/IC logic 3703A-3703F performs local thread dispatch and thread control operations for execution units within a sub-core and facilitates communication between threads executing on execution units of a sub-core. In at least one embodiment, 3D samplers 3705A-3705F can read texture or other 3D graphics related data into memory. In at least one embodiment, 3D samplers can read texture data differently based on a configured sample state and texture format associated with a given texture. In at least one embodiment, media samplers 3706A-3706F can perform similar read operations based on a type and format associated with media data. In at least one embodiment, each graphics sub-core 3701A-3701F can alternately include a unified 3D and media sampler. In at least one embodiment, threads executing on execution units within each of sub-cores 3701A-3701F can make use of shared local memory 3708A-3708F within each sub-core, to enable threads executing within a thread group to execute using a common pool of on-chip memory.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, portions or all of inference and/or training logic 1415 may be incorporated into graphics processor 3700. For example, in at least one embodiment, training and/or inferencing techniques described herein may use one or more of ALUs embodied in a 3D pipeline, graphics microcontroller 3738, geometry and fixed function pipeline 3714 and 3736, or other logic in FIG. 37. Moreover, in at least one embodiment, inferencing and/or training operations described herein may be done using logic other than logic illustrated in FIG. 14A or 14B. In at least one embodiment, weight parameters may be stored in on-chip or off-chip memory and/or registers (shown or not shown) that configure ALUs of graphics processor 3700 to perform one or more machine learning algorithms, neural network architectures, use cases, or training techniques described herein.

In at least one embodiment, such components can be utilized to generate one or more objects within one or more second images based, at least in part, on one or more features of the one or more objects within one or more first images.

Figure 38A:
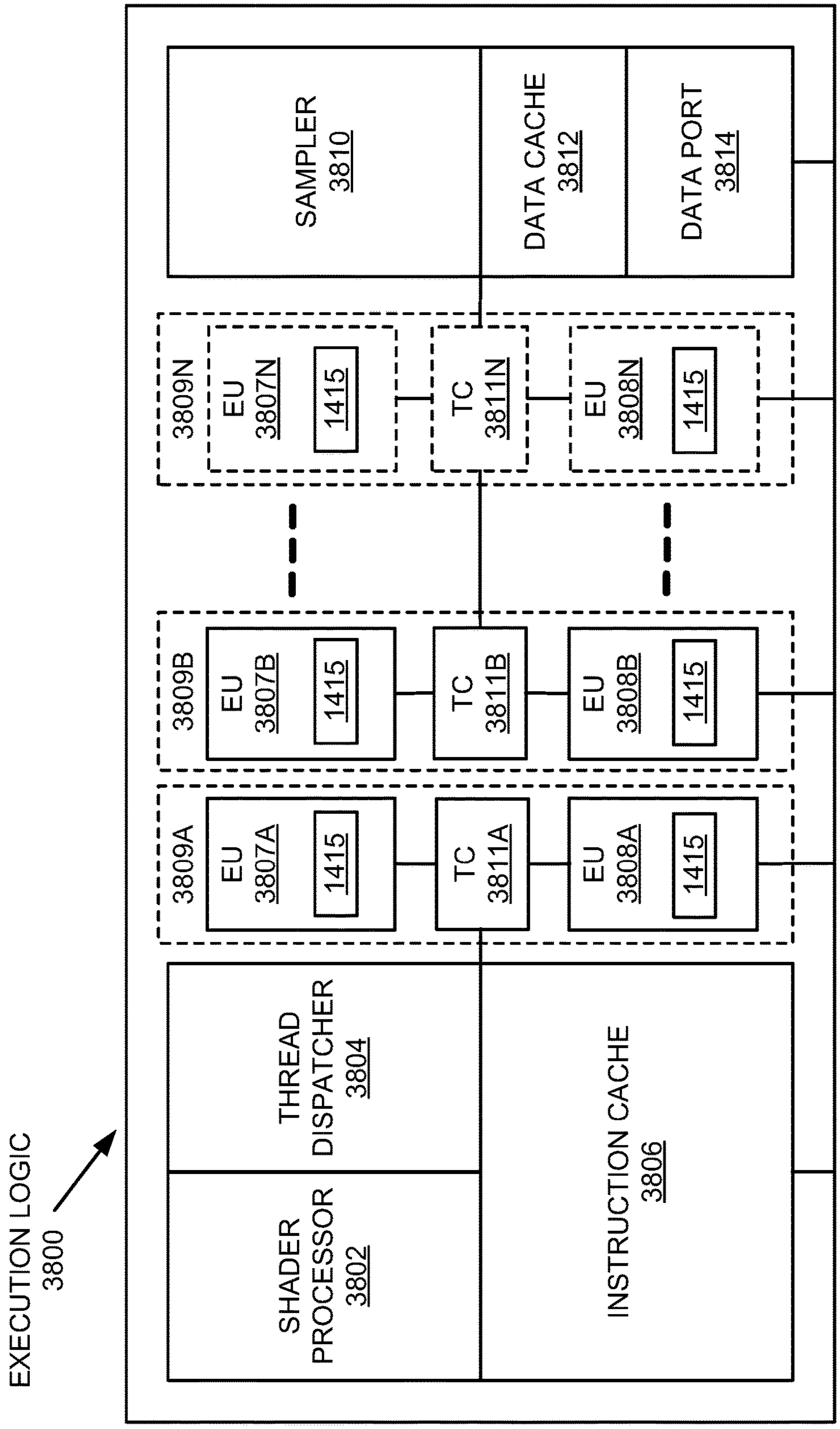
FIGS. 38A-38B illustrate thread execution logic including an array of processing elements of a graphics processor core according to at least one embodiment.
Figure 38B:
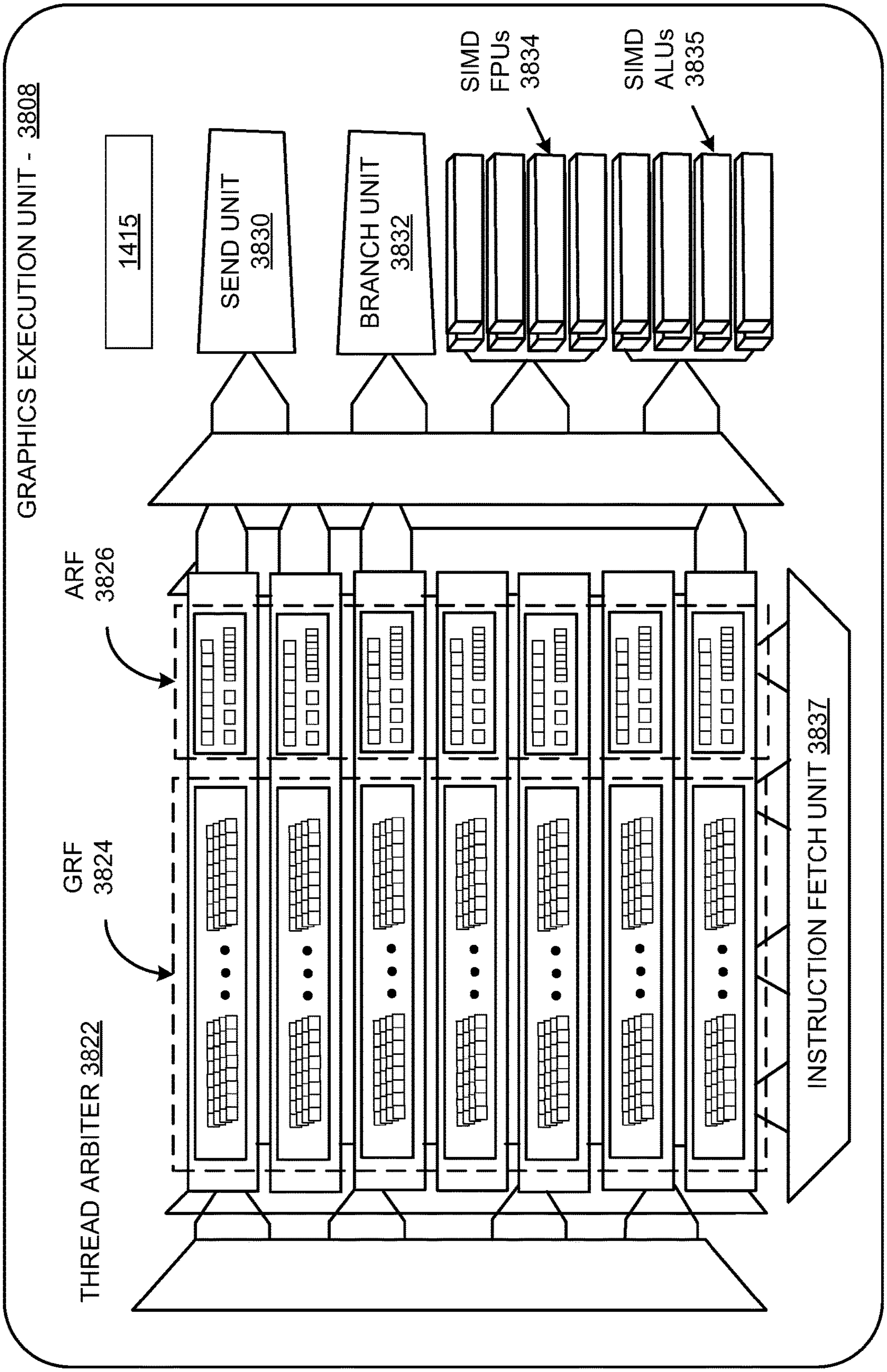

FIGS. 38A-38B illustrate thread execution logic 3800 including an array of processing elements of a graphics processor core according to at least one embodiment. FIG. 38A illustrates at least one embodiment, in which thread execution logic 3800 is used. FIG. 38B illustrates exemplary internal details of a graphics execution unit 3808, according to at least one embodiment.

As illustrated in FIG. 38A, in at least one embodiment, thread execution logic 3800 includes a shader processor 3802, a thread dispatcher 3804, an instruction cache 3806, a scalable execution unit array including a plurality of execution units 3807A-3807N and 3808A-3808N, a sampler 3810, a data cache 3812, and a data port 3814. In at least one embodiment, a scalable execution unit array can dynamically scale by enabling or disabling one or more execution units (e.g., any of execution unit 3808A-N or 3807A-N) based on computational requirements of a workload, for example. In at least one embodiment, scalable execution units are interconnected via an interconnect fabric that links to each execution unit. In at least one embodiment, thread execution logic 3800 includes one or more connections to memory, such as system memory or cache memory, through one or more of instruction cache 3806, data port 3814, sampler 3810, and execution units 3807 or 3808. In at least one embodiment, each execution unit (e.g., 3807A) is a stand-alone programmable general-purpose computational unit that is capable of executing multiple simultaneous hardware threads while processing multiple data elements in parallel for each thread. In at least one embodiment, array of execution units 3807 and/or 3808 is scalable to include any number individual execution units.

In at least one embodiment, execution units 3807 and/or 3808 are primarily used to execute shader programs. In at least one embodiment, shader processor 3802 can process various shader programs and dispatch execution threads associated with shader programs via a thread dispatcher 3804. In at least one embodiment, thread dispatcher 3804 includes logic to arbitrate thread initiation requests from graphics and media pipelines and instantiate requested threads on one or more execution units in execution units 3807 and/or 3808. For example, in at least one embodiment, a geometry pipeline can dispatch vertex, tessellation, or geometry shaders to thread execution logic for processing. In at least one embodiment, thread dispatcher 3804 can also process runtime thread spawning requests from executing shader programs.

In at least one embodiment, execution units 3807 and/or 3808 support an instruction set that includes native support for many standard 3D graphics shader instructions, such that shader programs from graphics libraries (e.g., Direct 3D and OpenGL) are executed with a minimal translation. In at least one embodiment, execution units support vertex and geometry processing (e.g., vertex programs, geometry programs, and/or vertex shaders), pixel processing (e.g., pixel shaders, fragment shaders) and general-purpose processing (e.g., compute and media shaders). In at least one embodiment, each of execution units 3807 and/or 3808, which include one or more arithmetic logic units (ALUs), is capable of multi-issue single instruction multiple data (SIMD) execution and multi-threaded operation enables an efficient execution environment despite higher latency memory accesses. In at least one embodiment, each hardware thread within each execution unit has a dedicated high-bandwidth register file and associated independent thread-state. In at least one embodiment, execution is multi-issue per clock to pipelines capable of integer, single and double precision floating point operations, SIMD branch capability, logical operations, transcendental operations, and other miscellaneous operations. In at least one embodiment, while waiting for data from memory or one of shared functions, dependency logic within execution units 3807 and/or 3808 causes a waiting thread to sleep until requested data has been returned. In at least one embodiment, while an awaiting thread is sleeping, hardware resources may be devoted to processing other threads. For example, in at least one embodiment, during a delay associated with a vertex shader operation, an execution unit can perform operations for a pixel shader, fragment shader, or another type of shader program, including a different vertex shader.

In at least one embodiment, each execution unit in execution units 3807 and/or 3808 operates on arrays of data elements. In at least one embodiment, a number of data elements is an "execution size," or number of channels for an instruction. In at least one embodiment, an execution channel is a logical unit of execution for data element access, masking, and flow control within instructions. In at least one embodiment, a number of channels may be independent of a number of physical arithmetic logic units (ALUs) or floating point units (FPUs) for a particular graphics processor. In at least one embodiment, execution units 3807 and/or 3808 support integer and floating-point data types.

In at least one embodiment, an execution unit instruction set includes SIMD instructions. In at least one embodiment, various data elements can be stored as a packed data type in a register and execution unit will process various elements based on data size of elements. For example, in at least one embodiment, when operating on a 256-bit wide vector, 256 bits of a vector are stored in a register and an execution unit operates on a vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, in at least one embodiment, different vector widths and register sizes are possible.

In at least one embodiment, one or more execution units can be combined into a fused execution unit 3809A-3809N having thread control logic (3811A-3811N) that is common to fused EUs such as execution unit 3807A fused with execution unit 3808A into fused execution unit 3809A. In at least one embodiment, multiple EUs can be fused into an EU group. In at least one embodiment, each EU in a fused EU group can be configured to execute a separate SIMD hardware thread, with a number of EUs in a fused EU group possibly varying according to various embodiments. In at least one embodiment, various SIMD widths can be performed per-EU, including but not limited to SIMD8, SIMD16, and SIMD32. In at least one embodiment, each fused graphics execution unit 3809A-3809N includes at least two execution units. For example, in at least one embodiment, fused execution unit 3809A includes a first EU 3807A, second EU 3808A, and thread control logic 3811A that is common to first EU 3807A and second EU 3808A. In at least one embodiment, thread control logic 3811A controls threads executed on fused graphics execution unit 3809A, allowing each EU within fused execution units 3809A-3809N to execute using a common instruction pointer register.

In at least one embodiment, one or more internal instruction caches (e.g., 3806) are included in thread execution logic 3800 to cache thread instructions for execution units. In at least one embodiment, one or more data caches (e.g., 3812) are included to cache thread data during thread execution. In at least one embodiment, sampler 3810 is included to provide texture sampling for 3D operations and media sampling for media operations. In at least one embodiment, sampler 3810 includes specialized texture or media sampling functionality to process texture or media data during sampling process before providing sampled data to an execution unit.

During execution, in at least one embodiment, graphics and media pipelines send thread initiation requests to thread execution logic 3800 via thread spawning and dispatch logic. In at least one embodiment, once a group of geometric objects has been processed and rasterized into pixel data, pixel processor logic (e.g., pixel shader logic, fragment shader logic, etc.) within shader processor 3802 is invoked to further compute output information and cause results to be written to output surfaces (e.g., color buffers, depth buffers, stencil buffers, etc.). In at least one embodiment, a pixel shader or a fragment shader calculates values of various vertex attributes that are to be interpolated across a rasterized object. In at least one embodiment, pixel processor logic within shader processor 3802 then executes an application programming interface (API)-supplied pixel or fragment shader program. In at least one embodiment, to execute a shader program, shader processor 3802 dispatches threads to an execution unit (e.g., 3808A) via thread dispatcher 3804. In at least one embodiment, shader processor 3802 uses texture sampling logic in sampler 3810 to access texture data in texture maps stored in memory. In at least one embodiment, arithmetic operations on texture data and input geometry data compute pixel color data for each geometric fragment, or discards one or more pixels from further processing.

In at least one embodiment, data port 3814 provides a memory access mechanism for thread execution logic 3800 to output processed data to memory for further processing on a graphics processor output pipeline. In at least one embodiment, data port 3814 includes or couples to one or more cache memories (e.g., data cache 3812) to cache data for memory access via a data port.

As illustrated in FIG. 38B, in at least one embodiment, a graphics execution unit 3808 can include an instruction fetch unit 3837, a general register file array (GRF) 3824, an architectural register file array (ARF) 3826, a thread arbiter 3822, a send unit 3830, a branch unit 3832, a set of SIMD floating point units (FPUs) 3834, and a set of dedicated integer SIM D ALUs 3835. In at least one embodiment, GRF 3824 and ARF 3826 includes a set of general register files and architecture register files associated with each simultaneous hardware thread that may be active in graphics execution unit 3808. In at least one embodiment, per thread architectural state is maintained in ARF 3826, while data used during thread execution is stored in GRF 3824. In at least one embodiment, execution state of each thread, including instruction pointers for each thread, can be held in thread-specific registers in ARF 3826.

In at least one embodiment, graphics execution unit 3808 has an architecture that is a combination of Simultaneous Multi-Threading (SMT) and fine-grained Interleaved Multi-Threading (IMT). In at least one embodiment, architecture has a modular configuration that can be fine-tuned at design time based on a target number of simultaneous threads and number of registers per execution unit, where execution unit resources are divided across logic used to execute multiple simultaneous threads.

In at least one embodiment, graphics execution unit 3808 can co-issue multiple instructions, which may each be different instructions. In at least one embodiment, thread arbiter 3822 of graphics execution unit thread 3808 can dispatch instructions to one of send unit 3830, branch unit 3832, or SIMD FPU(s) 3834 for execution. In at least one embodiment, each execution thread can access 128 general-purpose registers within GRF 3824, where each register can store 32 bytes, accessible as a SIMD 8-element vector of 32-bit data elements. In at least one embodiment, each execution unit thread has access to 4 kilobytes within GRF 3824, although embodiments are not so limited, and greater or fewer register resources may be provided in other embodiments. In at least one embodiment, up to seven threads can execute simultaneously, although a number of threads per execution unit can also vary according to embodiments. In at least one embodiment, in which seven threads may access 4 kilobytes, GRF 3824 can store a total of 28 kilobytes. In at least one embodiment, flexible addressing modes can permit registers to be addressed together to build effectively wider registers or to represent strided rectangular block data structures.

In at least one embodiment, memory operations, sampler operations, and other longer-latency system communications are dispatched via "send" instructions that are executed by message passing to send unit 3830. In at least one embodiment, branch instructions are dispatched to branch unit 3832 to facilitate SIMD divergence and eventual convergence.

In at least one embodiment, graphics execution unit 3808 includes one or more SIMD floating point units (FPU(s)) 3834 to perform floating-point operations. In at least one embodiment, FPU(s) 3834 also support integer computation. In at least one embodiment, FPU(s) 3834 can SIMD execute up to M number of 32-bit floating-point (or integer) operations, or SIMD execute up to 2M 16-bit integer or 16-bit floating-point operations. In at least one embodiment, at least one FPU provides extended math capability to support high-throughput transcendental math functions and double precision 64-bit floating-point. In at least one embodiment, a set of 8-bit integer SIMD ALUs 3835 are also present, and may be specifically optimized to perform operations associated with machine learning computations.

In at least one embodiment, arrays of multiple instances of graphics execution unit 3808 can be instantiated in a graphics sub-core grouping (e.g., a sub-slice). In at least one embodiment, execution unit 3808 can execute instructions across a plurality of execution channels. In at least one embodiment, each thread executed on graphics execution unit 3808 is executed on a different channel.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, portions or all of inference and/or training logic 1415 may be incorporated into thread execution logic 3800. Moreover, in at least one embodiment, inferencing and/or training operations described herein may be done using logic other than logic illustrated in FIG. 14A or 14B. In at least one embodiment, weight parameters may be stored in on-chip or off-chip memory and/or registers (shown or not shown) that configure ALUs thread of execution logic 3800 to perform one or more machine learning algorithms, neural network architectures, use cases, or training techniques described herein.

In at least one embodiment, such components can be utilized to generate one or more objects within one or more second images based, at least in part, on one or more features of the one or more objects within one or more first images.

Figure 39:
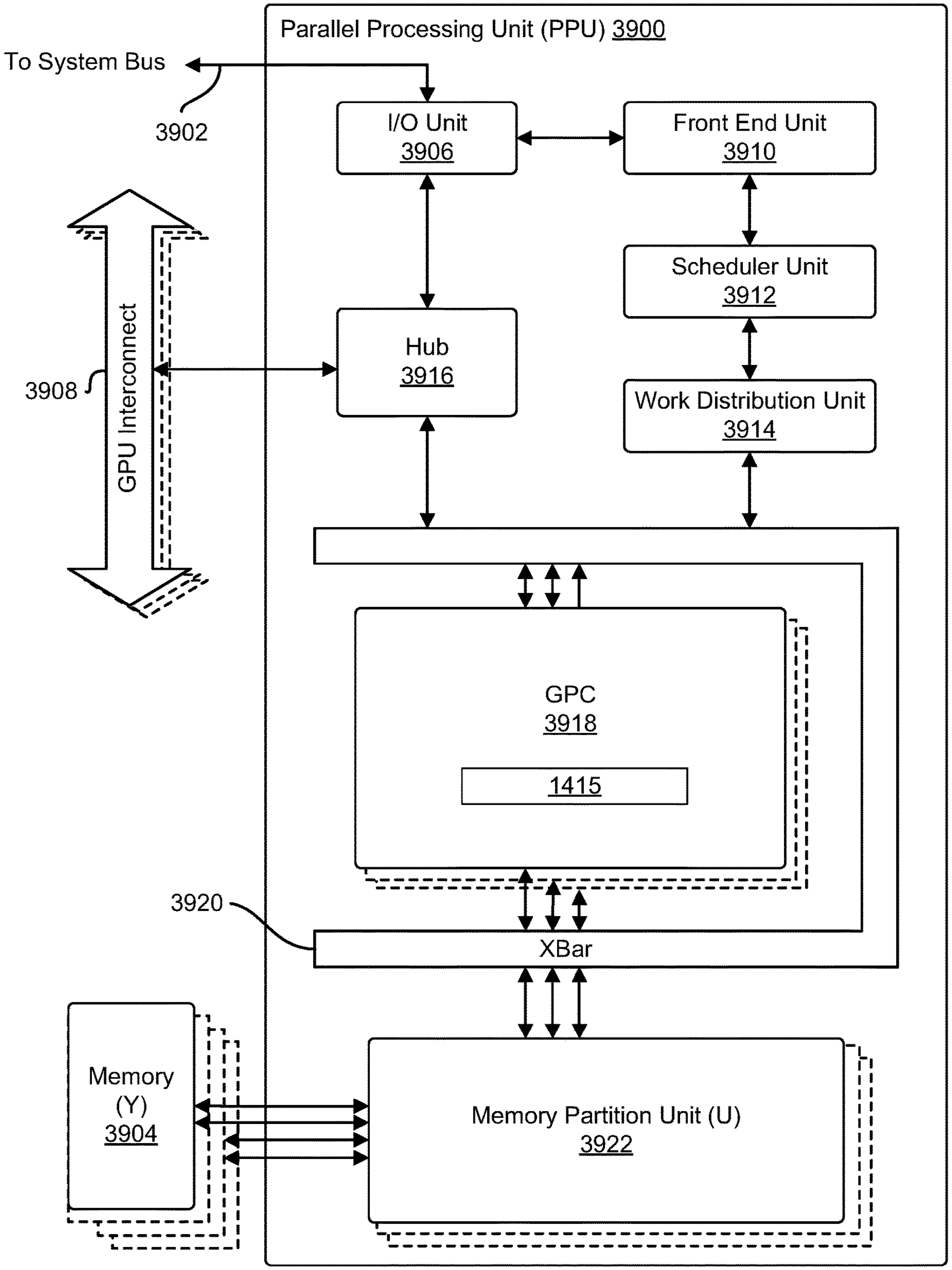
FIG. 39 illustrates a parallel processing unit ("PPU"), according to at least one embodiment.

FIG. 39 illustrates a parallel processing unit ("PPU") 3900, according to at least one embodiment. In at least one embodiment, PPU 3900 is configured with machine-readable code that, if executed by PPU 3900, causes PPU 3900 to perform some or all of processes and techniques described throughout this disclosure. In at least one embodiment, PPU 3900 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, PPU 3900 includes one or more graphics cores 2500 In at least one embodiment, a thread refers to a thread of execution and is an instantiation of a set of instructions configured to be executed by PPU 3900. In at least one embodiment, PPU 3900 is a graphics processing unit ("GPU") configured to implement a graphics rendering pipeline for processing three-dimensional ("3D") graphics data in order to generate two-dimensional ("2D") image data for display on a display device such as a liquid crystal display ("LCD") device. In at least one embodiment, PPU 3900 is utilized to perform computations such as linear algebra operations and machine-learning operations. FIG. 39 illustrates an example parallel processor for illustrative purposes only and should be construed as a non-limiting example of processor architectures contemplated within scope of this disclosure and that any suitable processor may be employed to supplement and/or substitute for same.

In at least one embodiment, one or more PPUs 3900 are configured to accelerate High Performance Computing ("HPC"), data center, and machine learning applications. In at least one embodiment, PPU 3900 is configured to accelerate deep learning systems and applications including following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In at least one embodiment, PPU 3900 includes, without limitation, an Input/Output ("I/O") unit 3906, a front-end unit 3910, a scheduler (sequencer) unit 3912, a work distribution unit 3914, a hub 3916, a crossbar ("XBar") 3920, one or more general processing clusters ("GPCs") 3918, and one or more partition units ("memory partition units") 3922. In at least one embodiment, PPU 3900 is connected to a host processor or other PPUs 3900 via one or more high-speed GPU interconnects ("GPU interconnects") 3908. In at least one embodiment, PPU 3900 is connected to a host processor or other peripheral devices via a system bus 3902. In at least one embodiment, PPU 3900 is connected to a local memory comprising one or more memory devices ("memory") 3904. In at least one embodiment, memory devices 3904 include, without limitation, one or more dynamic random access memory ("DRAM") devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 3908 may refer to a wire-based multi-lane communications link that is used by systems to scale and include one or more PPUs 3900 combined with one or more central processing units ("CPUs"), supports cache coherence between PPUs 3900 and CPUs, and CPU mastering. In at least one embodiment, data and/or commands are transmitted by high-speed GPU interconnect 3908 through hub 3916 to/from other units of PPU 3900 such as one or more copy engines, video encoders, video decoders, power management units, and other components which may not be explicitly illustrated in FIG. 39.

In at least one embodiment, I/O unit 3906 is configured to transmit and receive communications (e.g., commands, data) from a host processor (not illustrated in FIG. 39) over system bus 3902. In at least one embodiment, I/O unit 3906 communicates with host processor directly via system bus 3902 or through one or more intermediate devices such as a memory bridge. In at least one embodiment, I/O unit 3906 may communicate with one or more other processors, such as one or more of PPUs 3900 via system bus 3902. In at least one embodiment, I/O unit 3906 implements a Peripheral Component Interconnect Express ("PCIe") interface for communications over a PCIe bus. In at least one embodiment, I/O unit 3906 implements interfaces for communicating with external devices.

In at least one embodiment, I/O unit 3906 decodes packets received via system bus 3902. In at least one embodiment, at least some packets represent commands configured to cause PPU 3900 to perform various operations. In at least one embodiment, I/O unit 3906 transmits decoded commands to various other units of PPU 3900 as specified by commands. In at least one embodiment, commands are transmitted to front-end unit 3910 and/or transmitted to hub 3916 or other units of PPU 3900 such as one or more copy engines, a video encoder, a video decoder, a power management unit, etc. (not explicitly illustrated in FIG. 39). In at least one embodiment, I/O unit 3906 is configured to route communications between and among various logical units of PPU 3900.

In at least one embodiment, a program executed by host processor encodes a command stream in a buffer that provides workloads to PPU 3900 for processing. In at least one embodiment, a workload comprises instructions and data to be processed by those instructions. In at least one embodiment, a buffer is a region in a memory that is accessible (e.g., read/write) by both a host processor and PPU 3900 a host interface unit may be configured to access that buffer in a system memory connected to system bus 3902 via memory requests transmitted over system bus 3902 by I/O unit 3906. In at least one embodiment, a host processor writes a command stream to a buffer and then transmits a pointer to a start of a command stream to PPU 3900 such that front-end unit 3910 receives pointers to one or more command streams and manages one or more command streams, reading commands from command streams and forwarding commands to various units of PPU 3900.

In at least one embodiment, front-end unit 3910 is coupled to scheduler unit 3912 (which may be referred to as a sequencer unit, a thread sequencer, and/or an asynchronous compute engine) that configures various GPCs 3918 to process tasks defined by one or more command streams. In at least one embodiment, scheduler unit 3912 is configured to track state information related to various tasks managed by scheduler unit 3912 where state information may indicate which of GPCs 3918 a task is assigned to, whether task is active or inactive, a priority level associated with task, and so forth. In at least one embodiment, scheduler unit 3912 manages execution of a plurality of tasks on one or more of GPCs 3918.

In at least one embodiment, scheduler unit 3912 is coupled to work distribution unit 3914 that is configured to dispatch tasks for execution on GPCs 3918. In at least one embodiment, work distribution unit 3914 tracks a number of scheduled tasks received from scheduler unit 3912 and work distribution unit 3914 manages a pending task pool and an active task pool for each of GPCs 3918. In at least one embodiment, pending task pool comprises a number of slots (e.g., 32 slots) that contain tasks assigned to be processed by a particular GPC 3918; an active task pool may comprise a number of slots (e.g., 4 slots) for tasks that are actively being processed by GPCs 3918 such that as one of GPCs 3918 completes execution of a task, that task is evicted from that active task pool for GPC 3918 and another task from a pending task pool is selected and scheduled for execution on GPC 3918. In at least one embodiment, if an active task is idle on GPC 3918, such as while waiting for a data dependency to be resolved, then that active task is evicted from GPC 3918 and returned to that pending task pool while another task in that pending task pool is selected and scheduled for execution on GPC 3918.

In at least one embodiment, work distribution unit 3914 communicates with one or more GPCs 3918 via XBar 3920. In at least one embodiment, XBar 3920 is an interconnect network that couples many of units of PPU 3900 to other units of PPU 3900 and can be configured to couple work distribution unit 3914 to a particular GPC 3918. In at least one embodiment, one or more other units of PPU 3900 may also be connected to XBar 3920 via hub 3916.

In at least one embodiment, tasks are managed by scheduler unit 3912 and dispatched to one of GPCs 3918 by work distribution unit 3914. In at least one embodiment, GPC 3918 is configured to process task and generate results. In at least one embodiment, results may be consumed by other tasks within GPC 3918, routed to a different GPC 3918 via XBar 3920, or stored in memory 3904. In at least one embodiment, results can be written to memory 3904 via partition units 3922, which implement a memory interface for reading and writing data to/from memory 3904. In at least one embodiment, results can be transmitted to another PPU or CPU via high-speed GPU interconnect 3908. In at least one embodiment, PPU 3900 includes, without limitation, a number U of partition units 3922 that is equal to a number of separate and distinct memory devices 3904 coupled to PPU 3900, as described in more detail herein in conjunction with FIG. 41.

In at least one embodiment, a host processor executes a driver kernel that implements an application programming interface ("API") that enables one or more applications executing on a host processor to schedule operations for execution on PPU 3900. In at least one embodiment, multiple compute applications are simultaneously executed by PPU 3900 and PPU 3900 provides isolation, quality of service ("QoS"), and independent address spaces for multiple compute applications. In at least one embodiment, an application generates instructions (e.g., in form of API calls) that cause a driver kernel to generate one or more tasks for execution by PPU 3900 and that driver kernel outputs tasks to one or more streams being processed by PPU 3900. In at least one embodiment, each task comprises one or more groups of related threads, which may be referred to as a warp, wavefront, and/or wave. In at least one embodiment, a warp, wavefront, and/or wave comprises a plurality of related threads (e.g., 32 threads) that can be executed in parallel. In at least one embodiment, cooperating threads can refer to a plurality of threads including instructions to perform task and that exchange data through shared memory. In at least one embodiment, threads and cooperating threads are described in more detail in conjunction with FIG. 41.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, deep learning application processor is used to train a machine learning model, such as a neural network, to predict or infer information provided to PPU 3900. In at least one embodiment, deep learning application processor is used to infer or predict information based on a trained machine learning model (e.g., neural network) that has been trained by another processor or system or by PPU 3900. In at least one embodiment, PPU 3900 may be used to perform one or more neural network use cases described herein.

In at least one embodiment, such components can be utilized to generate one or more objects within one or more second images based, at least in part, on one or more features of the one or more objects within one or more first images.

Figure 40:
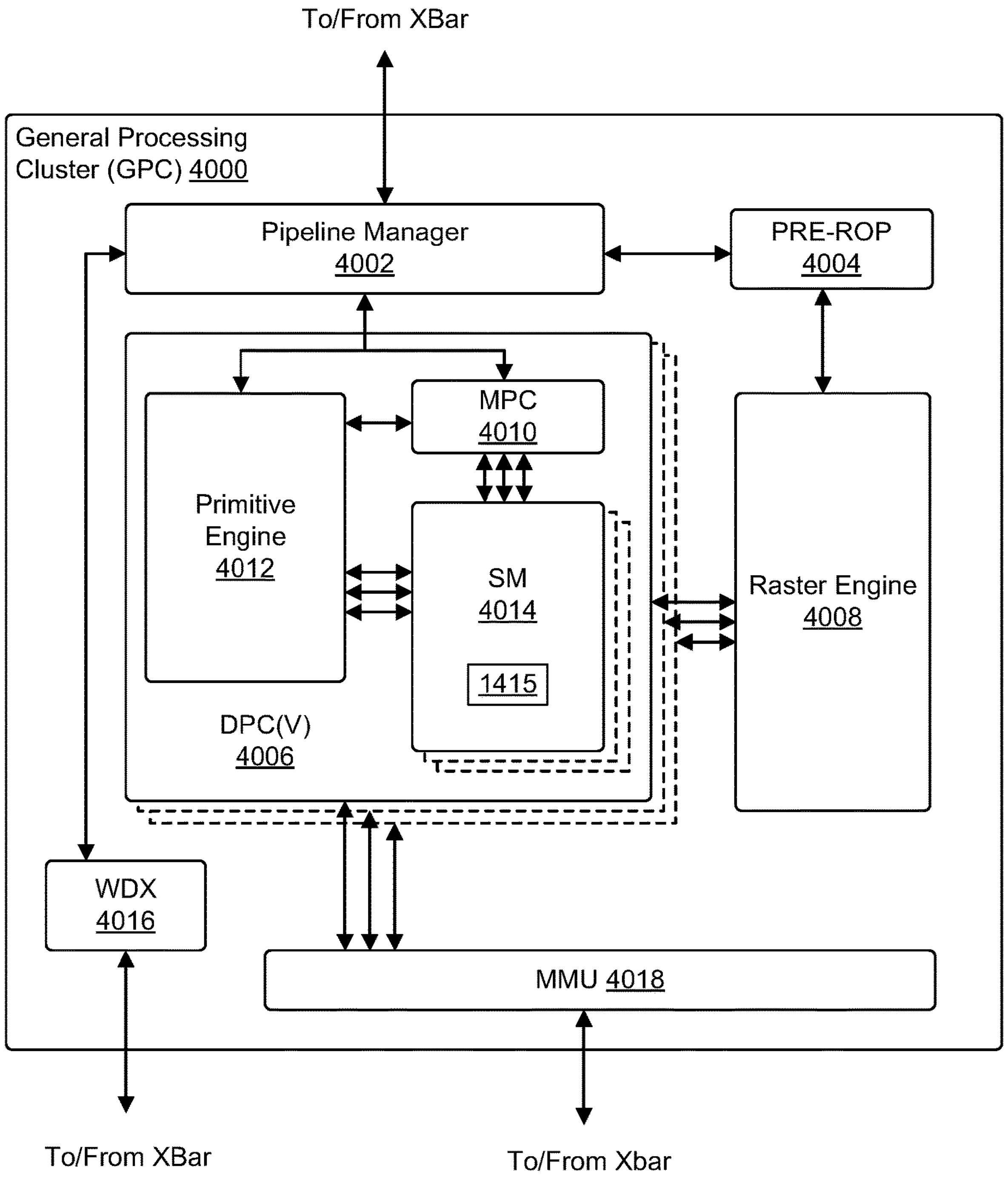
FIG. 40 illustrates a general processing cluster ("GPC"), according to at least one embodiment.

FIG. 40 illustrates a general processing cluster ("GPC") 4000, according to at least one embodiment. In at least one embodiment, GPC 4000 is GPC 3918 of FIG. 39. In at least one embodiment, each GPC 4000 includes, without limitation, a number of hardware units for processing tasks and each GPC 4000 includes, without limitation, a pipeline manager 4002, a pre-raster operations unit ("preROP") 4004, a raster engine 4008, a work distribution crossbar ("WDX") 4016, a memory management unit ("MMU") 4018, one or more Data Processing Clusters ("DPCs") 4006, and any suitable combination of parts.

In at least one embodiment, operation of GPC 4000 is controlled by pipeline manager 4002. In at least one embodiment, pipeline manager 4002 manages configuration of one or more DPCs 4006 for processing tasks allocated to GPC 4000. In at least one embodiment, pipeline manager 4002 configures at least one of one or more DPCs 4006 to implement at least a portion of a graphics rendering pipeline. In at least one embodiment, DPC 4006 is configured to execute a vertex shader program on a programmable streaming multi-processor ("SM") 4014. In at least one embodiment, pipeline manager 4002 is configured to route packets received from a work distribution unit to appropriate logical units within GPC 4000, in at least one embodiment, and some packets may be routed to fixed function hardware units in preROP 4004 and/or raster engine 4008 while other packets may be routed to DPCs 4006 for processing by a primitive engine 4012 or SM 4014. In at least one embodiment, pipeline manager 4002 configures at least one of DPCs 4006 to implement a neural network model and/or a computing pipeline.

In at least one embodiment, preROP unit 4004 is configured, in at least one embodiment, to route data generated by raster engine 4008 and DPCs 4006 to a Raster Operations ("ROP") unit in partition unit 3922, described in more detail above in conjunction with FIG. 39. In at least one embodiment, preROP unit 4004 is configured to perform optimizations for color blending, organize pixel data, perform address translations, and more. In at least one embodiment, raster engine 4008 includes, without limitation, a number of fixed function hardware units configured to perform various raster operations, in at least one embodiment, and raster engine 4008 includes, without limitation, a setup engine, a coarse raster engine, a culling engine, a clipping engine, a fine raster engine, a tile coalescing engine, and any suitable combination thereof. In at least one embodiment, setup engine receives transformed vertices and generates plane equations associated with geometric primitive defined by vertices; plane equations are transmitted to a coarse raster engine to generate coverage information (e.g., an x, y coverage mask for a tile) for primitive; output of a coarse raster engine is transmitted to a culling engine where fragments associated with a primitive that fail a z-test are culled, and transmitted to a clipping engine where fragments lying outside a viewing frustum are clipped. In at least one embodiment, fragments that survive clipping and culling are passed to a fine raster engine to generate attributes for pixel fragments based on plane equations generated by a setup engine. In at least one embodiment, an output of raster engine 4008 comprises fragments to be processed by any suitable entity, such as by a fragment shader implemented within DPC 4006.

In at least one embodiment, each DPC 4006 included in GPC 4000 comprises, without limitation, an M-Pipe Controller ("MPC") 4010; primitive engine 4012; one or more SMs 4014; and any suitable combination thereof. In at least one embodiment, MPC 4010 controls operation of DPC 4006, routing packets received from pipeline manager 4002 to appropriate units in DPC 4006. In at least one embodiment, packets associated with a vertex are routed to primitive engine 4012, which is configured to fetch vertex attributes associated with a vertex from memory; in contrast, packets associated with a shader program may be transmitted to SM 4014.

In at least one embodiment, SM 4014 comprises, without limitation, a programmable streaming processor that is configured to process tasks represented by a number of threads. In at least one embodiment, SM 4014 is multi-threaded and configured to execute a plurality of threads (e.g., 32 threads) from a particular group of threads concurrently and implements a Single-Instruction, Multiple-Data ("SIMD") architecture where each thread in a group of threads (e.g., a warp, wavefront, wave) is configured to process a different set of data based on same set of instructions. In at least one embodiment, all threads in group of threads execute a common set of instructions. In at least one embodiment, SM 4014 implements a Single-Instruction, Multiple Thread ("SIMT") architecture wherein each thread in a group of threads is configured to process a different set of data based on that common set of instructions, but where individual threads in a group of threads are allowed to diverge during execution. In at least one embodiment, a program counter, call stack, and execution state is maintained for each warp (which may be referred to as wavefronts and/or waves), enabling concurrency between warps and serial execution within warps when threads within a warp diverge. In another embodiment, a program counter, call stack, and execution state is maintained for each individual thread, enabling equal concurrency between all threads, within and between warps. In at least one embodiment, execution state is maintained for each individual thread and threads executing common instructions may be converged and executed in parallel for better efficiency. At least one embodiment of SM 4014 is described in more detail herein.

In at least one embodiment, MMU 4018 provides an interface between GPC 4000 and a memory partition unit (e.g., partition unit 3922 of FIG. 39) and MMU 4018 provides translation of virtual addresses into physical addresses, memory protection, and arbitration of memory requests. In at least one embodiment, MMU 4018 provides one or more translation lookaside buffers ("TLBs") for performing translation of virtual addresses into physical addresses in memory.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, deep learning application processor is used to train a machine learning model, such as a neural network, to predict or infer information provided to GPC 4000. In at least one embodiment, GPC 4000 is used to infer or predict information based on a trained machine learning model (e.g., neural network) that has been trained by another processor or system or by GPC 4000. In at least one embodiment, GPC 4000 may be used to perform one or more neural network use cases described herein.

In at least one embodiment, such components can be utilized to generate one or more objects within one or more second images based, at least in part, on one or more features of the one or more objects within one or more first images.

Figure 41:
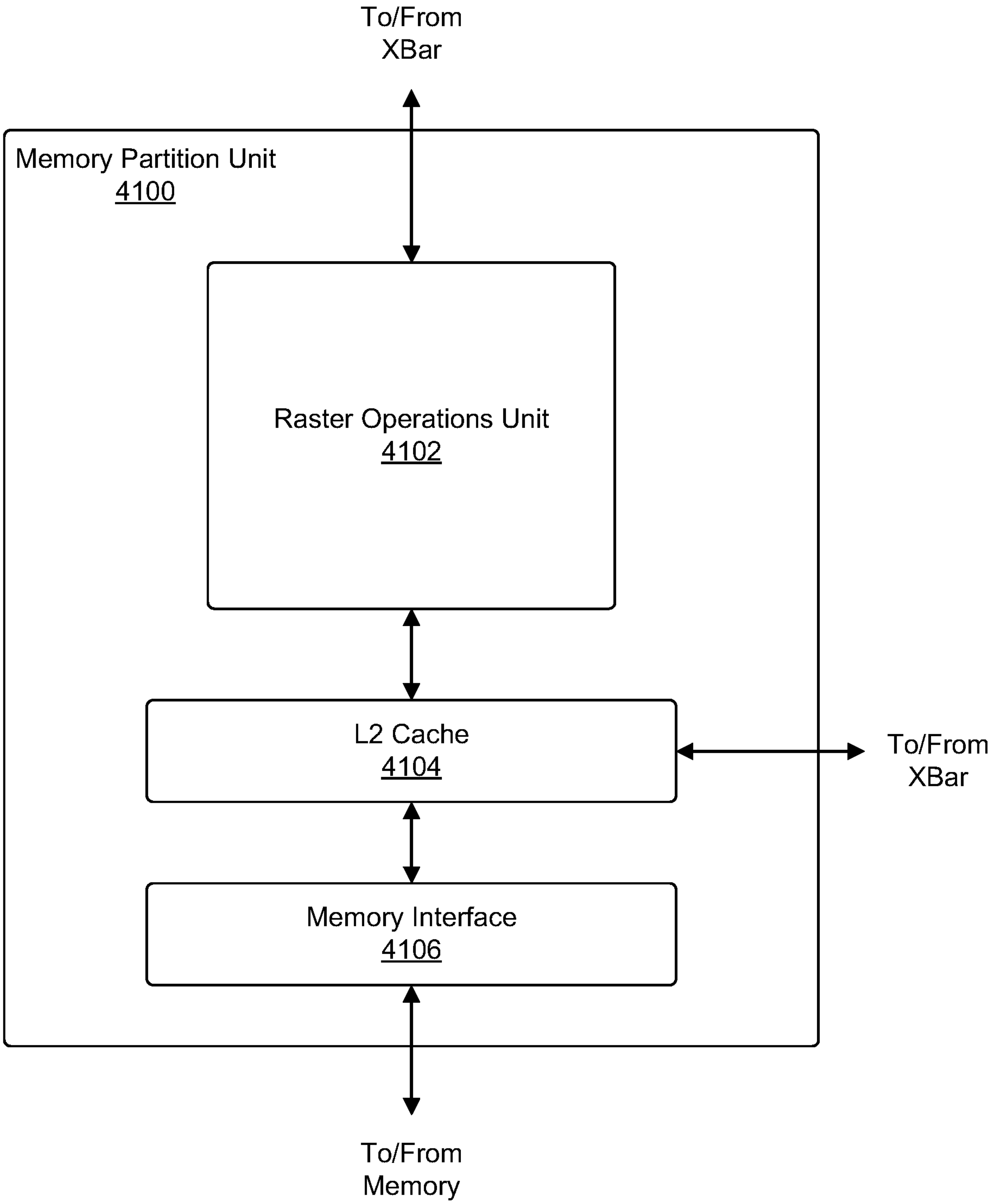
FIG. 41 illustrates a memory partition unit of a parallel processing unit ("PPU"), according to at least one embodiment.

FIG. 41 illustrates a memory partition unit 4100 of a parallel processing unit ("PPU"), in accordance with at least one embodiment. In at least one embodiment, memory partition unit 4100 includes, without limitation, a Raster Operations ("ROP") unit 4102, a level two ("L2") cache 4104, a memory interface 4106, and any suitable combination thereof. In at least one embodiment, memory interface 4106 is coupled to memory. In at least one embodiment, memory interface 4106 may implement 32, 64, 128, 1024-bit data buses, or like, for high-speed data transfer. In at least one embodiment, PPU incorporates U memory interfaces 4106 where U is a positive integer, with one memory interface 4106 per pair of partition units 4100, where each pair of partition units 4100 is connected to a corresponding memory device. For example, in at least one embodiment, PPU may be connected to up to Y memory devices, such as high bandwidth memory stacks or graphics double-data-rate, version 5, synchronous dynamic random access memory ("GDDR5 SDRAM").

In at least one embodiment, memory interface 4106 implements a high bandwidth memory second generation ("HBM2") memory interface and Y equals half of U. In at least one embodiment, HBM2 memory stacks are located on a physical package with a PPU, providing substantial power and area savings compared with conventional GDDR5 SDRAM systems. In at least one embodiment, each HBM2 stack includes, without limitation, four memory dies with Y=4, with each HBM2 stack including two 128-bit channels per die for a total of 8 channels and a data bus width of 1024 bits. In at least one embodiment, that memory supports Single-Error Correcting Double-Error Detecting ("SECDED") Error Correction Code ("ECC") to protect data. In at least one embodiment, ECC can provide higher reliability for compute applications that are sensitive to data corruption.

In at least one embodiment, PPU implements a multi-level memory hierarchy. In at least one embodiment, memory partition unit 4100 supports a unified memory to provide a single unified virtual address space for central processing unit ("CPU") and PPU memory, enabling data sharing between virtual memory systems. In at least one embodiment frequency of accesses by a PPU to a memory located on other processors is traced to ensure that memory pages are moved to physical memory of PPU that is accessing pages more frequently. In at least one embodiment, high-speed GPU interconnect 3908 supports address translation services allowing PPU to directly access a CPU's page tables and providing full access to CPU memory by a PPU.

In at least one embodiment, copy engines transfer data between multiple PPUs or between PPUs and CPUs. In at least one embodiment, copy engines can generate page faults for addresses that are not mapped into page tables and memory partition unit 4100 then services page faults, mapping addresses into page table, after which copy engine performs a transfer. In at least one embodiment, memory is pinned (i.e., non-pageable) for multiple copy engine operations between multiple processors, substantially reducing available memory. In at least one embodiment, with hardware page faulting, addresses can be passed to copy engines without regard as to whether memory pages are resident, and a copy process is transparent.

Data from memory 3904 of FIG. 39 or other system memory is fetched by memory partition unit 4100 and stored in L2 cache 4104, which is located on-chip and is shared between various GPCs, in accordance with at least one embodiment. Each memory partition unit 4100, in at least one embodiment, includes, without limitation, at least a portion of L2 cache associated with a corresponding memory device. In at least one embodiment, lower level caches are implemented in various units within GPCs. In at least one embodiment, each of SMs 4014 in FIG. 40 may implement a Level 1 ("L1") cache wherein that L1 cache is private memory that is dedicated to a particular SM 4014 and data from L2 cache 4104 is fetched and stored in each L1 cache for processing in functional units of SMs 4014. In at least one embodiment, L2 cache 4104 is coupled to memory interface 4106 and XBar 3920 shown in FIG. 39.

ROP unit 4102 performs graphics raster operations related to pixel color, such as color compression, pixel blending, and more, in at least one embodiment. ROP unit 4102, in at least one embodiment, implements depth testing in conjunction with raster engine 4008, receiving a depth for a sample location associated with a pixel fragment from a culling engine of raster engine 4008. In at least one embodiment, depth is tested against a corresponding depth in a depth buffer for a sample location associated with a fragment. In at least one embodiment, if that fragment passes that depth test for that sample location, then ROP unit 4102 updates depth buffer and transmits a result of that depth test to raster engine 4008. It will be appreciated that a number of partition units 4100 may be different than a number of GPCs and, therefore, each ROP unit 4102 can, in at least one embodiment, be coupled to each GPC. In at least one embodiment, ROP unit 4102 tracks packets received from different GPCs and determines whether a result generated by ROP unit 4102 is to be routed to through XBar 3920.

Figure 42:
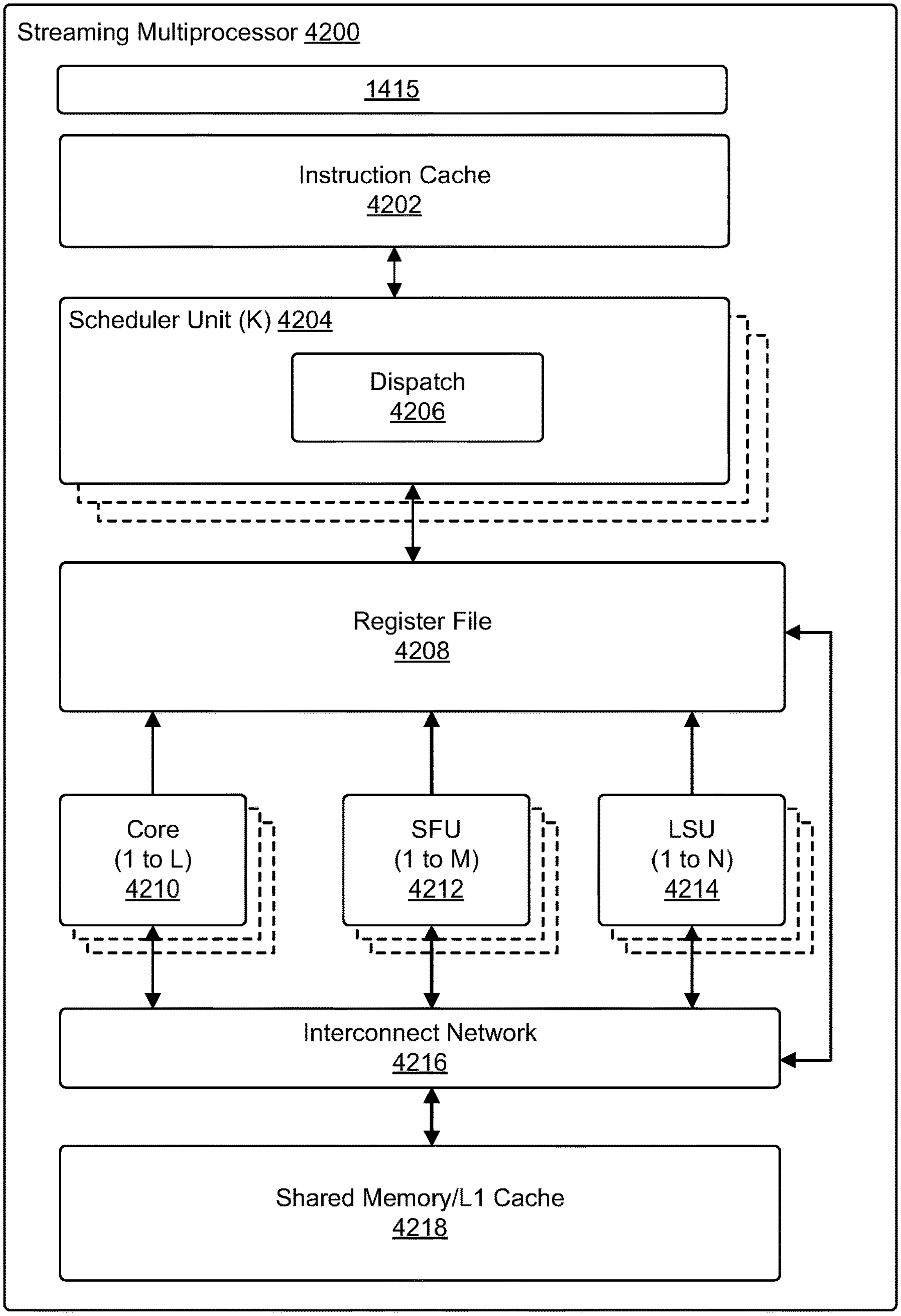
FIG. 42 illustrates a streaming multi-processor, according to at least one embodiment.

FIG. 42 illustrates a streaming multi-processor ("SM") 4200, according to at least one embodiment. In at least one embodiment, SM 4200 is SM of FIG. 40. In at least one embodiment, SM 4200 includes, without limitation, an instruction cache 4202, one or more scheduler units 4204 (which may be referred to as sequencer units), a register file 4208, one or more processing cores ("cores") 4210, one or more special function units ("SFUs") 4212, one or more load/store units ("LSUs") 4214, an interconnect network 4216, a shared memory/level one ("Li") cache 4218, and/or any suitable combination thereof. In at least one embodiment, LSUs 4214 perform load of store operations corresponding to loading/storing data (e.g., instructions) to perform an operation (e.g., perform an API, an API call).

In at least one embodiment, a work distribution unit dispatches tasks for execution on general processing clusters ("GPCs") of parallel processing units ("PPUs") and each task is allocated to a particular Data Processing Cluster ("DPC") within a GPC and, if a task is associated with a shader program, that task is allocated to one of SMs 4200 (which may be referred to as CUs and/or slices). In at least one embodiment, scheduler unit 4204 (which may be referred to as a sequencer and/or asynchronous compute engine) receives tasks from a work distribution unit and manages instruction scheduling for one or more thread blocks assigned to SM 4200. In at least one embodiment, scheduler unit 4204 schedules thread blocks for execution as warps (which may be referred to as wavefronts and/or waves) of parallel threads, wherein each thread block is allocated at least one warp. In at least one embodiment, each warp executes threads. In at least one embodiment, scheduler unit 4204 manages a plurality of different thread blocks, allocating warps to different thread blocks and then dispatching instructions from plurality of different cooperative groups to various functional units (e.g., processing cores 4210, SFUs 4212, and LSUs 4214) during each clock cycle.

In at least one embodiment, Cooperative Groups (which may also be referred to as wavefronts and/or waves) may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, applications of conventional programming models provide a single, simple construct for synchronizing cooperating threads: a barrier across all threads of a thread block (e.g., syncthreads( ) function). However, in at least one embodiment, programmers may define groups of threads at smaller than thread block granularities and synchronize within defined groups to enable greater performance, design flexibility, and software reuse in form of collective group-wide function interfaces. In at least one embodiment, Cooperative Groups enables programmers to define groups of threads explicitly at sub-block (i.e., as small as a single thread) and multi-block granularities, and to perform collective operations such as synchronization on threads in a cooperative group. In at least one embodiment, that programming model supports clean composition across software boundaries, so that libraries and utility functions can synchronize safely within their local context without having to make assumptions about convergence. In at least one embodiment, Cooperative Groups primitives enable new patterns of cooperative parallelism, including, without limitation, producer-consumer parallelism, opportunistic parallelism, and global synchronization across an entire grid of thread blocks.

In at least one embodiment, a dispatch unit 4206 is configured to transmit instructions to one or more functional units and scheduler unit 4204 and includes, without limitation, two dispatch units 4206 that enable two different instructions from a common warp to be dispatched during each clock cycle. In at least one embodiment, each scheduler unit 4204 includes a single dispatch unit 4206 or additional dispatch units 4206.

In at least one embodiment, each SM 4200 (which may be referred to as a CU and/or slice), in at least one embodiment, includes, without limitation, register file 4208 that provides a set of registers for functional units of SM 4200. In at least one embodiment, register file 4208 is divided between each functional unit such that each functional unit is allocated a dedicated portion of register file 4208. In at least one embodiment, register file 4208 is divided between different warps being executed by SM 4200 and register file 4208 provides temporary storage for operands connected to data paths of functional units. In at least one embodiment, each SM 4200 comprises, without limitation, a plurality of L processing cores 4210, where L is a positive integer. In at least one embodiment, SM 4200 includes, without limitation, a large number (e.g., 128 or more) of distinct processing cores 4210. In at least one embodiment, each processing core 4210 includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 4210 include, without limitation, 64 single-precision (32-bit) floating point cores, 64 integer cores, 32 double-precision (64-bit) floating point cores, and 8 tensor cores.

Tensor cores are configured to perform matrix operations in accordance with at least one embodiment. In at least one embodiment, one or more tensor cores are included in processing cores 4210. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation, $D=A\times B+C$, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as a CUDA 9 C++ API, exposes specialized matrix load, matrix multiply and accumulate, and matrix store operations to efficiently use tensor cores from a CUDA-C++ program. In at least one embodiment, at a CUDA level, a warp-level interface assumes 16×16 size matrices spanning all 32 threads of warp (which may be referred to as a wavefront and/or wave).

In at least one embodiment, each SM 4200 comprises, without limitation, M SFUs 4212 that perform special functions (e.g., attribute evaluation, reciprocal square root, and like). In at least one embodiment, SFUs 4212 include, without limitation, a tree traversal unit configured to traverse a hierarchical tree data structure. In at least one embodiment, SFUs 4212 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 4200. In at least one embodiment, texture maps are stored in shared memory/L1 cache 4218. In at least one embodiment, texture units implement texture operations such as filtering operations using mip-maps (e.g., texture maps of varying levels of detail), in accordance with at least one embodiment. In at least one embodiment, each SM 4200 includes, without limitation, two texture units.

Each SM 4200 comprises, without limitation, N LSUs 4214 that implement load and store operations between shared memory/L1 cache 4218 and register file 4208, in at least one embodiment. Interconnect network 4216 connects each functional unit to register file 4208 and LSU 4214 to register file 4208 and shared memory/L1 cache 4218 in at least one embodiment. In at least one embodiment, interconnect network 4216 is a crossbar that can be configured to connect any functional units to any registers in register file 4208 and connect LSUs 4214 to register file 4208 and memory locations in shared memory/L1 cache 4218.

In at least one embodiment, shared memory/L1 cache 4218 is an array of on-chip memory that allows for data storage and communication between SM 4200 and primitive engine and between threads in SM 4200, in at least one embodiment. In at least one embodiment, shared memory/L1 cache 4218 comprises, without limitation, 128 KB of storage capacity and is in a path from SM 4200 to a partition unit. In at least one embodiment, shared memory/L1 cache 4218, in at least one embodiment, is used to cache reads and writes. In at least one embodiment, one or more of shared memory/L1 cache 4218, L2 cache, and memory are backing stores.

Combining data cache and shared memory functionality into a single memory block provides improved performance for both types of memory accesses, in at least one embodiment. In at least one embodiment, capacity is used or is usable as a cache by programs that do not use shared memory, such as if shared memory is configured to use half of a capacity, and texture and load/store operations can use remaining capacity. Integration within shared memory/L1 cache 4218 enables shared memory/L1 cache 4218 to function as a high-throughput conduit for streaming data while simultaneously providing high-bandwidth and low-latency access to frequently reused data, in accordance with at least one embodiment. In at least one embodiment, when configured for general purpose parallel computation, a simpler configuration can be used compared with graphics processing. In at least one embodiment, fixed function graphics processing units are bypassed, creating a much simpler programming model. In a general purpose parallel computation configuration, a work distribution unit assigns and distributes blocks of threads directly to DPCs, in at least one embodiment. In at least one embodiment, threads in a block execute a common program, using a unique thread ID in calculation to ensure each thread generates unique results, using SM 4200 to execute program and perform calculations, shared memory/L1 cache 4218 to communicate between threads, and LSU 4214 to read and write global memory through shared memory/L1 cache 4218 and memory partition unit. In at least one embodiment, when configured for general purpose parallel computation, SM 4200 writes commands that scheduler unit 4204 can use to launch new work on DPCs.

In at least one embodiment, a PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In at least one embodiment, a PPU is embodied on a single semiconductor substrate. In at least one embodiment, a PPU is included in a system-on-a-chip ("SoC") along with one or more other devices such as additional PPUs, memory, a reduced instruction set computer ("RISC") CPU, a memory management unit ("MMU"), a digital-to-analog converter ("DAC"), and like.

In at least one embodiment, a PPU may be included on a graphics card that includes one or more memory devices. In at least one embodiment, that graphics card may be configured to interface with a PCIe slot on a motherboard of a desktop computer. In at least one embodiment, that PPU may be an integrated graphics processing unit ("iGPU") included in chipset of a motherboard.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, deep learning application processor is used to train a machine learning model, such as a neural network, to predict or infer information provided to SM 4200. In at least one embodiment, SM 4200 is used to infer or predict information based on a trained machine learning model (e.g., neural network) that has been trained by another processor or system or by SM 4200. In at least one embodiment, SM 4200 may be used to perform one or more neural network use cases described herein.

In at least one embodiment, such components can be utilized to generate one or more objects within one or more second images based, at least in part, on one or more features of the one or more objects within one or more first images.

Embodiments are disclosed related a virtualized computing platform for advanced computing, such as image inferencing and image processing in medical applications. Without limitation, embodiments may include radiography, magnetic resonance imaging (MRI), nuclear medicine, ultrasound, sonography, elastography, photoacoustic imaging, tomography, echocardiography, functional near-infrared spectroscopy, and magnetic particle imaging, or a combination thereof. In at least one embodiment, a virtualized computing platform and associated processes described herein may additionally or alternatively be used, without limitation, in forensic science analysis, sub-surface detection and imaging (e.g., oil exploration, archaeology, paleontology, etc.), topography, oceanography, geology, osteology, meteorology, intelligent area or object tracking and monitoring, sensor data processing (e.g., RADAR, SONAR, LIDAR, etc.), and/or genomics and gene sequencing.

Figure 43:
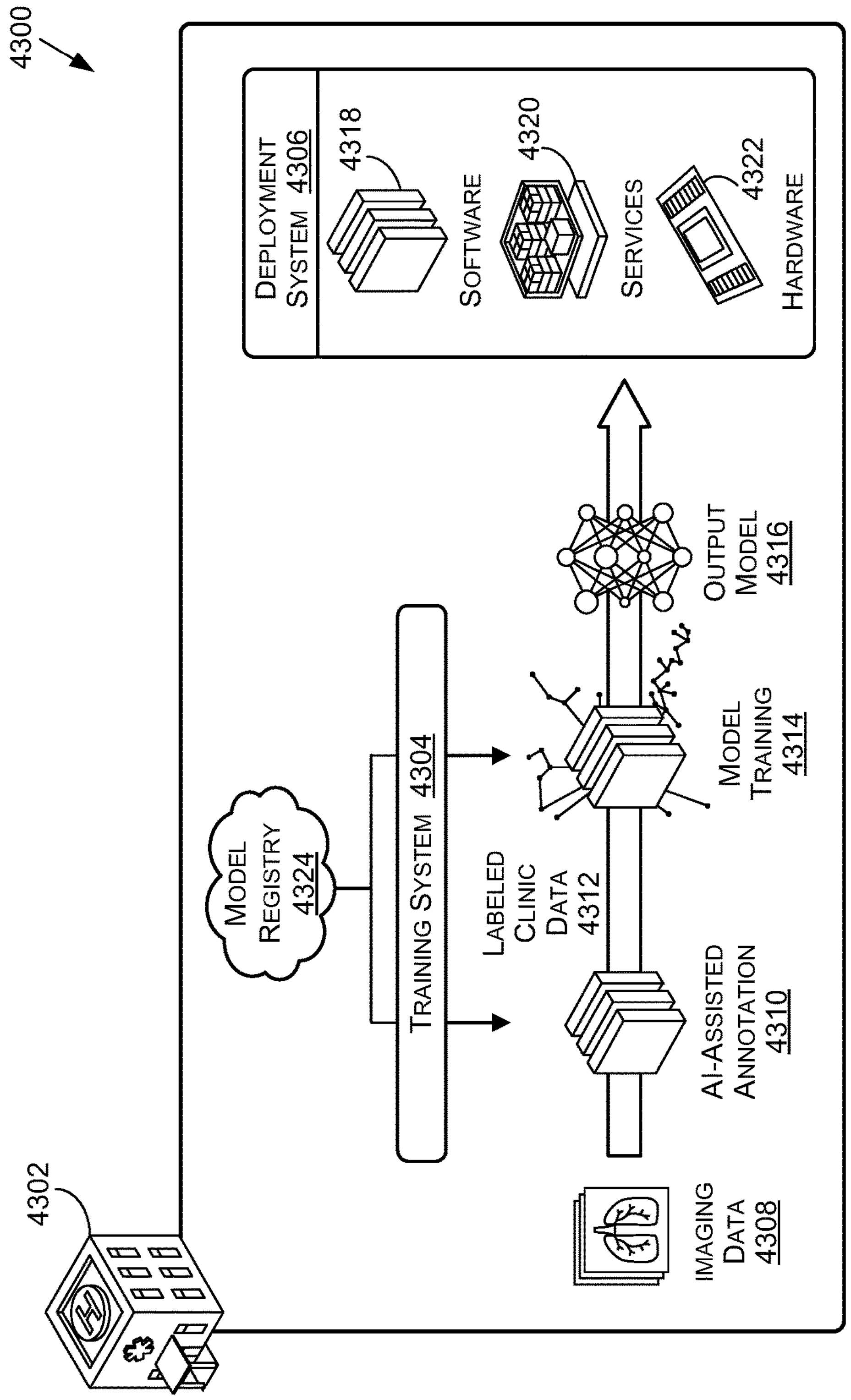
FIG. 43 is an example data flow diagram for an advanced computing pipeline, in accordance with at least one embodiment.

With reference to FIG. 43, FIG. 43 is an example data flow diagram for a process 4300 of generating and deploying an image processing and inferencing pipeline, in accordance with at least one embodiment. In at least one embodiment, process 4300 may be deployed for use with imaging devices, processing devices, genomics devices, gene sequencing devices, radiology devices, and/or other device types at one or more facilities 4302, such as medical facilities, hospitals, healthcare institutes, clinics, research or diagnostic labs, etc. In at least one embodiment, process 4300 may be deployed to perform genomics analysis and inferencing on sequencing data. Examples of genomic analyses that may be performed using systems and processes described herein include, without limitation, variant calling, mutation detection, and gene expression quantification.

In at least one embodiment, process 4300 may be executed within a training system 4304 and/or a deployment system 4306. In at least one embodiment, training system 4304 may be used to perform training, deployment, and implementation of machine learning models (e.g., neural networks, object detection algorithms, computer vision algorithms, etc.) for use in deployment system 4306. In at least one embodiment, deployment system 4306 may be configured to offload processing and compute resources among a distributed computing environment to reduce infrastructure requirements at facility 4302. In at least one embodiment, deployment system 4306 may provide a streamlined platform for selecting, customizing, and implementing virtual instruments for use with imaging devices (e.g., MRI, CT Scan, X-Ray, Ultrasound, etc.) or sequencing devices at facility 4302. In at least one embodiment, virtual instruments may include software-defined applications for performing one or more processing operations with respect to imaging data generated by imaging devices, sequencing devices, radiology devices, and/or other device types. In at least one embodiment, one or more applications in a pipeline may use or call upon services (e.g., inference, visualization, compute, AI, etc.) of deployment system 4306 during execution of applications.

In at least one embodiment, some of applications used in advanced processing and inferencing pipelines may use machine learning models or other AI to perform one or more processing steps. In at least one embodiment, machine learning models may be trained at facility 4302 using data 4308 (such as imaging data) generated at facility 4302 (and stored on one or more picture archiving and communication system (PACS) servers at facility 4302), may be trained using imaging or sequencing data 4308 from another facility or facilities (e.g., a different hospital, lab, clinic, etc.), or a combination thereof. In at least one embodiment, training system 4304 may be used to provide applications, services, and/or other resources for generating working, deployable machine learning models for deployment system 4306.

In at least one embodiment, a model registry 4324 may be backed by object storage that may support versioning and object metadata. In at least one embodiment, object storage may be accessible through, for example, a cloud storage (e.g., a cloud 4426 of FIG. 44) compatible application programming interface (API) from within a cloud platform. In at least one embodiment, machine learning models within model registry 4324 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, a training pipeline 4404 (FIG. 44) may include a scenario where facility 4302 is training their own machine learning model, or has an existing machine learning model that needs to be optimized or updated. In at least one embodiment, imaging data 4308 generated by imaging device(s), sequencing devices, and/or other device types may be received. In at least one embodiment, once imaging data 4308 is received, AI-assisted annotation 4310 may be used to aid in generating annotations corresponding to imaging data 4308 to be used as ground truth data for a machine learning model. In at least one embodiment, AI-assisted annotation 4310 may include one or more machine learning models (e.g., convolutional neural networks (CNNs)) that may be trained to generate annotations corresponding to certain types of imaging data 4308 (e.g., from certain devices) and/or certain types of anomalies in imaging data 4308. In at least one embodiment, AI-assisted annotations 4310 may then be used directly, or may be adjusted or fine-tuned using an annotation tool (e.g., by a researcher, a clinician, a doctor, a scientist, etc.), to generate ground truth data. In at least one embodiment, in some examples, labeled clinic data 4312 (e.g., annotations provided by a clinician, doctor, scientist, technician, etc.) may be used as ground truth data for training a machine learning model. In at least one embodiment, AI-assisted annotations 4310, labeled clinic data 4312, or a combination thereof may be used as ground truth data for training a machine learning model. In at least one embodiment, a trained machine learning model may be referred to as an output model 4316, and may be used by deployment system 4306, as described herein.

In at least one embodiment, training pipeline 4404 (FIG. 44) may include a scenario where facility 4302 needs a machine learning model for use in performing one or more processing tasks for one or more applications in deployment system 4306, but facility 4302 may not currently have such a machine learning model (or may not have a model that is optimized, efficient, or effective for such purposes). In at least one embodiment, an existing machine learning model may be selected from model registry 4324. In at least one embodiment, model registry 4324 may include machine learning models trained to perform a variety of different inference tasks on imaging data. In at least one embodiment, machine learning models in model registry 4324 may have been trained on imaging data from different facilities than facility 4302 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises (e.g., to comply with HIPAA regulations, privacy regulations, etc.). In at least one embodiment, once a model is trained—or partially trained—at one location, a machine learning model may be added to model registry 4324. In at least one embodiment, a machine learning model may then be retrained, or updated, at any number of other facilities, and a retrained or updated model may be made available in model registry 4324. In at least one embodiment, a machine learning model may then be selected from model registry 4324—and referred to as output model 4316—and may be used in deployment system 4306 to perform one or more processing tasks for one or more applications of a deployment system.

In at least one embodiment, training pipeline 4404 (FIG. 44) may be used in a scenario that includes facility 4302 requiring a machine learning model for use in performing one or more processing tasks for one or more applications in deployment system 4306, but facility 4302 may not currently have such a machine learning model (or may not have a model that is optimized, efficient, or effective for such purposes). In at least one embodiment, a machine learning model selected from model registry 4324 might not be fine-tuned or optimized for imaging data 4308 generated at facility 4302 because of differences in populations, genetic variations, robustness of training data used to train a machine learning model, diversity in anomalies of training data, and/or other issues with training data. In at least one embodiment, AI-assisted annotation 4310 may be used to aid in generating annotations corresponding to imaging data 4308 to be used as ground truth data for retraining or updating a machine learning model. In at least one embodiment, labeled clinic data 4312 (e.g., annotations provided by a clinician, doctor, scientist, etc.) may be used as ground truth data for training a machine learning model. In at least one embodiment, retraining or updating a machine learning model may be referred to as model training 4314. In at least one embodiment, model training 4314—e.g., AI-assisted annotations 4310, labeled clinic data 4312, or a combination thereof—may be used as ground truth data for retraining or updating a machine learning model.

In at least one embodiment, deployment system 4306 may include software 4318, services 4320, hardware 4322, and/or other components, features, and functionality. In at least one embodiment, deployment system 4306 may include a software "stack," such that software 4318 may be built on top of services 4320 and may use services 4320 to perform some or all of processing tasks, and services 4320 and software 4318 may be built on top of hardware 4322 and use hardware 4322 to execute processing, storage, and/or other compute tasks of deployment system 4306.

In at least one embodiment, software 4318 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, for each type of imaging device (e.g., CT, MRI, X-Ray, ultrasound, sonography, echocardiography, etc.), sequencing device, radiology device, genomics device, etc., there may be any number of containers that may perform a data processing task with respect to imaging data 4308 (or other data types, such as those described herein) generated by a device. In at least one embodiment, an advanced processing and inferencing pipeline may be defined based on selections of different containers that are desired or required for processing imaging data 4308, in addition to containers that receive and configure imaging data for use by each container and/or for use by facility 4302 after processing through a pipeline (e.g., to convert outputs back to a usable data type, such as digital imaging and communications in medicine (DICOM) data, radiology information system (RIS) data, clinical information system (CIS) data, remote procedure call (RPC) data, data substantially compliant with a representation state transfer (REST) interface, data substantially compliant with a file-based interface, and/or raw data, for storage and display at facility 4302). In at least one embodiment, a combination of containers within software 4318 (e.g., that make up a pipeline) may be referred to as a virtual instrument (as described in more detail herein), and a virtual instrument may leverage services 4320 and hardware 4322 to execute some or all processing tasks of applications instantiated in containers.

In at least one embodiment, a data processing pipeline may receive input data (e.g., imaging data 4308) in a DICOM, RIS, CIS, REST compliant, RPC, raw, and/or other format in response to an inference request (e.g., a request from a user of deployment system 4306, such as a clinician, a doctor, a radiologist, etc.). In at least one embodiment, input data may be representative of one or more images, video, and/or other data representations generated by one or more imaging devices, sequencing devices, radiology devices, genomics devices, and/or other device types. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 4316 of training system 4304.

In at least one embodiment, tasks of data processing pipeline may be encapsulated in a container(s) that each represent a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 4324 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 4320 as a system (e.g., system 4400 of FIG. 44). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming DICOM data. In at least one embodiment, once validated by system 4400 (e.g., for accuracy, safety, patient privacy, etc.), an application may be available in a container registry for selection and/or implementation by a user (e.g., a hospital, clinic, lab, healthcare provider, etc.) to perform one or more processing tasks with respect to data at a facility (e.g., a second facility) of a user.

Figure 44:
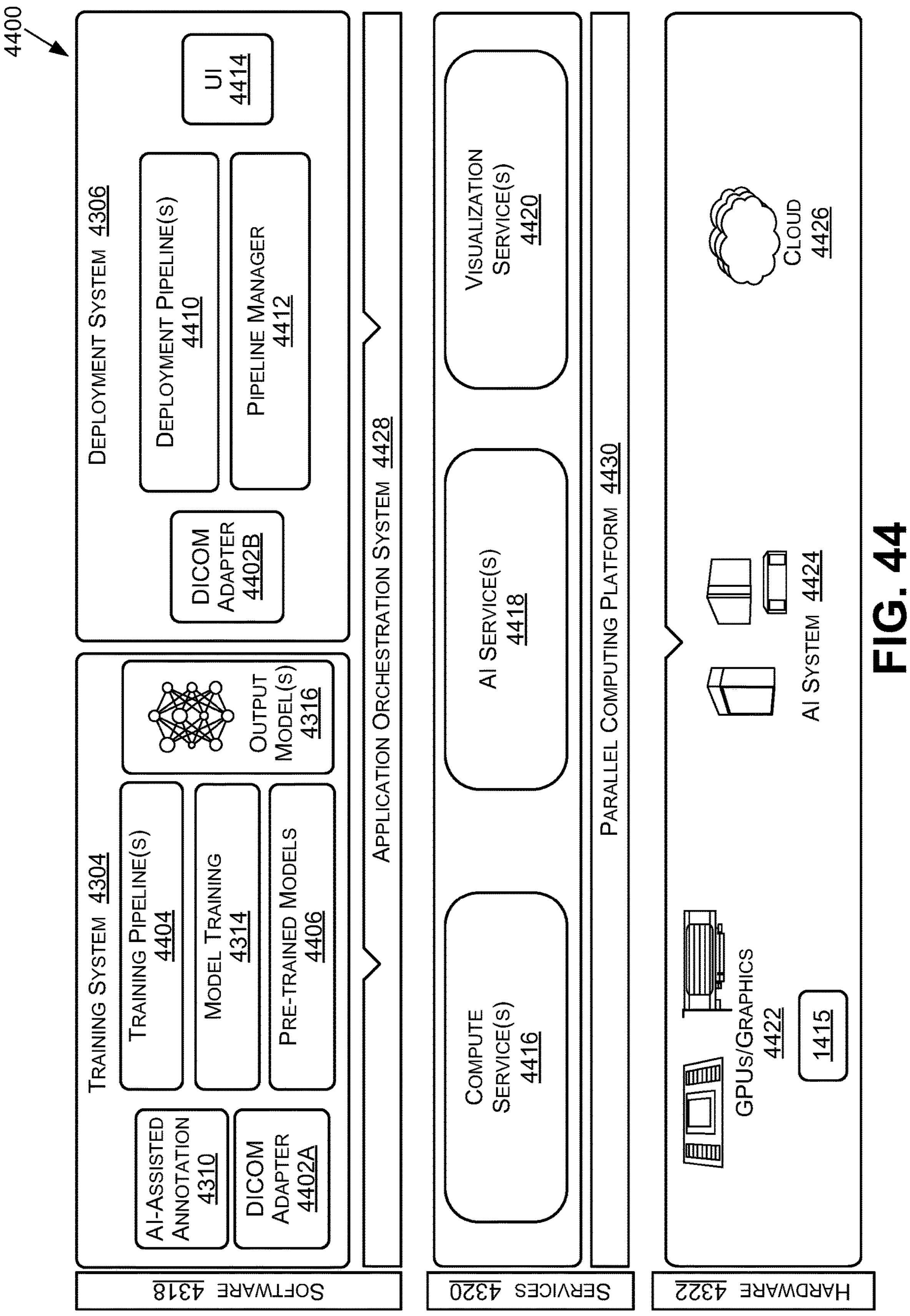
FIG. 44 is a system diagram for an example system for training, adapting, instantiating and deploying machine learning models in an advanced computing pipeline, in accordance with at least one embodiment.

In at least one embodiment, developers may then share applications or containers through a network for access and use by users of a system (e.g., system 4400 of FIG. 44). In at least one embodiment, completed and validated applications or containers may be stored in a container registry and associated machine learning models may be stored in model registry 4324. In at least one embodiment, a requesting entity (e.g., a user at a medical facility)—who provides an inference or image processing request—may browse a container registry and/or model registry 4324 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 4306 (e.g., a cloud) to perform processing of data processing pipeline. In at least one embodiment, processing by deployment system 4306 may include referencing selected elements (e.g., applications, containers, models, etc.) from a container registry and/or model registry 4324. In at least one embodiment, once results are generated by a pipeline, results may be returned to a user for reference (e.g., for viewing in a viewing application suite executing on a local, on-premises workstation or terminal). In at least one embodiment, a radiologist may receive results from an data processing pipeline including any number of application and/or containers, where results may include anomaly detection in X-rays, CT scans, MRIs, etc.

In at least one embodiment, to aid in processing or execution of applications or containers in pipelines, services 4320 may be leveraged. In at least one embodiment, services 4320 may include compute services, artificial intelligence (AI) services, visualization services, and/or other service types. In at least one embodiment, services 4320 may provide functionality that is common to one or more applications in software 4318, so functionality may be abstracted to a service that may be called upon or leveraged by applications. In at least one embodiment, functionality provided by services 4320 may run dynamically and more efficiently, while also scaling well by allowing applications to process data in parallel (e.g., using a parallel computing platform 4430 (FIG. 44)). In at least one embodiment, rather than each application that shares a same functionality offered by a service 4320 being required to have a respective instance of service 4320, service 4320 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 4320 includes an AI service (e.g., an inference service), one or more machine learning models associated with an application for anomaly detection (e.g., tumors, growth abnormalities, scarring, etc.) may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 4318 implementing advanced processing and inferencing pipeline that includes segmentation application and anomaly detection application may be streamlined because each application may call upon a same inference service to perform one or more inferencing tasks.

In at least one embodiment, hardware 4322 may include GPUs, CPUs, graphics cards, an AI/deep learning system (e.g., an AI supercomputer, such as NVIDIA's DGX supercomputer system), a cloud platform, or a combination thereof. In at least one embodiment, different types of hardware 4322 may be used to provide efficient, purpose-built support for software 4318 and services 4320 in deployment system 4306. In at least one embodiment, use of GPU processing may be implemented for processing locally (e.g., at facility 4302), within an AI/deep learning system, in a cloud system, and/or in other processing components of deployment system 4306 to improve efficiency, accuracy, and efficacy of image processing, image reconstruction, segmentation, MRI exams, stroke or heart attack detection (e.g., in real-time), image quality in rendering, etc. In at least one embodiment, a facility may include imaging devices, genomics devices, sequencing devices, and/or other device types on-premises that may leverage GPUs to generate imaging data representative of a subject's anatomy.

In at least one embodiment, software 4318 and/or services 4320 may be optimized for GPU processing with respect to deep learning, machine learning, and/or high-performance computing, as non-limiting examples. In at least one embodiment, at least some of computing environment of deployment system 4306 and/or training system 4304 may be executed in a datacenter one or more supercomputers or high performance computing systems, with GPU optimized software (e.g., hardware and software combination of NVIDIA's DGX system). In at least one embodiment, datacenters may be compliant with provisions of HIPAA, such that receipt, processing, and transmission of imaging data and/or other patient data is securely handled with respect to privacy of patient data. In at least one embodiment, hardware 4322 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX systems) as a hardware abstraction and scaling platform. In at least one embodiment, cloud platform may integrate an application container clustering system or orchestration system (e.g., KUBERNETES) on multiple GPUs to enable seamless scaling and load balancing.

In at least one embodiment, such components can be utilized to generate one or more objects within one or more second images based, at least in part, on one or more features of the one or more objects within one or more first images.

FIG. 44 is a system diagram for an example system 4400 for generating and deploying an imaging deployment pipeline, in accordance with at least one embodiment. In at least one embodiment, system 4400 may be used to implement process 4300 of FIG. 43 and/or other processes including advanced processing and inferencing pipelines. In at least one embodiment, system 4400 may include training system 4304 and deployment system 4306. In at least one embodiment, training system 4304 and deployment system 4306 may be implemented using software 4318, services 4320, and/or hardware 4322, as described herein.

In at least one embodiment, system 4400 (e.g., training system 4304 and/or deployment system 4306) may implemented in a cloud computing environment (e.g., using cloud 4426). In at least one embodiment, system 4400 may be implemented locally with respect to a healthcare services facility, or as a combination of both cloud and local computing resources. In at least one embodiment, in embodiments where cloud computing is implemented, patient data may be separated from, or unprocessed by, by one or more components of system 4400 that would render processing non-compliant with HIPAA and/or other data handling and privacy regulations or laws. In at least one embodiment, access to APIs in cloud 4426 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 4400, may be restricted to a set of public IPs that have been vetted or authorized for interaction.

In at least one embodiment, various components of system 4400 may communicate between and among one another using any of a variety of different network types, including but not limited to local area networks (LANs) and/or wide area networks (WANs) via wired and/or wireless communication protocols. In at least one embodiment, communication between facilities and components of system 4400 (e.g., for transmitting inference requests, for receiving results of inference requests, etc.) may be communicated over a data bus or data busses, wireless data protocols (Wi-Fi), wired data protocols (e.g., Ethernet), etc.

In at least one embodiment, training system 4304 may execute training pipelines 4404, similar to those described herein with respect to FIG. 43. In at least one embodiment, where one or more machine learning models are to be used in deployment pipelines 4410 by deployment system 4306, training pipelines 4404 may be used to train or retrain one or more (e.g., pre-trained) models, and/or implement one or more of pre-trained models 4406 (e.g., without a need for retraining or updating). In at least one embodiment, as a result of training pipelines 4404, output model(s) 4316 may be generated. In at least one embodiment, training pipelines 4404 may include any number of processing steps, such as but not limited to imaging data (or other input data) conversion or adaption (e.g., using DICOM adapter 4402A to convert DICOM images to another format suitable for processing by respective machine learning models, such as Neuroimaging Informatics Technology Initiative (NIfTI) format), AI-assisted annotation 4310, labeling or annotating of imaging data 4308 to generate labeled clinic data 4312, model selection from a model registry, model training 4314, training, retraining, or updating models, and/or other processing steps. In at least one embodiment, for different machine learning models used by deployment system 4306, different training pipelines 4404 may be used. In at least one embodiment, training pipeline 4404 similar to a first example described with respect to FIG. 43 may be used for a first machine learning model, training pipeline 4404 similar to a second example described with respect to FIG. 43 may be used for a second machine learning model, and training pipeline 4404 similar to a third example described with respect to FIG. 43 may be used for a third machine learning model. In at least one embodiment, any combination of tasks within training system 4304 may be used depending on what is required for each respective machine learning model. In at least one embodiment, one or more of machine learning models may already be trained and ready for deployment so machine learning models may not undergo any processing by training system 4304, and may be implemented by deployment system 4306.

In at least one embodiment, output model(s) 4316 and/or pre-trained model(s) 4406 may include any types of machine learning models depending on implementation or embodiment. In at least one embodiment, and without limitation, machine learning models used by system 4400 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Figure 47A:
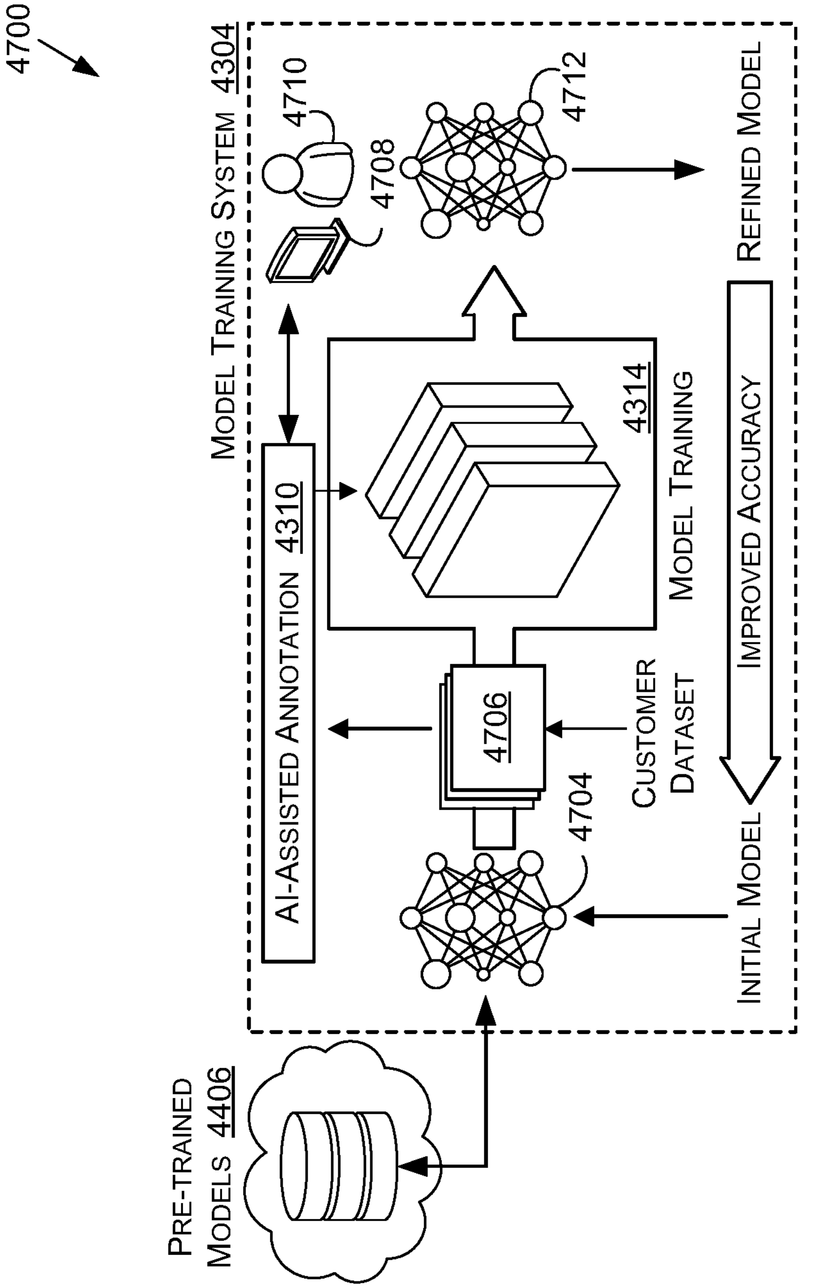
FIG. 47A illustrates a data flow diagram for a process to train a machine learning model, in accordance with at least one embodiment.
Figure 47B:
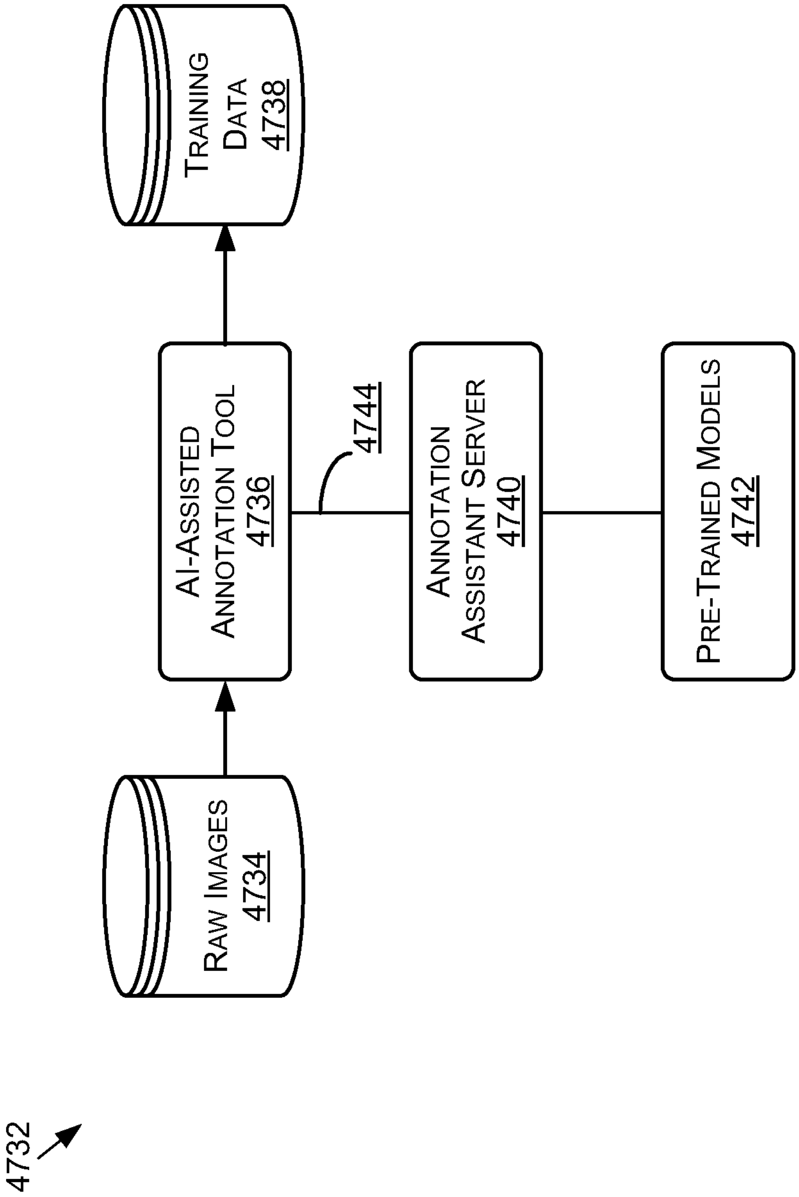
FIG. 47B is an example illustration of a client-server architecture to enhance annotation tools with pre-trained annotation models, in accordance with at least one embodiment.

In at least one embodiment, training pipelines 4404 may include AI-assisted annotation, as described in more detail herein with respect to at least FIG. 47B. In at least one embodiment, labeled clinic data 4312 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 4308 (or other data type used by machine learning models), there may be corresponding ground truth data generated by training system 4304. In at least one embodiment, AI-assisted annotation may be performed as part of deployment pipelines 4410; either in addition to, or in lieu of AI-assisted annotation included in training pipelines 4404. In at least one embodiment, system 4400 may include a multi-layer platform that may include a software layer (e.g., software 4318) of diagnostic applications (or other application types) that may perform one or more medical imaging and diagnostic functions. In at least one embodiment, system 4400 may be communicatively coupled to (e.g., via encrypted links) PACS server networks of one or more facilities. In at least one embodiment, system 4400 may be configured to access and referenced data (e.g., DICOM data, RIS data, raw data, CIS data, REST compliant data, RPC data, raw data, etc.) from PACS servers (e.g., via a DICOM adapter 4402, or another data type adapter such as RIS, CIS, REST compliant, RPC, raw, etc.) to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 4302). In at least one embodiment, applications may then call or execute one or more services 4320 for performing compute, AI, or visualization tasks associated with respective applications, and software 4318 and/or services 4320 may leverage hardware 4322 to perform processing tasks in an effective and efficient manner.

In at least one embodiment, deployment system 4306 may execute deployment pipelines 4410. In at least one embodiment, deployment pipelines 4410 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 4410 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 4410 depending on information desired from data generated by a device. In at least one embodiment, where detections of anomalies are desired from an MRI machine, there may be a first deployment pipeline 4410, and where image enhancement is desired from output of an MRI machine, there may be a second deployment pipeline 4410.

In at least one embodiment, applications available for deployment pipelines 4410 may include any application that may be used for performing processing tasks on imaging data or other data from devices. In at least one embodiment, different applications may be responsible for image enhancement, segmentation, reconstruction, anomaly detection, object detection, feature detection, treatment planning, dosimetry, beam planning (or other radiation treatment procedures), and/or other analysis, image processing, or inferencing tasks. In at least one embodiment, deployment system 4306 may define constructs for each of applications, such that users of deployment system 4306 (e.g., medical facilities, labs, clinics, etc.) may understand constructs and adapt applications for implementation within their respective facility. In at least one embodiment, an application for image reconstruction may be selected for inclusion in deployment pipeline 4410, but data type generated by an imaging device may be different from a data type used within an application. In at least one embodiment, DICOM adapter 4402B (and/or a DICOM reader) or another data type adapter or reader (e.g., RIS, CIS, REST compliant, RPC, raw, etc.) may be used within deployment pipeline 4410 to convert data to a form useable by an application within deployment system 4306. In at least one embodiment, access to DICOM, RIS, CIS, REST compliant, RPC, raw, and/or other data type libraries may be accumulated and pre-processed, including decoding, extracting, and/or performing any convolutions, color corrections, sharpness, gamma, and/or other augmentations to data. In at least one embodiment, DICOM, RIS, CIS, REST compliant, RPC, and/or raw data may be unordered and a pre-pass may be executed to organize or sort collected data. In at least one embodiment, because various applications may share common image operations, in some embodiments, a data augmentation library (e.g., as one of services 4320) may be used to accelerate these operations. In at least one embodiment, to avoid bottlenecks of conventional processing approaches that rely on CPU processing, parallel computing platform 4430 may be used for GPU acceleration of these processing tasks.

In at least one embodiment, an image reconstruction application may include a processing task that includes use of a machine learning model. In at least one embodiment, a user may desire to use their own machine learning model, or to select a machine learning model from model registry 4324. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 4400—such as services 4320 and hardware 4322—deployment pipelines 4410 may be even more user friendly, provide for easier integration, and produce more accurate, efficient, and timely results.

In at least one embodiment, deployment system 4306 may include a user interface 4414 (e.g., a graphical user interface, a web interface, etc.) that may be used to select applications for inclusion in deployment pipeline(s) 4410, arrange applications, modify or change applications or parameters or constructs thereof, use and interact with deployment pipeline(s) 4410 during set-up and/or deployment, and/or to otherwise interact with deployment system 4306. In at least one embodiment, although not illustrated with respect to training system 4304, user interface 4414 (or a different user interface) may be used for selecting models for use in deployment system 4306, for selecting models for training, or retraining, in training system 4304, and/or for otherwise interacting with training system 4304.

Figure 45:
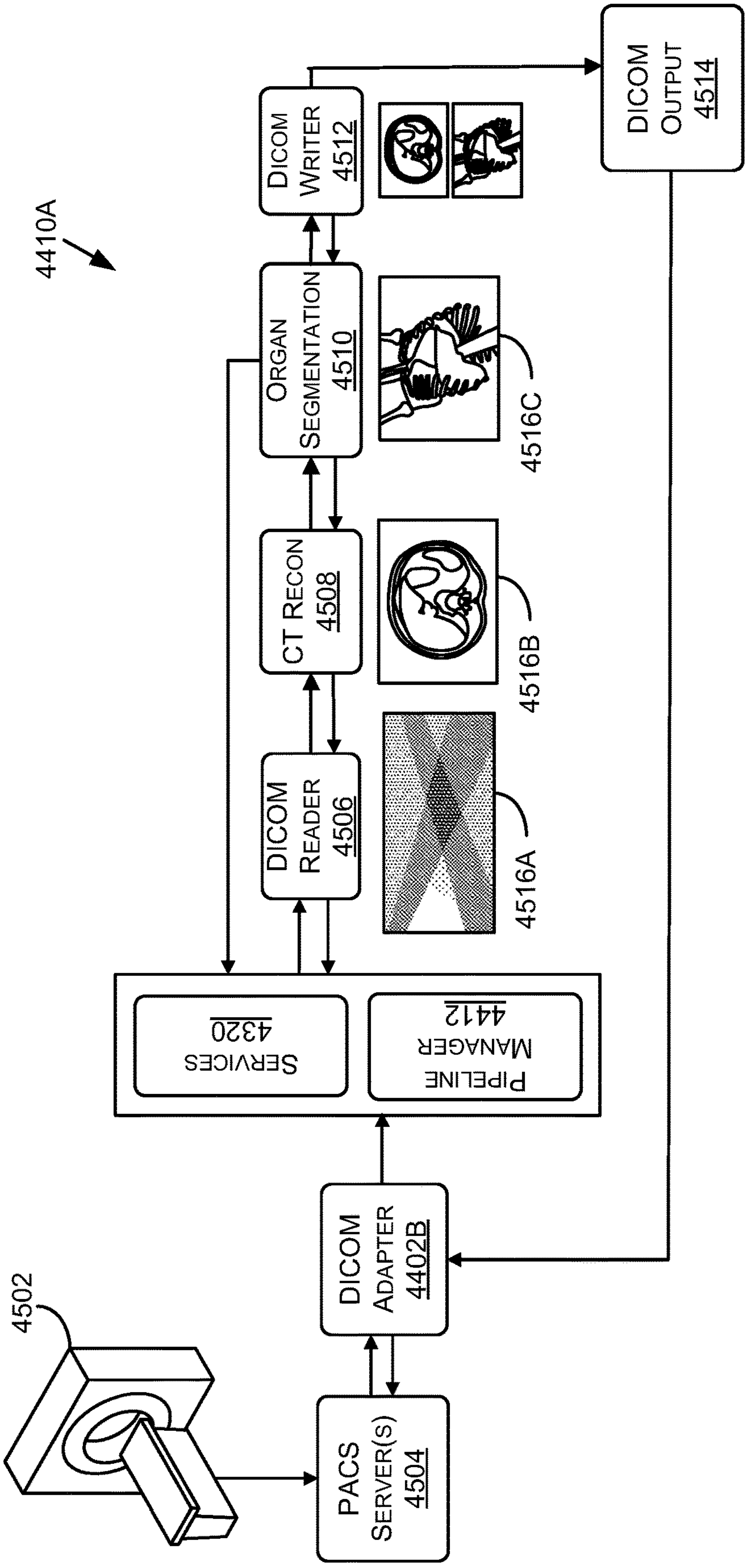
FIG. 45 includes an example illustration of an advanced computing pipeline 4410A for processing imaging data, in accordance with at least one embodiment.

In at least one embodiment, pipeline manager 4412 may be used, in addition to an application orchestration system 4428, to manage interaction between applications or containers of deployment pipeline(s) 4410 and services 4320 and/or hardware 4322. In at least one embodiment, pipeline manager 4412 may be configured to facilitate interactions from application to application, from application to service 4320, and/or from application or service to hardware 4322. In at least one embodiment, although illustrated as included in software 4318, this is not intended to be limiting, and in some examples (e.g., as illustrated in FIG. 45) pipeline manager 4412 may be included in services 4320. In at least one embodiment, application orchestration system 4428 (e.g., Kubernetes, DOCKER, etc.) may include a container orchestration system that may group applications into containers as logical units for coordination, management, scaling, and deployment. In at least one embodiment, by associating applications from deployment pipeline(s) 4410 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 4412 and application orchestration system 4428. In at least one embodiment, so long as an expected input and/or output of each container or application is known by a system (e.g., based on constructs of applications or containers), application orchestration system 4428 and/or pipeline manager 4412 may facilitate communication among and between, and sharing of resources among and between, each of applications or containers. In at least one embodiment, because one or more of applications or containers in deployment pipeline(s) 4410 may share same services and resources, application orchestration system 4428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 4428 such as a sequencer and/or asynchronous compute engine) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 4320 leveraged by and shared by applications or containers in deployment system 4306 may include compute services 4416, AI services 4418, visualization services 4420, and/or other service types. In at least one embodiment, applications may call (e.g., execute) one or more of services 4320 to perform processing operations for an application. In at least one embodiment, compute services 4416 may be leveraged by applications to perform super-computing or other high-performance computing (HPC) tasks. In at least one embodiment, compute service(s) 4416 may be leveraged to perform parallel processing (e.g., using a parallel computing platform 4430) for processing data through one or more of applications and/or one or more tasks of a single application, substantially simultaneously. In at least one embodiment, parallel computing platform 4430 (e.g., NVIDIA's CUDA) may enable general purpose computing on GPUs (GPGPU) (e.g., GPUs 4422). In at least one embodiment, a software layer of parallel computing platform 4430 may provide access to virtual instruction sets and parallel computational elements of GPUs, for execution of compute kernels. In at least one embodiment, parallel computing platform 4430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 4430 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 4418 may be leveraged to perform inferencing services for executing machine learning model(s) associated with applications (e.g., tasked with performing one or more processing tasks of an application). In at least one embodiment, AI services 4418 may leverage AI system 4424 to execute machine learning model(s) (e.g., neural networks, such as CNNs) for segmentation, reconstruction, object detection, feature detection, classification, and/or other inferencing tasks. In at least one embodiment, applications of deployment pipeline(s) 4410 may use one or more of output models 4316 from training system 4304 and/or other models of applications to perform inferencing on imaging data (e.g., DICOM data, RIS data, CIS data, REST compliant data, RPC data, raw data, etc.). In at least one embodiment, two or more examples of inferencing using application orchestration system 4428 (e.g., a scheduler, sequencer, and/or asynchronous compute engine) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 4428 may distribute resources (e.g., services 4320 and/or hardware 4322) based on priority paths for different inferencing tasks of AI services 4418.

In at least one embodiment, shared storage may be mounted to AI services 4418 within system 4400. In at least one embodiment, shared storage may operate as a cache (or other storage device type) and may be used to process inference requests from applications. In at least one embodiment, when an inference request is submitted, a request may be received by a set of API instances of deployment system 4306, and one or more instances may be selected (e.g., for best fit, for load balancing, etc.) to process a request. In at least one embodiment, to process a request, a request may be entered into a database, a machine learning model may be located from model registry 4324 if not already in a cache, a validation step may ensure appropriate machine learning model is loaded into a cache (e.g., shared storage), and/or a copy of a model may be saved to a cache. In at least one embodiment, a scheduler (e.g., of pipeline manager 4412) may be used to launch an application that is referenced in a request if an application is not already running or if there are not enough instances of an application. In at least one embodiment, if an inference server is not already launched to execute a model, an inference server may be launched. In at least one embodiment, any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inferencing on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inferencing as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT less than one minute) priority while others may have lower priority (e.g., TAT less than 10 minutes). In at least one embodiment, model execution times may be measured from requesting institution or entity and may include partner network traversal time, as well as execution on an inference service.

In at least one embodiment, transfer of requests between services 4320 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. In at least one embodiment, results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 4426, and an inference service may perform inferencing on a GPU.

In at least one embodiment, visualization services 4420 may be leveraged to generate visualizations for viewing outputs of applications and/or deployment pipeline(s) 4410. In at least one embodiment, GPUs 4422 may be leveraged by visualization services 4420 to generate visualizations. In at least one embodiment, rendering effects, such as ray-tracing, may be implemented by visualization services 4420 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 4420 may include an internal visualizer, cinematics, and/or other rendering or image processing capabilities or functionality (e.g., ray tracing, rasterization, internal optics, etc.).

In at least one embodiment, hardware 4322 may include GPUs 4422, AI system 4424, cloud 4426, and/or any other hardware used for executing training system 4304 and/or deployment system 4306. In at least one embodiment, GPUs 4422 (e.g., NVIDIA's TESLA and/or QUADRO GPUs) may include any number of GPUs that may be used for executing processing tasks of compute services 4416, AI services 4418, visualization services 4420, other services, and/or any of features or functionality of software 4318. For example, with respect to AI services 4418, GPUs 4422 may be used to perform pre-processing on imaging data (or other data types used by machine learning models), post-processing on outputs of machine learning models, and/or to perform inferencing (e.g., to execute machine learning models). In at least one embodiment, cloud 4426, AI system 4424, and/or other components of system 4400 may use GPUs 4422. In at least one embodiment, cloud 4426 may include a GPU-optimized platform for deep learning tasks. In at least one embodiment, AI system 4424 may use GPUs, and cloud 4426—or at least a portion tasked with deep learning or inferencing—may be executed using one or more AI systems 4424. As such, although hardware 4322 is illustrated as discrete components, this is not intended to be limiting, and any components of hardware 4322 may be combined with, or leveraged by, any other components of hardware 4322.

In at least one embodiment, AI system 4424 may include a purpose-built computing system (e.g., a super-computer or an IPC) configured for inferencing, deep learning, machine learning, and/or other artificial intelligence tasks. In at least one embodiment, AI system 4424 (e.g., NVIDIA's DGX) may include GPU-optimized software (e.g., a software stack) that may be executed using a plurality of GPUs 4422, in addition to CPUs, RAM, storage, and/or other components, features, or functionality. In at least one embodiment, one or more AI systems 4424 may be implemented in cloud 4426 (e.g., in a data center) for performing some or all of AI-based processing tasks of system 4400.

In at least one embodiment, cloud 4426 may include a GPU-accelerated infrastructure (e.g., NVIDIA's NGC) that may provide a GPU-optimized platform for executing processing tasks of system 4400. In at least one embodiment, cloud 4426 may include an AI system(s) 4424 for performing one or more of AI-based tasks of system 4400 (e.g., as a hardware abstraction and scaling platform). In at least one embodiment, cloud 4426 may integrate with application orchestration system 4428 leveraging multiple GPUs to enable seamless scaling and load balancing between and among applications and services 4320. In at least one embodiment, cloud 4426 may tasked with executing at least some of services 4320 of system 4400, including compute services 4416, AI services 4418, and/or visualization services 4420, as described herein. In at least one embodiment, cloud 4426 may perform small and large batch inference (e.g., executing NVIDIA's TENSOR RT), provide an accelerated parallel computing API and platform 4430 (e.g., NVIDIA's CUDA), execute application orchestration system 4428 (e.g., KUBERNETES), provide a graphics rendering API and platform (e.g., for ray-tracing, 2D graphics, 3D graphics, and/or other rendering techniques to produce higher quality cinematics), and/or may provide other functionality for system 4400.

In at least one embodiment, in an effort to preserve patient confidentiality (e.g., where patient data or records are to be used off-premises), cloud 4426 may include a registry—such as a deep learning container registry. In at least one embodiment, a registry may store containers for instantiations of applications that may perform pre-processing, post-processing, or other processing tasks on patient data. In at least one embodiment, cloud 4426 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, confidentiality of patient data is preserved in compliance with HIPAA and/or other data regulations.

In at least one embodiment, such components can be utilized to generate one or more objects within one or more second images based, at least in part, on one or more features of the one or more objects within one or more first images.

FIG. 45 includes an example illustration of a deployment pipeline 4410A for processing imaging data, in accordance with at least one embodiment. In at least one embodiment, system 4400—and specifically deployment system 4306—may be used to customize, update, and/or integrate deployment pipeline(s) 4410A into one or more production environments. In at least one embodiment, deployment pipeline 4410A of FIG. 45 includes a non-limiting example of a deployment pipeline 4410A that may be custom defined by a particular user (or team of users) at a facility (e.g., at a hospital, clinic, lab, research environment, etc.). In at least one embodiment, to define deployment pipelines 4410A for a CT scanner 4502, a user may select—from a container registry, for example—one or more applications that perform specific functions or tasks with respect to imaging data generated by CT scanner 4502. In at least one embodiment, applications may be applied to deployment pipeline 4410A as containers that may leverage services 4320 and/or hardware 4322 of system 4400. In addition, deployment pipeline 4410A may include additional processing tasks or applications that may be implemented to prepare data for use by applications (e.g., DICOM adapter 4402B and DICOM reader 4506 may be used in deployment pipeline 4410A to prepare data for use by CT reconstruction 4508, organ segmentation 4510, etc.). In at least one embodiment, deployment pipeline 4410A may be customized or selected for consistent deployment, one time use, or for another frequency or interval. In at least one embodiment, a user may desire to have CT reconstruction 4508 and organ segmentation 4510 for several subjects over a specific interval, and thus may deploy pipeline 4410A for that period of time. In at least one embodiment, a user may select, for each request from system 4400, applications that a user wants to perform processing on that data for that request. In at least one embodiment, deployment pipeline 4410A may be adjusted at any interval and, because of adaptability and scalability of a container structure within system 4400, this may be a seamless process.

In at least one embodiment, deployment pipeline 4410A of FIG. 45 may include CT scanner 4502 generating imaging data of a patient or subject. In at least one embodiment, imaging data from CT scanner 4502 may be stored on a PACS server(s) 4504 associated with a facility housing CT scanner 4502. In at least one embodiment, PACS server(s) 4504 may include software and/or hardware components that may directly interface with imaging modalities (e.g., CT scanner 4502) at a facility. In at least one embodiment, DICOM adapter 4402B may enable sending and receipt of DICOM objects using DICOM protocols. In at least one embodiment, DICOM adapter 4402B may aid in preparation or configuration of DICOM data from PACS server(s) 4504 for use by deployment pipeline 4410A. In at least one embodiment, once DICOM data is processed through DICOM adapter 4402B, pipeline manager 4412 may route data through to deployment pipeline 4410A. In at least one embodiment, DICOM reader 4506 may extract image files and any associated metadata from DICOM data (e.g., raw sinogram data, as illustrated in visualization 4516A). In at least one embodiment, working files that are extracted may be stored in a cache for faster processing by other applications in deployment pipeline 4410A. In at least one embodiment, once DICOM reader 4506 has finished extracting and/or storing data, a signal of completion may be communicated to pipeline manager 4412. In at least one embodiment, pipeline manager 4412 may then initiate or call upon one or more other applications or containers in deployment pipeline 4410A.

In at least one embodiment, CT reconstruction 4508 application and/or container may be executed once data (e.g., raw sinogram data) is available for processing by CT reconstruction 4508 application. In at least one embodiment, CT reconstruction 4508 may read raw sinogram data from a cache, reconstruct an image file out of raw sinogram data (e.g., as illustrated in visualization 4516B), and store resulting image file in a cache. In at least one embodiment, at completion of reconstruction, pipeline manager 4412 may be signaled that reconstruction task is complete. In at least one embodiment, once reconstruction is complete, and a reconstructed image file may be stored in a cache (or other storage device), organ segmentation 4510 application and/or container may be triggered by pipeline manager 4412. In at least one embodiment, organ segmentation 4510 application and/or container may read an image file from a cache, normalize or convert an image file to format suitable for inference (e.g., convert an image file to an input resolution of a machine learning model), and run inference against a normalized image. In at least one embodiment, to run inference on a normalized image, organ segmentation 4510 application and/or container may rely on services 4320, and pipeline manager 4412 and/or application orchestration system 4428 may facilitate use of services 4320 by organ segmentation 4510 application and/or container. In at least one embodiment, for example, organ segmentation 4510 application and/or container may leverage AI services 4418 to perform inferencing on a normalized image, and AI services 4418 may leverage hardware 4322 (e.g., AI system 4424) to execute AI services 4418. In at least one embodiment, a result of an inference may be a mask file (e.g., as illustrated in visualization 4516C) that may be stored in a cache (or other storage device).

In at least one embodiment, once applications that process DICOM data and/or data extracted from DICOM data have completed processing, a signal may be generated for pipeline manager 4412. In at least one embodiment, pipeline manager 4412 may then execute DICOM writer 4512 to read results from a cache (or other storage device), package results into a DICOM format (e.g., as DICOM output 4514) for use by users at a facility who generated a request. In at least one embodiment, DICOM output 4514 may then be transmitted to DICOM adapter 4402B to prepare DICOM output 4514 for storage on PACS server(s) 4504 (e.g., for viewing by a DICOM viewer at a facility). In at least one embodiment, in response to a request for reconstruction and segmentation, visualizations 4516B and 4516C may be generated and available to a user for diagnoses, research, and/or for other purposes.

Although illustrated as consecutive application in deployment pipeline 4410A, CT reconstruction 4508 and organ segmentation 4510 applications may be processed in parallel in at least one embodiment. In at least one embodiment, where applications do not have dependencies on one another, and data is available for each application (e.g., after DICOM reader 4506 extracts data), applications may be executed at a same time, substantially at a same time, or with some overlap. In at least one embodiment, where two or more applications require similar services 4320, a scheduler of system 4400 may be used to load balance and distribute compute or processing resources between and among various applications. In at least one embodiment, in some embodiments, parallel computing platform 4430 may be used to perform parallel processing for applications to decrease run-time of deployment pipeline 4410A to provide real-time results.

Figure 46A:
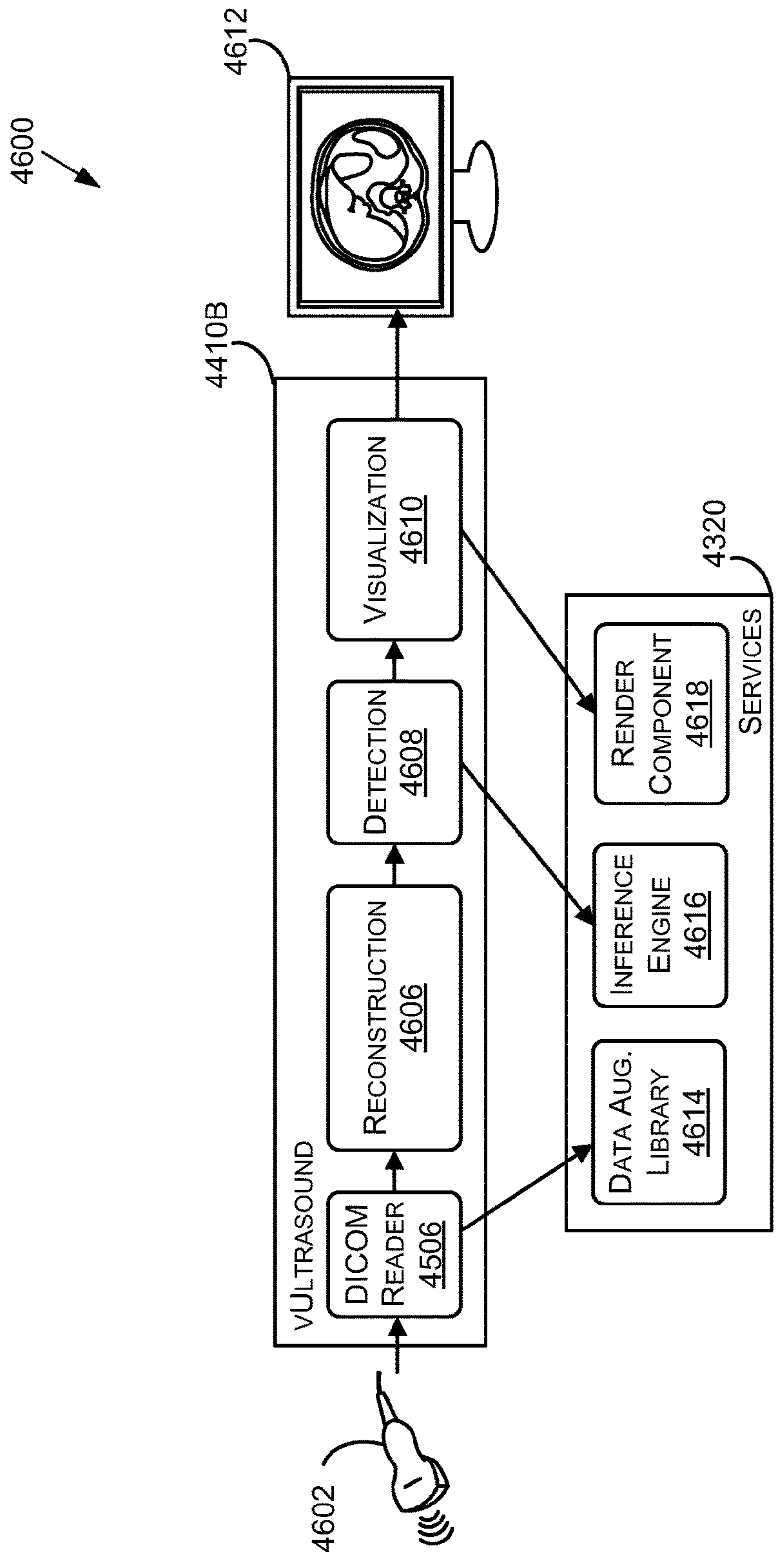
FIG. 46A includes an example data flow diagram of a virtual instrument supporting an ultrasound device, in accordance with at least one embodiment.
Figure 46B:
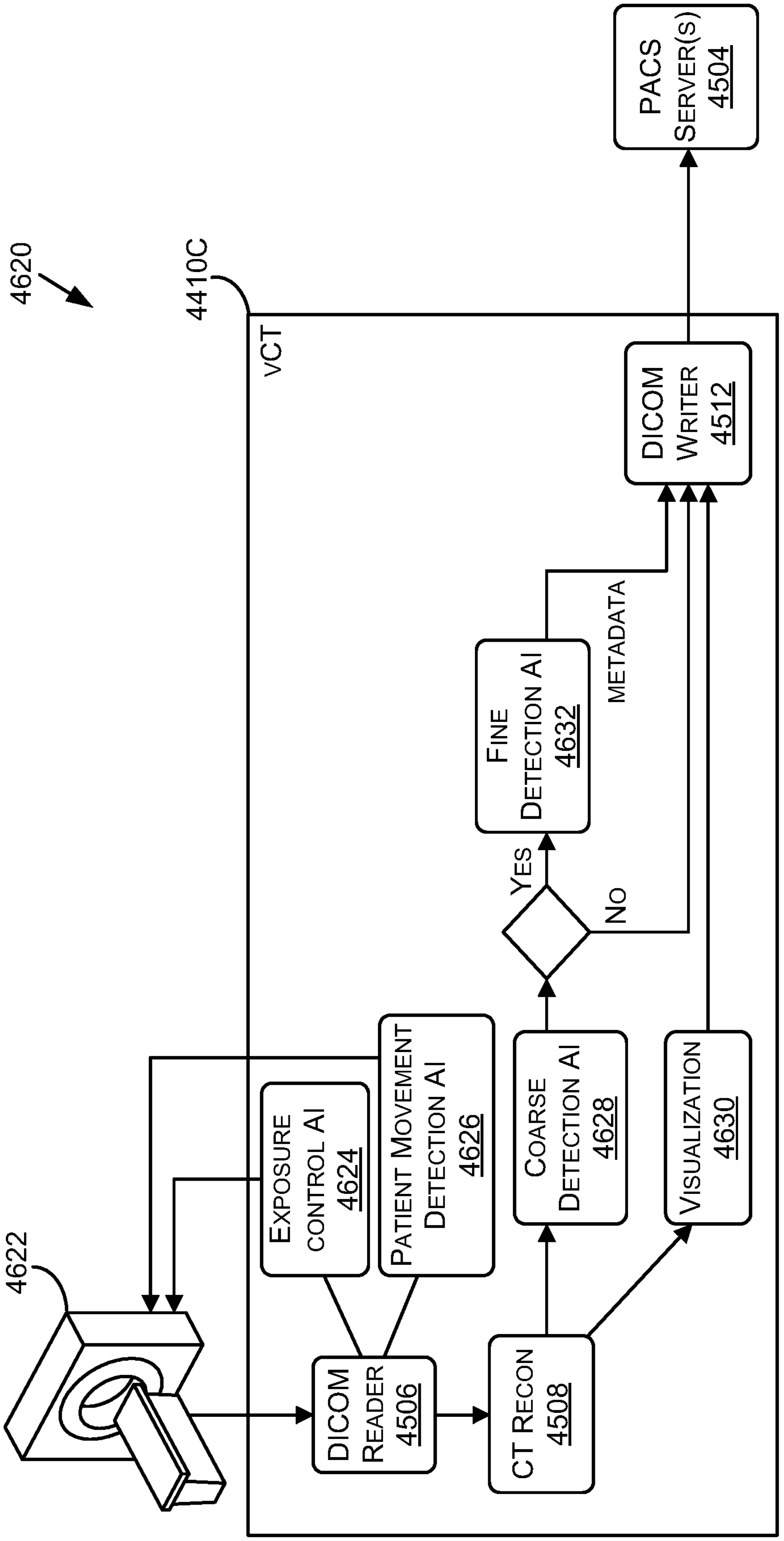
FIG. 46B includes an example data flow diagram of a virtual instrument supporting an CT scanner, in accordance with at least one embodiment.

In at least one embodiment, and with reference to FIGS. 46A-46B, deployment system 4306 may be implemented as one or more virtual instruments to perform different functionalities—such as image processing, segmentation, enhancement, AI, visualization, and inferencing—with imaging devices (e.g., CT scanners, X-ray machines, MRI machines, etc.), sequencing devices, genomics devices, and/or other device types. In at least one embodiment, system 4400 may allow for creation and provision of virtual instruments that may include a software-defined deployment pipeline 4410 that may receive raw/unprocessed input data generated by a device(s) and output processed/reconstructed data. In at least one embodiment, deployment pipelines 4410 (e.g., 4410A and 4410B) that represent virtual instruments may implement intelligence into a pipeline, such as by leveraging machine learning models, to provide containerized inference support to a system. In at least one embodiment, virtual instruments may execute any number of containers each including instantiations of applications. In at least one embodiment, such as where real-time processing is desired, deployment pipelines 4410 representing virtual instruments may be static (e.g., containers and/or applications may be set), while in other examples, container and/or applications for virtual instruments may be selected (e.g., on a per-request basis) from a pool of applications or resources (e.g., within a container registry).

In at least one embodiment, system 4400 may be instantiated or executed as one or more virtual instruments on-premise at a facility in, for example, a computing system deployed next to or otherwise in communication with a radiology machine, an imaging device, and/or another device type at a facility. In at least one embodiment, however, an on-premise installation may be instantiated or executed within a computing system of a device itself (e.g., a computing system integral to an imaging device), in a local datacenter (e.g., a datacenter on-premise), and/or in a cloud-environment (e.g., in cloud 4426). In at least one embodiment, deployment system 4306, operating as a virtual instrument, may be instantiated by a supercomputer or other HPC system in some examples. In at least one embodiment, on-premise installation may allow for high-bandwidth uses (via, for example, higher throughput local communication interfaces, such as RF over Ethernet) for real-time processing. In at least one embodiment, real-time or near real-time processing may be particularly useful where a virtual instrument supports an ultrasound device or other imaging modality where immediate visualizations are expected or required for accurate diagnoses and analyses. In at least one embodiment, a cloud-computing architecture may be capable of dynamic bursting to a cloud computing service provider, or other compute cluster, when local demand exceeds on-premise capacity or capability. In at least one embodiment, a cloud architecture, when implemented, may be tuned for training neural networks or other machine learning models, as described herein with respect to training system 4304. In at least one embodiment, with training pipelines in place, machine learning models may be continuously learn and improve as they process additional data from devices they support. In at least one embodiment, virtual instruments may be continually improved using additional data, new data, existing machine learning models, and/or new or updated machine learning models.

In at least one embodiment, a computing system may include some or all of hardware 4322 described herein, and hardware 4322 may be distributed in any of a number of ways including within a device, as part of a computing device coupled to and located proximate a device, in a local datacenter at a facility, and/or in cloud 4426. In at least one embodiment, because deployment system 4306 and associated applications or containers are created in software (e.g., as discrete containerized instantiations of applications), behavior, operation, and configuration of virtual instruments, as well as outputs generated by virtual instruments, may be modified or customized as desired, without having to change or alter raw output of a device that a virtual instrument supports.

In at least one embodiment, such components can be utilized to generate one or more objects within one or more second images based, at least in part, on one or more features of the one or more objects within one or more first images.

FIG. 46A includes an example data flow diagram of a virtual instrument supporting an ultrasound device, in accordance with at least one embodiment. In at least one embodiment, deployment pipeline 4410B may leverage one or more of services 4320 of system 4400. In at least one embodiment, deployment pipeline 4410B and services 4320 may leverage hardware 4322 of a system either locally or in cloud 4426. In at least one embodiment, although not illustrated, process 4600 may be facilitated by pipeline manager 4412, application orchestration system 4428, and/or parallel computing platform 4430.

In at least one embodiment, process 4600 may include receipt of imaging data from an ultrasound device 4602. In at least one embodiment, imaging data may be stored on PACS server(s) in a DICOM format (or other format, such as RIS, CIS, REST compliant, RPC, raw, etc.), and may be received by system 4400 for processing through deployment pipeline 4410 selected or customized as a virtual instrument (e.g., a virtual ultrasound) for ultrasound device 4602. In at least one embodiment, imaging data may be received directly from an imaging device (e.g., ultrasound device 4602) and processed by a virtual instrument. In at least one embodiment, a transducer or other signal converter communicatively coupled between an imaging device and a virtual instrument may convert signal data generated by an imaging device to image data that may be processed by a virtual instrument. In at least one embodiment, raw data and/or image data may be applied to DICOM reader 4506 to extract data for use by applications or containers of deployment pipeline 4410B. In at least one embodiment, DICOM reader 4506 may leverage data augmentation library 4614 (e.g., NVIDIA's DALI) as a service 4320 (e.g., as one of compute service(s) 4416) for extracting, resizing, rescaling, and/or otherwise preparing data for use by applications or containers.

In at least one embodiment, once data is prepared, a reconstruction 4606 application and/or container may be executed to reconstruct data from ultrasound device 4602 into an image file. In at least one embodiment, after reconstruction 4606, or at a same time as reconstruction 4606, a detection 4608 application and/or container may be executed for anomaly detection, object detection, feature detection, and/or other detection tasks related to data. In at least one embodiment, an image file generated during reconstruction 4606 may be used during detection 4608 to identify anomalies, objects, features, etc. In at least one embodiment, detection 4608 application may leverage an inference engine 4616 (e.g., as one of AI service(s) 4418) to perform inferencing on data to generate detections. In at least one embodiment, one or more machine learning models (e.g., from training system 4304) may be executed or called by detection 4608 application.

In at least one embodiment, once reconstruction 4606 and/or detection 4608 is/are complete, data output from these application and/or containers may be used to generate visualizations 4610, such as visualization 4612 (e.g., a grayscale output) displayed on a workstation or display terminal. In at least one embodiment, visualization may allow a technician or other user to visualize results of deployment pipeline 4410B with respect to ultrasound device 4602. In at least one embodiment, visualization 4610 may be executed by leveraging a render component 4618 of system 4400 (e.g., one of visualization service(s) 4420). In at least one embodiment, render component 4618 may execute a 2D, OpenGL, or ray-tracing service to generate visualization 4612.

In at least one embodiment, such components can be utilized to generate one or more objects within one or more second images based, at least in part, on one or more features of the one or more objects within one or more first images.

FIG. 46B includes an example data flow diagram of a virtual instrument supporting a CT scanner, in accordance with at least one embodiment. In at least one embodiment, deployment pipeline 4410C may leverage one or more of services 4320 of system 4400. In at least one embodiment, deployment pipeline 4410C and services 4320 may leverage hardware 4322 of a system either locally or in cloud 4426. In at least one embodiment, although not illustrated, process 4620 may be facilitated by pipeline manager 4412, application orchestration system 4428, and/or parallel computing platform 4430.

In at least one embodiment, process 4620 may include CT scanner 4622 generating raw data that may be received by DICOM reader 4506 (e.g., directly, via a PACS server 4504, after processing, etc.). In at least one embodiment, a Virtual CT (instantiated by deployment pipeline 4410C) may include a first, real-time pipeline for monitoring a patient (e.g., patient movement detection AI 4626) and/or for adjusting or optimizing exposure of CT scanner 4622 (e.g., using exposure control AI 4624). In at least one embodiment, one or more of applications (e.g., 4624 and 4626) may leverage a service 4320, such as AI service(s) 4418. In at least one embodiment, outputs of exposure control AI 4624 application (or container) and/or patient movement detection AI 4626 application (or container) may be used as feedback to CT scanner 4622 and/or a technician for adjusting exposure (or other settings of CT scanner 4622) and/or informing a patient to move less.

In at least one embodiment, deployment pipeline 4410C may include a non-real-time pipeline for analyzing data generated by CT scanner 4622. In at least one embodiment, a second pipeline may include CT reconstruction 4508 application and/or container, a coarse detection AI 4628 application and/or container, a fine detection AI 4632 application and/or container (e.g., where certain results are detected by coarse detection AI 4628), a visualization 4630 application and/or container, and a DICOM writer 4512 (and/or other data type writer, such as RIS, CIS, REST compliant, RPC, raw, etc.) application and/or container. In at least one embodiment, raw data generated by CT scanner 4622 may be passed through pipelines of deployment pipeline 4410C (instantiated as a virtual CT instrument) to generate results. In at least one embodiment, results from DICOM writer 4512 may be transmitted for display and/or may be stored on PACS server(s) 4504 for later retrieval, analysis, or display by a technician, practitioner, or other user.

In at least one embodiment, such components can be utilized to generate one or more objects within one or more second images based, at least in part, on one or more features of the one or more objects within one or more first images.

FIG. 47A illustrates a data flow diagram for a process 4700 to train, retrain, or update a machine learning model, in accordance with at least one embodiment. In at least one embodiment, process 4700 may be executed using, as a non-limiting example, system 4400 of FIG. 44. In at least one embodiment, process 4700 may leverage services 4320 and/or hardware 4322 of system 4400, as described herein. In at least one embodiment, refined models 4712 generated by process 4700 may be executed by deployment system 4306 for one or more containerized applications in deployment pipelines 4410.

In at least one embodiment, model training 4314 may include retraining or updating an initial model 4704 (e.g., a pre-trained model) using new training data (e.g., new input data, such as customer dataset 4706, and/or new ground truth data associated with input data). In at least one embodiment, to retrain, or update, initial model 4704, output or loss layer(s) of initial model 4704 may be reset, or deleted, and/or replaced with an updated or new output or loss layer(s). In at least one embodiment, initial model 4704 may have previously fine-tuned parameters (e.g., weights and/or biases) that remain from prior training, so training or retraining 4314 may not take as long or require as much processing as training a model from scratch. In at least one embodiment, during model training 4314, by having reset or replaced output or loss layer(s) of initial model 4704, parameters may be updated and re-tuned for a new data set based on loss calculations associated with accuracy of output or loss layer(s) at generating predictions on new, customer dataset 4706 (e.g., image data 4308 of FIG. 43).

In at least one embodiment, pre-trained models 4406 may be stored in a data store, or registry (e.g., model registry 4324 of FIG. 43). In at least one embodiment, pre-trained models 4406 may have been trained, at least in part, at one or more facilities other than a facility executing process 4700. In at least one embodiment, to protect privacy and rights of patients, subjects, or clients of different facilities, pre-trained models 4406 may have been trained, on-premise, using customer or patient data generated on-premise. In at least one embodiment, pre-trained models 4406 may be trained using cloud 4426 and/or other hardware 4322, but confidential, privacy protected patient data may not be transferred to, used by, or accessible to any components of cloud 4426 (or other off premise hardware). In at least one embodiment, where a pre-trained model 4406 is trained at using patient data from more than one facility, pre-trained model 4406 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 4406 on-premise and/or off premise, such as in a datacenter or other cloud computing infrastructure.

In at least one embodiment, when selecting applications for use in deployment pipelines 4410, a user may also select machine learning models to be used for specific applications. In at least one embodiment, a user may not have a model for use, so a user may select a pre-trained model 4406 to use with an application. In at least one embodiment, pre-trained model 4406 may not be optimized for generating accurate results on customer dataset 4706 of a facility of a user (e.g., based on patient diversity, demographics, types of medical imaging devices used, etc.). In at least one embodiment, prior to deploying pre-trained model 4406 into deployment pipeline 4410 for use with an application(s), pre-trained model 4406 may be updated, retrained, and/or fine-tuned for use at a respective facility.

In at least one embodiment, a user may select pre-trained model 4406 that is to be updated, retrained, and/or fine-tuned, and pre-trained model 4406 may be referred to as initial model 4704 for training system 4304 within process 4700. In at least one embodiment, customer dataset 4706 (e.g., imaging data, genomics data, sequencing data, or other data types generated by devices at a facility) may be used to perform model training 4314 (which may include, without limitation, transfer learning) on initial model 4704 to generate refined model 4712. In at least one embodiment, ground truth data corresponding to customer dataset 4706 may be generated by training system 4304. In at least one embodiment, ground truth data may be generated, at least in part, by clinicians, scientists, doctors, practitioners, at a facility (e.g., as labeled clinic data 4312 of FIG. 43).

In at least one embodiment, AI-assisted annotation 4310 may be used in some examples to generate ground truth data. In at least one embodiment, AI-assisted annotation 4310 (e.g., implemented using an AI-assisted annotation SDK) may leverage machine learning models (e.g., neural networks) to generate suggested or predicted ground truth data for a customer dataset. In at least one embodiment, user 4710 may use annotation tools within a user interface (a graphical user interface (GUI)) on computing device 4708.

In at least one embodiment, user 4710 may interact with a GUI via computing device 4708 to edit or fine-tune annotations or auto-annotations. In at least one embodiment, a polygon editing feature may be used to move vertices of a polygon to more accurate or fine-tuned locations.

In at least one embodiment, once customer dataset 4706 has associated ground truth data, ground truth data (e.g., from AI-assisted annotation, manual labeling, etc.) may be used by during model training 4314 to generate refined model 4712. In at least one embodiment, customer dataset 4706 may be applied to initial model 4704 any number of times, and ground truth data may be used to update parameters of initial model 4704 until an acceptable level of accuracy is attained for refined model 4712. In at least one embodiment, once refined model 4712 is generated, refined model 4712 may be deployed within one or more deployment pipelines 4410 at a facility for performing one or more processing tasks with respect to medical imaging data.

In at least one embodiment, refined model 4712 may be uploaded to pre-trained models 4406 in model registry 4324 to be selected by another facility. In at least one embodiment, his process may be completed at any number of facilities such that refined model 4712 may be further refined on new datasets any number of times to generate a more universal model.

In at least one embodiment, such components can be utilized to generate one or more objects within one or more second images based, at least in part, on one or more features of the one or more objects within one or more first images.

FIG. 47B is an example illustration of a client-server architecture 4732 to enhance annotation tools with pre-trained annotation models, in accordance with at least one embodiment. In at least one embodiment, AI-assisted annotation tools 4736 may be instantiated based on a client-server architecture 4732. In at least one embodiment, annotation tools 4736 in imaging applications may aid radiologists, for example, identify organs and abnormalities. In at least one embodiment, imaging applications may include software tools that help user 4710 to identify, as a non-limiting example, a few extreme points on a particular organ of interest in raw images 4734 (e.g., in a 3D MRI or CT scan) and receive auto-annotated results for all 2D slices of a particular organ. In at least one embodiment, results may be stored in a data store as training data 4738 and used as (for example and without limitation) ground truth data for training. In at least one embodiment, when computing device 4708 sends extreme points for AI-assisted annotation 4310, a deep learning model, for example, may receive this data as input and return inference results of a segmented organ or abnormality. In at least one embodiment, pre-instantiated annotation tools, such as AI-Assisted Annotation Tool 4736B in FIG. 47B, may be enhanced by making API calls (e.g., API Call 4744) to a server, such as an Annotation Assistant Server 4740 that may include a set of pre-trained models 4742 stored in an annotation model registry, for example. In at least one embodiment, an annotation model registry may store pre-trained models 4742 (e.g., machine learning models, such as deep learning models) that are pre-trained to perform AI-assisted annotation on a particular organ or abnormality. In at least one embodiment, these models may be further updated by using training pipelines 4404. In at least one embodiment, pre-installed annotation tools may be improved over time as new labeled clinic data 4312 is added.

Inference and/or training logic 1415 are used to perform inferencing and/or training operations associated with one or more embodiments. Details regarding inference and/or training logic 1415 are provided herein in conjunction with FIGS. 14A and/or 14B.

In at least one embodiment, such components can be utilized to generate one or more objects within one or more second images based, at least in part, on one or more features of the one or more objects within one or more first images.

At least one embodiment of the disclosure can be described in view of the following clauses:

1. A processor, comprising:
one or more circuits to generate one or more objects within one or more second images based, at least in part, on one or more features of the one or more objects within one or more first images.

2. The processor of claim 1, wherein the one or more circuits are further to perform face detection for an initial first image, of the one or more first images, and to perform feature detection, to determine the one or more features, within only a detected face region in this initial first image.

3. The processor of claim 2, wherein the one or more circuits are further to analyze the one or more features determined for this initial first image to predict a location of a face region in a subsequent first image.

4. The processor of claim 3, wherein the one or more circuits are further to analyze predicted regions for one or more subsequent first images based, at least in part, upon the one or more features determined for a respective prior first image of the one or more first images.

5. The processor of claim 4, wherein the one or more circuits are further to crop the one or more first images to correspond to the detected face regions, and to pass the cropped one or more first images to a feature detection network to detect the one or more features.

6. The processor of claim 1, wherein the one or more circuits are further to generate the one or more objects within the one or more second images by synthesizing data in one or more regions corresponding to the one or more features.

7. A system comprising:
one or more processors to generate one or more objects within one or more second images based, at least in part, on one or more features of the one or more objects within one or more first images.

8. The system of claim 7, wherein the one or more processors are further to perform face detection for an initial first image, of the one or more first images, and to perform feature detection, to determine the one or more features, within only a detected face region in this initial first image.

9. The system of claim 8, wherein the one or more processors are further to analyze the one or more features determined for this initial first image to predict a location of a face region in a subsequent first image.

10. The system of claim 9, wherein the one or more processors are further to analyze predicted regions for one or more subsequent first images based, at least in part, upon the one or more features determined for a respective prior first image of the one or more first images.

11. The system of claim 10, wherein the one or more processors are further to crop the one or more first images to correspond to the detected face regions, and to pass the cropped one or more first images to a feature detection network to detect the one or more features.

12. The system of claim 7, wherein the one or more processors are further to generate the one or more objects within the one or more second images by synthesizing data in one or more regions corresponding to the one or more features.

13. A method comprising:
generating one or more objects within one or more second images based, at least in part, on one or more features of the one or more objects within one or more first images.

14. The method of claim 13, further comprising:
performing face detection for an initial first image, of the one or more first images, and to perform feature detection, to determine the one or more features, within only a detected face region in this initial first image.

15. The method of claim 14, further comprising:
analyzing the one or more features determined for this initial first image to predict a location of a face region in a subsequent first image.

16. The method of claim 15, further comprising:
analyzing predicted regions for one or more subsequent first images based, at least in part, upon the one or more features determined for a respective prior first image of the one or more first images.

17. The method of claim 16, further comprising:
cropping the one or more first images to correspond to the detected face regions, and to pass the cropped one or more first images to a feature detection network to detect the one or more features.

18. The method of claim 13, further comprising:
generating the one or more objects within the one or more second images by synthesizing data in one or more regions corresponding to the one or more features.

19. A machine-readable medium having stored thereon a set of instructions, which if performed by one or more processors, cause the one or more processors to at least:
generate one or more objects within one or more second images based, at least in part, on one or more features of the one or more objects within one or more first images.

20. The machine-readable medium of claim 19, wherein the instructions if performed further cause the one or more processors to:
perform face detection for an initial first image, of the one or more first images, and to perform feature detection, to determine the one or more features, within only a detected face region in this initial first image.

21. The machine-readable medium of claim 20, wherein the instructions if performed further cause the one or more processors to:
analyze the one or more features determined for this initial first image to predict a location of a face region in a subsequent first image.

22. The machine-readable medium of claim 21, wherein the instructions if performed further cause the one or more processors to:
analyze predicted regions for one or more subsequent first images based, at least in part, upon the one or more features determined for a respective prior first image of the one or more first images.

23. The machine-readable medium of claim 22, wherein the instructions if performed further cause the one or more processors to:
crop the one or more first images to correspond to the detected face regions, and to pass the cropped one or more first images to a feature detection network to detect the one or more features.

24. The machine-readable medium of claim 19, wherein the instructions if performed further cause the one or more processors to:
generate the one or more objects within the one or more second images by synthesizing data in one or more regions corresponding to the one or more features.

25. A image generation system, comprising:
one or more processors to generate one or more objects within one or more second images based, at least in part, on one or more features of the one or more objects within one or more first images; and
memory for storing network parameters for the one or more neural networks.

26. The image generation system of claim 25, wherein the one or more processors are further to perform face detection for an initial first image, of the one or more first images, and to perform feature detection, to determine the one or more features, within only a detected face region in this initial first image.

27. The image generation system of claim 26, wherein the one or more processors are further to analyze the one or more features determined for this initial first image to predict a location of a face region in a subsequent first image.

28. The image generation system of claim 27, wherein the one or more processors are further to analyze predicted regions for one or more subsequent first images based, at least in part, upon the one or more features determined for a respective prior first image of the one or more first images.

29. The image generation system of claim 28, wherein the one or more processors are further to crop the one or more first images to correspond to the detected face regions, and to pass the cropped one or more first images to a feature detection network to detect the one or more features.

30. The image generation system of claim 25, wherein the one or more processors are further to generate the one or more objects within the one or more second images by synthesizing data in one or more regions corresponding to the one or more features.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

In at least one embodiment, referring back to FIG. 20, computer programs in form of machine-readable executable code or computer control logic algorithms are stored in main memory 2004 and/or secondary storage. Computer programs, if executed by one or more processors, enable system 2000 to perform various functions in accordance with at least one embodiment. In at least one embodiment, memory 2004, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of CPU 2002, parallel processing system 2012, an integrated circuit capable of at least a portion of capabilities of both CPU 2002, parallel processing system 2012, a chipset (e.g., a group of integrated circuits designed to work and sold as a unit for performing related functions, etc.), and/or any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, computer system 2000 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a handheld electronic device, a mobile phone device, a television, workstation, game consoles, embedded system, and/or any other type of logic.

In at least one embodiment, parallel processing system 2012 includes, without limitation, a plurality of parallel processing units ("PPUs") 2014 and associated memories 2016. In at least one embodiment, PPUs 2014 are connected to a host processor or other peripheral devices via an interconnect 2018 and a switch 2020 or multiplexer. In at least one embodiment, parallel processing system 2012 distributes computational tasks across PPUs 2014 which can be parallelizable for example, as part of distribution of computational tasks across multiple graphics processing unit ("GPU") thread blocks. In at least one embodiment, memory is shared and accessible (e.g., for read and/or write access) across some or all of PPUs 2014, although such shared memory may incur performance penalties relative to use of local memory and registers resident to a PPU 2014. In at least one embodiment, operation of PPUs 2014 is synchronized through use of a command such as _syncthreads( ), wherein all threads in a block (e.g., executed across multiple PPUs 2014) to reach a certain point of execution of code before proceeding.

In at least one embodiment, one or more techniques described herein utilize a oneAPI programming model. In at least one embodiment, a oneAPI programming model refers to a programming model for interacting with various compute accelerator architectures. In at least one embodiment, oneAPI refers to an application programming interface (API) designed to interact with various compute accelerator architectures. In at least one embodiment, a oneAPI programming model utilizes a DPC++ programming language. In at least one embodiment, a DPC++ programming language refers to a high-level language for data parallel programming productivity. In at least one embodiment, a DPC++ programming language is based at least in part on C and/or C++ programming languages. In at least one embodiment, a oneAPI programming model is a programming model such as those developed by Intel Corporation of Santa Clara, CA.

In at least one embodiment, oneAPI and/or oneAPI programming model is utilized to interact with various accelerator, GPU, processor, and/or variations thereof, architectures. In at least one embodiment, oneAPI includes a set of libraries that implement various functionalities. In at least one embodiment, oneAPI includes at least a oneAPI DPC++ library, a oneAPI math kernel library, a oneAPI data analytics library, a oneAPI deep neural network library, a oneAPI collective communications library, a oneAPI threading building blocks library, a oneAPI video processing library, and/or variations thereof.

In at least one embodiment, a oneAPI DPC++ library, also referred to as oneDPL, is a library that implements algorithms and functions to accelerate DPC++ kernel programming. In at least one embodiment, oneDPL implements one or more standard template library (STL) functions. In at least one embodiment, oneDPL implements one or more parallel STL functions. In at least one embodiment, oneDPL provides a set of library classes and functions such as parallel algorithms, iterators, function object classes, range-based API, and/or variations thereof. In at least one embodiment, oneDPL implements one or more classes and/or functions of a C++ standard library. In at least one embodiment, oneDPL implements one or more random number generator functions.

In at least one embodiment, a oneAPI math kernel library, also referred to as oneMKL, is a library that implements various optimized and parallelized routines for various mathematical functions and/or operations. In at least one embodiment, oneMKL implements one or more basic linear algebra subprograms (BLAS) and/or linear algebra package (LAPACK) dense linear algebra routines. In at least one embodiment, oneMKL implements one or more sparse BLAS linear algebra routines. In at least one embodiment, oneMKL implements one or more random number generators (RNGs). In at least one embodiment, oneMKL implements one or more vector mathematics (VM) routines for mathematical operations on vectors. In at least one embodiment, oneMKL implements one or more Fast Fourier Transform (FFT) functions.

In at least one embodiment, a oneAPI data analytics library, also referred to as oneDAL, is a library that implements various data analysis applications and distributed computations. In at least one embodiment, oneDAL implements various algorithms for preprocessing, transformation, analysis, modeling, validation, and decision making for data analytics, in batch, online, and distributed processing modes of computation. In at least one embodiment, oneDAL implements various C++ and/or Java APIs and various connectors to one or more data sources. In at least one embodiment, oneDAL implements DPC++ API extensions to a traditional C++ interface and enables GPU usage for various algorithms.

In at least one embodiment, a oneAPI deep neural network library, also referred to as oneDNN, is a library that implements various deep learning functions. In at least one embodiment, oneDNN implements various neural network, machine learning, and deep learning functions, algorithms, and/or variations thereof.

In at least one embodiment, a oneAPI collective communications library, also referred to as oneCCL, is a library that implements various applications for deep learning and machine learning workloads. In at least one embodiment, oneCCL is built upon lower-level communication middleware, such as message passing interface (MPI) and libfabrics. In at least one embodiment, oneCCL enables a set of deep learning specific optimizations, such as prioritization, persistent operations, out of order executions, and/or variations thereof. In at least one embodiment, oneCCL implements various CPU and GPU functions.

In at least one embodiment, a oneAPI threading building blocks library, also referred to as oneTBB, is a library that implements various parallelized processes for various applications. In at least one embodiment, oneTBB is utilized for task-based, shared parallel programming on a host. In at least one embodiment, oneTBB implements generic parallel algorithms. In at least one embodiment, oneTBB implements concurrent containers. In at least one embodiment, oneTBB implements a scalable memory allocator. In at least one embodiment, oneTBB implements a work-stealing task scheduler. In at least one embodiment, oneTBB implements low-level synchronization primitives. In at least one embodiment, oneTBB is compiler-independent and usable on various processors, such as GPUs, PPUs, CPUs, and/or variations thereof.

In at least one embodiment, a oneAPI video processing library, also referred to as oneVPL, is a library that is utilized for accelerating video processing in one or more applications. In at least one embodiment, oneVPL implements various video decoding, encoding, and processing functions. In at least one embodiment, oneVPL implements various functions for media pipelines on CPUs, GPUs, and other accelerators. In at least one embodiment, oneVPL implements device discovery and selection in media centric and video analytics workloads. In at least one embodiment, oneVPL implements API primitives for zero-copy buffer sharing.

In at least one embodiment, a oneAPI programming model utilizes a DPC++ programming language. In at least one embodiment, a DPC++ programming language is a programming language that includes, without limitation, functionally similar versions of CUDA mechanisms to define device code and distinguish between device code and host code. In at least one embodiment, a DPC++ programming language may include a subset of functionality of a CUDA programming language. In at least one embodiment, one or more CUDA programming model operations are performed using a oneAPI programming model using a DPC++ programming language.

In at least one embodiment, any application programming interface (API) described herein is compiled into one or more instructions, operations, or any other signal by a compiler, interpreter, or other software tool. In at least one embodiment, compilation comprises generating one or more machine-executable instructions, operations, or other signals from source code. In at least one embodiment, an API compiled into one or more instructions, operations, or other signals, when performed, causes one or more processors such as graphics processors 3500, graphics cores 2500, parallel processor 2700, processor 3000, processor core 3000, or any other logic circuit further described herein to perform one or more computing operations.

It should be noted that, while example embodiments described herein may relate to a CUDA programming model, techniques described herein can be utilized with any suitable programming model, such HIP, oneAPI, and/or variations thereof.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In the scope of this application, the term arithmetic logic unit, or ALU, is used to refer to any computational logic circuit that processes operands to produce a result. For example, in the present document, the term ALU can refer to a floating point unit, a DSP, a tensor core, a shader core, a coprocessor, or a CPU.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A processor, comprising:
one or more circuits to:
apply an object detector to a first image to detect a first object region of a first image;
perform feature detection within the detected first object region to detect one or more features of one or more objects within the detected first object region, wherein the feature detection is constrained to a portion of the first image corresponding to the detected first object region;
predict one or more second object regions to perform feature detection within one or more second images based, at least in part, on the detected one or more features of the one or more objects within the first image without applying the object detector to the one or more second images to detect the one or more second object regions; and
perform feature detection within the predicted one or more second object regions to detect one or more features of the one or more objects within the predicted one or more second object regions, wherein the feature detection is constrained to a portion of the one or more second images corresponding to the predicted second object regions.

2. The processor of claim 1, wherein to detect the first object region the one or more circuits are further to perform face detection on the first image, wherein the detected first object region is a detected first face region of the first image, and wherein to detect the one or more features, the one or more circuits are to perform feature detection within only the detected first face region in the first image.

3. The processor of claim 2, wherein the one or more circuits are further to analyze the detected one or more features determined for the first image to predict a location of a face region in the one or more second images subsequent to the first image without performing objection detection on the one or more second images.

4. The processor of claim 3, wherein the one or more circuits are further to analyze predicted face regions for one or more subsequent images subsequent to the one or more second images, the predicted face regions predicted based, at least in part, upon the detected one or more features determined for the first image.

5. The processor of claim 4, wherein the one or more circuits are further to crop the first image to correspond to the detected face region, and to pass the cropped first image to a feature detection network to detect the one or more features.

6. The processor of claim 1, wherein the first image and the one or more second images are different frames of a video, wherein the one or more circuits are further to cause transmission of compressed video data comprising keypoints corresponding to features of one or more objects within the predicted one or more second object regions of the one or more second images without including in the compressed video data information representing content of the one or more second image outside the predicted one or more second object regions, the keypoints usable to reconstruct the one or more objects within one or more reconstructed second images in a decompressed version of the video.

7. A system, comprising:
one or more processors to:
apply an object detector to a first image to detect a first object region of a first image;
perform feature detection within the detected first object region to detect one or more features of one or more objects within the detected first object region, wherein the feature detection is constrained to a portion of the first image corresponding to the detected first object region;
predict one or more second object regions to perform feature detection within one or more second images based, at least in part, on the detected one or more features of the one or more objects within the first image without applying the object detector to the one or more second images to detect the one or more second object regions; and
perform feature detection within the predicted one or more second object regions to detect one or more features of the one or more objects within the predicted one or more second object regions, wherein the feature detection is constrained to a portion of the one or more second images corresponding to the predicted second object regions.

8. The system of claim 7, wherein to detect the first object region the one or more processors are further to perform face detection on the first image, wherein the detected first object region is a detected first face region of the first image, and wherein to detect the one or more features, the one or more circuits are to perform feature detection within only the detected first face region in the first image.

9. The system of claim 8, wherein the one or more processors are further to analyze the detected one or more features determined for the first image to predict a location of a face region in the one or more second images subsequent to the first image without performing objection detection on the one or more second images.

10. The system of claim 9, wherein the one or more processors are further to analyze predicted face regions for one or more subsequent images subsequent to the one or more second images, the predicted face regions predicted based, at least in part, upon the detected one or more features determined for the first image.

11. The system of claim 10, wherein the one or more processors are further to crop the first image to correspond to the detected face region, and to pass the cropped first image to a feature detection network to detect the one or more features.

12. The system of claim 7, wherein the first image and the one or more second images are different frames of a video, wherein the one or more processors are further to cause transmission of compressed video data comprising keypoints corresponding to features of one or more objects within the predicted one or more second object regions of the one or more second images without including in the compressed video data information representing content of the one or more second image outside the predicted one or more second object regions, the keypoints usable to reconstruct the one or more objects within one or more reconstructed second images in a decompressed version of the video.

13. A method, comprising:
applying an object detector to a first image to detect a first object region of a first image;
performing feature detection within the detected first object region to detect one or more features of one or more objects within the detected first object region, wherein the feature detection is constrained to a portion of the first image corresponding to the detected first object region;

predicting one or more second object regions to perform feature detection within one or more second images based, at least in part, on the detected one or more features of the one or more objects within the first image without applying the object detector to the one or more second images to detect the one or more second object regions; and performing feature detection within the predicted one or more second object regions to detect one or more features of the one or more objects within the predicted one or more second object regions, wherein the feature detection is constrained to a portion of the one or more second images corresponding to the predicted second object regions.

14. The method of claim 13, wherein detecting the first object region comprises:

performing face detection on the first image, wherein the detected first object region is a detected first face region of the first image, and wherein detecting the one or more features comprises performing feature detection within only the detected first face region in the first image.

15. The method of claim 14, further comprising:

analyzing the detected one or more features determined for the first image to predict a location of a face region in the one or more second images subsequent to the first image without performing objection detection on the one or more second images.

16. The method of claim 15, further comprising:

analyzing predicted face regions for one or more subsequent images subsequent to the one or more second images, the predicted face regions predicted based, at least in part, upon the detected one or more features determined for the first image.

17. The method of claim 16, further comprising:

cropping the first image to correspond to the detected face region, and to pass the cropped first image to a feature detection network to detect the one or more features.

18. The method of claim 13, wherein the first image and the one or more second images are different frames of a video, the method further comprising:

transmitting compressed video data comprising keypoints corresponding to features of one or more objects within the predicted one or more second object regions of the one or more second images without including in the compressed video data information representing content of the one or more second image outside the predicted one or more second object regions, the keypoints usable to reconstruct the one or more objects within one or more reconstructed second images in a decompressed version of the video.

19. A non-transitory machine-readable medium having stored thereon a set of instructions, which if performed by one or more processors, cause the one or more processors to at least:

apply an object detector to a first image to detect a first object region of a first image;

perform feature detection within the detected first object region to detect one or more features of one or more objects within the detected first object region, wherein the feature detection is constrained to a portion of the first image corresponding to the detected first object region;

predict one or more second object regions to perform feature detection within one or more second images based, at least in part, on the detected one or more features of the one or more objects within the first image without applying the object detector to the one or more second images to detect the one or more second object regions; and perform feature detection within the predicted one or more second object regions to detect one or more features of the one or more objects within the predicted one or more second object regions, wherein the feature detection is constrained to a portion of the one or more second images corresponding to the predicted second object regions.

20. The non-transitory machine-readable medium of claim 19, wherein to detect the first object region the instructions if performed further cause the one or more processors to: perform face detection on the first image, wherein the detected first object region is a detected first face region of the first image, and wherein to detect the one or more features, the one or more circuits are to perform feature detection within only the detected first face region in the first image.

21. The non-transitory machine-readable medium of claim 20, wherein the instructions if performed further cause the one or more processors to:

analyze the detected one or more features determined for the first image to predict a location of a face region in the one or more second images subsequent to the first image without performing objection detection on the one or more second images.

22. The non-transitory machine-readable medium of claim 21, wherein the instructions if performed further cause the one or more processors to:

analyze predicted face regions for one or more subsequent images subsequent to the one or more second images, the predicted face regions predicted based, at least in part, upon the detected one or more features determined for the first image.

23. The non-transitory machine-readable medium of claim 22, wherein the instructions if performed further cause the one or more processors to:

crop the first image to correspond to the detected face region, and to pass the cropped first image to a feature detection network to detect the one or more features.

24. The non-transitory machine-readable medium of claim 19, wherein the first image and the one or more second images are different frames of a video, wherein the instructions if performed further cause the one or more processors to:

cause transmission of compressed video data comprising keypoints corresponding to features of one or more objects within the predicted one or more second object regions of the one or more second images without including in the compressed video data information representing content of the one or more second image outside the predicted one or more second object regions, the keypoints usable to reconstruct the one or more objects within one or more reconstructed second images in a decompressed version of the video.

25. An image generation system, comprising:

one or more processors to:

apply an object detector to a first image to detect a first object region of a first image;

perform feature detection within the detected first object region to detect one or more features of one or more objects within the detected first object region, wherein the feature detection is constrained to a portion of the first image corresponding to the detected first object region;

predict one or more second object regions to perform feature detection within one or more second images based, at least in part, on the detected one or more features of the one or more objects within the first image without applying the object detector to the one or more second images to detect the one or more second object regions; and perform feature detection within the predicted one or more second object regions to detect one or more features of the one or more objects within the predicted one or more second object regions, wherein the feature detection is constrained to a portion of the one or more second images corresponding to the predicted second object regions; and memory for storing network parameters for one or more neural networks to be used by the one or more processors to predict the one or more second object regions.

26. The image generation system of claim 25, wherein to detect the first object region the one or more processors are further to perform face detection on the first image, wherein the detected first object region is a detected first face region of the first image, and wherein to detect the one or more features, the one or more circuits are to perform feature detection within only the detected first face region in the first image.

27. The image generation system of claim 26, wherein the one or more processors are further to analyze the detected one or more features determined for the first image to predict a location of a face region in the one or more second images subsequent to the first image without performing objection detection on the one or more second images.

28. The image generation system of claim 27, wherein the one or more processors are further to analyze predicted face regions for one or more subsequent images subsequent to the one or more second images, the predicted face regions predicted based, at least in part, upon the detected one or more features determined for the first image.

29. The image generation system of claim 28, wherein the one or more processors are further to crop the first image to correspond to the detected face region, and to pass the cropped first image to a feature detection network to detect the one or more features.

30. The image generation system of claim 25, wherein the first image and the one or more second images are different frames of a video, wherein the one or more processors are further to cause transmission of compressed video data comprising keypoints corresponding to features of one or more objects within the predicted one or more second object regions of the one or more second images without including in the compressed video data information representing content of the one or more second image outside the predicted one or more second object regions, the keypoints usable to reconstruct the one or more objects within one or more reconstructed second images in a decompressed version of the video.

* * * * *